US010654346B2

(12) United States Patent
Copp et al.

(10) Patent No.: US 10,654,346 B2
(45) Date of Patent: May 19, 2020

(54) FOLDING/RETRACTABLE PICKUP TRUCK BOX COVER

(71) Applicant: Peragon Enterprises, Inc., Spooner, WI (US)

(72) Inventors: Heath Copp, Town of Trego, WI (US); Joel Anderson, Lammers Township, WI (US)

(73) Assignee: PERAGON ENTERPRISES, INC., Bemidji, MN (US)

( * ) Notice: Subject to any disclaimer, the term of this patent is extended or adjusted under 35 U.S.C. 154(b) by 398 days.

(21) Appl. No.: 15/615,490

(22) Filed: Jun. 6, 2017

(65) Prior Publication Data

US 2017/0334275 A1 Nov. 23, 2017

Related U.S. Application Data

(63) Continuation of application No. 13/766,396, filed on Feb. 13, 2013, now Pat. No. 9,707,833.

(60) Provisional application No. 61/763,901, filed on Feb. 12, 2013, provisional application No. 61/598,665, filed on Feb. 14, 2012, provisional application No. 61/598,338, filed on Feb. 13, 2012.

(51) Int. Cl.
*B60J 7/14* (2006.01)
*B60J 7/19* (2006.01)
*B60J 7/04* (2006.01)

(52) U.S. Cl.
CPC .............. *B60J 7/141* (2013.01); *B60J 7/041* (2013.01); *B60J 7/198* (2013.01)

(58) Field of Classification Search
CPC ...... B60J 7/04; B60J 7/041; B60J 7/042; B60J 7/14; B60J 7/141
See application file for complete search history.

(56) References Cited

U.S. PATENT DOCUMENTS

| 2,559,929 | A | 7/1951 | Bjork |
| 4,210,361 | A | 7/1980 | Marvin et al. |
| 4,550,945 | A | 11/1985 | Englehardt |
| 4,826,232 | A | 5/1989 | Wissler |
| 4,861,092 | A | 8/1989 | Bogard |

(Continued)

OTHER PUBLICATIONS http://web.archive.org/web/20090823121617/http:/www.peragon.com, by Way Back Machine, dated Aug. 23, 2009, 2 pp.

(Continued)

*Primary Examiner* — Michael P Ferguson
(74) *Attorney, Agent, or Firm* — Merchant & Gould P.C.

(57) ABSTRACT

A retractable pickup truck box cover system includes a pivot joint with improved strength, durability, and manufacturability between panels of a panel assembly of the cover system. A sealing system between the panels and along ends of the panel assembly provides improved weather resistance to the cover system. A lateral support system provides resistance to binding loads when opening and closing the panel assembly. The lateral support system may also aid installation of the cover system. A ramp adjustment system allows fine tuning of the ramps that guide folding and unfolding of the panel assembly. An improved locking system and the pivot joints allow more compact storage of the panel assembly. The improved locking system includes lock rods that engage rails of the cover system. Connecting structures connect adjacent panel pairs when the cover system is deployed and do not connect the adjacent panels when the cover system is stowed.

9 Claims, 114 Drawing Sheets

(56) References Cited

U.S. PATENT DOCUMENTS

| | | | |
|---|---|---|---|
| 4,867,220 | A | 9/1989 | Matsumoto et al. |
| 5,040,843 | A | 8/1991 | Russell et al. |
| 5,087,093 | A | 2/1992 | Repetti |
| 5,344,159 | A | 9/1994 | Powell |
| 5,653,491 | A | 8/1997 | Steffens et al. |
| 5,823,605 | A | 10/1998 | Seargeant |
| 6,113,176 | A | 9/2000 | Bernardo |
| 6,158,171 | A | 12/2000 | Kellogg et al. |
| 6,321,819 | B1 | 11/2001 | Copp et al. |
| 6,382,699 | B1 | 5/2002 | Hanson |
| 6,533,343 | B2 | 3/2003 | Bohm et al. |
| 6,827,389 | B1 | 12/2004 | Pandorf |
| 6,997,634 | B2 | 2/2006 | Zheng |
| 7,021,693 | B2 | 4/2006 | Keller |
| 7,066,523 | B2 | 6/2006 | Verduci et al. |
| 7,246,839 | B1 | 7/2007 | Nyberg |
| 7,278,674 | B1 | 10/2007 | Bogard |
| 8,672,388 | B2 | 3/2014 | Rusher et al. |
| 9,004,571 | B1 | 4/2015 | Bernardo et al. |
| 2004/0079032 | A1 | 4/2004 | Russell |
| 2004/0245799 | A1 | 12/2004 | Rusu |
| 2005/0155293 | A1 | 7/2005 | Dron |
| 2006/0012211 | A1 | 1/2006 | Keller |
| 2006/0049658 | A1 | 3/2006 | Sugimoto |
| 2007/0113482 | A1 | 5/2007 | Dumke |
| 2007/0210609 | A1 | 9/2007 | Maimin et al. |
| 2010/0109372 | A1 | 5/2010 | Walser |
| 2012/0260579 | A1 | 10/2012 | DeMello |
| 2013/0229027 | A1 | 9/2013 | Copp et al. |
| 2014/0312646 | A1 | 10/2014 | Copp et al. |
| 2015/0165960 | A1 | 6/2015 | Yue |
| 2017/0050503 | A1 | 2/2017 | Roth et al. |

OTHER PUBLICATIONS http://web.archive.org/web/20110209084413/http:/www.peragon.com, by Way Back Machine, dated Feb. 9, 2011, and related product information, 46 pp.

Truck and Van Products/Tite-Lok, https://web.archive.org/web/20060520959551/http:/www.lavanture.com/tl_clamps.html, 3 pages, by Way Back Machine, dated May 12, 2006.

Welcome to SiraWeb.com. Tite Lok mounting clamp for typically used to mount soft tonneau covers, http://www.siraweb.com/p/10916/tl-2022, 2 pages (Copyright 2014).

U.S. Appl. No. 14/179,217, filed Feb. 12, 2014 entitled "Folding/Retractable Pickup Truck Box Cover".

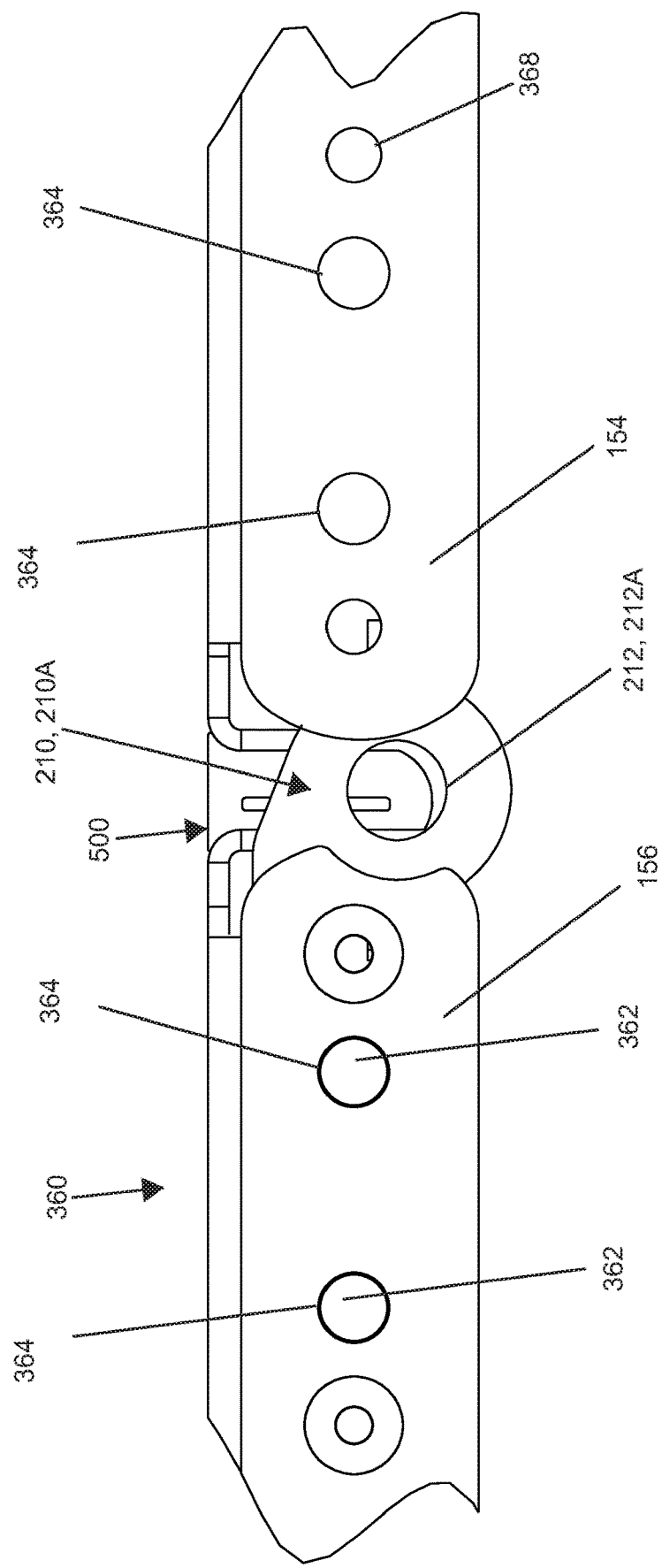

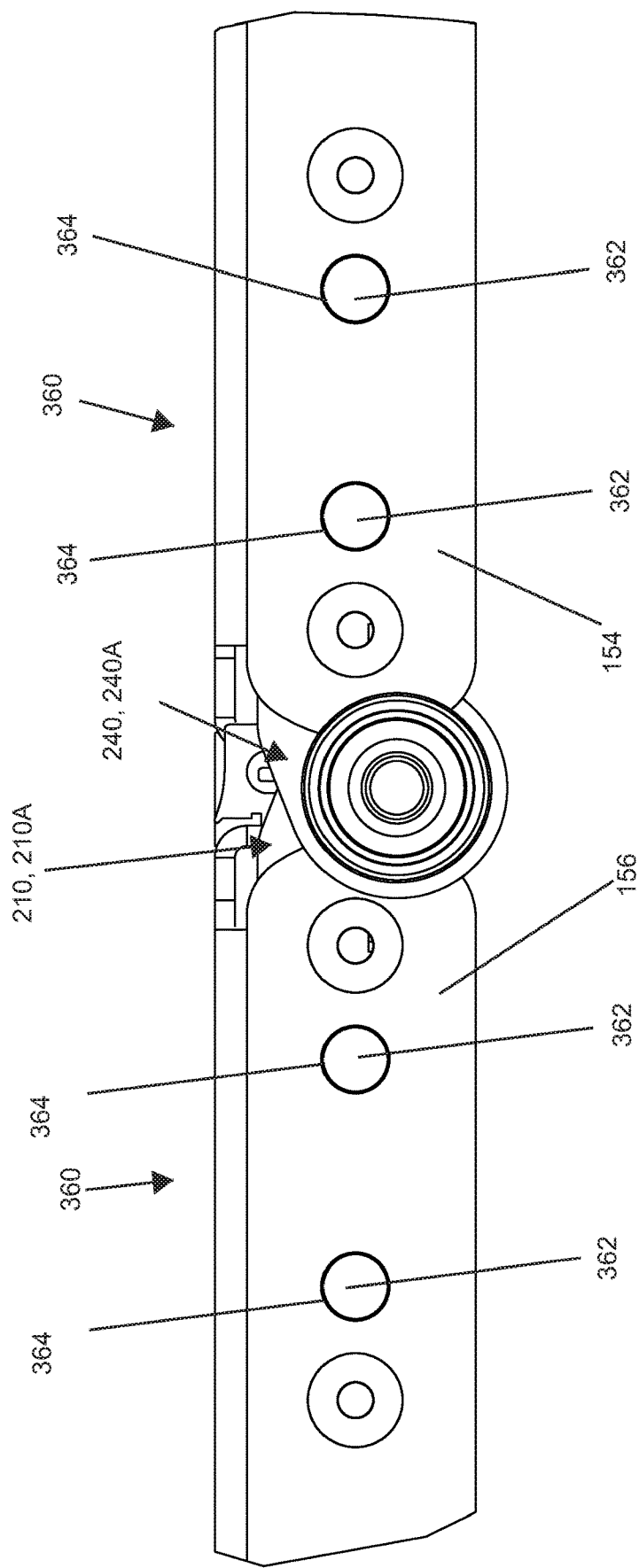

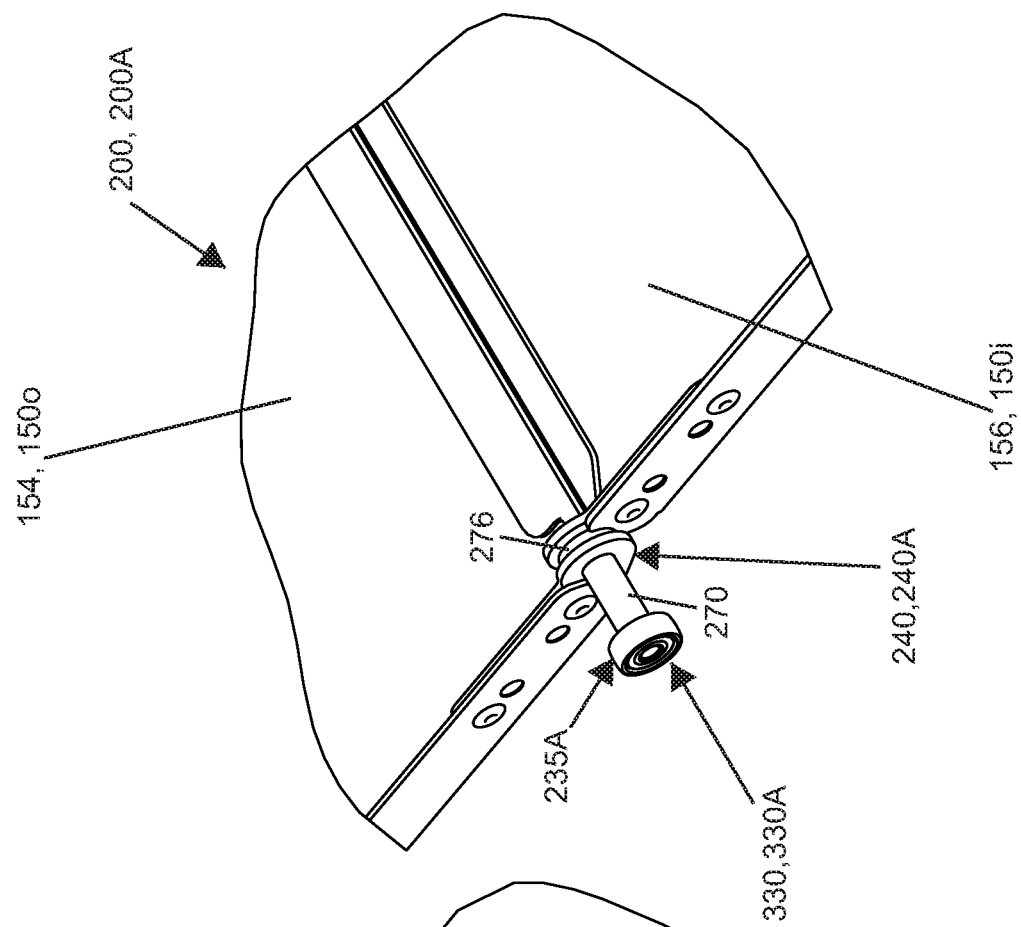
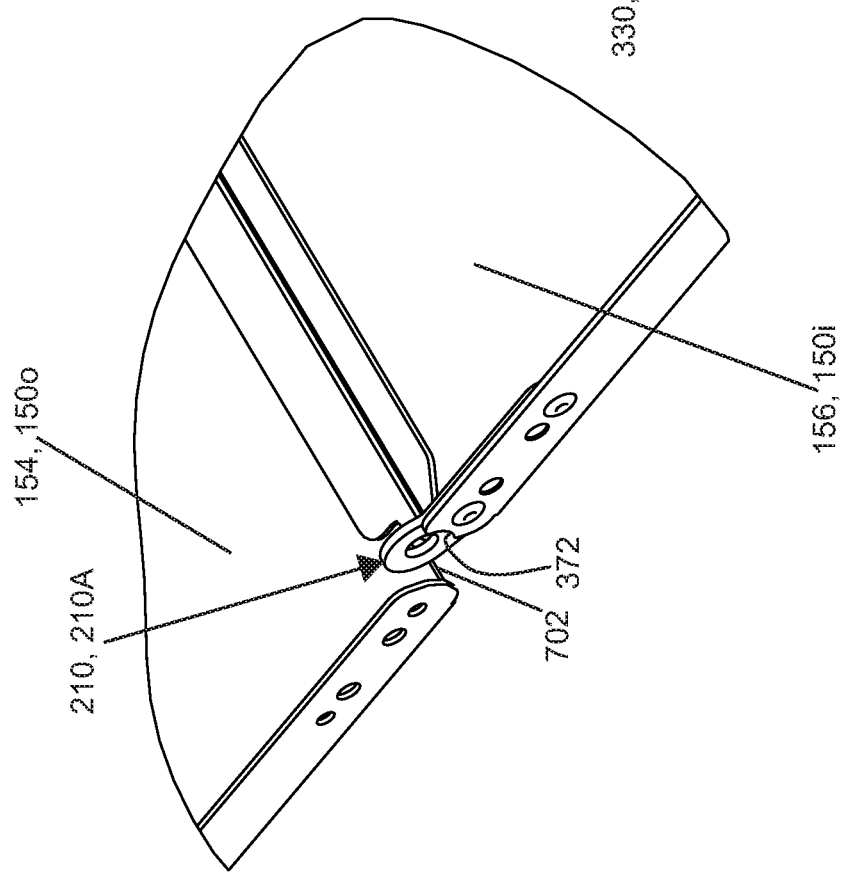
Fig. 26
Fig. 25

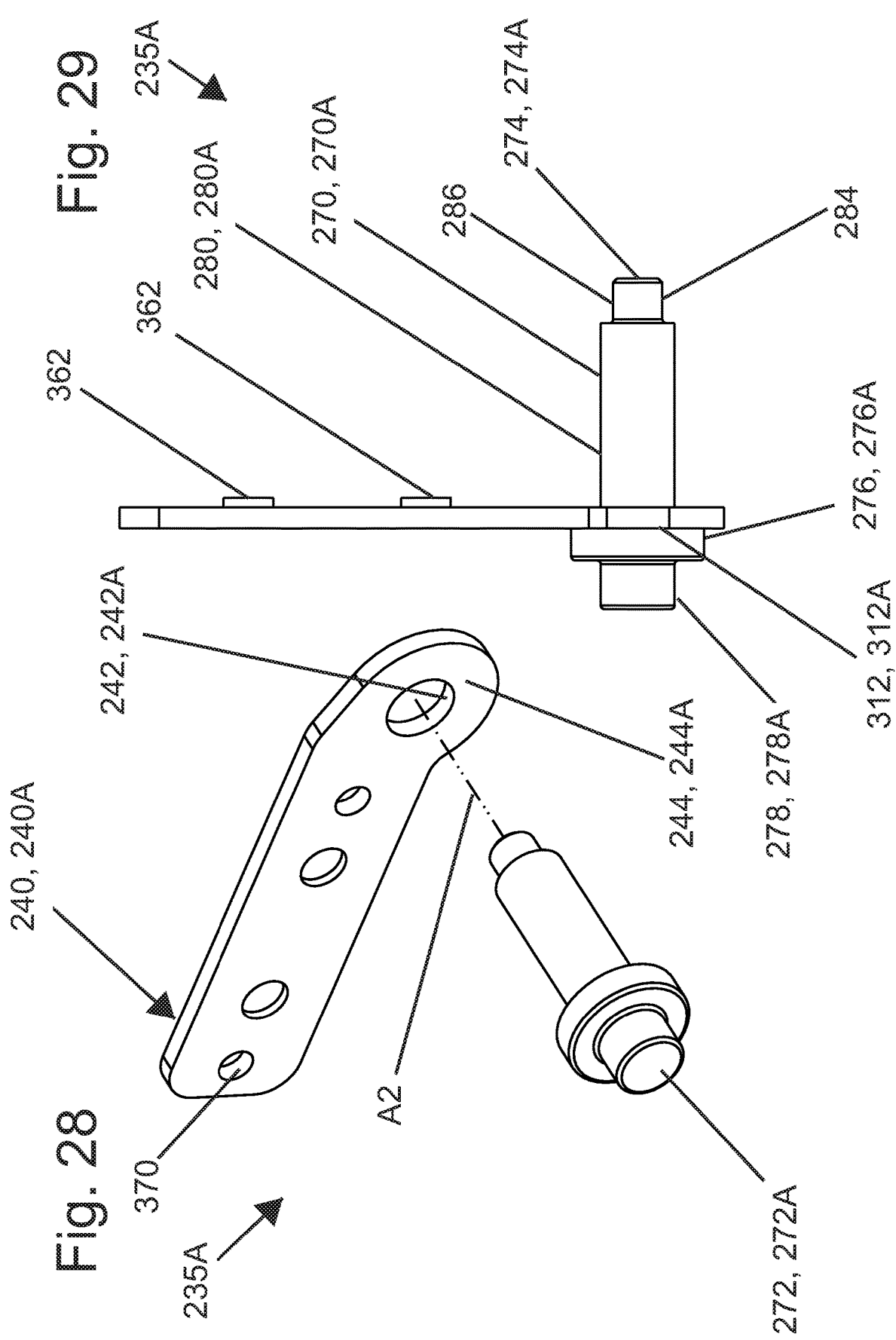

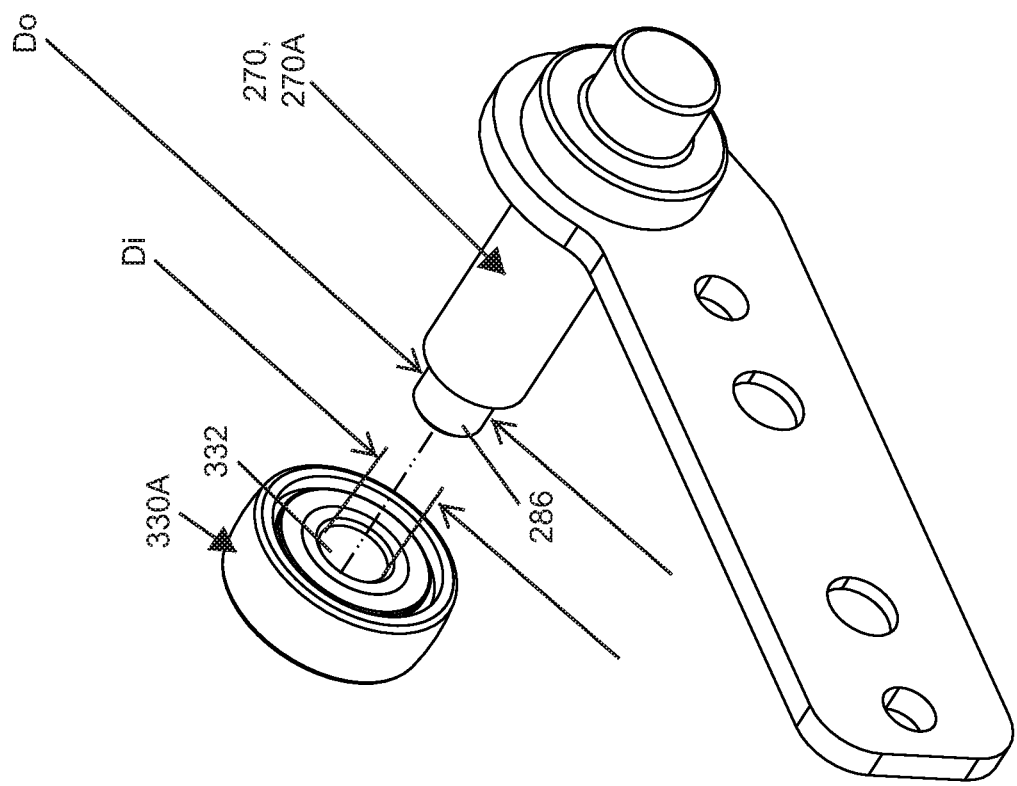

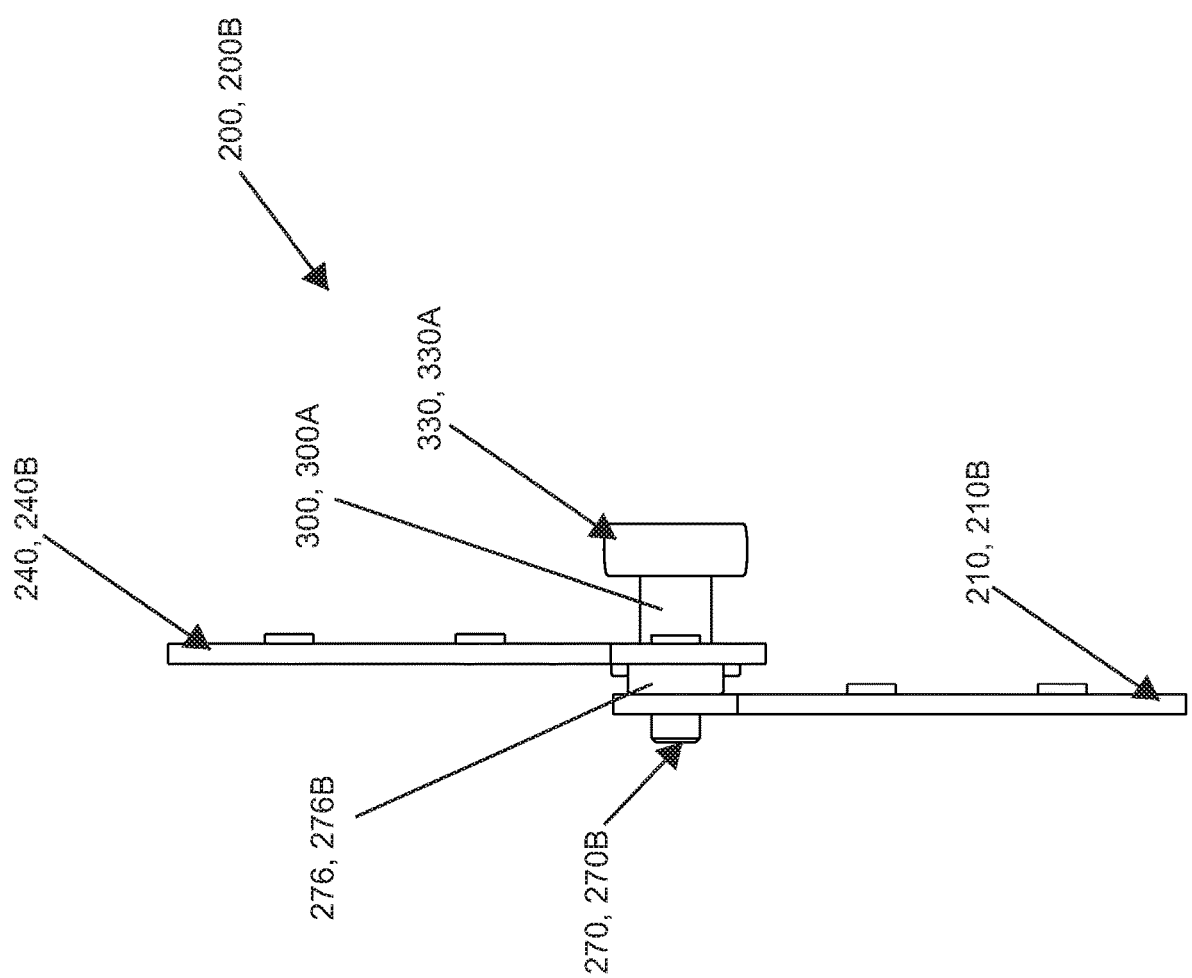

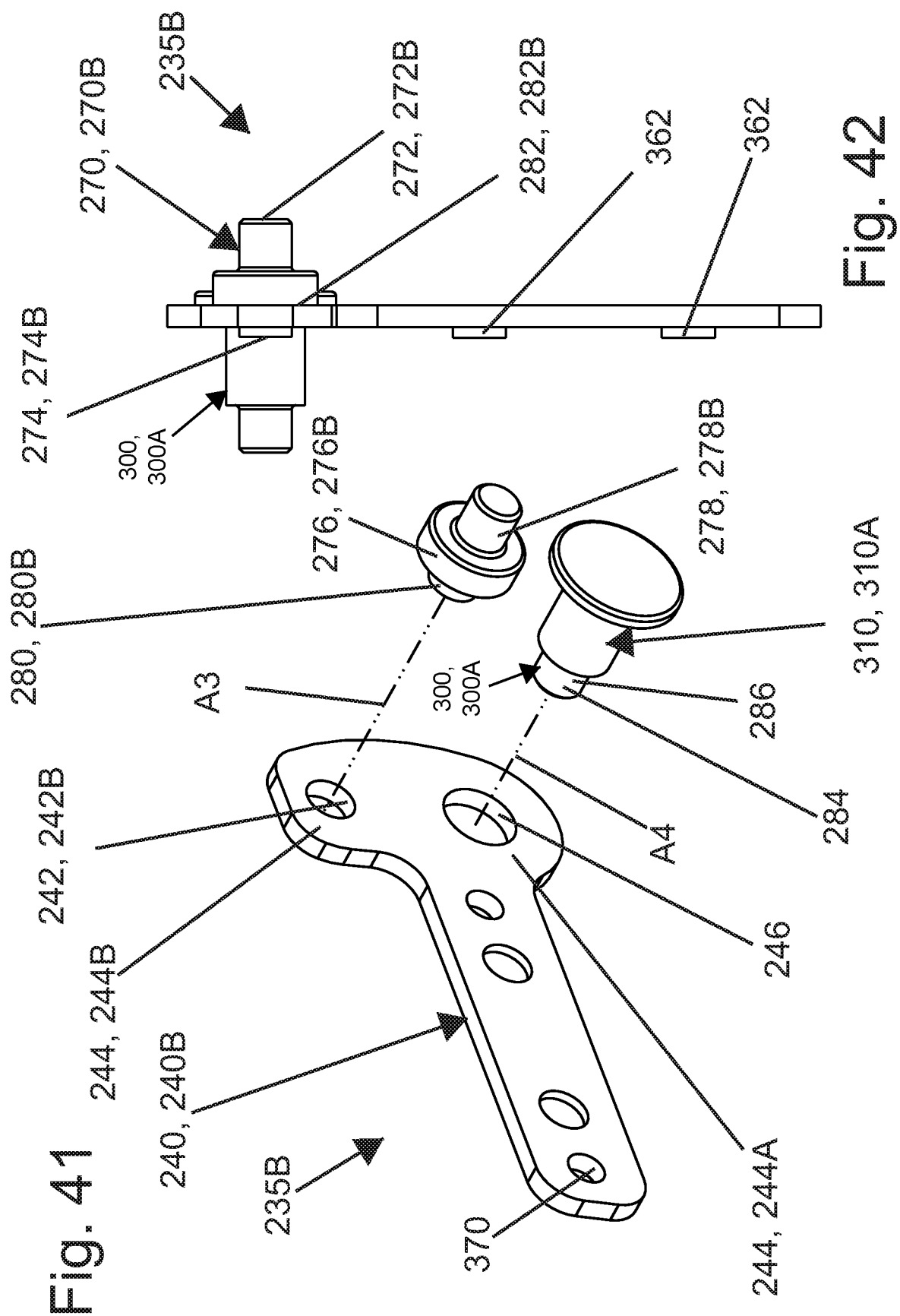

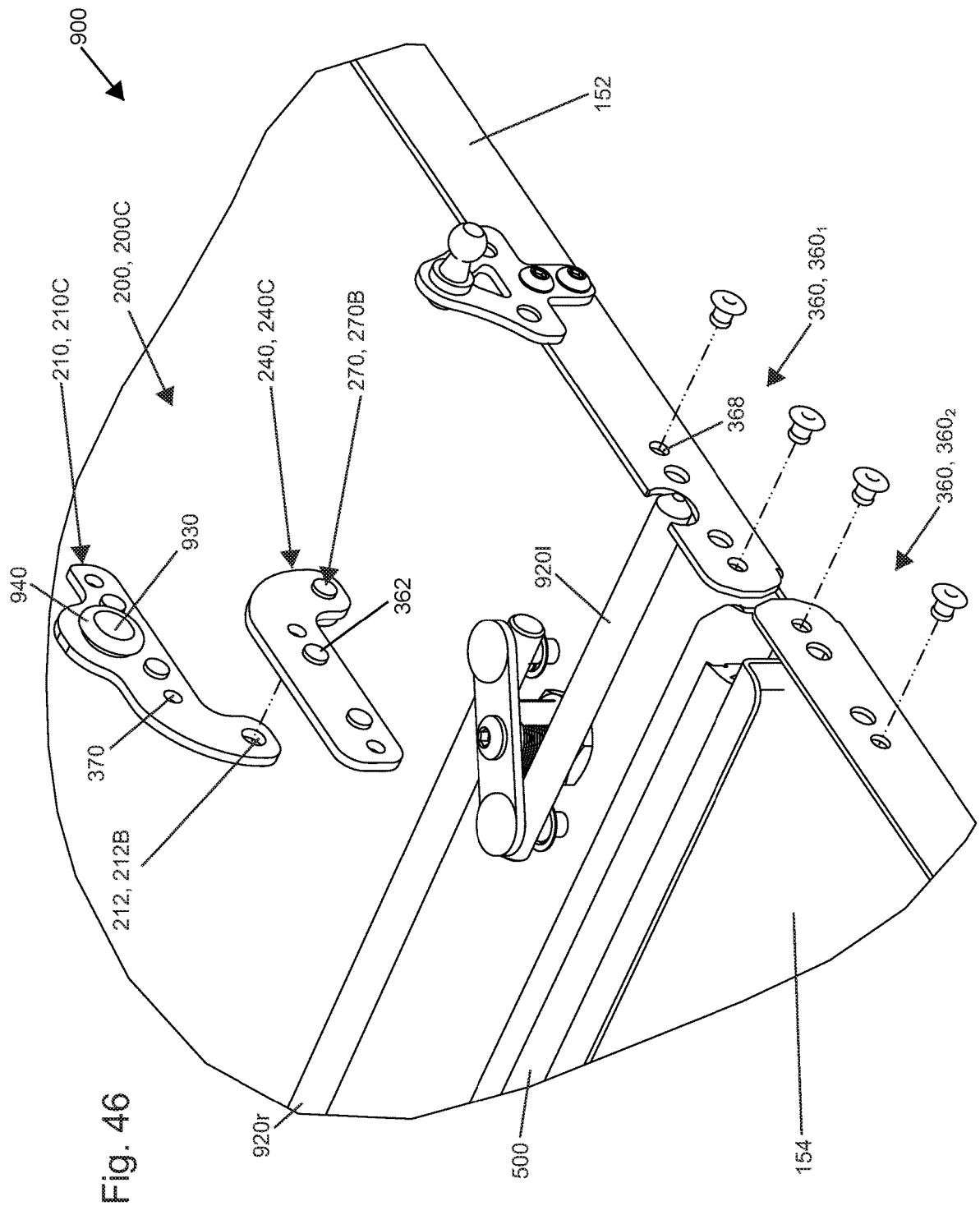

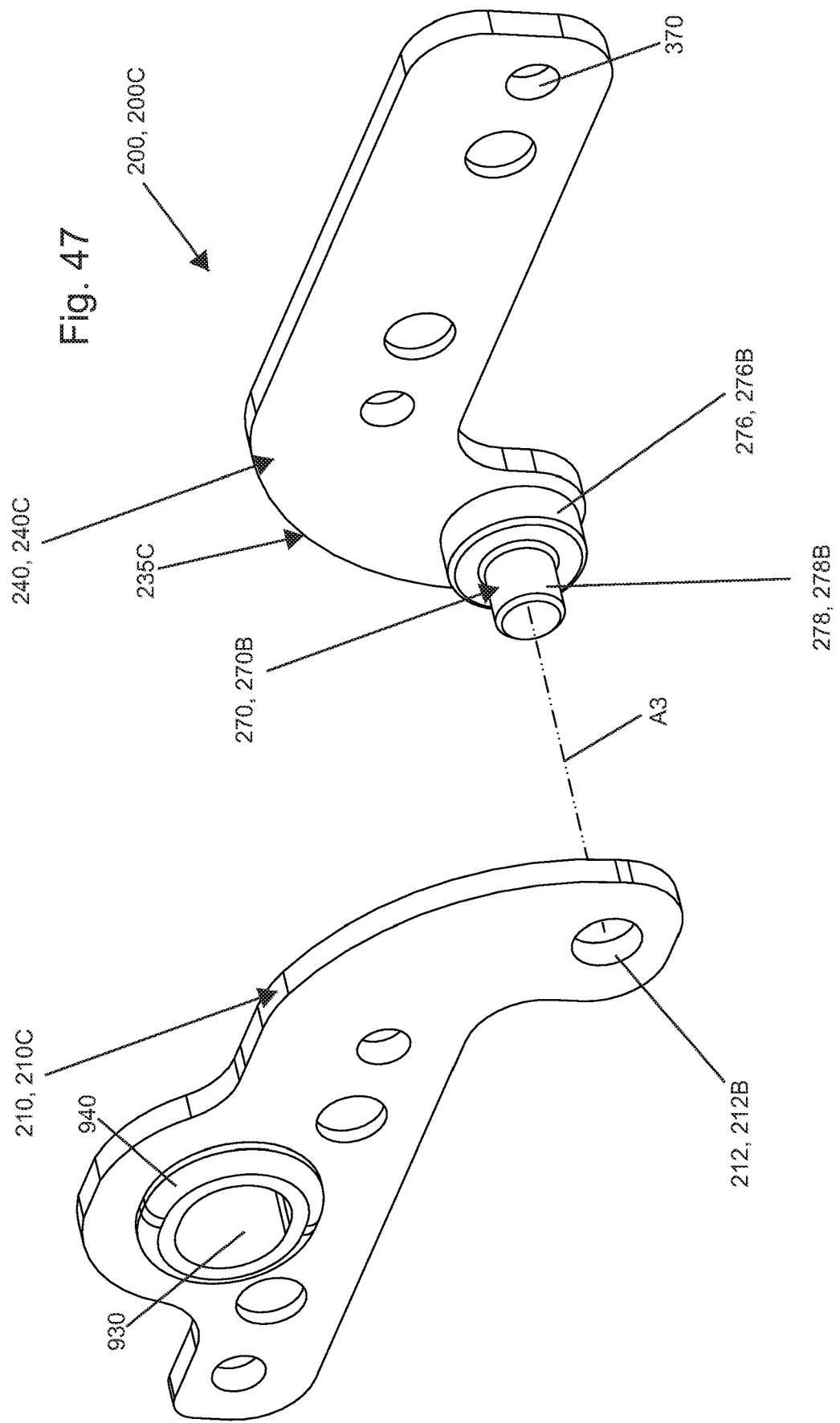

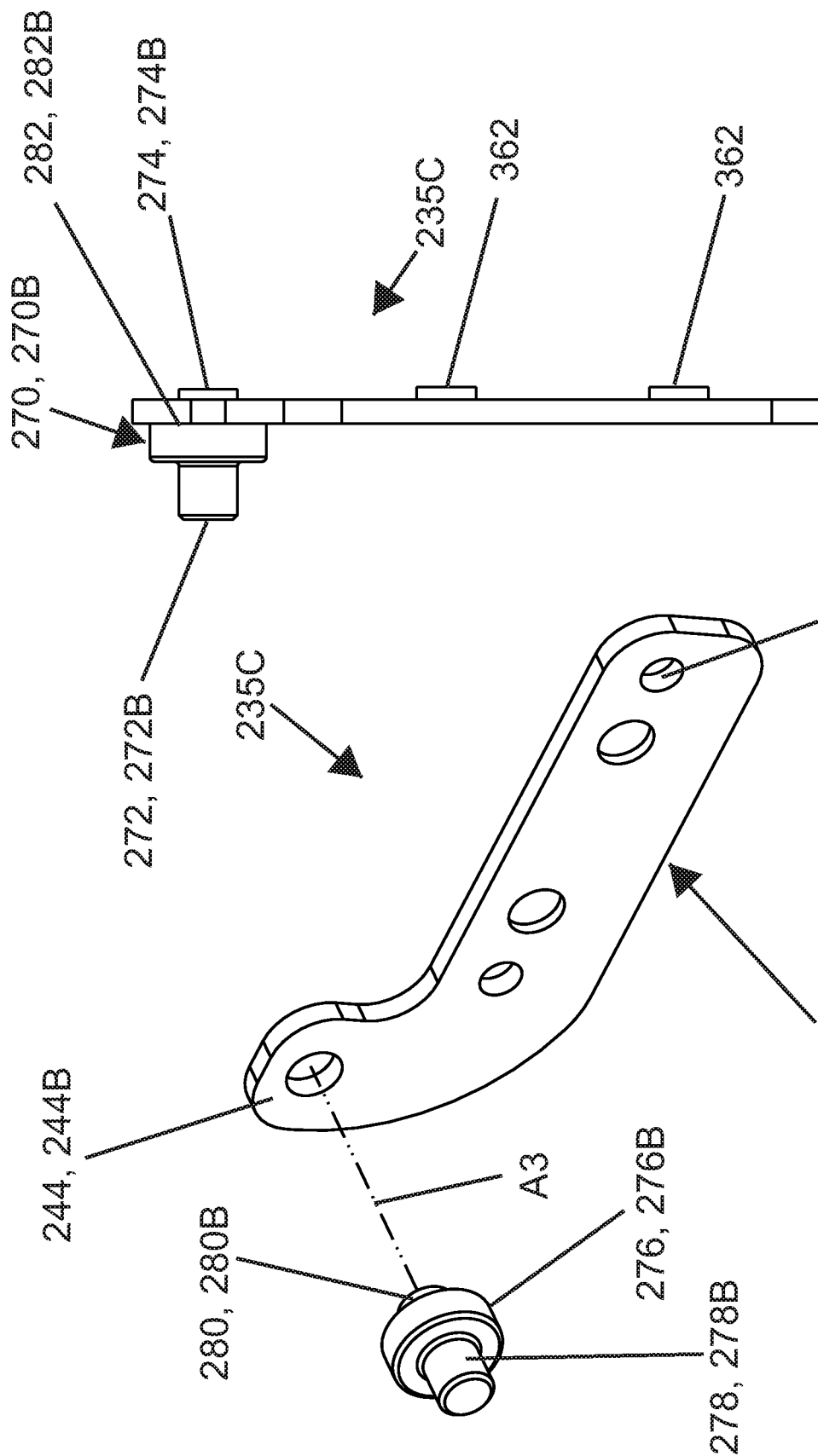

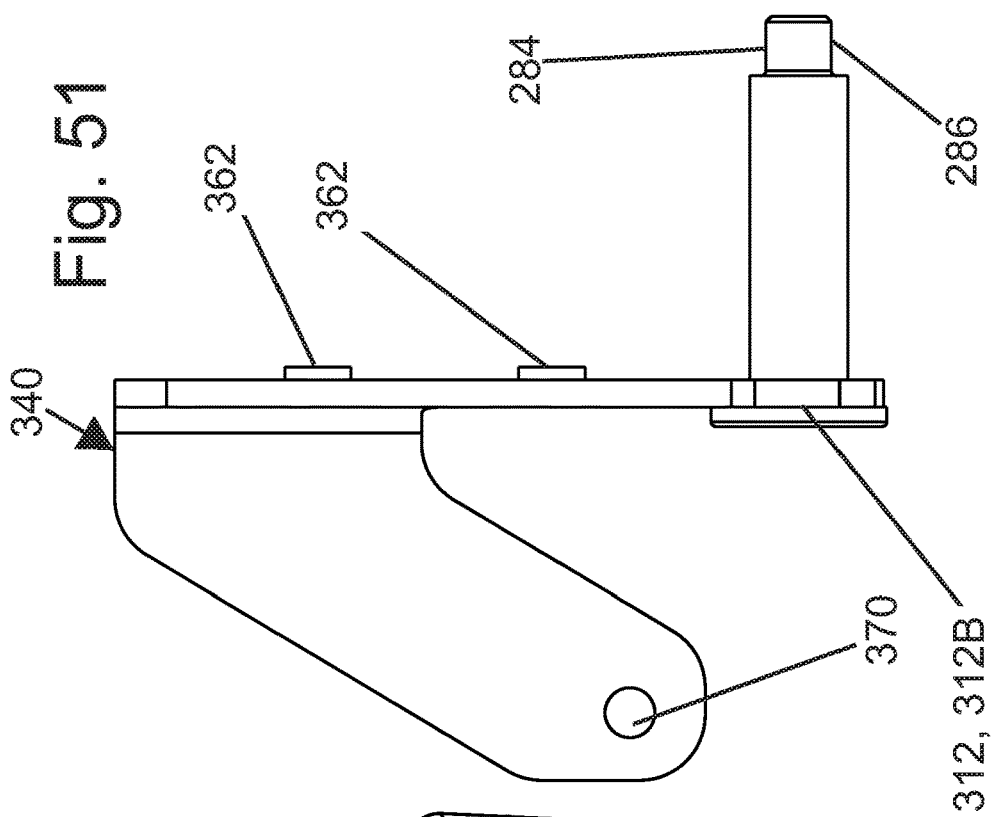
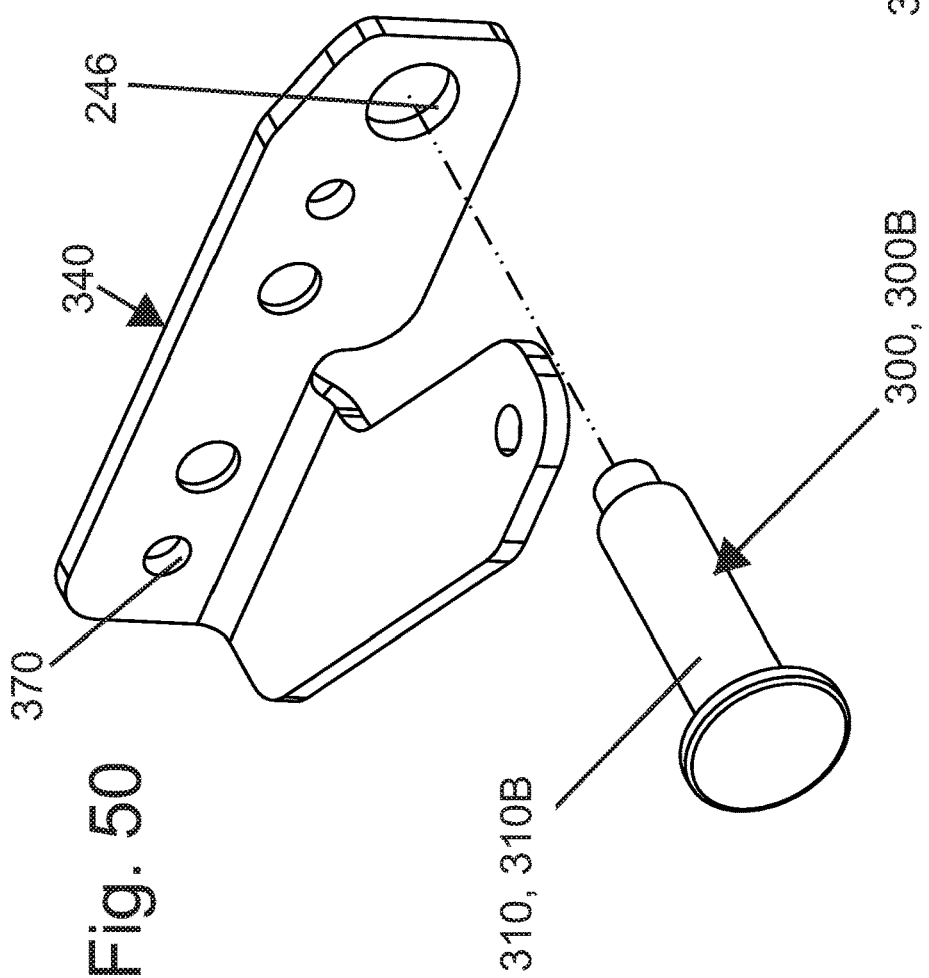

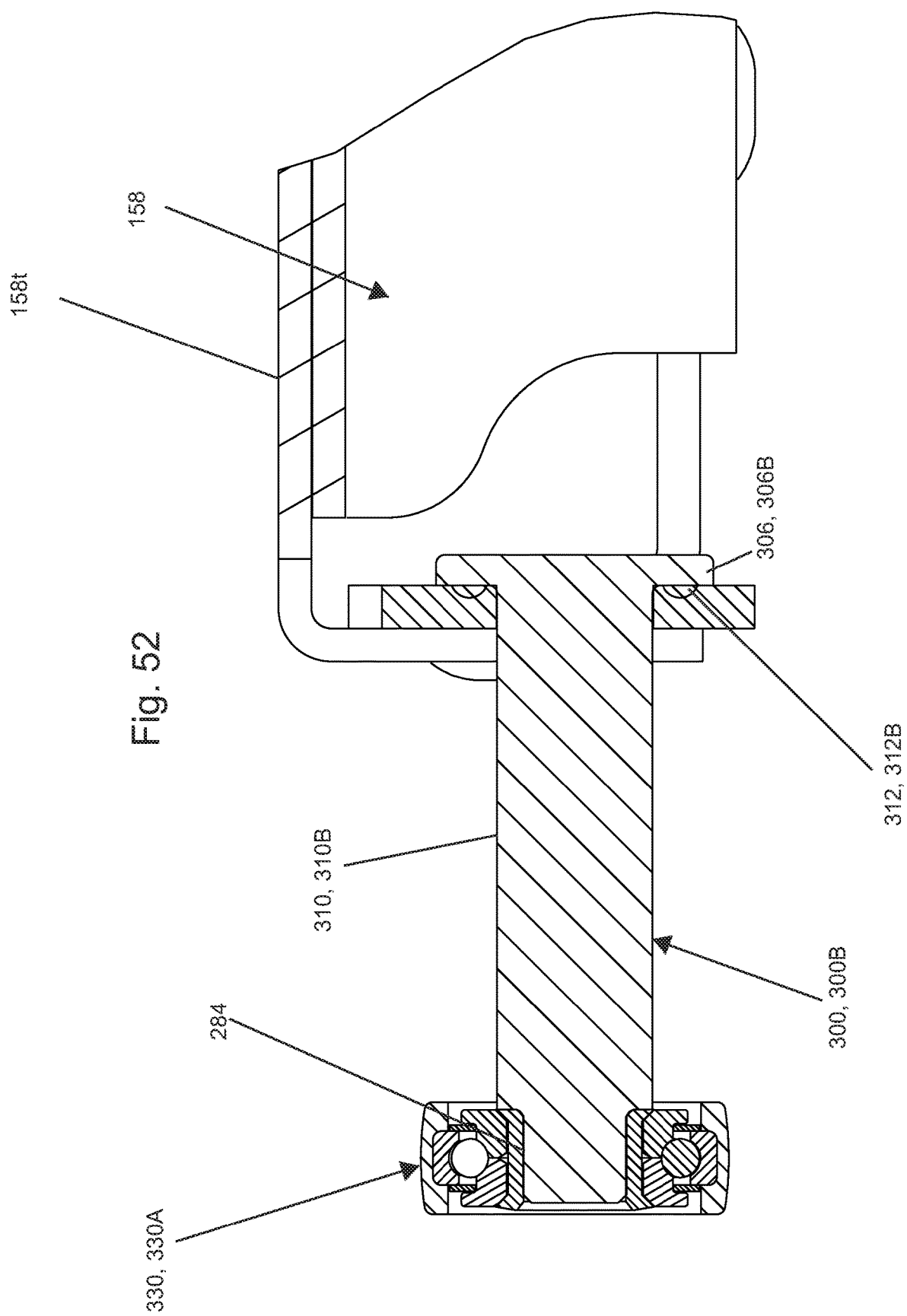

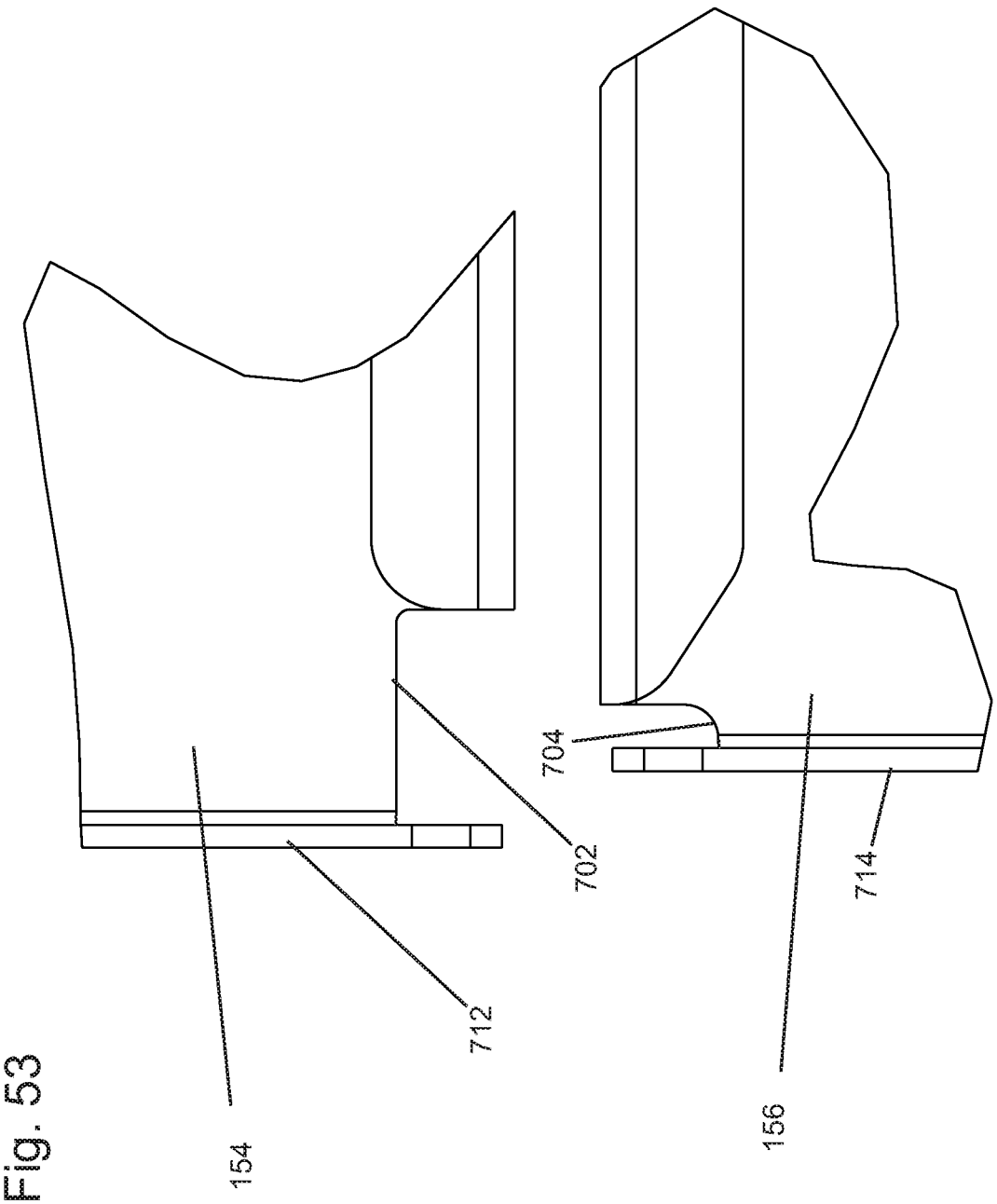

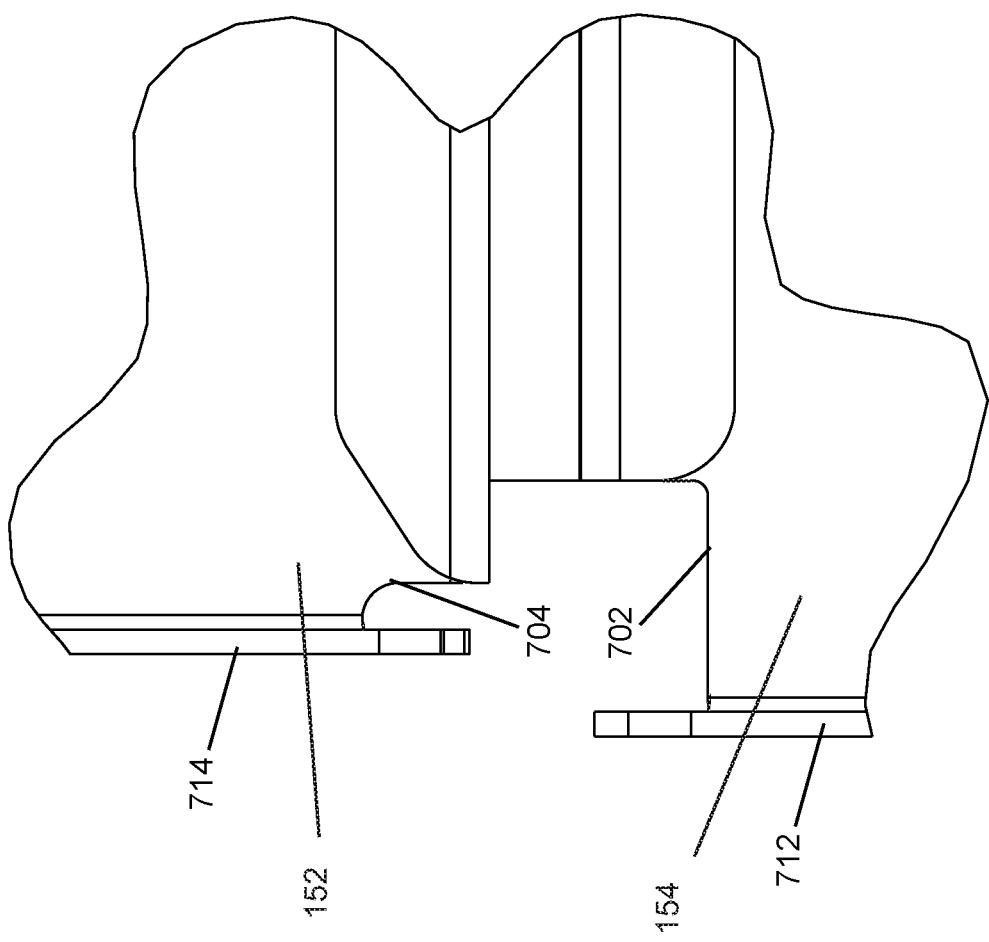

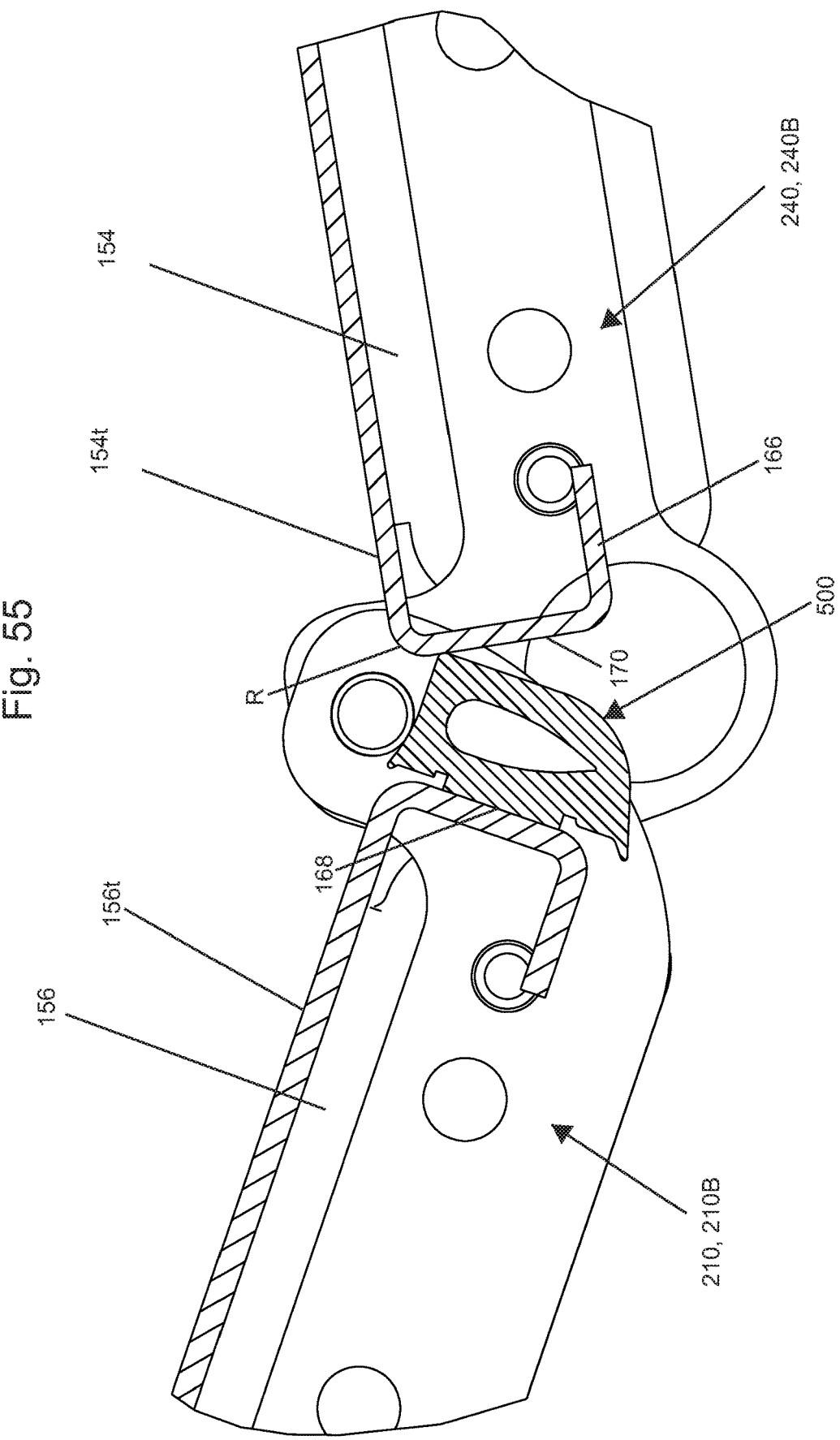

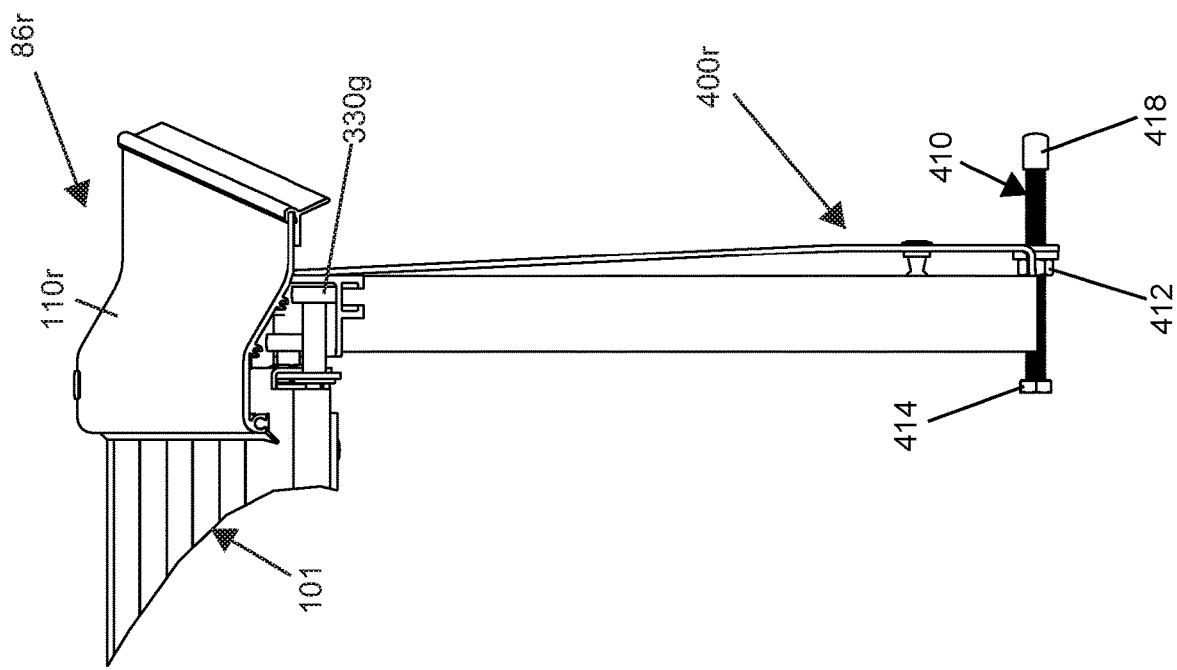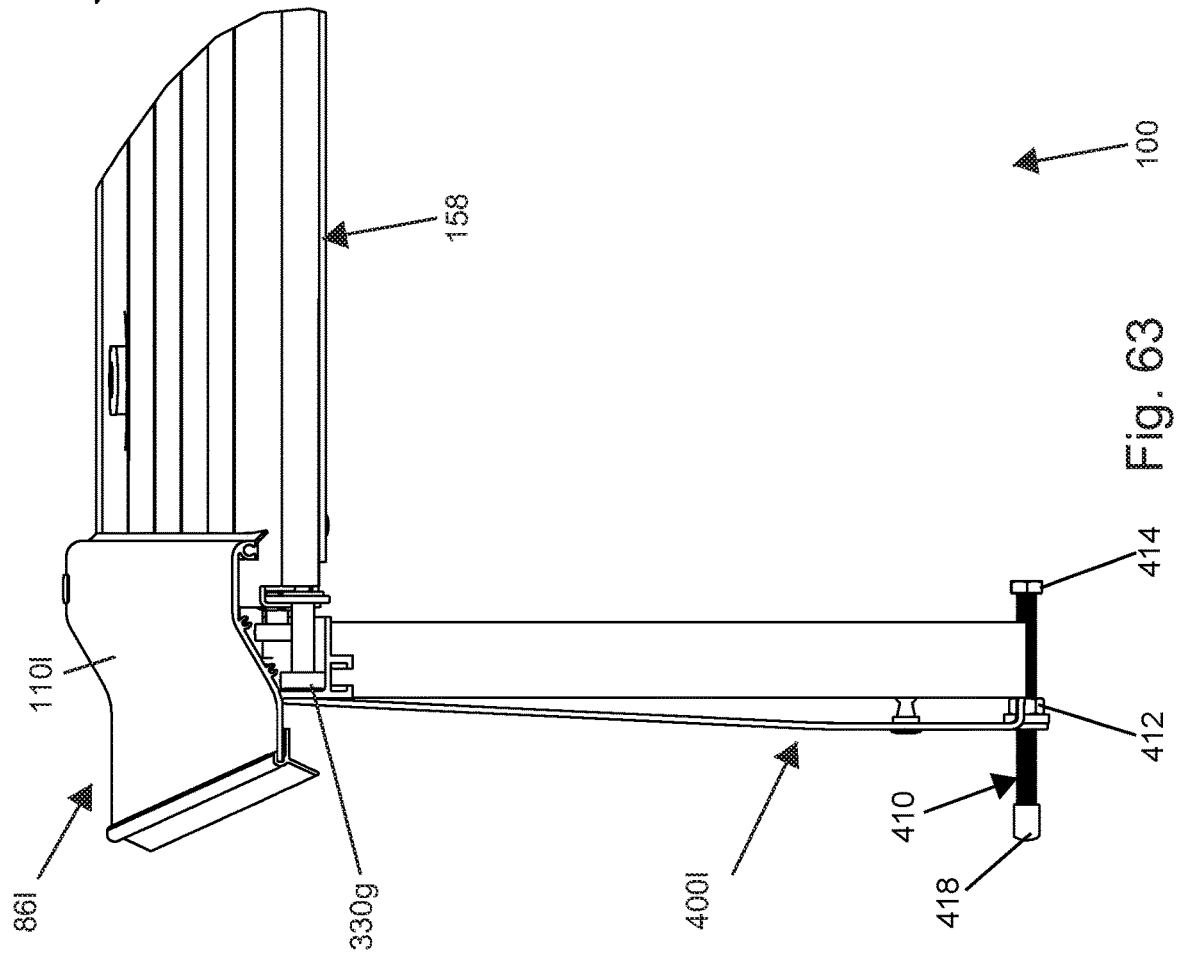
Fig. 63

FOLDING/RETRACTABLE PICKUP TRUCK BOX COVER

CROSS-REFERENCE TO RELATED APPLICATIONS

This application is a continuation of U.S. patent application Ser. No. 13/766,396, filed on Feb. 13, 2013, U.S. Pat. No. 9,707,833, issued on Jul. 18, 2017, entitled FOLDING/RETRACTABLE PICKUP TRUCK BOX COVER, which claims priority to U.S. Provisional Patent Application Ser. No. 61/598,338, entitled "RETRACTABLE COVER SYSTEM FOR A PICKUP TRUCK BOX", and filed on Feb. 13, 2012; and to U.S. Provisional Patent Application Ser. No. 61/598,665, entitled "FOLDING/RETRACTABLE PICKUP TRUCK BOX COVER", and filed on Feb. 14, 2012; and to U.S. Provisional Patent Application Ser. No. 61/763,901, entitled "FOLDING/RETRACTABLE PICKUP TRUCK BOX COVER", and filed on Feb. 12, 2013. Each of the above-identified applications are hereby incorporated by reference in their entireties. To the extent appropriate, a claim of priority is made to each of the above-identified applications.

BACKGROUND

Pickup trucks typically include a pickup truck box positioned toward a rear end of the pickup truck and behind a cab of the pickup truck. The pickup truck box, as delivered from the factory, typically includes an opening behind a front wall of the pickup truck box and between a right and a left sidewall of the pickup truck box. At a rear end of the pickup truck box, an end gate is typically positioned between the right and the left sidewalls of the pickup truck box. The end gate is typically foldable to an open position that pivots about an axis that is positioned adjacent a bed of the pickup truck box. The front wall, the right and the left sidewalls, and the end gate of the pickup truck box typically extend upward from the bed of the pickup truck box. The opening of the pickup truck box typically extends around a perimeter of the pickup truck box that includes tops of the front wall, the right and left sidewalls, and the end gate. The opening of the pickup truck box allows the pickup truck box to haul irregularly shaped and/or large objects that may extend above the tops of the front wall, the right and the left sidewalls, and the end gate and further allows the objects to extend above the cab of the pickup. However, the opening of the pickup truck box does not provide enclosed storage that is often desired to keep various items in. The opening of the pickup truck box may further cause increased aerodynamic drag on the pickup truck that results in increased fuel usage and thereby cause increased cost and increased environmental pollution.

A variety of pickup truck box covers has been developed, and such covers are available in the marketplace. The pickup truck box covers, that are available in the marketplace, typically cover the opening of the pickup truck box and extend around the perimeter of the opening. The pickup truck box covers typically have a configuration that covers or substantially covers the opening and may further provide a lock to lock the pickup truck box cover in this extended configuration. The pickup truck box covers may also include a retracted configuration wherein the pickup truck box cover is folded or otherwise moved out of the way to substantially uncover the pickup truck box opening. The pickup truck box cover may further be removed from the pickup truck box and thereby free-up the entire pickup truck box or substantially the entire pickup truck box for use. U.S. Pat. No. 6,321,819, by Copp et al., issued on Nov. 27, 2001, discloses a retractable cover system for use in covering a pickup truck box and is hereby incorporated by reference in its entirety. Peragon Enterprises, Inc. of Bemidji, Minn. 56619 sells retractable cover systems for covering the opening of a pickup truck box.

SUMMARY

An aspect of the present disclosure relates to a pivoting joint for a retractable cover system for use in covering an opening of a pickup truck box. The retractable cover system includes a plurality of panels that pivot with respect to one another. When the plurality of the panels is unfolded, the retractable cover system covers the opening of the pickup truck box. The pivoting joint includes a first member that moves with a first panel of the plurality of panels. The first member includes a pivot surface that forms a part of the pivoting joint. In certain embodiments, the first member may be a separate piece from the first panel. In other embodiments, the first member may be part of the first panel. The pivoting joint also includes a second member that moves with a second panel of the plurality of panels. In certain embodiments, the second member may be a separate piece from the second panel, and, in other embodiments, the second member may be part of the second panel. The pivoting joint also includes a shaft that extends along an axis and includes a spacer portion that is positioned between the first member and the second member. The shaft extends from a first end to a second end and further defines a pivoting portion that engages the pivoting surface of the first member. The pivoting surface and the pivoting portion provide for a pivoting action of the pivoting joint. In preferred embodiments, the shaft is monolithic (i.e., one piece).

Another aspect of the present disclosure relates to a sealing system for a retractable cover system for covering a pickup truck box. The retractable cover system includes at least a first panel and a second panel that are pivotally attached to each other along a pivot axis. The retractable cover system is moveable between an extended configuration that substantially covers the pickup truck box and a stowed configuration that substantially uncovers the pickup truck box. The first panel and the second panel substantially extend between sides of the pickup truck box. The sealing system includes a transverse seal and at least one longitudinal seal. The transverse seal is adapted to seal the first panel and the second panel at a joint between the first and the second panels when the retractable cover system is in the extended configuration. The joint between the first panel and the second panel rotates about the pivot axis. The transverse seal substantially extends between the sides of the pickup truck box. The transverse seal includes a top that extends between the first panel and the second panel and that is substantially co-planar with a top surface of the first panel and a top surface of the second panel when the retractable cover system is in the extended configuration. The at least one longitudinal seal extends substantially parallel to the sides of the pickup truck box. The longitudinal seal is in sealing contact with the top surfaces of the first and the second panels and the top of the transverse seal when the retractable cover system is in the extended configuration. The sealing system may further include a seal for sealing the retractable cover system to an end gate of the pickup truck box. The seal substantially extends between the sides of the pickup truck box. The seal includes a first side that is attached to an end panel of the retractable cover system, a top side that is adjacent a guard lip of the end panel, and a second side that is adapted for sealing contact with the end gate when the retractable cover system is in the extended configuration and the end gate is in a closed position.

Still another aspect of the present disclosure relates to a retractable cover system for covering a pickup truck box that includes a lateral guide positioned on at least one of a first and a second rail. The retractable cover system further including a plurality of panels pivotally attached to one another and a plurality of guide elements. At least one of the guide elements engages the lateral guide and thereby laterally guides the plurality of panels.

Yet another aspect of the present disclosure relates to a method for adjusting a pair of opposing rails of the retractable cover system. The method includes installing the pair of the opposing rails, assembling the folding panel assembly to the pair of the opposing rails, and moving each of the opposing rails inwardly. The pair of the opposing rails is installed over a pair of opposing side walls of the pickup truck box. The folding panel assembly is assembled to the pair of the opposing rails by respectively engaging a pair of opposing sets of guide elements of the folding panel assembly with a pair of tracks of the pair of the opposing rails. Each of the opposing sets of guide elements includes an extended guide element that extends outwardly beyond the other guide elements. Each of the opposing rails are moved inwardly until a lateral guide surface of the opposing rail contacts the respective extended guide element.

Still another aspect of the present disclosure relates to adjustable ramps of a retractable cover system for covering a pickup truck box. The retractable cover system includes a first rail, a first ramp, a second rail, a second ramp, a plurality of panels, and a plurality of guide elements. The first rail includes a first track portion with a first cutout. The first ramp continues from the first cutout of the first rail. The second rail includes a second track portion with a second cutout. The second ramp continues from the second cutout of the second rail. The plurality of panels extends between a first side and a second side. The plurality of panels is movable between a deployed configuration and a stowed configuration. The plurality of panels substantially covers the pickup truck box when in the deployed configuration. The plurality of guide elements guides and supports the plurality of panels and rides on the track portions. The plurality of guide elements includes a first set of guide elements that remain on the track portions and a second set of guide elements that leave the track portions at the cutouts and ride on the ramps. The ramps are adjustable for aligning the ramps with the second set of guide elements by bending the ramps.

Yet another aspect of the present disclosure relates to a locking system for the retractable cover system for covering the pickup truck box. The locking system includes a locked configuration that locks the retractable cover system in the extended configuration and an unlocked configuration that allows the retractable cover system to be moved between the extended configuration and the stowed configuration. The retractable cover system includes a panel that is hingedly connected to a front side of the pickup truck box, a right rail that is positioned over a right side of the pickup truck box, and a left rail that is positioned over a left side of the pickup truck box. The right rail includes a right track for guiding a right set of guide elements, and the left rail includes a left track for guiding a left set of guide elements. The locking system includes a lock mount, a rotatable portion, a right guide, a left guide, a right lock rod, and a left lock rod. The lock mount is positioned on the panel. The rotatable portion is rotatably mounted to the lock mount about an axis. The rotatable portion includes an arm with a first connection and a second connection. The rotatable portion is moveable between a locked position and an unlocked position. The right guide is positioned on a right side of the panel. The left guide is positioned on a left side of the panel. The right lock rod is pivotally connected to the first connection and is slidingly connected to the right guide. The left lock rod is pivotally connected to the second connection and slidingly connected to the left guide. When the rotatable portion is moved to the locked position from the unlocked position, the arm urges a right end of the right lock rod to extend beyond the right guide and enter the right rail. When the rotatable portion is moved to the locked position from the unlocked position, the arm urges a left end of the left lock rod to extend beyond the left guide and enter the left rail.

Still another aspect of the present disclosure relates to interconnecting structures that interconnect panels of a retractable cover system that is adapted to cover a pickup truck box when in a deployed configuration and is also adapted to retract to a stowed configuration. The retractable cover system includes a first rail, a second rail, a plurality of panels, and at least one connecting structure. The plurality of panels extends along a width between a first side and a second side. The first side is supported by the first rail and the second side is supported by the second rail. Each of the panels extends along a respective length between a respective front and a respective back. The panels of adjacent pairs of the panels are pivotally attached to one another at a corresponding pivot of a plurality of pivots. The at least one connecting structure structurally connects the panels of at least one of the adjacent pairs of the panels when the retractable cover system is in the deployed configuration and does not connect the panels of the at least one of the adjacent pairs of the panels when the retractable cover system is in the stowed configuration.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 23 is the partial side elevation view of FIG. 22, but with a first member assembled to the first panel and a seal assembled to the second panel and positioned between the first and the second panels in a compressed state;

FIG. 24 is the partial side elevation view of FIG. 23, but with a subassembly including a second member and a shaft assembled to the second panel, thereby completing the assembly of the first joint type of FIG. 18 between and to the first and the second panels of FIG. 22; FIG. 24 is also an enlarged portion of FIG. 11 and shows the seal of FIG. 23 overlaid, but in an uncompressed state;

FIG. 25 is a partial perspective view showing the underside of the panel assembly of FIG. 8 with the first member of FIG. 23 attached to the first panel by rivets;

FIG. 26 is the partial perspective view of FIG. 25, but with the subassembly of FIG. 24 assembled to the second panel by additional rivets thereby completing the first joint type of FIG. 18;

FIG. 28 is an exploded perspective view of the subassembly of FIG. 24;

FIG. 29 is a plan view of the subassembly of FIG. 24;

FIG. 30 is an exploded perspective view illustrating a guide element before being press fit onto the shaft of FIG. 24 in the context of the subassembly of FIG. 24;

FIG. 37 is also an enlarged portion of FIG. 11;

FIG. 40 is a plan view of the second joint type of FIG. 31;

FIG. 41 is an exploded view of the subassembly of FIG. 37;

FIG. 42 is a plan view of the subassembly of FIG. 37;

FIG. 46 is an exploded left-rear perspective view similar to FIG. 33, but illustrating the third joint type of FIG. 43;

FIG. 47 is an exploded perspective view similar to FIGS. 21 and 34, but illustrating the third joint type of FIG. 43;

FIG. 48 is an exploded perspective view of a subassembly of the third joint type of FIG. 43 that is similar to the subassembly of FIG. 37;

FIG. 49 is a plan view of the subassembly of FIG. 48;

FIG. 50 is an exploded perspective view of a reinforcement bracket and guide element mount assembly used at a rearmost position of the retractable cover system;

FIG. 51 is a plan view of the reinforcement bracket and guide element mount assembly of FIG. 50;

FIG. 52 is a partial cross-sectional elevation view of the reinforcement bracket and guide element mount assembly of FIG. 50 installed at the rearmost position;

FIG. 53 is a bottom plan view illustrating a notch arrangement in the first and the second panels of FIG. 22;

FIG. 54 is a bottom plan view illustrating another notch arrangement in the first and the second panels of FIG. 22;

FIG. 55 is a partial cross-sectional left side elevation view illustrating the seal of FIG. 23 positioned between the first and the second panels of FIG. 22 with the first and the second panels joined by the second joint type of FIG. 31 thereby positioning a joint pivot axis above top surfaces of the first and the second panels;

FIG. 63 is similar to the broken rear perspective view of FIG. 62 but with the rails now positioned at a final position;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

According to the principles of the present disclosure, a retractable cover system includes various improvements and refinements over retractable cover systems that are known in the prior art.

Figure 1:
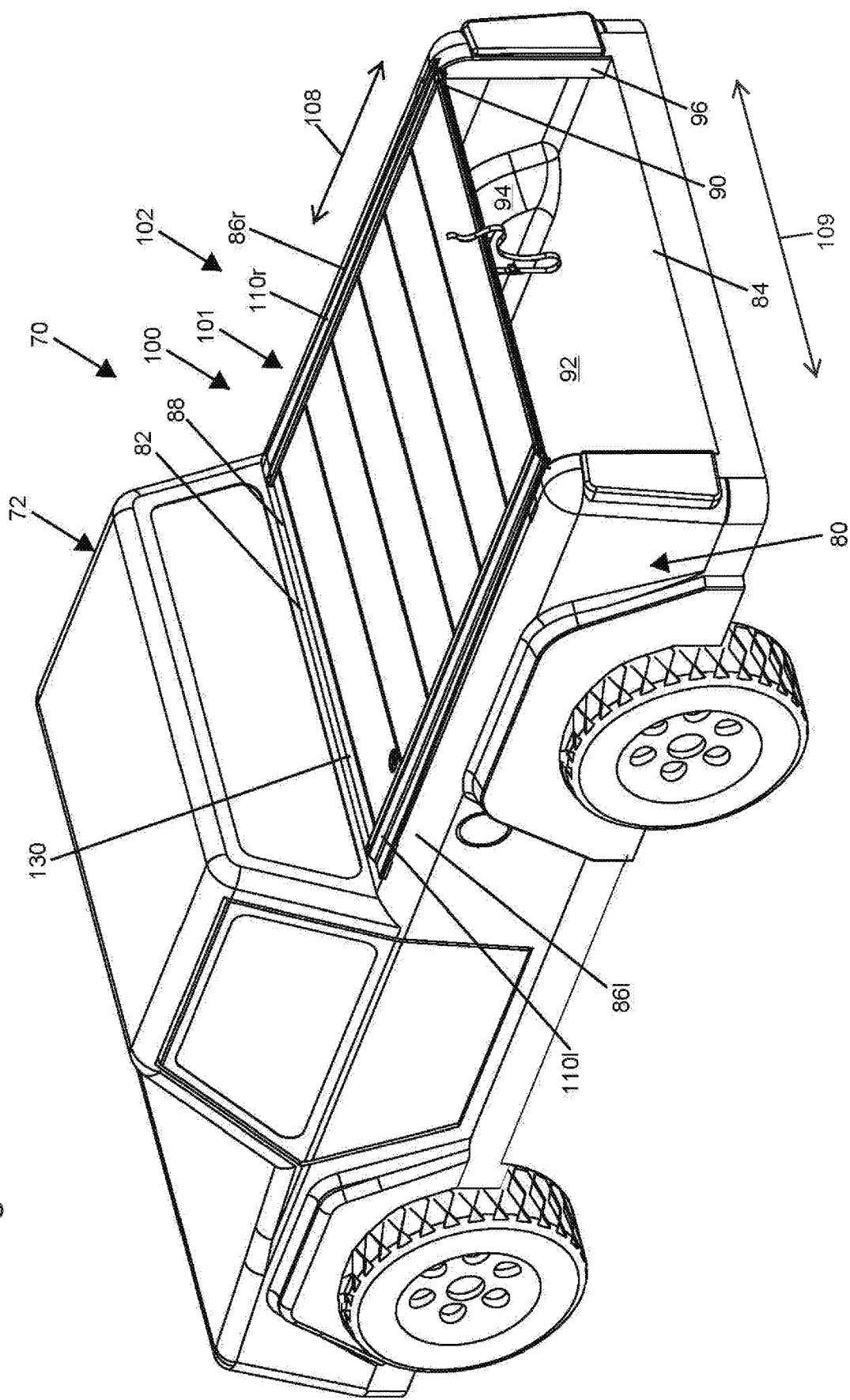
FIG. 1 is a left-rear perspective view of a retractable cover system for covering an opening of a pickup truck box according to the principles of the present disclosure.
Figure 2:
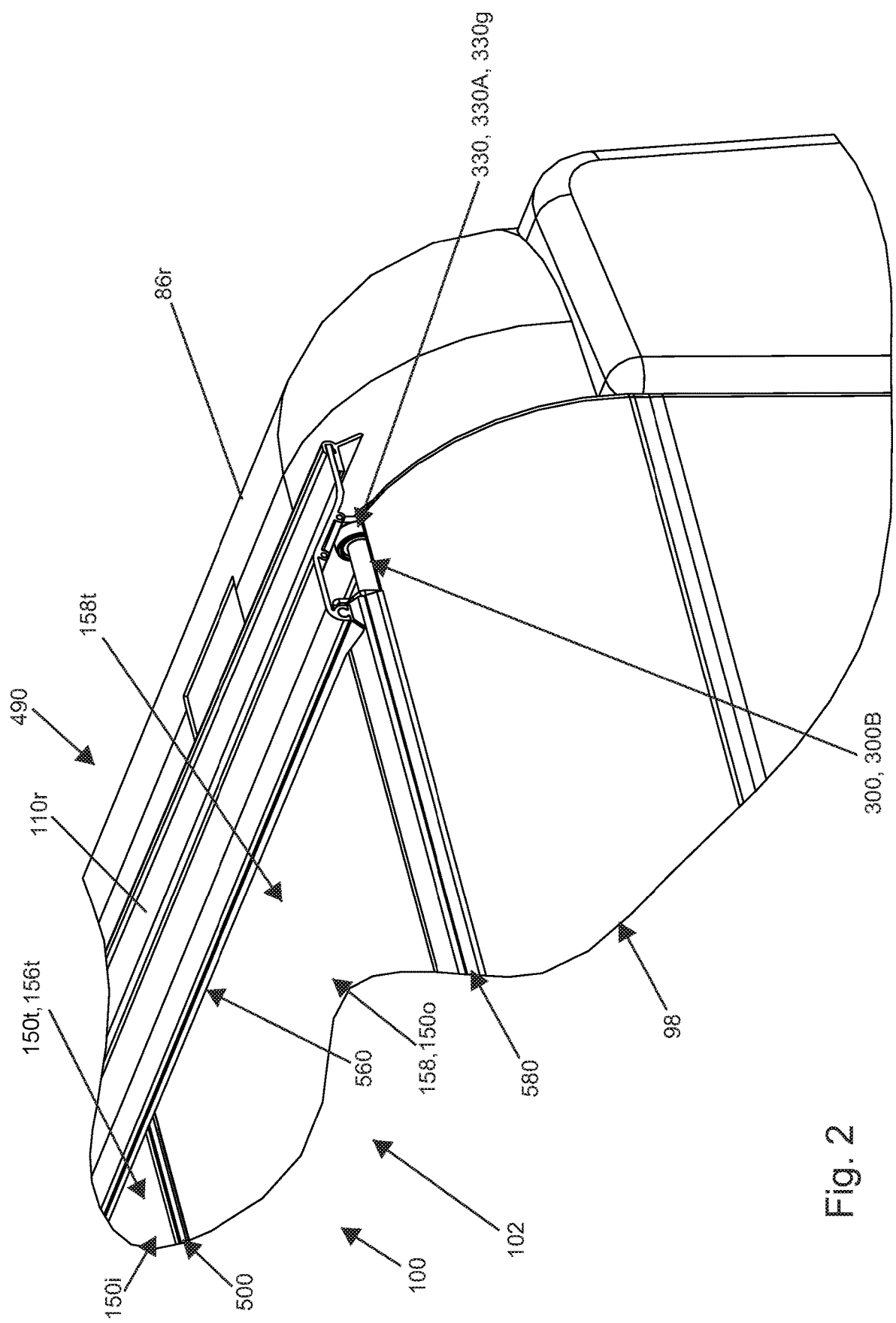
FIG. 2 is an enlarged partial left-rear perspective view of a portion of the retractable cover system of FIG. 1, an end gate of the pickup truck box is further shown in a closed position.

Turning now to FIG. 1, a pickup truck 70 is illustrated with a retractable cover system 100 according to the principles of the present disclosure. In particular, the pickup truck 70 includes a cab 72 and a pickup truck box 80 positioned behind the cab 72 and extending to a rear end of the pickup truck 70. The pickup truck box 80 extends between a forward end 82 and a rearward end 84 of the pickup truck box 80. The forward end 82 and the rearward end 84 are therefore spaced apart along a fore-aft direction 108. The rearward end 84 may be covered by an end gate 98, as illustrated at FIG. 2. The pickup truck box 80 includes a right side 86r and an opposite left side 86l. The right side 86r and the left side 86l are spaced along a transverse direction 109. A front side 88 of the pickup truck box 80 may extend between the right side 86r and the left side 86l. Likewise, the end gate 98, when in a closed position, may extend between the right side 86r and the left side 86l.

The right side 86r, the left side 86l, the front side 88, and the end gate 98 may each form a wall that defines the pickup truck box 80. The walls may extend generally upwardly from a bed 92 of the pickup truck box 80 to a generally common top side of the walls. The top side of the walls may extend around a perimeter when the end gate 98 is in the closed position and thereby define an opening 90 of the pickup truck box 80. The end gate 98 may define a rear opening 96 when either opened or removed from the pickup truck box 80. The pickup truck box 80 may further include a pair of wheel wells 94 that are generally adjacent the bed 92 and extend upwardly over a portion of the left side 86l and the right side 86r.

The retractable cover system 100 includes a panel assembly 101 that is configurable in a deployed configuration 102 and a stowed configuration 104. The retractable cover system 100 includes an interface system 105 that generally interfaces with the pickup truck box 80 and provides a support structure for the panel assembly 101.

Figure 58:
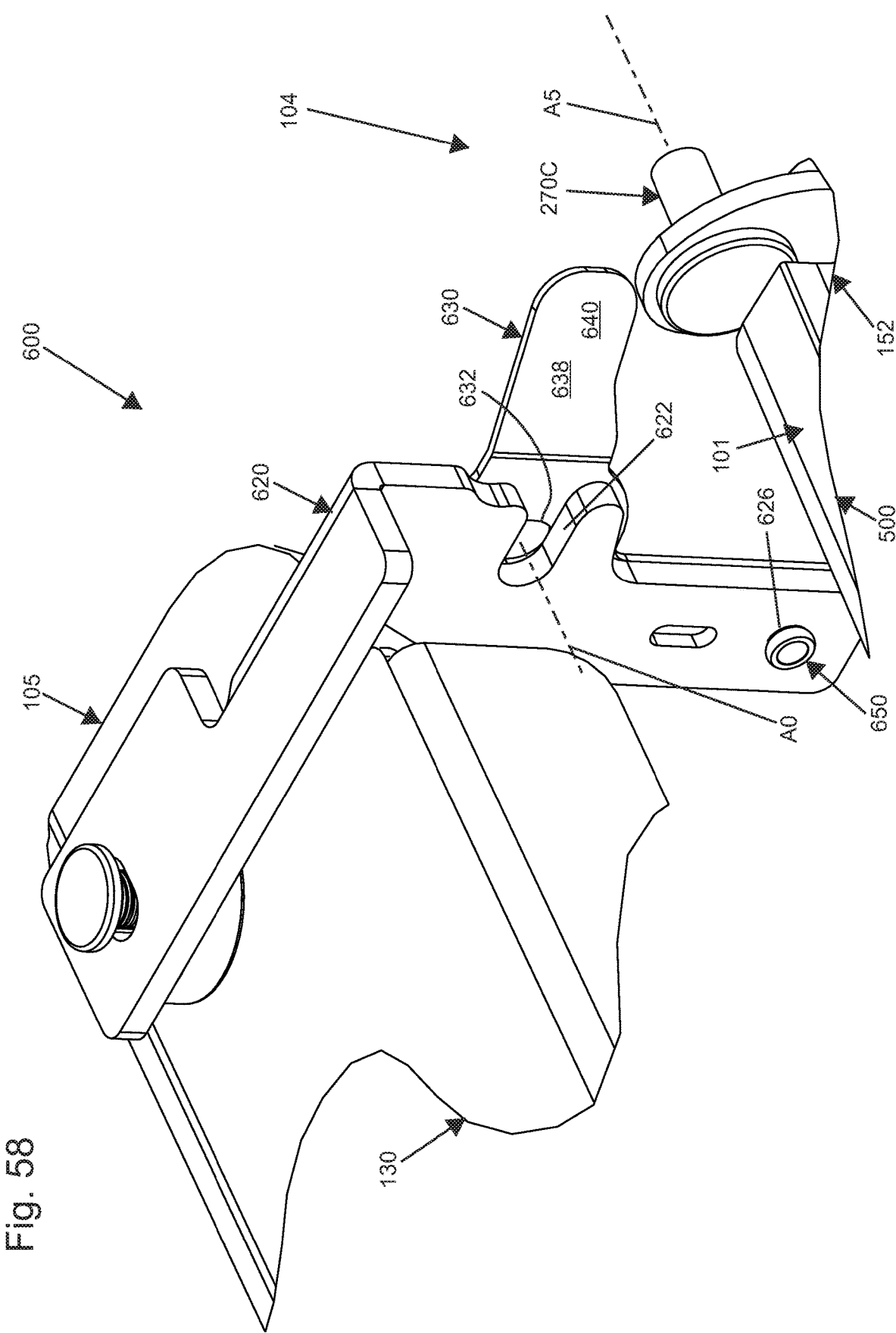
FIG. 58 is a partial perspective view illustrating a quick release system of the retractable cover system of FIG. 1 with the quick release system in a released configuration.
Figure 59:
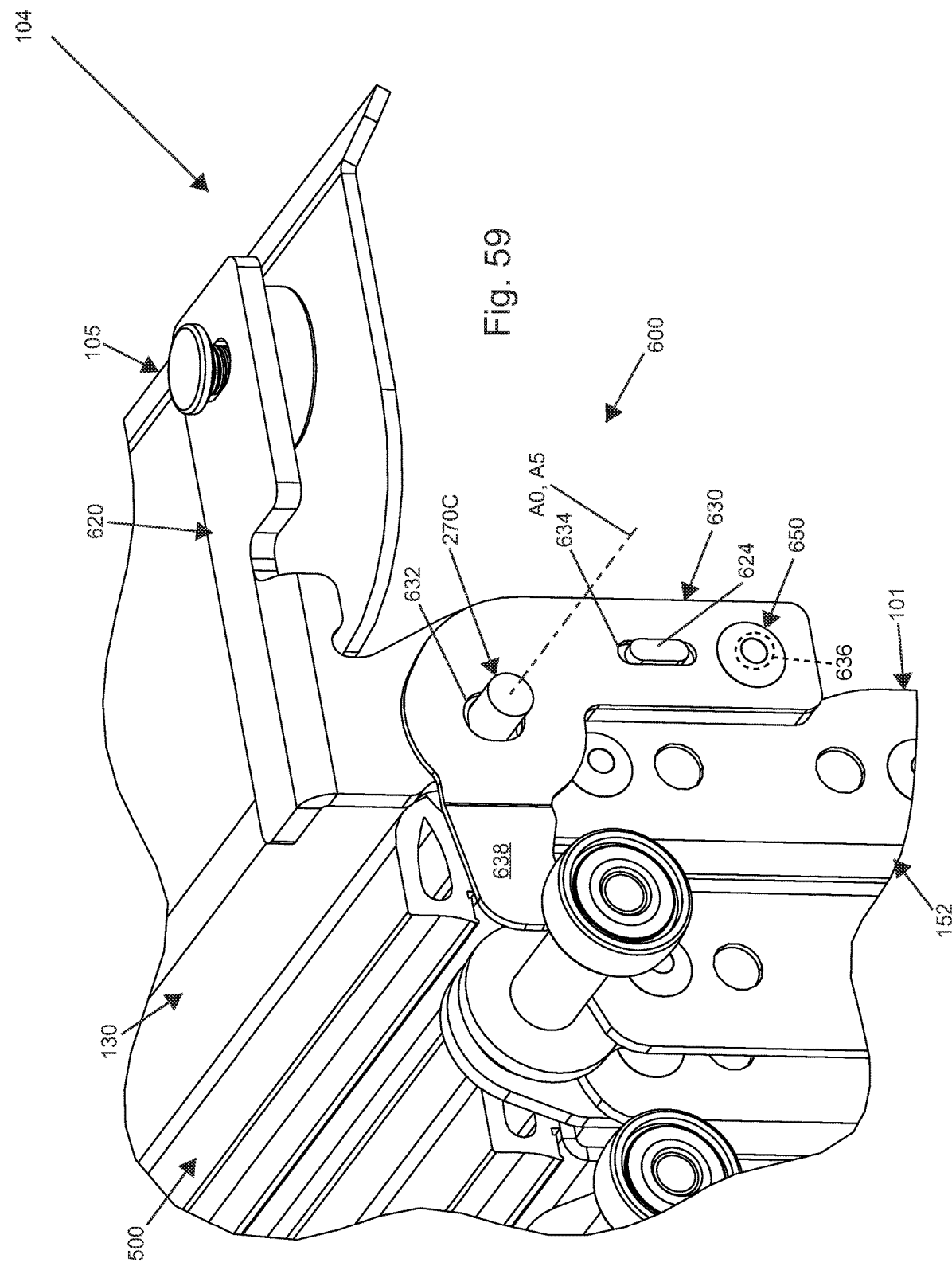
FIG. 59 is a partial perspective view of the quick released system of FIG. 58 with the quick release system in an attached configuration.
Figure 64:
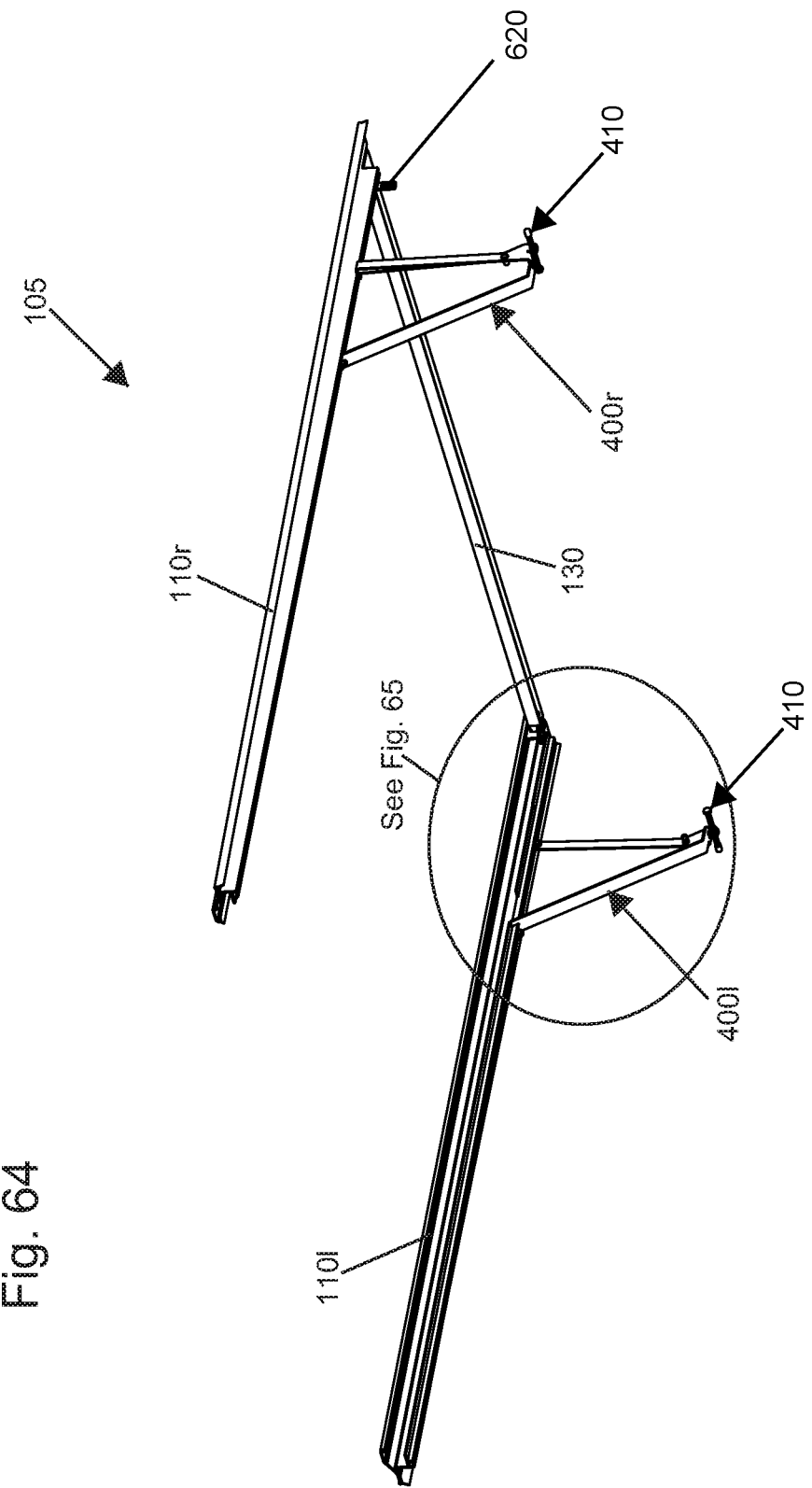
FIG. 64 is a right-rear-bottom perspective view illustrating a ramp system of the retractable cover system of FIG. 1.

As illustrated at FIG. 64, the interface system 105 includes a front cross-member 130, a right rail 110r, a left rail 110l, a right ramp structure 400r, and a left ramp structure 400l. The front cross-member 130 is generally positioned adjacent the front side 88 of the pickup truck box 80. The right rail 110r is generally positioned along a top of the right side 86r and extends from the front cross-member 130 to the end gate 98 when the end gate 98 is at the closed position. The left rail 110l is generally positioned along a top of the left side 86l and extends from the front cross-member 130 to the end gate 98 when the end gate 98 is at the closed position. The panel assembly 101 is pivotally attached to the interface system 105. In particular, a panel 152 is pivotally attached to the interface system 105 at a quick-attach system 600, as illustrated at FIGS. 58 and 59. The quick-attach system 600 defines an axis A0 about which the panel 152 is pivotally attached to the interface system 105 (see FIGS. 58 and 59).

Figure 6:
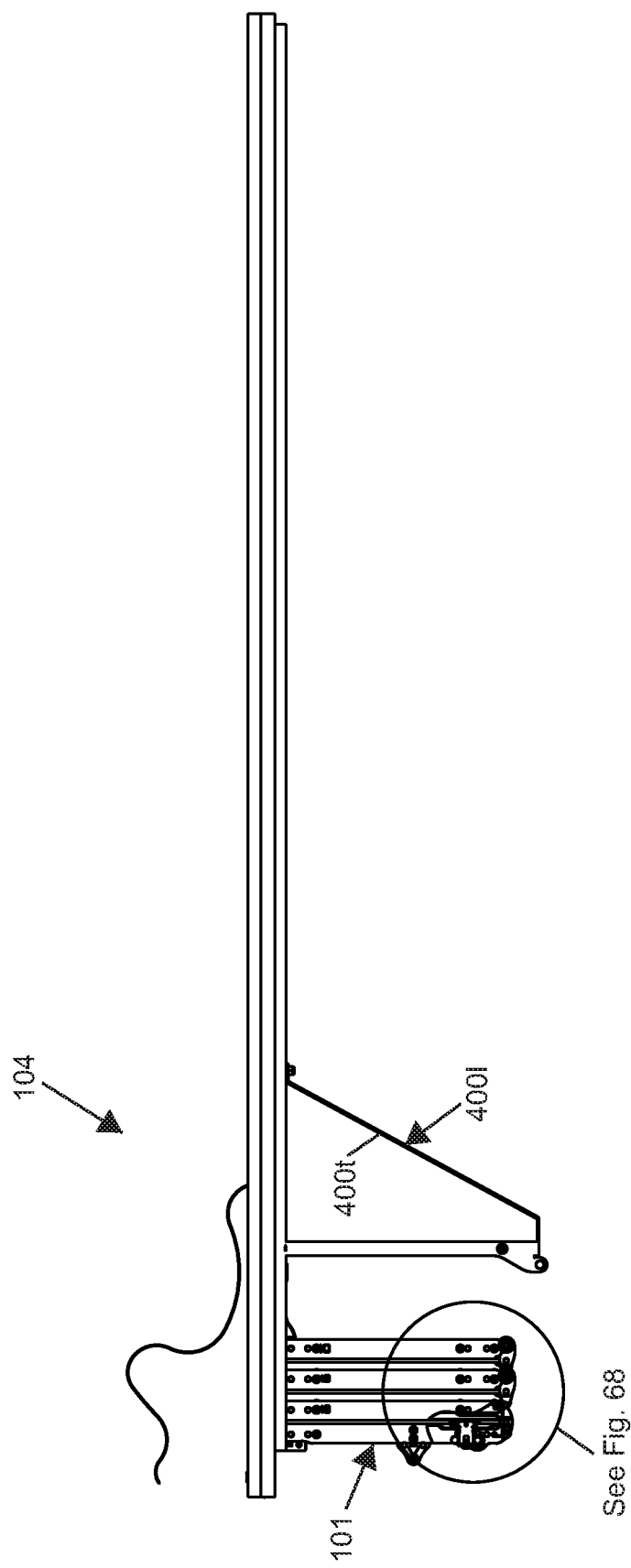
FIG. 6 is a left-side elevation view of the retractable cover system of FIG. 1 in the stowed configuration.
Figure 7:
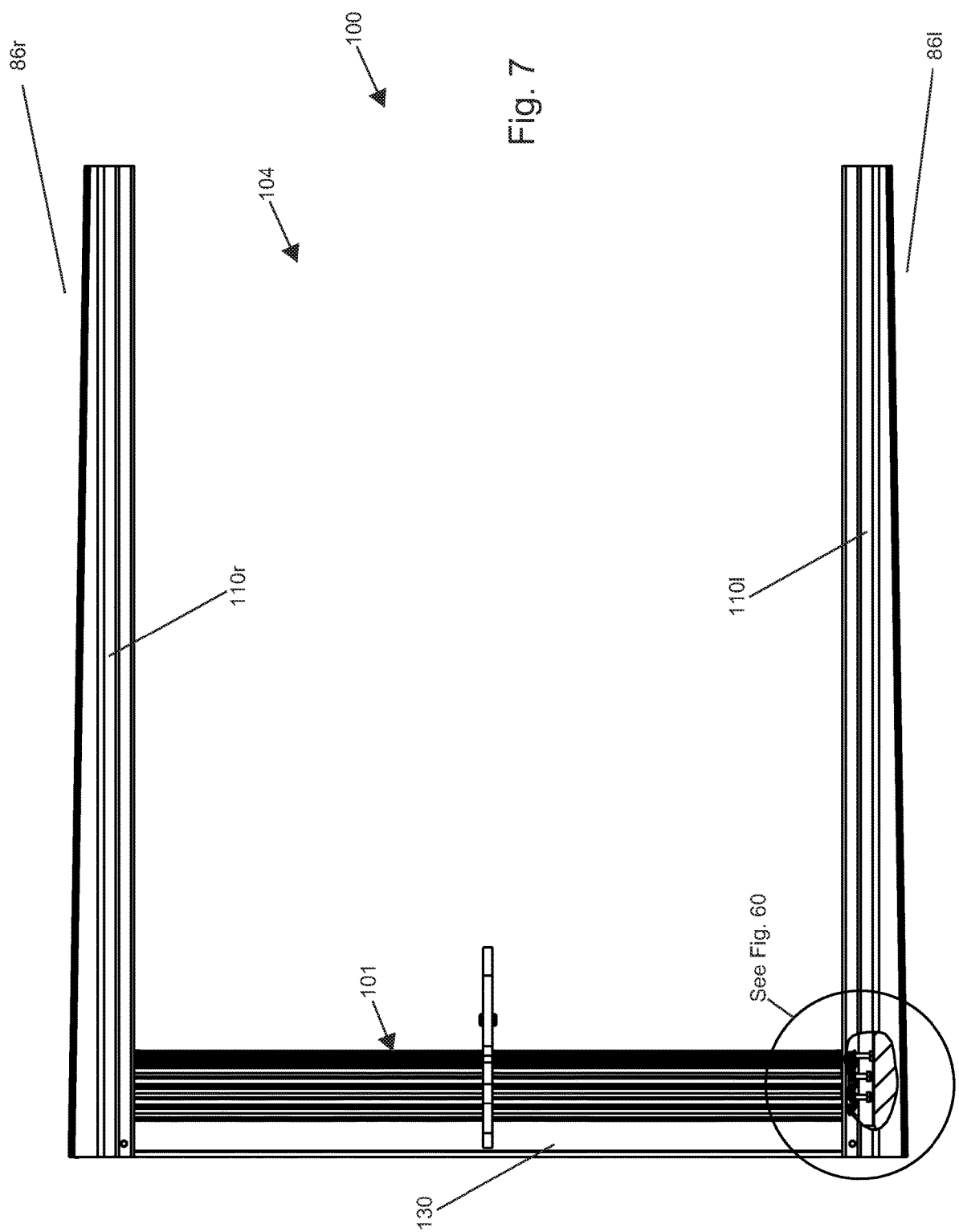
FIG. 7 is a top plan view of the retractable cover system of FIG. 1 in the stowed configuration.
Figure 16:
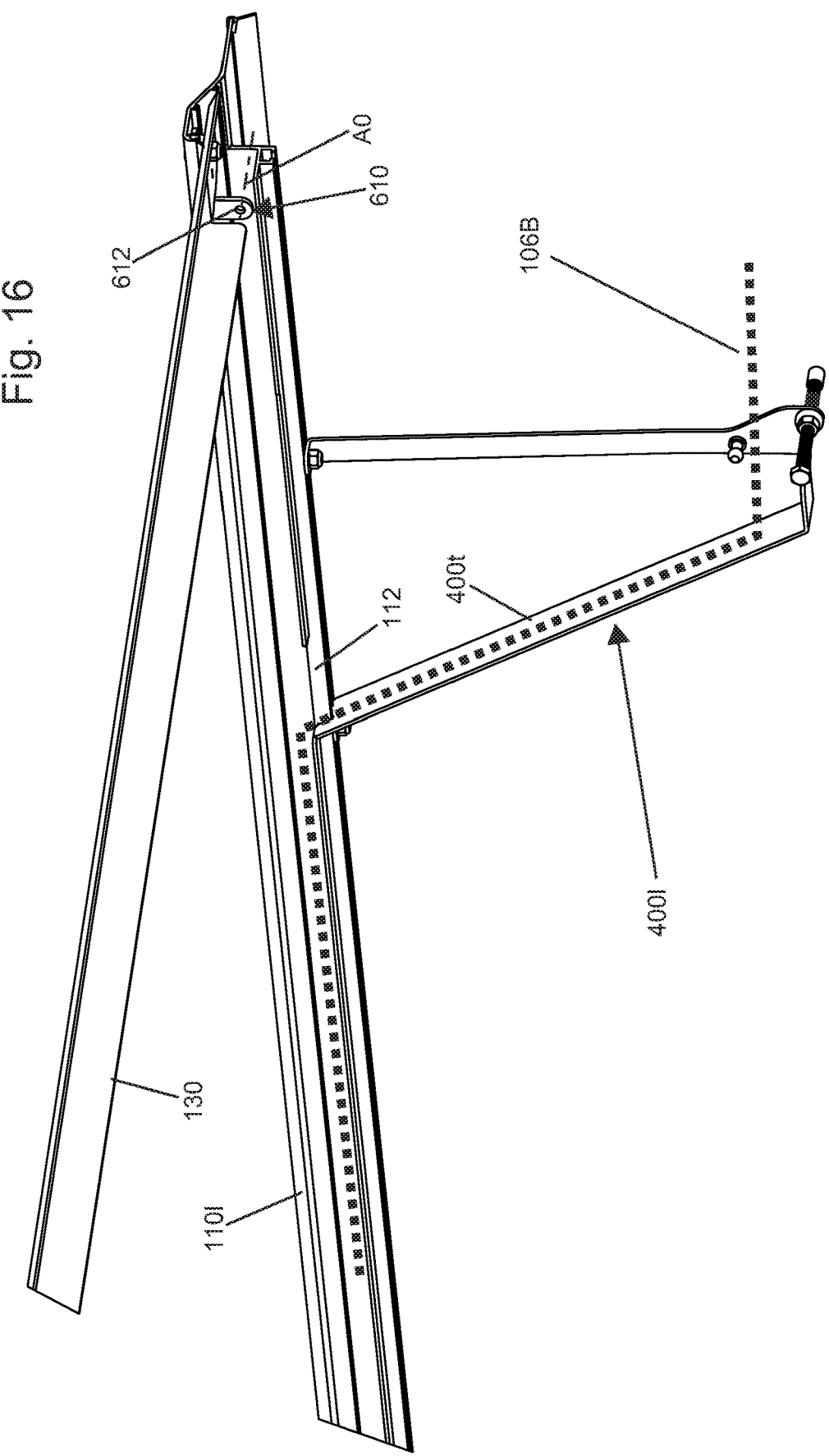
FIG. 16 is a partial right-front perspective view of a rail system of the retractable cover system of FIG. 1 and further illustrates a first path of the retractable cover system.
Figure 17:
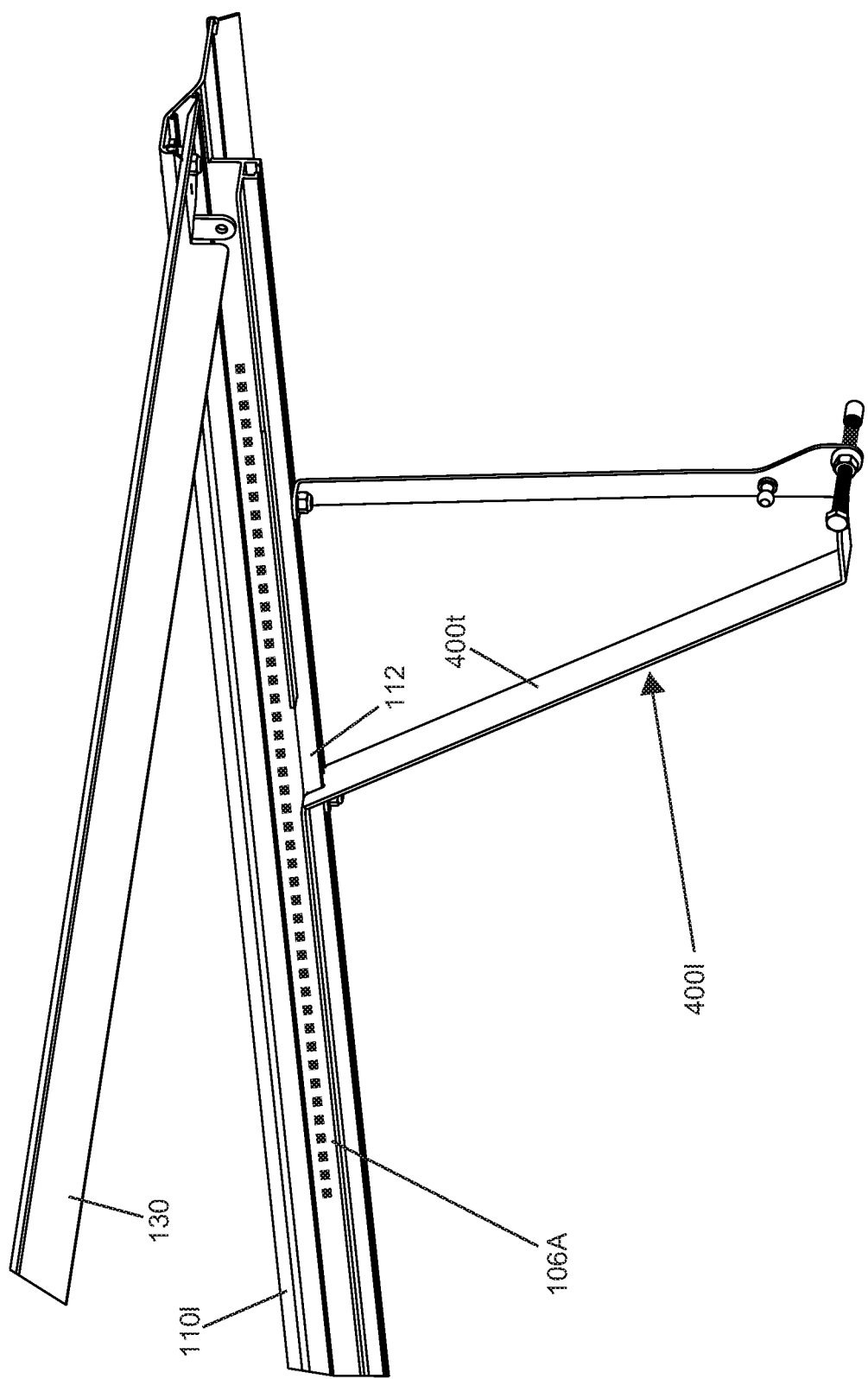
FIG. 17 is a partial right-front perspective view of the rail system of FIG. 16, but illustrating a second path of the retractable cover system of FIG. 1.

The panel assembly 101 is further supported by the right rail 110r and the left rail 110l. In particular, the panel assembly 101 includes a series of guide elements 330 that are supported by the right rail 110r and the left rail 110l. The guide elements 330 generally allow movement along the fore-aft direction 108 by the panel assembly 101. In particular, a set of inner guide elements 330i of the guide elements 330 follow a path 106B, as illustrated at FIG. 16. The path 106B extends along the right rail 110r and/or the left rail 110l along the fore-aft direction 108 until the right ramp structure 400r or the left ramp structure 400l is reached. Upon reaching the ramp structures 400r, 400l, the inner guide elements 330i follow the right ramp structure 400r or the left ramp structure 400l, as illustrated at FIG. 16. The panel assembly 101 further includes a set of outer guide elements 330o of the guide elements 330 that generally move along the right rail 110r and the left rail 110l along the fore-aft direction 108. In particular, as illustrated at FIG. 17, the outer guide elements 330o follow a path 106A along their length of travel along the right rail 110r or the left rail 110l. A gap 112 in each of the right rail 110r and the left rail 110l allows the path 106B to diverge from the path 106A, as illustrated at FIGS. 16 and 17. The outer guide elements 330o do not enter the gap 112 and thereby continue traveling along the right rail 110r and the left rail 110l along the fore-aft direction 108. The inner guide elements 330i fall within the gap 112 and thereby enter the right ramp structure 400r or the left ramp structure 400l. The guide elements 330 may run in a track 110t of the right rail 110r or the left rail 110l (see FIG. 61). The inner guide elements 330i may run in a track 400t of the right ramp structure 400r or the left ramp structure 400l, upon reaching the ramp structures 400r, 400l (see FIGS. 6, 16, and 17).

Figure 3:
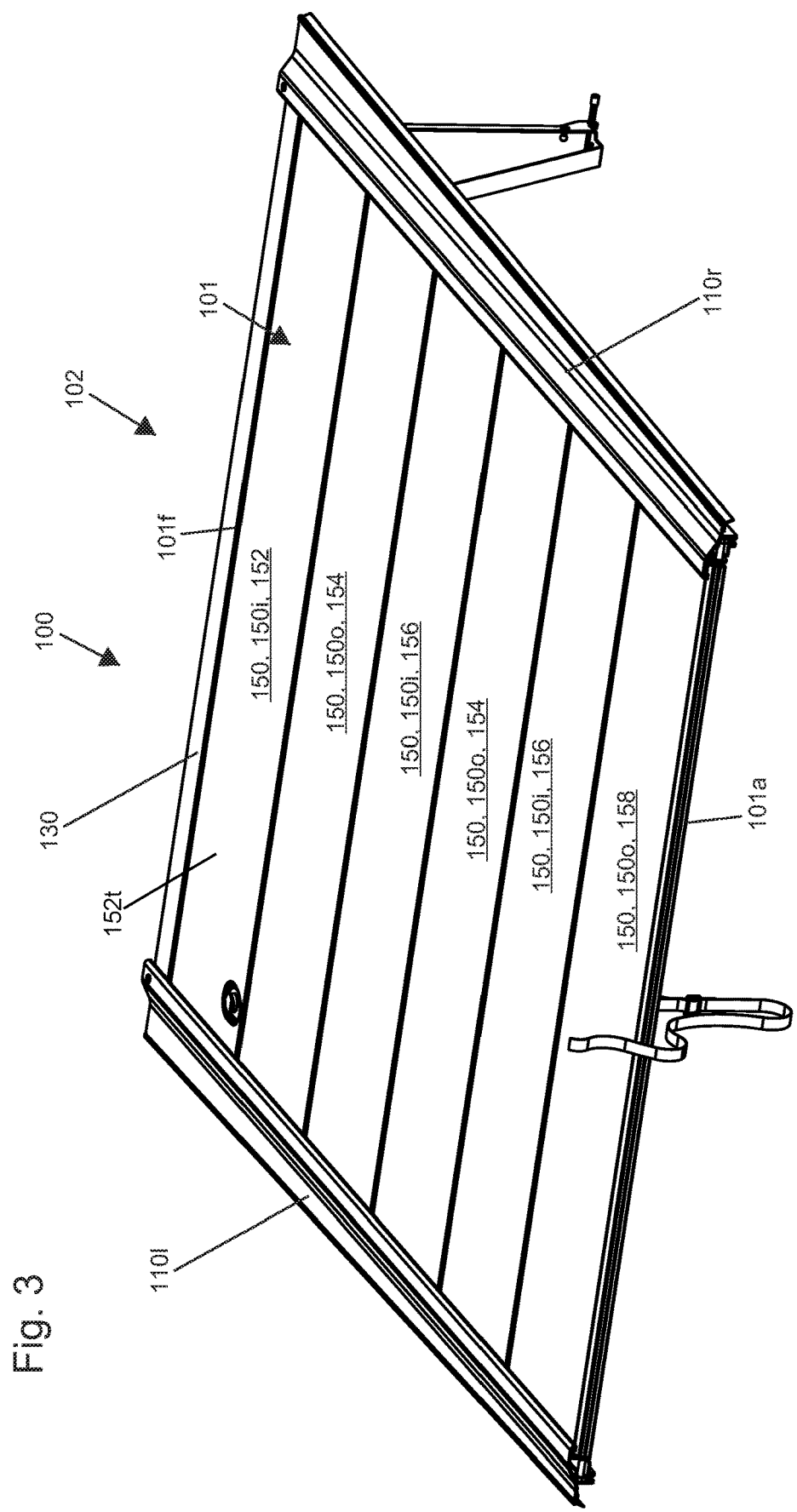
FIG. 3 is a right-rear perspective view of the retractable cover system of FIG. 1 in an extended configuration.
Figure 4:
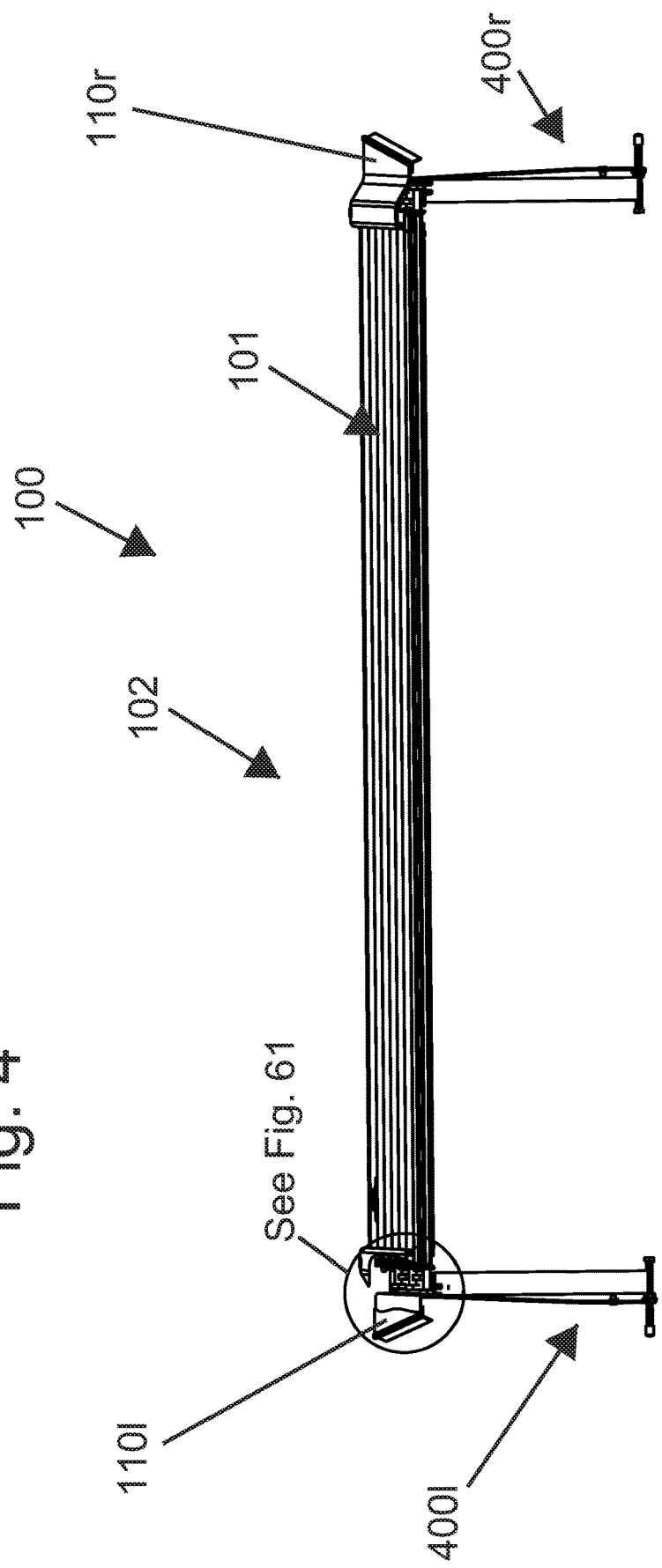
FIG. 4 is a mostly rear perspective view of the retractable cover system of FIG. 1 in the extended configuration.

According to the principles of the present disclosure, the panel assembly 101 includes the panel 152, one or more of a panel 154, one or more of a panel 156, and a panel 158 (see FIG. 3). The panel 158 is included at an aft end 101a of the panel assembly 101. In certain embodiments, as illustrated at FIG. 3, the panel assembly 101 may include six or more of the panels 152, 154, 156, 158. In these embodiments, the panel 152 is pivotally connected to the interface system 105 at a forward end 101f of the panel assembly 101. In turn, the panel 154 is pivotally connected to the panel 152. In turn, the panel 156 is pivotally connected to the panel 154. In turn, another of the panel 154 may be pivotally connected to the panel 156. In turn, another of the panel 156 may be pivotally connected to the preceding panel 154. Additional extensions to the panel assembly 101 may be made by adding pairs of the panel 154 and the panel 156. Upon the last pair of the panels 154 and 156 being added, the panel 158 is pivotally attached to the last of the panels 156. According to the principles of the present disclosure, the panels 154 may be substantially identical to each other, and the panels 156 may be substantially identical to each other.

In other embodiments, only four of the panels 152, 154, 156, 158 may be used in the panel assembly 101. In particular, the panel 152 may be pivotally connected to the interface system 105, the panel 154 may be pivotally connected to the panel 152, the panel 156 may be pivotally attached to the panel 154, and, finally, the panel 158 may be pivotally attached to the panel 156. As will be discussed and illustrated hereinafter, various features of the panels 152, 154, 156, 158 of the panel assembly 101 may be repeated to take advantage of common and/or similar parts, common spacings, common diameters, common sizes, common offsets, and other common features.

Figure 5:
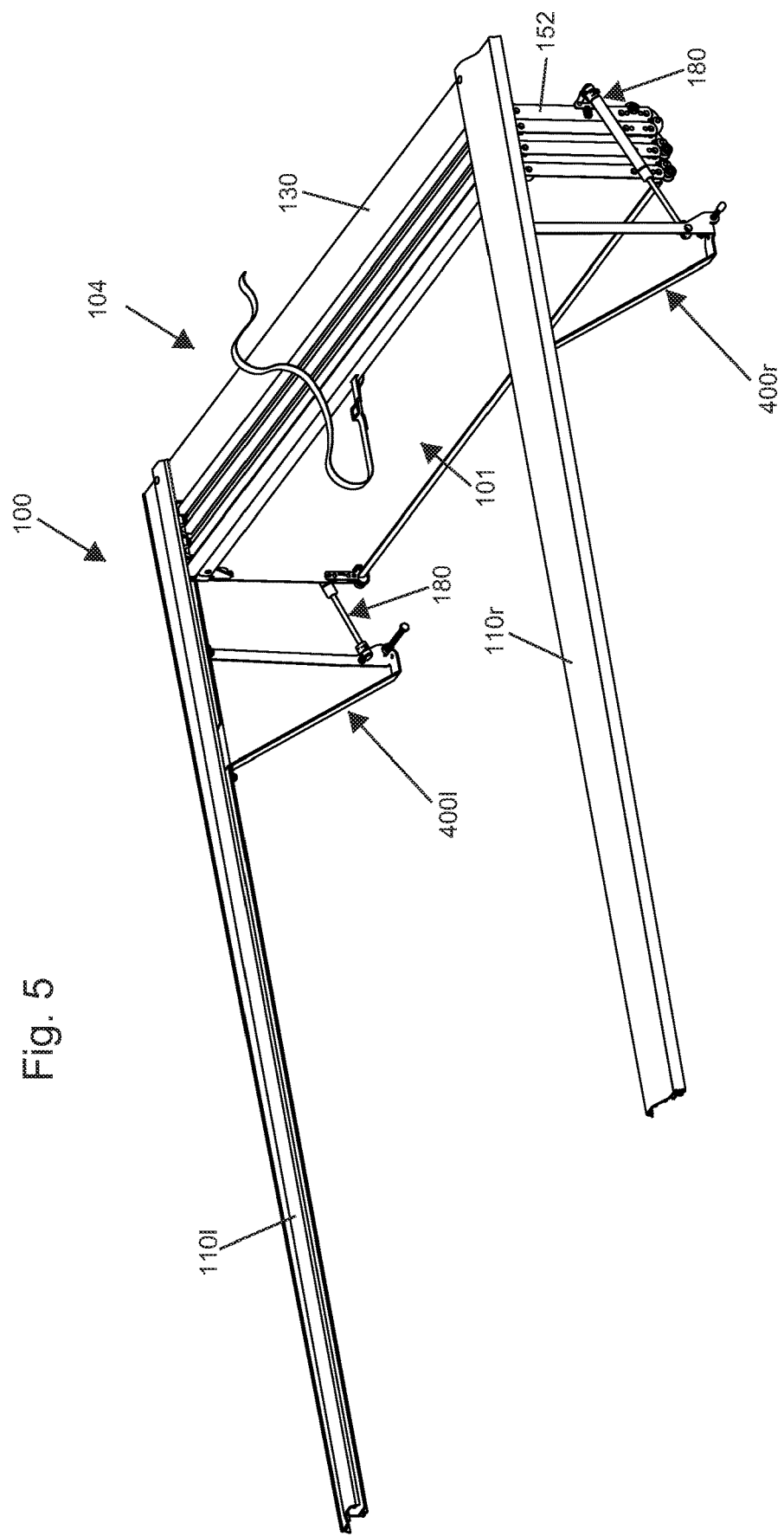
FIG. 5 is a right-rear perspective view of the retractable cover system of FIG. 1 in a stowed configuration.

In order to assist the panel 152 in reaching the extended configuration 102, a pair of actuators 180 may be positioned between the panel 152 and the right ramp structure 400r and the left ramp structure 400l, respectively, as illustrated at FIG. 5. As depicted, the actuators 180 each include a gas charged cylinder that is configured to extend. Thus, at the stowed configuration 104, the actuators 180 urge the panel assembly 101 to remain in the stowed configuration 104. As the panel assembly 101 is moved to the deployed configuration 102, the panel assembly 101 is held at the deployed configuration 102 by the actuators 180.

Figure 13:
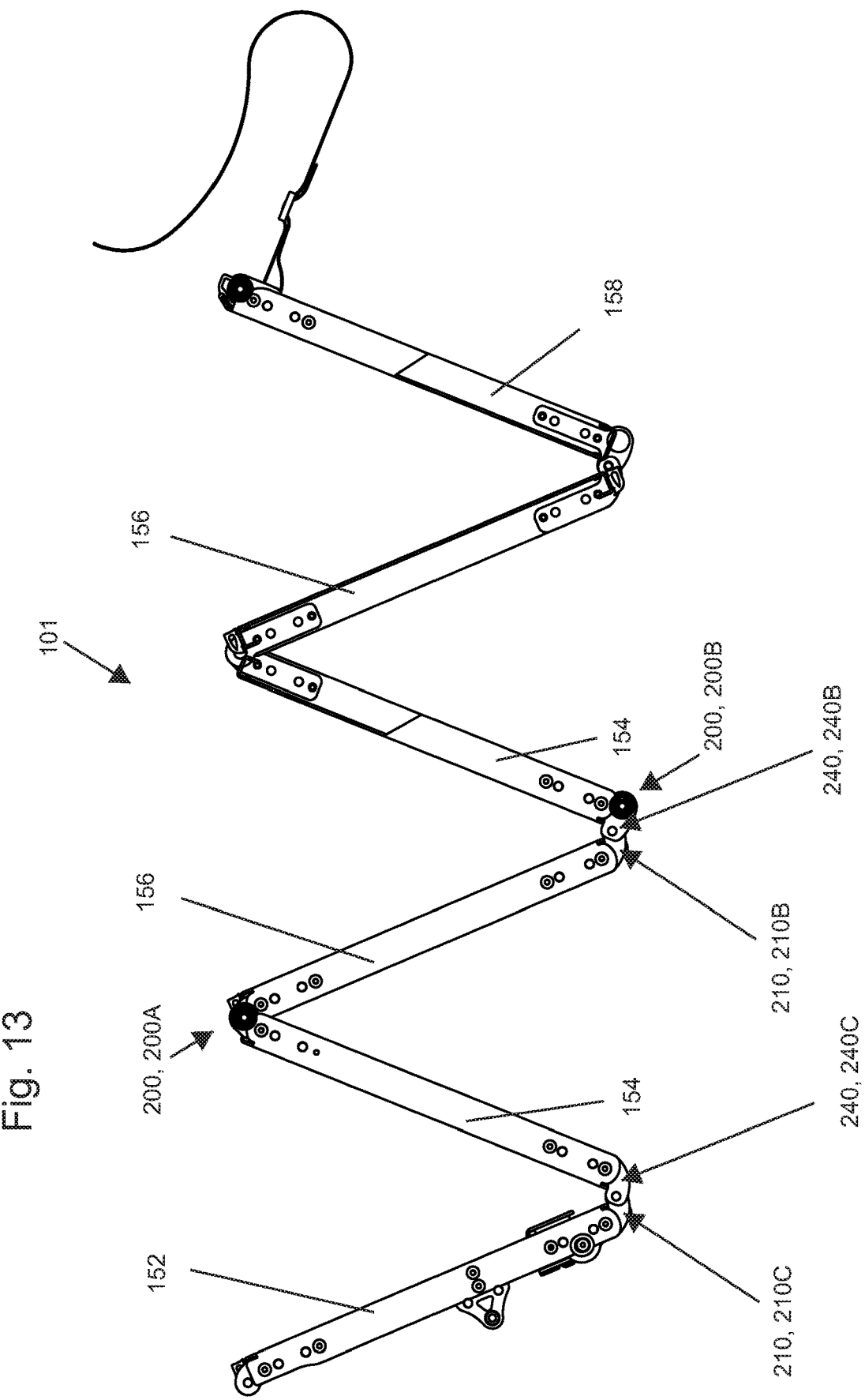
FIG. 13 is a left-side partially cross-sectioned elevation view of the panel assembly of FIG. 8 with the panels of FIG. 12 further hinged.
Figure 18:
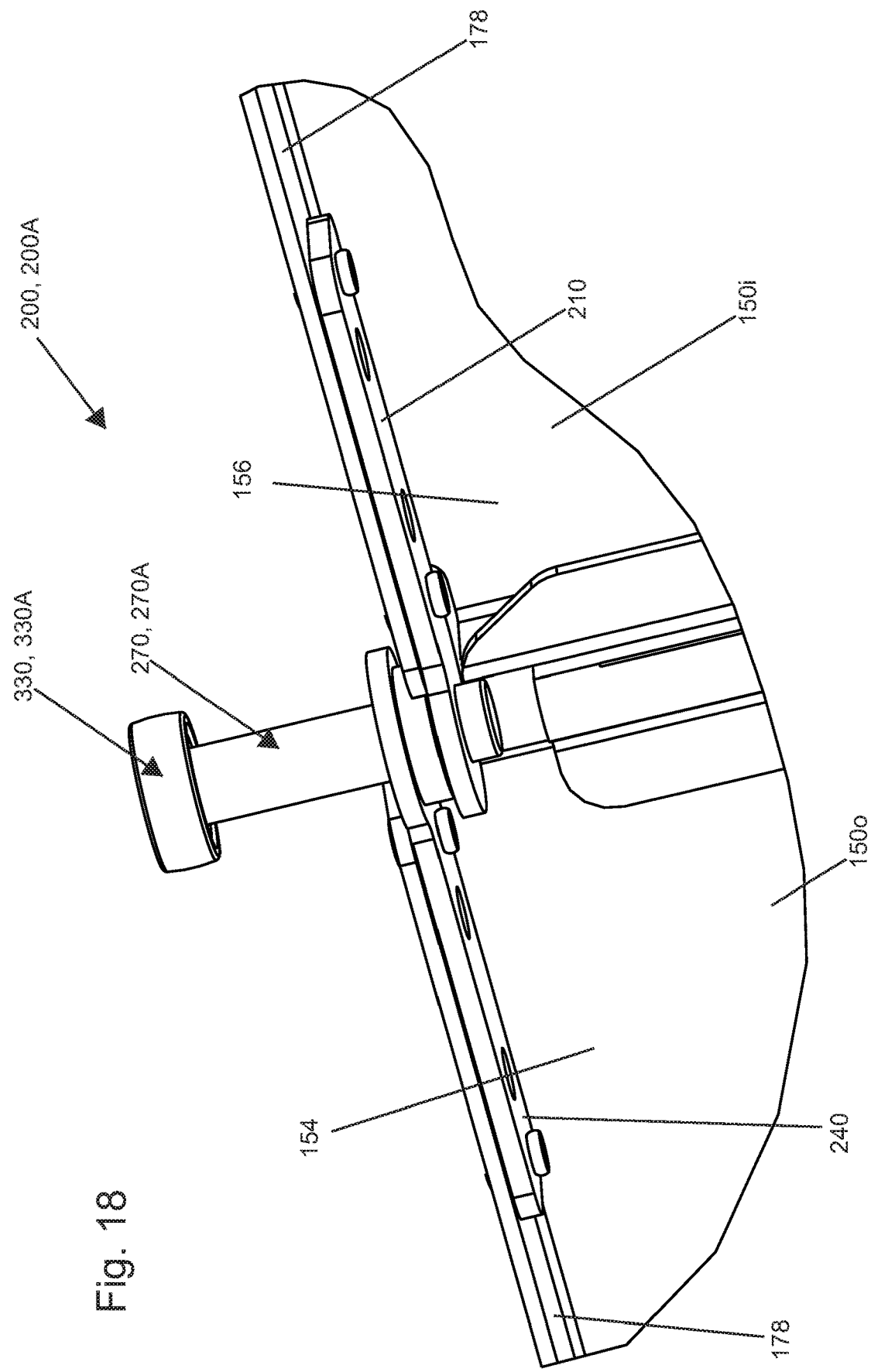
FIG. 18 is a partial perspective view of the underside of the panel assembly of FIG. 8 illustrating a first joint type of the retractable cover system of FIG. 1.
Figure 19:
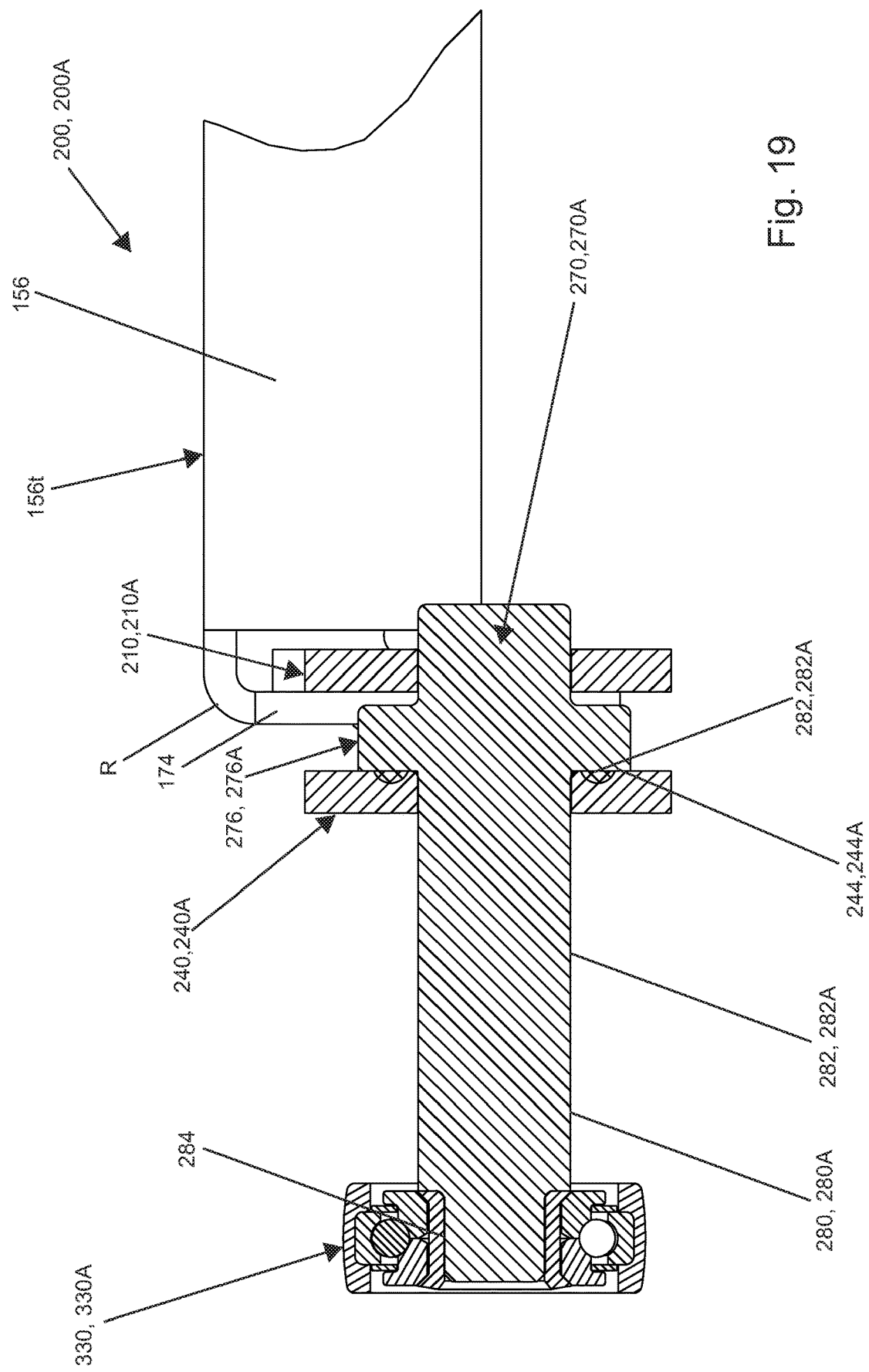
FIG. 19 is a partial cross-sectional elevation view of the first joint type of FIG. 18.
Figure 20:
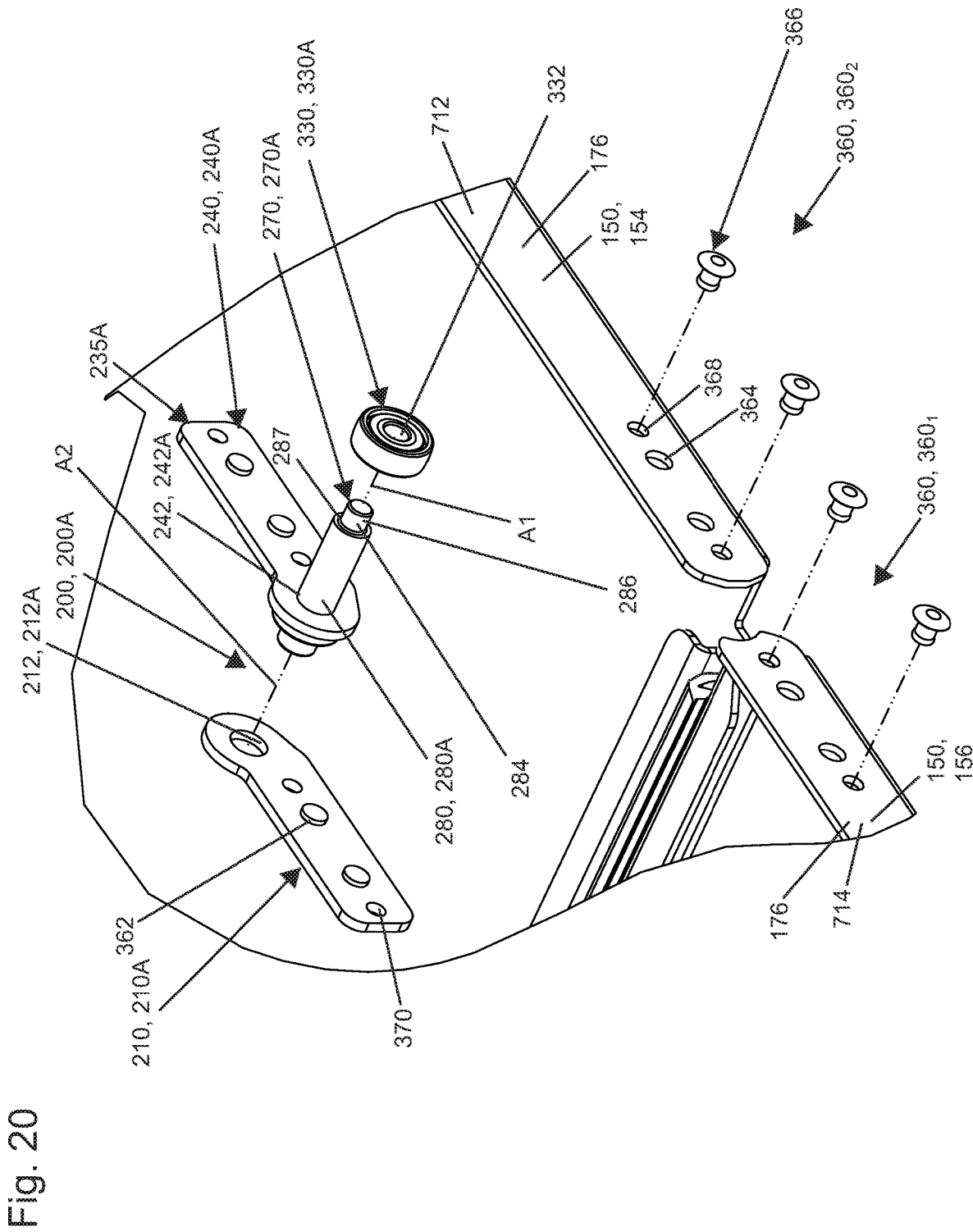
FIG. 20 is an enlarged portion of FIG. 9, further illustrating the first joint type of FIG. 18.
Figure 21:
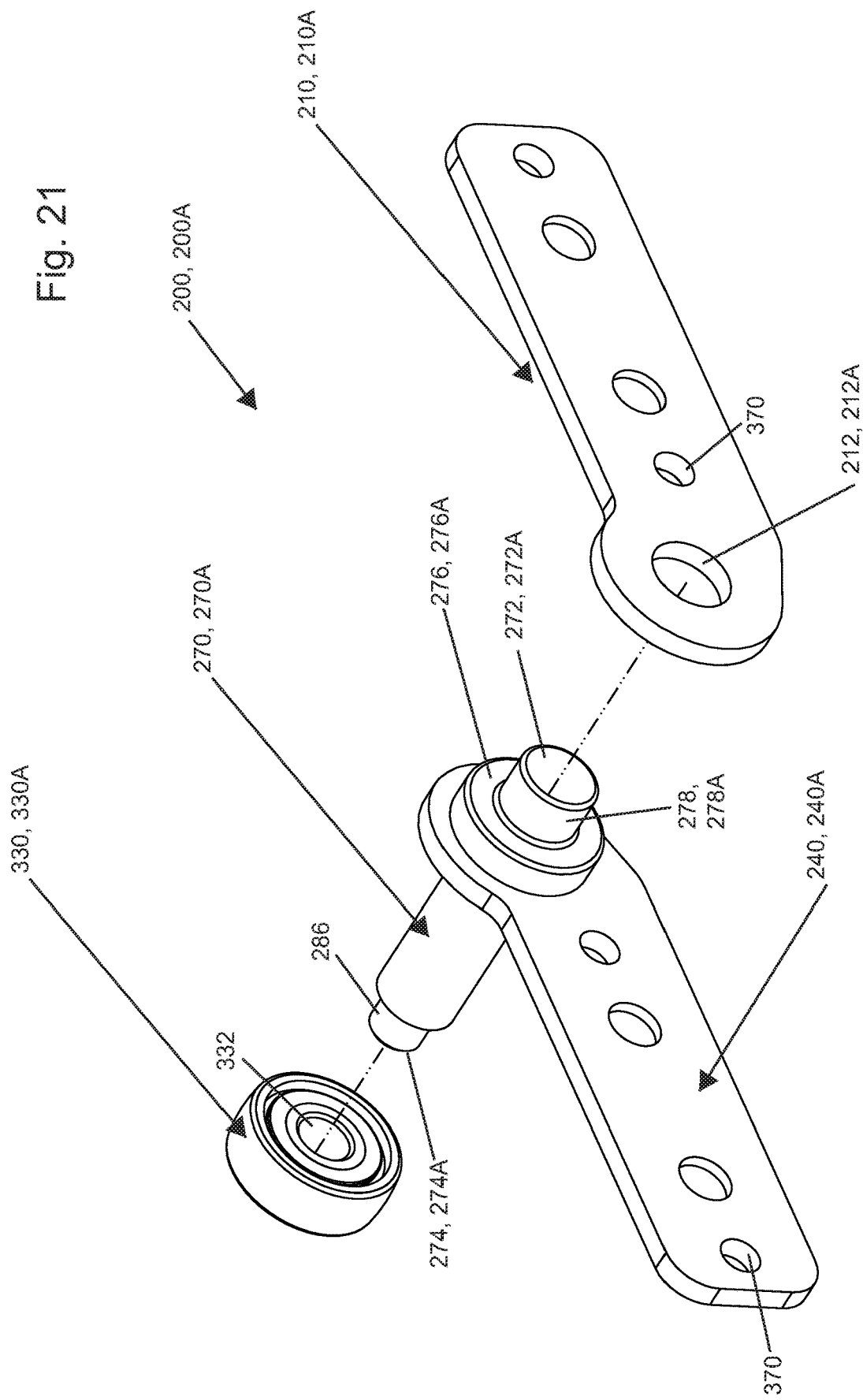
FIG. 21 is an enlarged portion of FIG. 8, further illustrating the first joint type of FIG. 18.

Turning now to FIGS. 18-29, a joint 200A, according to the principles of the present disclosure, is illustrated. The joint 200A is an embodiment of a pivoting joint 200. The joint 200A may be a first joint type of the panel assembly 101. As illustrated at FIGS. 13 and 18, the joint 200A is used to pivotally connect the panel 156 with the panel 154. As illustrated at FIG. 20, the joint 200A includes a first member 210A that is connected to a first panel 156 by a connecting arrangement 360, 360₁. As the first member 210A is connected to the first panel 156, they are one kinematic body and move kinematically together. Likewise, the joint 200A includes a second member 240A that is attached to a second panel 154 by a connecting arrangement 360, 360₂. As the second member 240A is connected to the second panel 154, they are one kinematic body and move kinematically together. As depicted at FIG. 21, the joint 200A includes a shaft 270A that extends between a first end 272A and a second end 274A. As depicted, one of the guide elements 330 is positioned at the second end 274A of the shaft 270A. The shaft 270A thereby positions the guide element 330 in the transverse direction 109 relative to the panel assembly 101. In particular, a mounting surface 286 positioned at the second end 274A presses into an inner race 332 of a guide element 330A. As illustrated at FIG. 20, a shoulder 287 of the shaft 270A abuts against the inner race 332 to position the guide element 330A on the shaft 270A. The guide element 330A is a roller with a rotational axis A1. The joint 200A, as depicted, results in an axis A2 being positioned below a top surface 154t of the panel 154 and below a top surface 156t of the panel 156. The axis A2 is a pivot axis of the joint 200A. As depicted, the joint 200A positions the pivot axis A2 coaxially with the rotational axis A1 of the guide element 330A.

As illustrated at FIG. 53, the panels 154 and 158 include a notch 702, and the panel 156 includes a notch 704. The notch 704 is adapted to receive the first member 210A and allow the first member 210A to be mounted at an inside of a flange 714 of the panel 156. Likewise, the notch 702 allows the second member 240A to be mounted at an inside of a flange 712 of the panel 154, 158. As illustrated at FIGS. 25 and 26, the notch 702 further allows assembly of the joint 200A in between the panel 154 or 158 and the panel 156. In the depicted embodiment, the shaft 270A is sub-assembled to the second member 240A and thereby forms a subassembly 235A, as illustrated at FIGS. 28 and 29. In embodiments without protrusions 362, the subassembly 235A may be assembled as a right-hand or a left-hand subassembly by reversing the direction that the shaft 270A is assembled, respectively. In embodiments with the protrusions 362, the second member 240A may be right-handed or left-handed (e.g., with the protrusions 362 positioned on opposite sides) and used in a corresponding right-hand or left-hand subassembly 235A. In addition, as illustrated at FIG. 30, the guide element 330A may be further sub-assembled to the subassembly 235A. The guide element 330A may be assembled before or after the first member 210A and/or the second member 240A are mounted to the flange 714 and/or 712. The guide element 330A may be disassembled and reassembled (e.g., for servicing and/or replacing the guide element 330A) without additional disassembly of the joint 200A. As illustrated at FIGS. 20, 25, and 26, the subassembly 235A may be inserted into the notch 702 and thereby tilted into position. In particular, the fastening arrangement 360 and the insertion of a pivoting portion 278A of the shaft 270A into a pivot surface 212A of the first member 210A may require the subassembly 235A to be tilted into position in the depicted embodiment.

Figure 31:
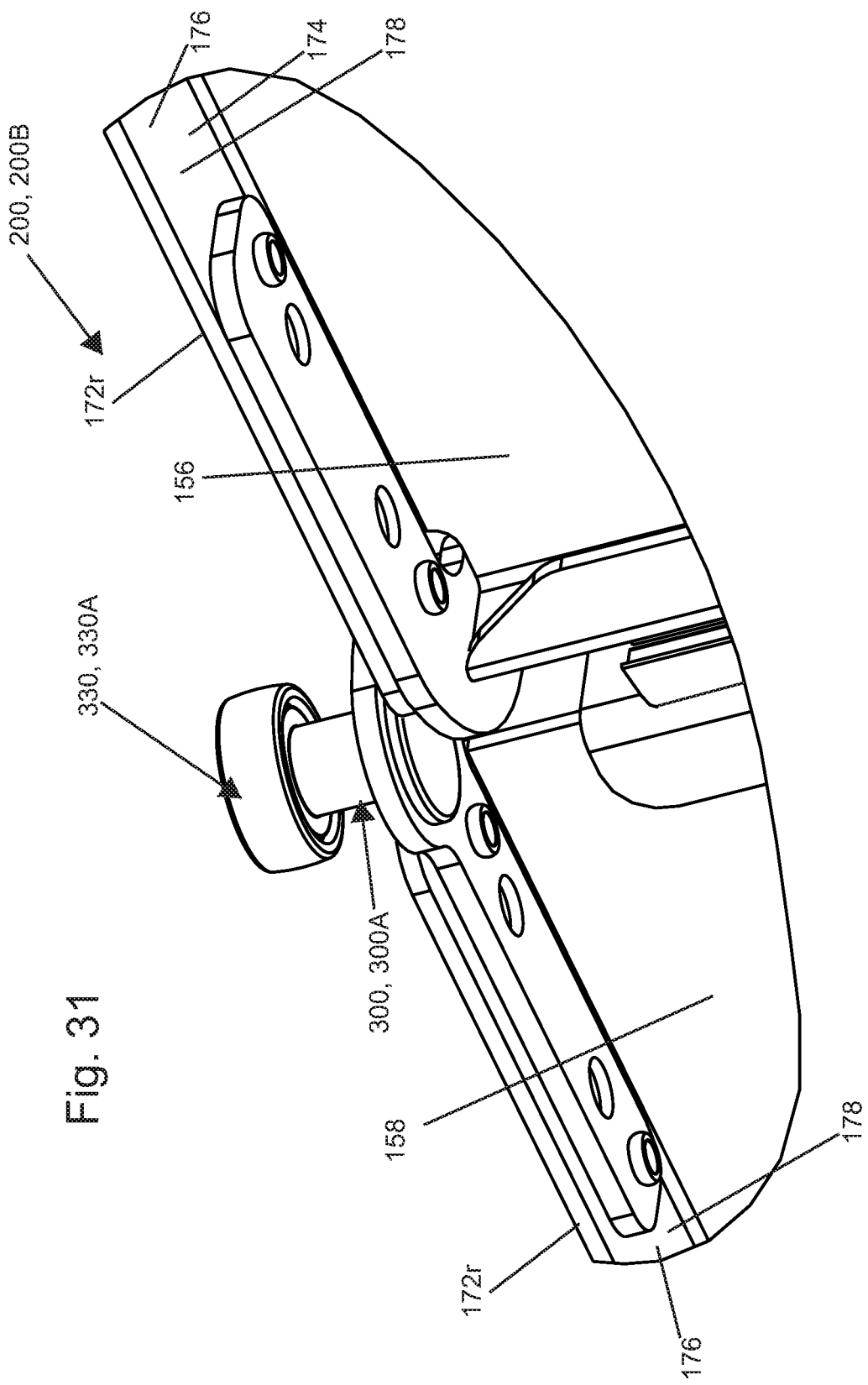
FIG. 31 is a partial perspective view of the underside of the panel assembly of FIG. 8 illustrating a second joint type of the retractable cover system of FIG. 1.
Figure 32:
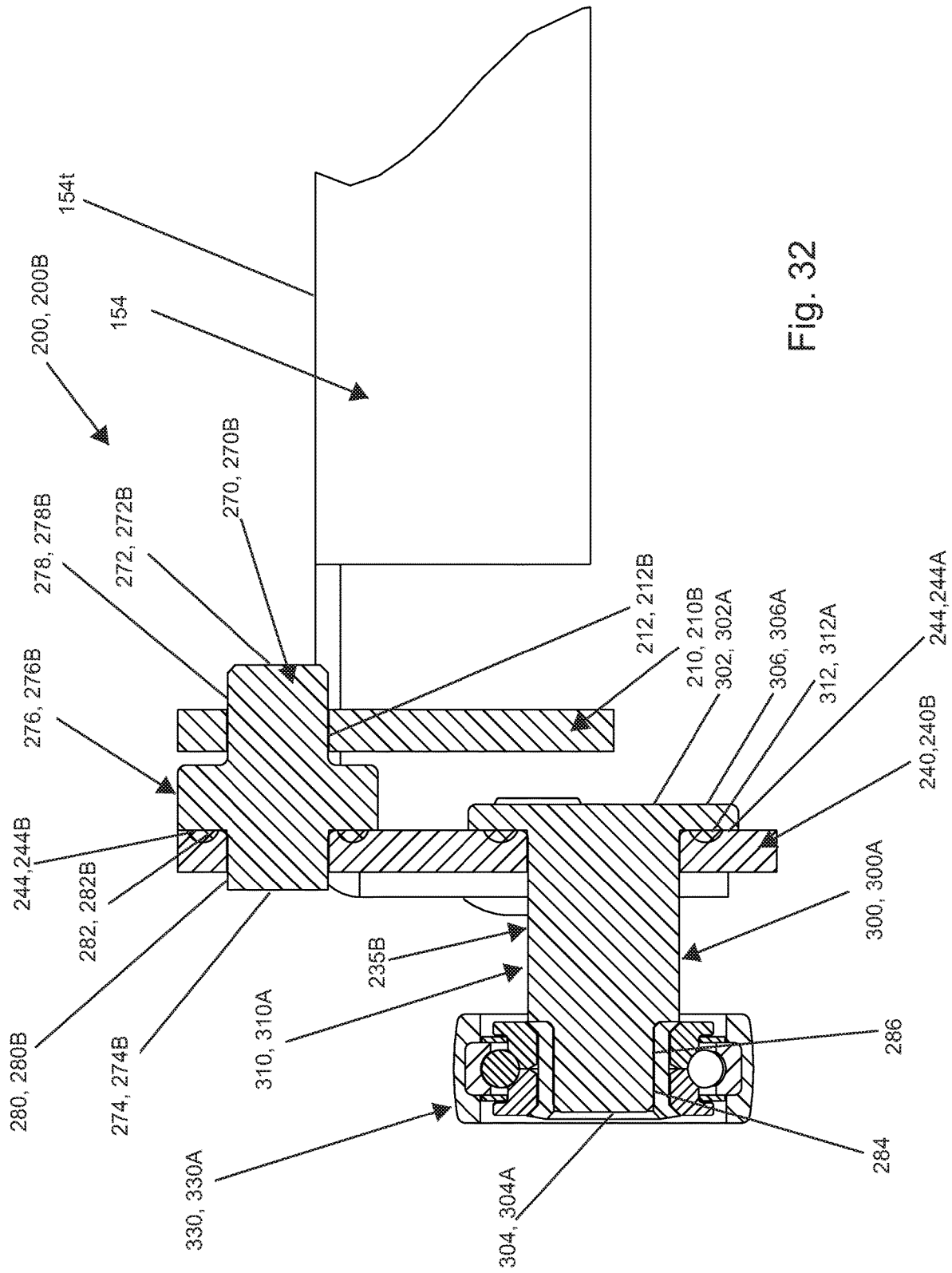
FIG. 32 is a partial cross-sectional elevation view of the second joint type of FIG. 31.
Figure 33:
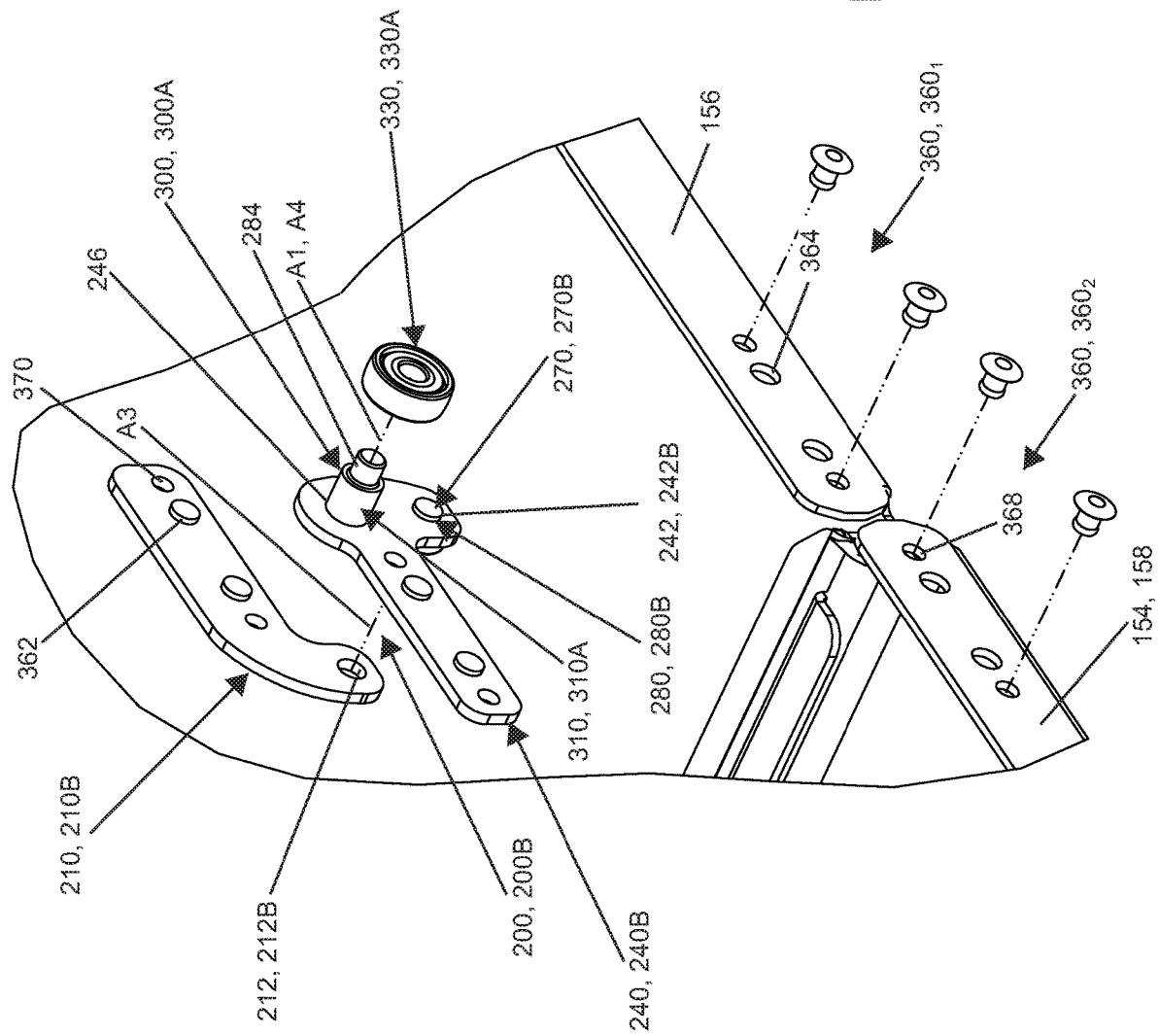
FIG. 33 is an enlarged portion of FIG. 9, further illustrating the second joint type of FIG. 31.
Figure 34:
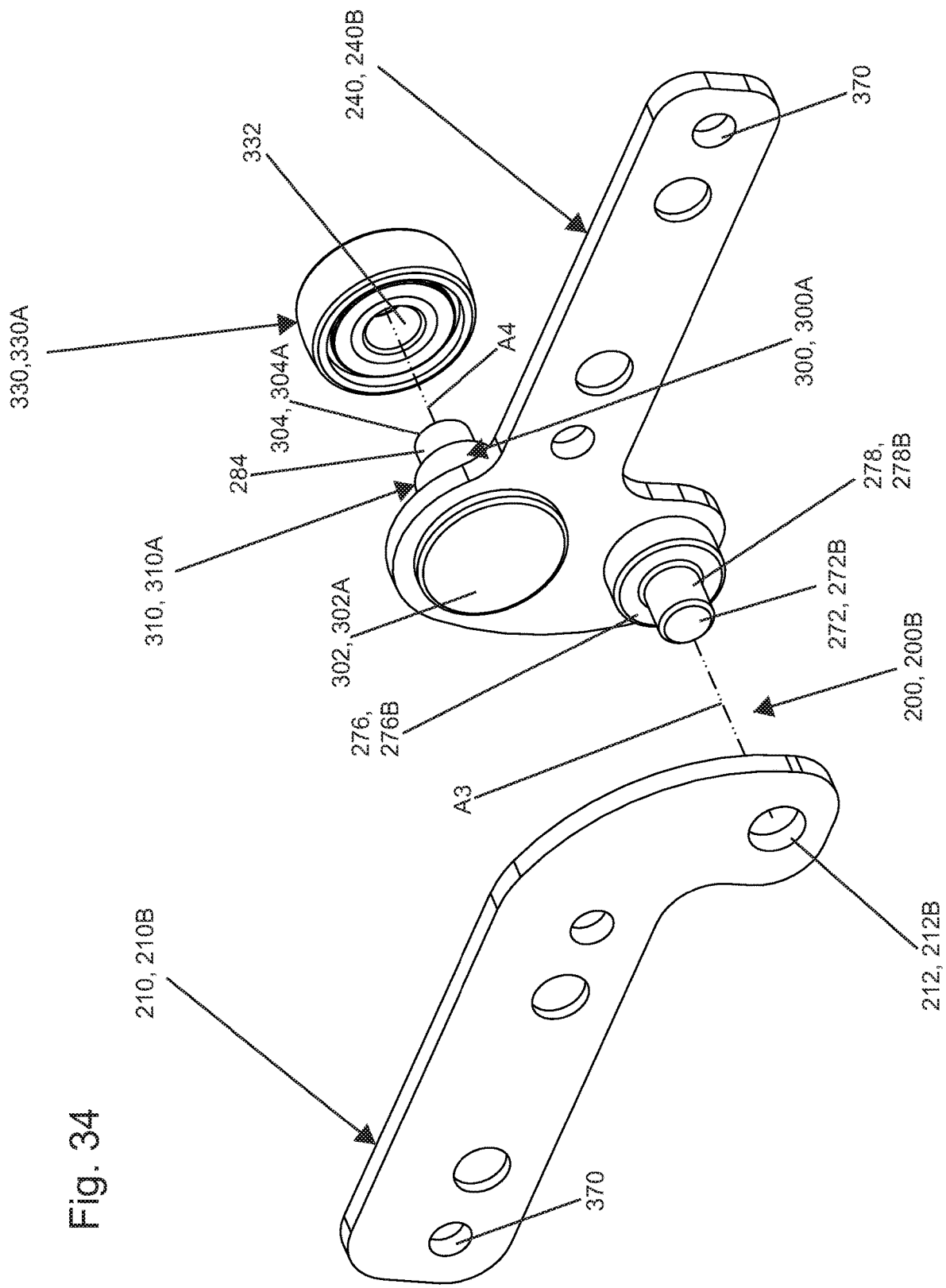
FIG. 34 is an exploded perspective view similar to FIG. 21, but illustrating the second joint type of FIG. 31.
Figure 35:
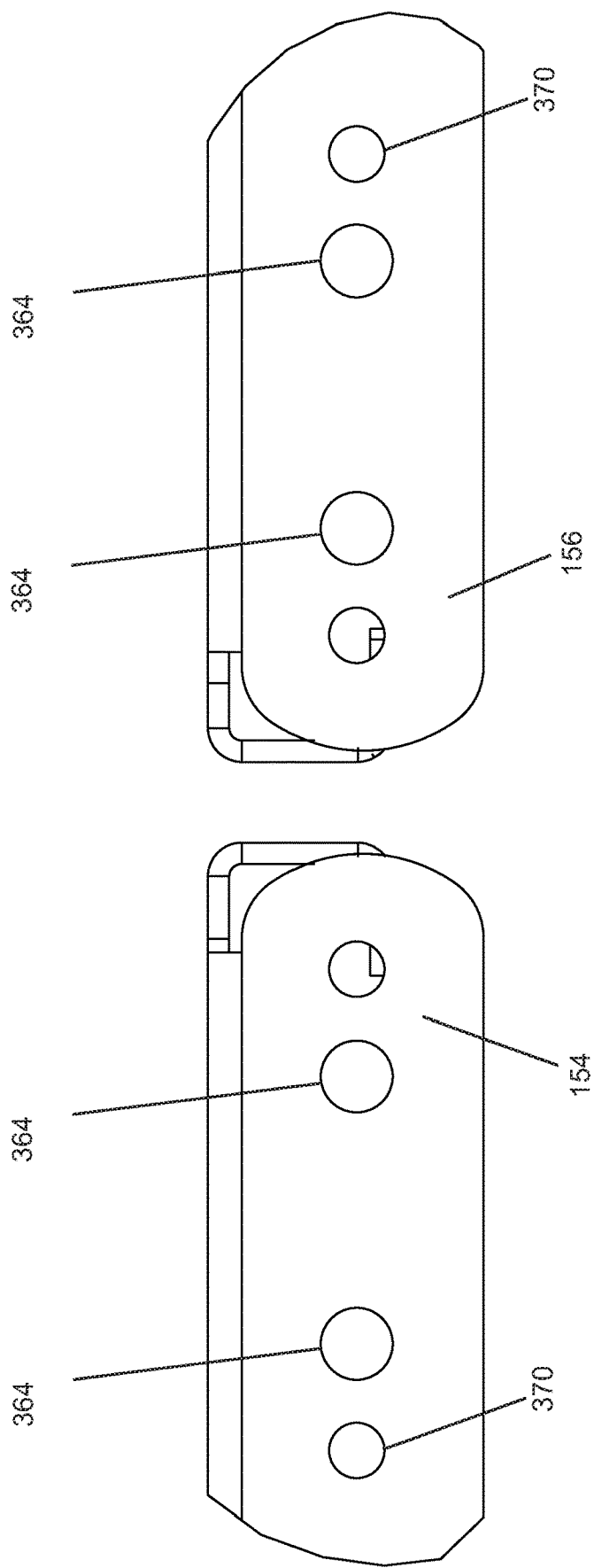
FIG. 35 is a partial side elevation view of the first panel and the second panel of FIG. 22 before they are connected by the second joint type of FIG. 31, the second joint type of FIG. 31 being connected to opposite ends of the first panel and the second panel of FIG. 22 as the first joint type of FIG. 18.
Figure 36:
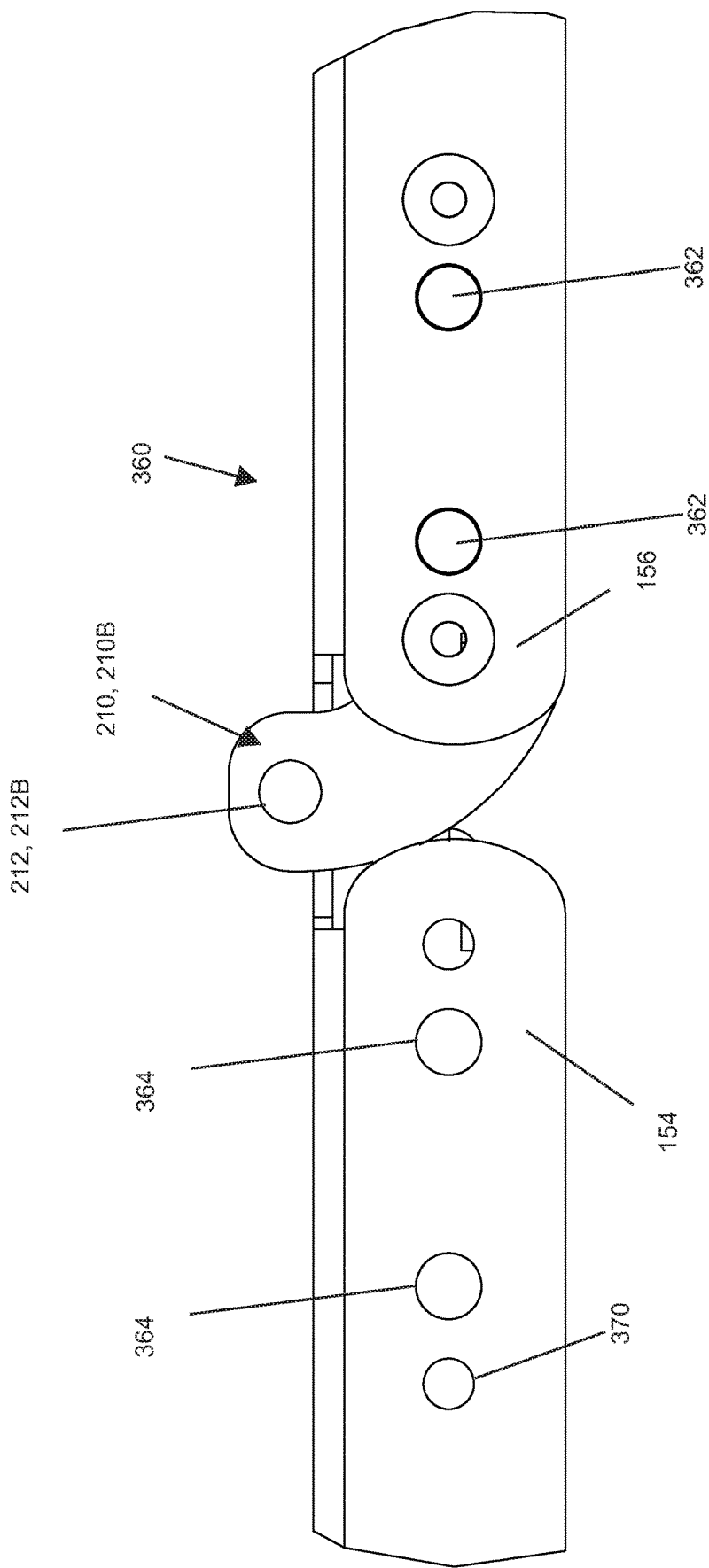
FIG. 36 is the partial side elevation view of FIG. 35, but with a first member assembled to the first panel.
Figure 37:
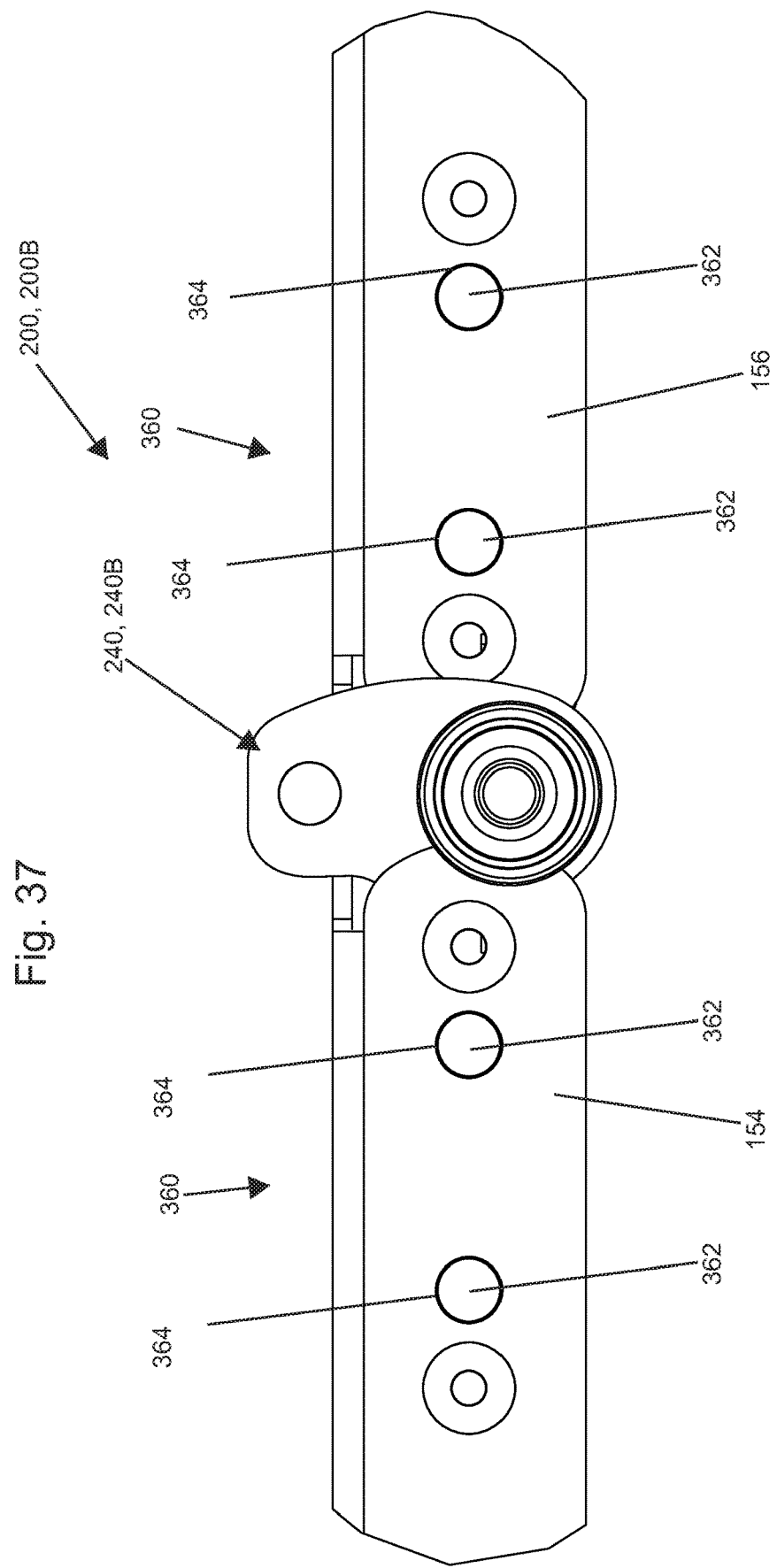
FIG. 37 is the partial side elevation view of FIG. 36, but with a subassembly including a second member and a shaft assembled to the second panel, thereby completing the assembly of the second joint type of FIG. 31 between and to the first and the second panels of FIG. 22.

Turning now to FIGS. 31-42, a joint 200B, according to the principles of the present disclosure, is illustrated. The joint 200B is an embodiment of the pivoting joint 200. The joint 200B may be a second joint type of the panel assembly 101. As illustrated at FIGS. 13, 31, and 33, the joint 200B is used to pivotally connect the panel 156 with the panel 154 or 158. As illustrated at FIG. 33, the joint 200B includes a first member 210B that is connected to a first panel 156 by a connecting arrangement 360, 360₁. As the first member 210B is connected to the first panel 156, they are one kinematic body and move kinematically together. Likewise, the joint 200B includes a second member 240B that is attached to a second panel 154 or 158 by a connecting arrangement 360, 360₂. As the second member 240B is connected to the second panel 154 or 158, they are one kinematic body and move kinematically together. As depicted at FIGS. 33 and 34, the joint 200B includes a shaft 270B that extends between a first end 272B and a second end 274B. As depicted, one of the guide elements 330 is positioned at a second end 304A of a shaft 300A. The shaft 300A thereby positions the guide element 330 in the transverse direction 109 relative to the panel assembly 101. In particular, a mounting surface 286 positioned at the second end 304A presses into the inner race 332 of the guide element 330A. As illustrated at FIGS. 20 and 33, a shoulder 287 of the shaft 300A abuts against the inner race 332 to position the guide element 330A on the shaft 300A. An axis A3 of the shaft 270B is offset from an axis A4 of the shaft 300A. The joint 200B, as depicted, results in the axis A3 being positioned above the top surface 154t of the panel 154, above the top surface 156t of the panel 156, and above a top surface 158*t* of the panel 158. The axis A3 is a pivot axis of the joint 200B. The axis A4 is coaxial with the rotational axis A1 of the guide element 330A.

Figure 39:
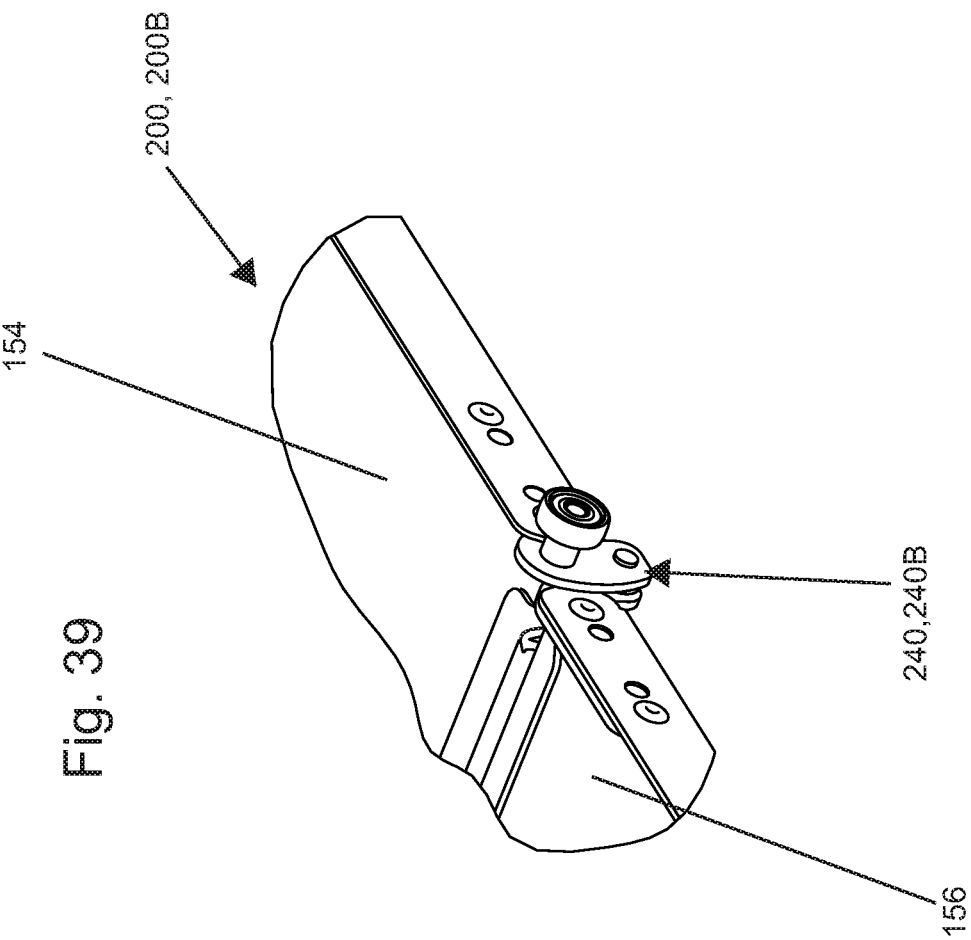
FIG. 39 is the partial perspective view of FIG. 38, but with the subassembly of FIG. 37 assembled to the second panel by additional rivets thereby completing the second joint type of FIG. 31.
Figure 38:
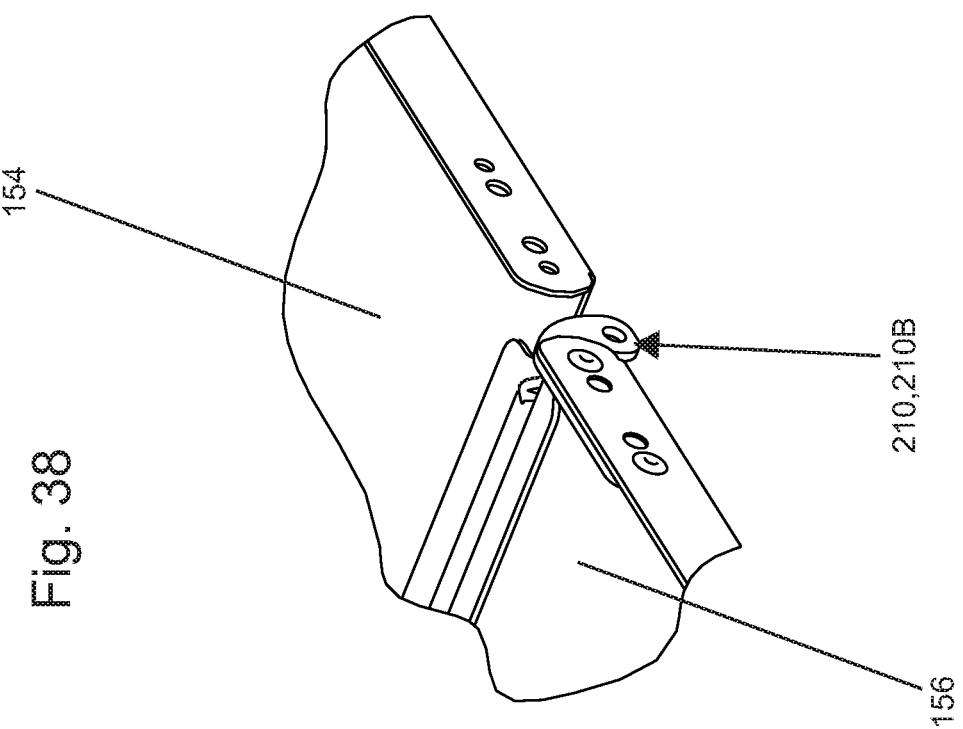
FIG. 38 is a partial perspective view showing the underside of the panel assembly of FIG. 8 with the first member of FIG. 36 attached to the first panel by additional rivets.

As illustrated at FIG. 54, the panel 154 includes a notch 702, and the panels 152 and 156 include a notch 704. The notch 704 is adapted to receive the first member 210B and allow the first member 210B to be mounted at the inside of the flange 714 of the panel 152. Likewise, the notch 702 allows the second member 240B to be mounted at an inside of the flange 712 of the panel 154. As illustrated at FIGS. 38 and 39, the notch 702 further allows assembly of the joint 200B in between the panel 154 and the panel 156. In the depicted embodiment, the shafts 270B and 300A are sub-assembled to the second member 240B and thereby form a subassembly 235B, as illustrated at FIGS. 32, 41, and 42. In embodiments without protrusions 362, the subassembly 235B may be assembled as a right-hand or a left-hand subassembly by reversing the direction that the shafts 270B and 300A are assembled, respectively. In embodiments with the protrusions 362, the second member 240B may be right-handed or left-handed (e.g., with the protrusions 362 positioned on opposite sides) and used in a corresponding right-hand or left-hand subassembly 235B. The joining of the shaft 300A to the second member 240B may include a weld portion 312A on the shaft 300A being welded to a weld portion 244A of the second member 240B. The joining of the shaft 300A to the second member 240B may include a piloting portion 246 of the second member 240B receiving a pilot 310A of the shaft 300A. In addition, as illustrated at FIG. 32, the guide element 330A may be further sub-assembled to the subassembly 235B. The guide element 330A may be assembled before or after the first member 210B and/or the second member 240B are mounted to the flange 714 and/or 712. The guide element 330A may be disassembled and reassembled (e.g., for servicing and/or replacing the guide element 330A) without additional disassembly of the joint 200B. As illustrated at FIGS. 33, 38, and 39, the subassembly 235B may be inserted into the notch 702 and thereby tilted into position. In particular, the fastening arrangement 360 and the insertion of a pivoting portion 278B of the shaft 270B into a pivot surface 212B of the first member 210B may require the subassembly 235B to be tilted into position in the depicted embodiment.

Figure 43:
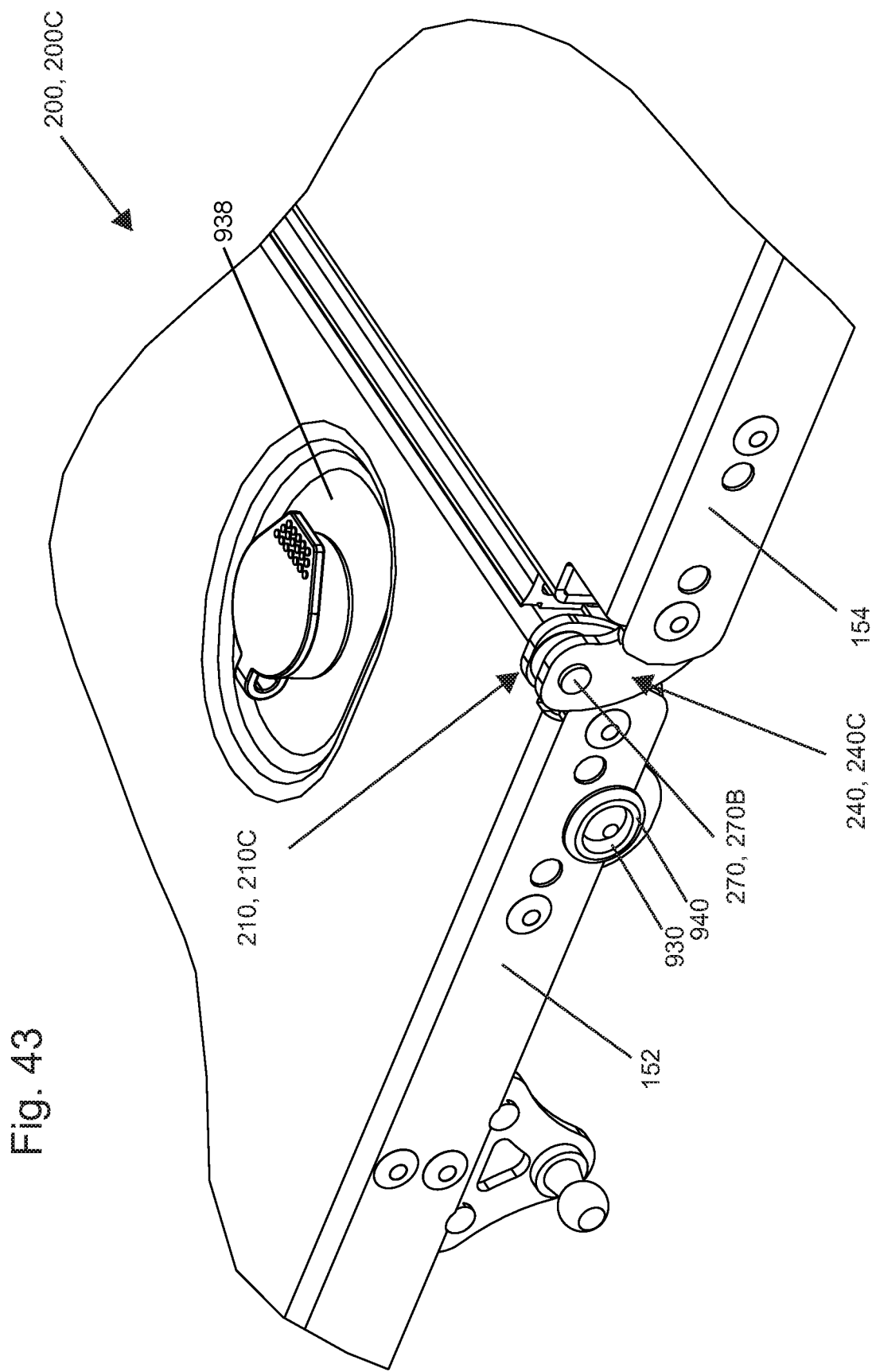
FIG. 43 is a partial left-rear perspective view of the panel assembly of FIG. 8 illustrating a third joint type that is similar to the second joint type of FIG. 31.
Figure 44:
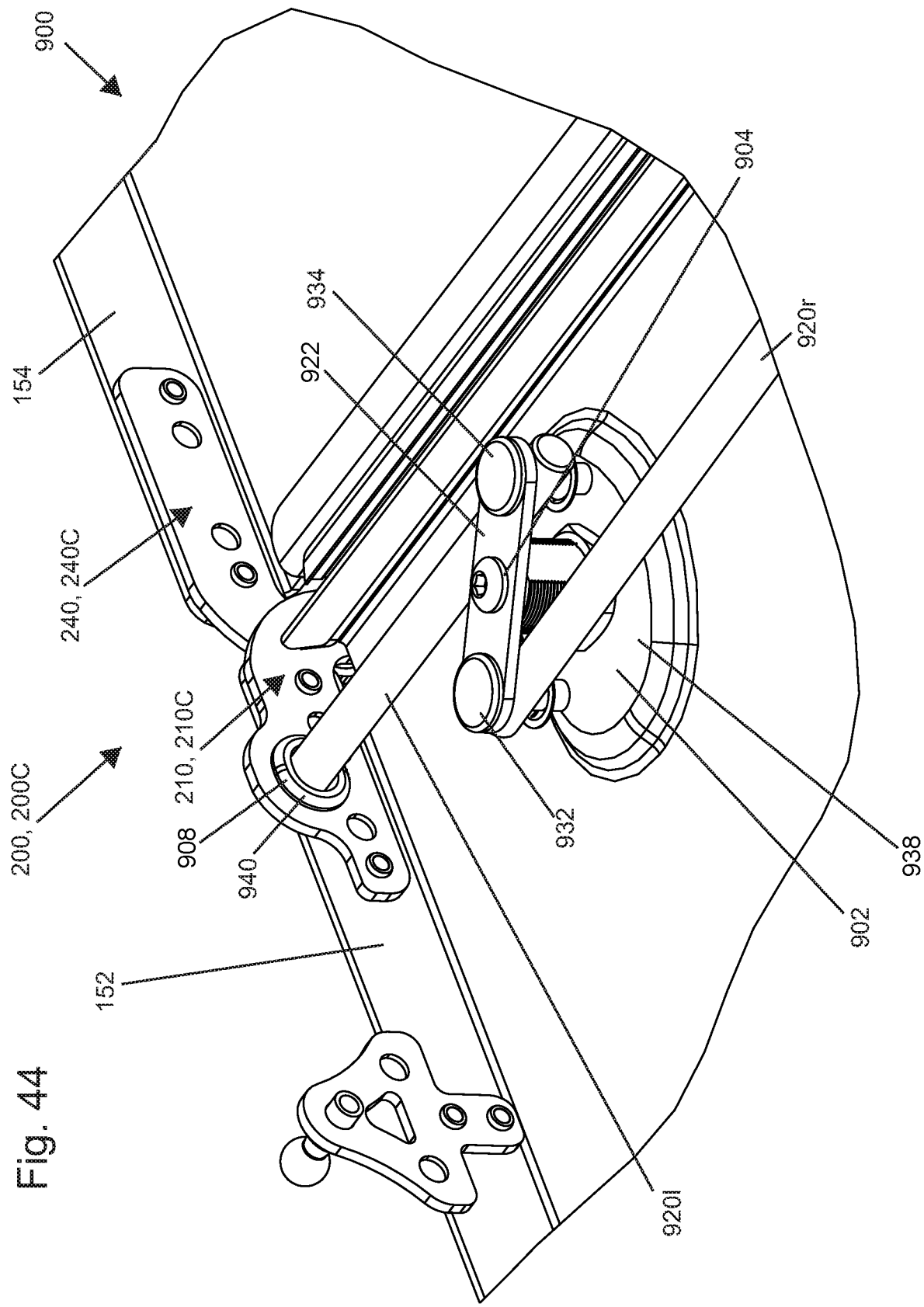
FIG. 44 is a partial right-front perspective view of the underside of the panel assembly of FIG. 8 further illustrating the third joint type of FIG. 43.

Turning now to FIGS. 43-49, a joint 200C, according to the principles of the present disclosure, is illustrated. The joint 200C is an embodiment of the pivoting joint 200. The joint 200C may be a third joint type of the panel assembly 101. As illustrated at FIGS. 13 and 43, the joint 200C is used to pivotally connect the panel 152 with the panel 154. As illustrated at FIG. 46, the joint 200C includes a first member 210C that is connected to a first panel 152 by a connecting arrangement 360, 360$_1$. As the first member 210C is connected to the first panel 152, they are one kinematic body and move kinematically together. Likewise, the joint 200C includes a second member 240C that is attached to a second panel 154 by a connecting arrangement 360, 360$_2$. As the second member 240C is connected to the second panel 154, they are one kinematic body and move kinematically together. As depicted at FIG. 47, the joint 200C includes the shaft 270B (a shared part with the joint 200B) that extends between the first end 272B and the second end 274B. The joint 200C does not include any guide elements 330. The first member 210C of the joint 200C includes an opening 930 for a lock rod 920, 920*r*, 920*l*. The joint 200C may be similar to the joint 200B except for the addition of the opening 930 and the deletion of the guide element 330 and its mount. The joint 200C, as depicted, results in the axis A3 being positioned above the top surface 152*t* of the panel 152 and above the top surface 154*t* of the panel 154. The axis A3 is a pivot axis of the joint 200C.

Figure 45:
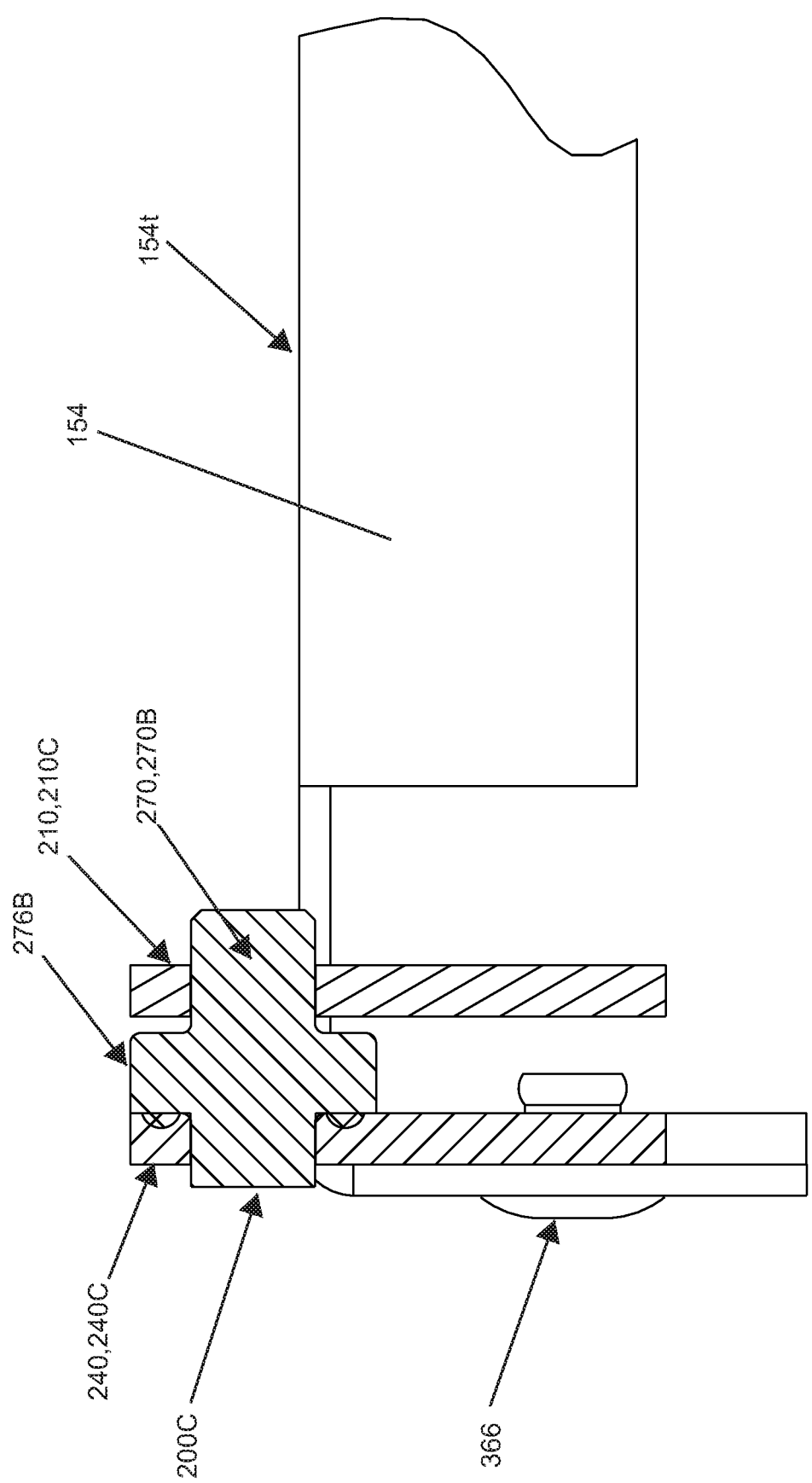
FIG. 45 is a cross-sectional elevation view of the third joint type of FIG. 43.

As mentioned above and as illustrated at FIG. 54, the panel 154 includes a notch 702, and the panel 152 includes a notch 704. The notch 704 is adapted to receive the first member 210C and allow the first member 210C to be mounted at the inside of the flange 714 of the panel 152. Likewise, the notch 702 allows the second member 240C to be mounted at the inside of the flange 712 of the panel 154. As illustrated at FIGS. 45 and 46, the notch 702 further allows assembly of the joint 200C in between the panel 154 and the panel 152. In the depicted embodiment, the shaft 270B is sub-assembled to the second member 240C and thereby forms a subassembly 235C, as illustrated at FIGS. 48 and 49. In embodiments without protrusions 362, the subassembly 235C may be assembled as a right-hand or a left-hand subassembly by reversing the direction that the shaft 270B is assembled, respectively. In embodiments with the protrusions 362, the second member 240C may be right-handed or left-handed (e.g., with the protrusions 362 positioned on opposite sides) and used in a corresponding right-hand or left-hand subassembly 235C. As illustrated at FIGS. 33, 38, and 39 (with the joint 200B), the subassembly 235C may be inserted into the notch 702 and thereby tilted into position. In particular, the fastening arrangement 360 and the insertion of the pivoting portion 278B of the shaft 270B into a pivot surface 212B of the first member 210C may require the subassembly 235C to be tilted into position in the depicted embodiment.

The joint 200 will now be described in detail. The joint 200 includes the first member 210 that moves with the first panel. The first member 210 includes the pivot surface 212 that forms part of the joint 200. In certain embodiments, the first member 210 may be a separate part from the first panel. In other embodiments, the first member 210 may be part of the first panel. The joint 200 also includes the second member 240 that moves with the second panel. In certain embodiments, the second member 240 may be a separate part from the second panel, and, in other embodiments, the second member 240 may be part of the second panel.

The joint 200 also includes the shaft 270 that extends along the axis A2, A3 and includes a spacer portion 276, 276A, 276B that is positioned between the first member 210 and the second member 240. The shaft 270 extends from a first end 272 to a second end 274 and further defines a pivoting portion 278, 278A, 278B that engages the pivot surface 212, 212A, 212B of the first member 210. The pivot surface 212 and the pivoting portion 278 provide for a pivoting action of the pivoting joint 200. In preferred embodiments, the shaft is monolithic (i.e., one piece).

The shaft 270 may be mounted to the second member 240 and thereby form a subassembly 235, 235A, 235B, 235C. The second member 240 may include a piloting portion 242, 242A, 242B (i.e., a hole), and the shaft 270 may include a pilot 280, 280A, 280B (i.e., an outer diameter) that is mounted within the piloting portion 242. The shaft 270 and the second member 240 may be welded together. The shaft 270 thereby includes a weld portion 282, 282A, 282B that is welded to a weld portion 244, 244A, 244B of the second member 240. Any conventional means may be used to weld the shaft 270 to the second member 240. In certain embodiments, the shaft 270 includes a weld portion that resembles stud welded weld portions that are known in the art for stud welding studs (i.e., a threaded member) to another member. Thus, a stud welding type process may be used to weld the shaft 270 to the second member 240. The axis A2, A3 of the shaft 270 may form a pivoting axis of the joint 200.

As mentioned above, the joint 200 may be found in three configurations of the joints 200A, 200B, and 200C on the retractable cover system 100. In the configuration of the joint 200A, the pivoting axis A2 is positioned below the top surfaces 154t, 156t of the first and the second panels when the retractable cover system 100 is in the extended configuration 102. In the configuration of the joints 200B and 200C, the pivoting axis A3 is positioned above the top surfaces 152t, 154t, 156t, 158t of the first and the second panels when the retractable cover system 100 is in the extended configuration 102. As shown at FIG. 13, the joints 200 with the configuration of the joint 200A alternate with the joints 200 with the configuration of the joints 200B and 200C. The joints 200 with the configuration of the joint 200A include the outer guide elements 330o, and the joints 200 with the configuration of the joint 200B include the inner guide elements 330i. Thus, the joints 200A stay on the rails 110r, 110l, and the joints 200B engage the ramp structures 400r, 400l when the retractable cover system 100 is moved between the extended configuration 102 and the stowed configuration 104.

At various positions of the joints 200, the first member 210 may be positioned generally behind the second member 240, and, in other positions, the second member 240 may be generally positioned behind the first member 210 when the retractable cover system 100 is in the extended configuration 102. In the depicted embodiment, the first member 210 is an inner member, and the second member 240 is an outer member.

The pivot axes A2, A3 of the retractable cover system 100 may include a pair of the joints 200 and thereby include a pair of the outer members 240 that are each attached to the same second panel. Likewise, the pivot axes A2, A3 may include a pair of the inner members 210 that are each attached to the same first panel of the retractable cover system 100. The inner members 210 of the pair of the pivoting joints 200 are positioned within the outer members 240 along the pivoting axis A2, A3. The inner members 210 are thereby trapped between the outer members 240, and the first panel is thereby trapped between the outer members 240. The pivoting portions 278 of the pair of the joints 200 may extend inwardly toward each other and extend inwardly through the pivoting surfaces 212. Clearance may exist between the pair of the inner members 210 and the pair of the outer members 240 that allows for manufacturing tolerances, smooth operation of the retractable cover system 100 (i.e., resistance to binding), etc. However, the clearance between the pair of the inner members 210 and the pair of the outer members 240 is not sufficient to allow the first panel and the second panel to detach from each other at the pivoting joint. The clearance between the pair of the inner members 210 and the pair of the outer members 240 may allow the first and the second panels to move along the pivoting axis A2, A3 relative to each other by a predetermined amount.

Figure 10:
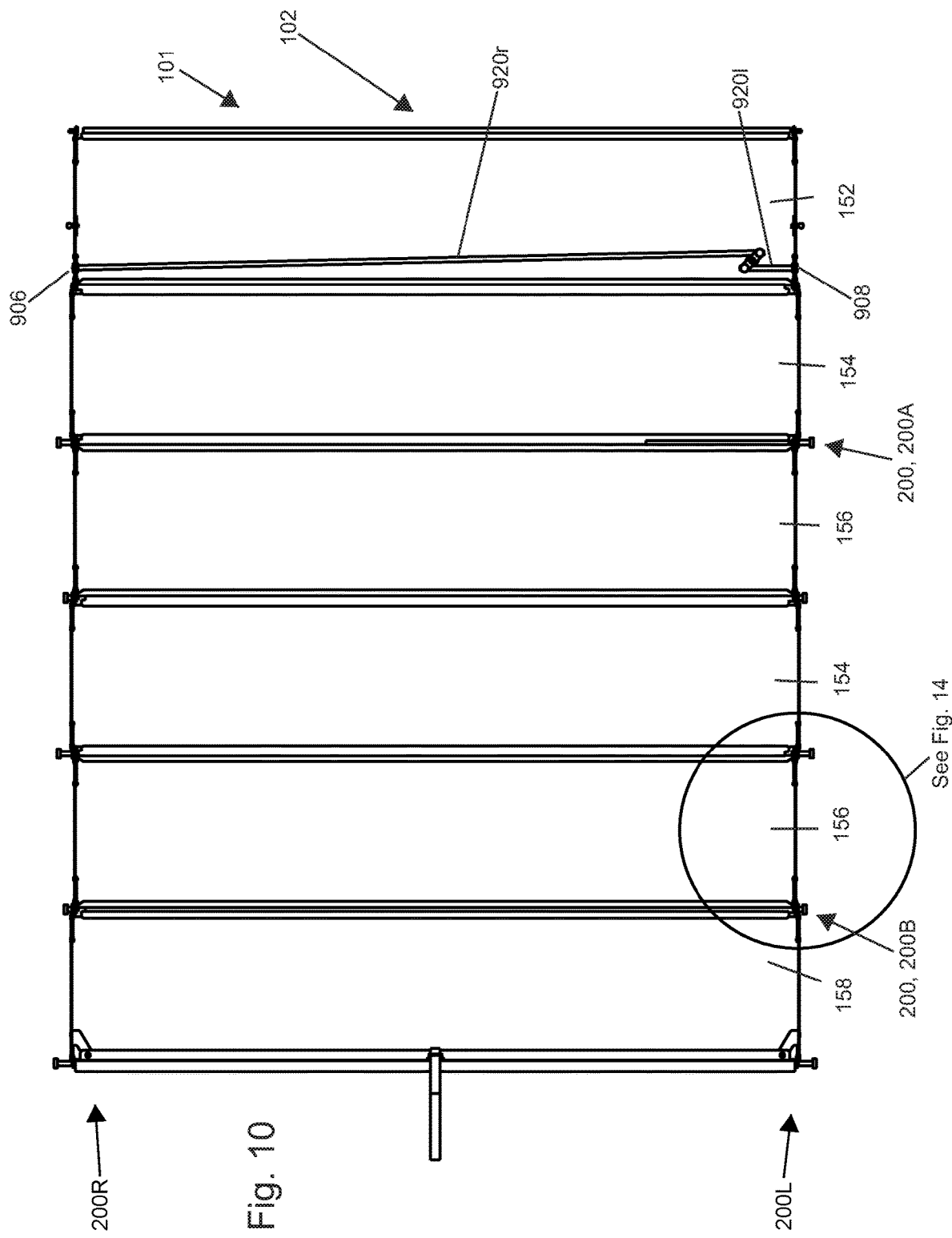
FIG. 10 is a bottom plan view of the panel assembly of FIG. 8 in the extended configuration.
Figure 11:
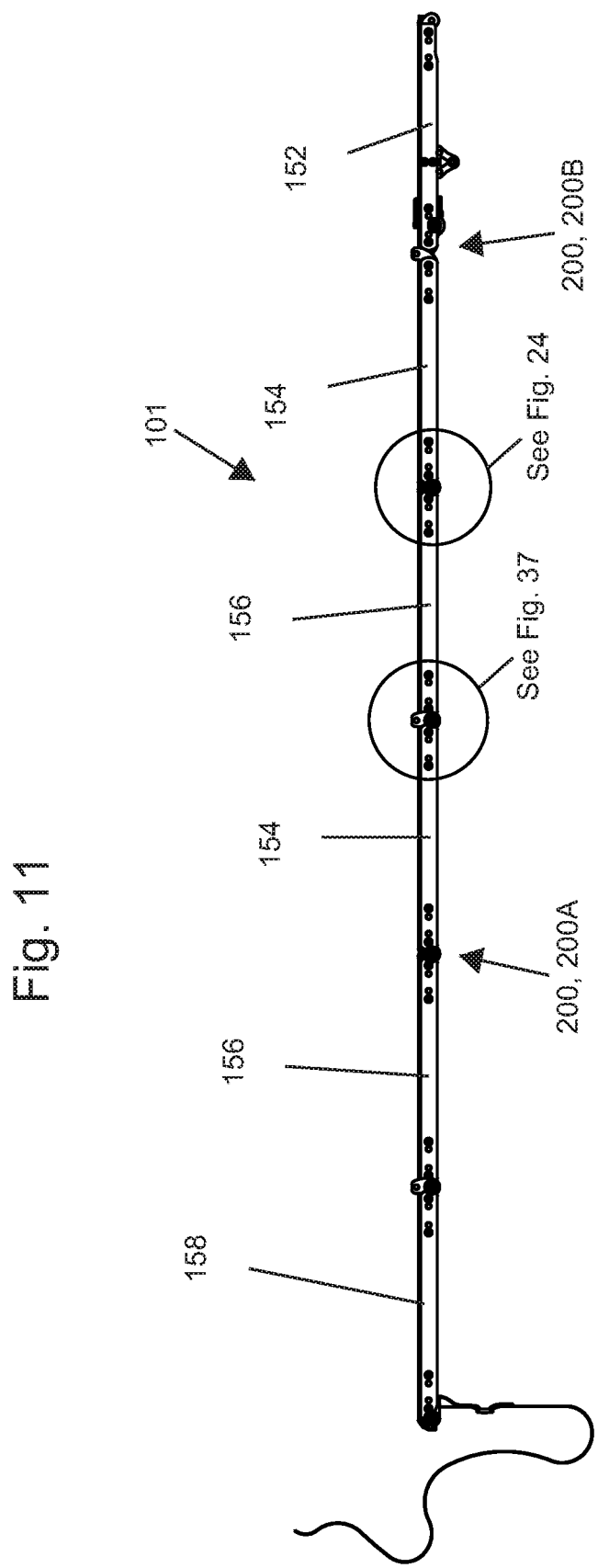
FIG. 11 is a right-side elevation view of the panel assembly of FIG. 8 in the extended configuration.
Figure 12:
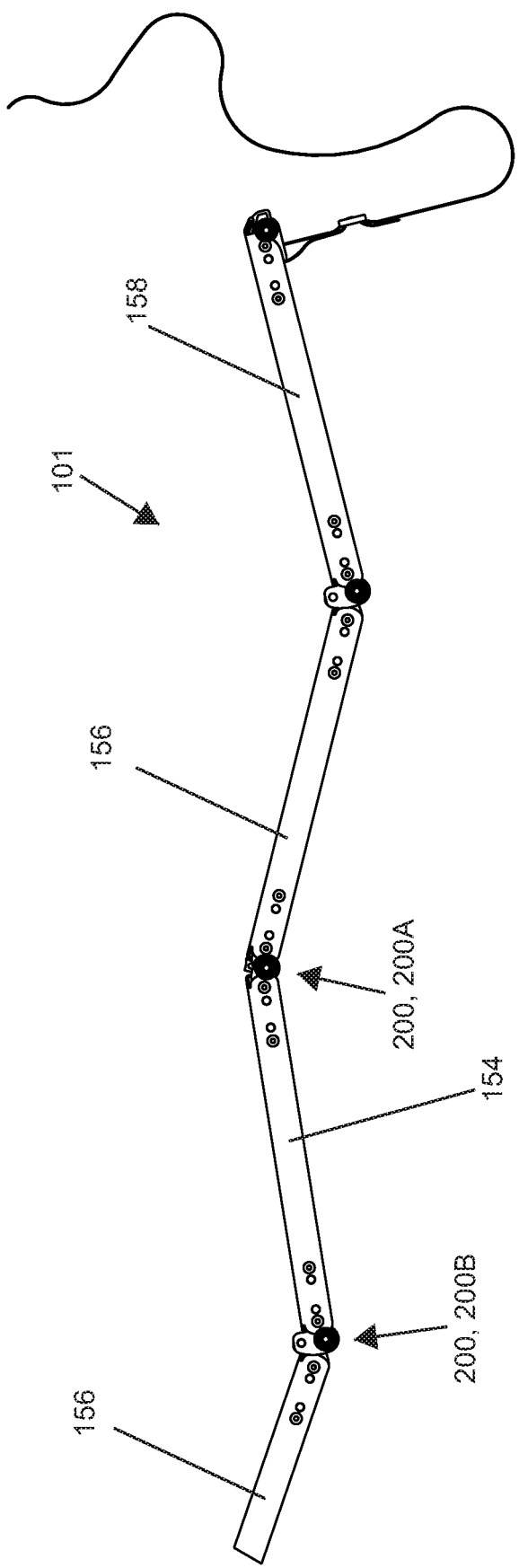
FIG. 12 is a partial left-side elevation view illustrating hinging movement between panels of the panel assembly of FIG. 8.

The pair of the joints 200 may include a right hand joint 200R and a left hand joint 200L (see FIG. 10). The right hand joint 200R and the left hand joint 200L may be mirror images of each other. The right hand joint 200R and the left hand joint 200L may substantially be mirror images of each other. The right hand joint 200R and the left hand joint 200L may include one or more features and/or components that are substantially mirror images of each other. In certain embodiments, some or all components of the joints 200R, 200L (e.g., the first member 210, the second member 240A, the shaft 270, the guide element 330, etc.) may be substantially identical from the right hand joint 200R and the left hand joint 200L. Achieving a right hand configuration for the right hand joint 200R and a left hand configuration for the left hand joint 200L may be accomplished when assembling the components (e.g., the first member 210, the second member 240A, the shaft 270, the guide element 330, etc.) together.

The retractable cover system 100 and various components (e.g., the panels 150, etc.) may be symmetrical about a vertical center-plane of the pickup truck 70. The retractable cover system 100 may be substantially symmetrical about the vertical center-plane of the pickup truck 70. The retractable cover system 100 may include one or more features and/or components that are substantially symmetrical about the vertical center-plane of the pickup truck 70. Certain components (e.g., a locking system 900, the panel 152, etc.) may be non-symmetrical or partially non-symmetrical about the vertical center-plane of the pickup truck 70 while the remaining components may be symmetrical about the vertical center-plane of the pickup truck 70.

The shaft 270A of the pivoting joint 200A may be used to mount the guide element 330 (i.e., the rolling element 330A). The guide element 330 may guide the axis A2 of the shaft 270A and thereby the plurality of the panels along the path 106A as the retractable cover system 100 is moved between the extended configuration 102 (i.e., a deployed configuration) and the stowed configuration 104 (i.e., a retracted configuration).

The guide elements 330 may be a separate piece that is mounted to the shaft 270A, 300. In preferred embodiments, the guide element 330 is a roller 330A and the shaft 270A, 300 includes a roller mount 284. The inner race 332 of the roller 330A may be pressed fit onto the roller mount 284. In order to avoid the expense of press fitting a hole of a close tolerance inner race to a close tolerance mounting surface, the inner race 332 of the roller 330A may be designed of a material that may yield upon press fitting the hole of the inner race 332 to the roller mount 284. In certain embodiments, the roller mount 284 may have a nominal diametral dimension Do of about one-quarter inch (see FIG. 30), and a diametral interference between the mounting surface 286 and the hole of the inner race 332 may be as large as 0.0065 inch. The 0.0065 inch diametral interference may represent a maximum material condition of the mounting surface 286 of the roller mount 284 and the hole of the inner race 332. The diametral interference between the mounting surface 286 and the hole of the inner race 332 may be as low as 0.0005 inch and yet maintain a sufficient press fit to keep the roller 330A mounted on the shaft 270A, 300 without additional fasteners, fastening elements, bonding agents, etc. In certain embodiments, a tolerance of an inside diameter of the hole of the inner race 332 may be a diameter Di that is sized between 0.2465 inch and 0.2495 inch. In certain embodiments, the tolerance of the hole of the inner race 332 of the roller 330A may be the diameter Di that is sized between 0.24975 inch and 0.25 inch. A tolerance of the mounting surface 286 of the shaft 270A, 300 may be the outside diameter Do that is sized between 0.250 inch to 0.253 inch. Pressing the inner race 332 onto the mounting surface 286 may not necessarily cause the inner race 332 to yield (e.g., in a minimum material condition of the inner race 332 and the roller mount 284).

According to the principles of the present disclosure, the guide element 330 is not limited to rollers 330A. For example, the guide element 330 may be a guide block 330B (see FIG. 15). The guide block 330B may not necessarily rotate as the guide block 330B travels along the path 106A, 106B.

The panels 152, 154, 156, and 158 will now be described in detail. As the panels 152, 154, 156, 158 have many features in common, a generic panel 150 will be described with such common features (see FIGS. 3 and 8). The top surfaces 152t, 154t, 156t, 158t are generically a top surface 150t of the panel 150 (see FIGS. 2, 3, 15, 19, 32, 45, 52, and 55-57). As the panels 152 and 156 have certain features in common as inside panels, a generic inside panel 150i will be described with such common features. As the panels 154 and 158 have certain features in common as outside panels, a generic outside panel 150o will be described with such common features.

The panel 150 is preferably made of sheet metal and cut from sheet metal stock into a pattern with sheet metal cutting tools. The pattern is then formed by bending with bending sheet metal tools. In other embodiments, the panel 150 may be formed by extruding. In still other embodiments, other fabrication methods may be used to form the panel 150 (e.g., molding, machining, welding, etc.). A combination of methods may be used to form the panel 150. The panel 150 is preferably made of aluminum sheet metal of a thickness Tp (see FIG. 108) and powder coated after forming. In certain embodiments, the thickness Tp may range from about 0.063 inch to about 0.08 inch. In certain embodiments, the thickness Tp is about 0.63 inch for the panels 152, 154, and 156. In certain embodiments, the thickness Tp is about 0.08 inch for the panel 158. In other embodiments, the panel 150 may be made from other materials including steel, fiberglass, plastic, other metals, etc. and/or at other thicknesses Tp.

Figure 8:
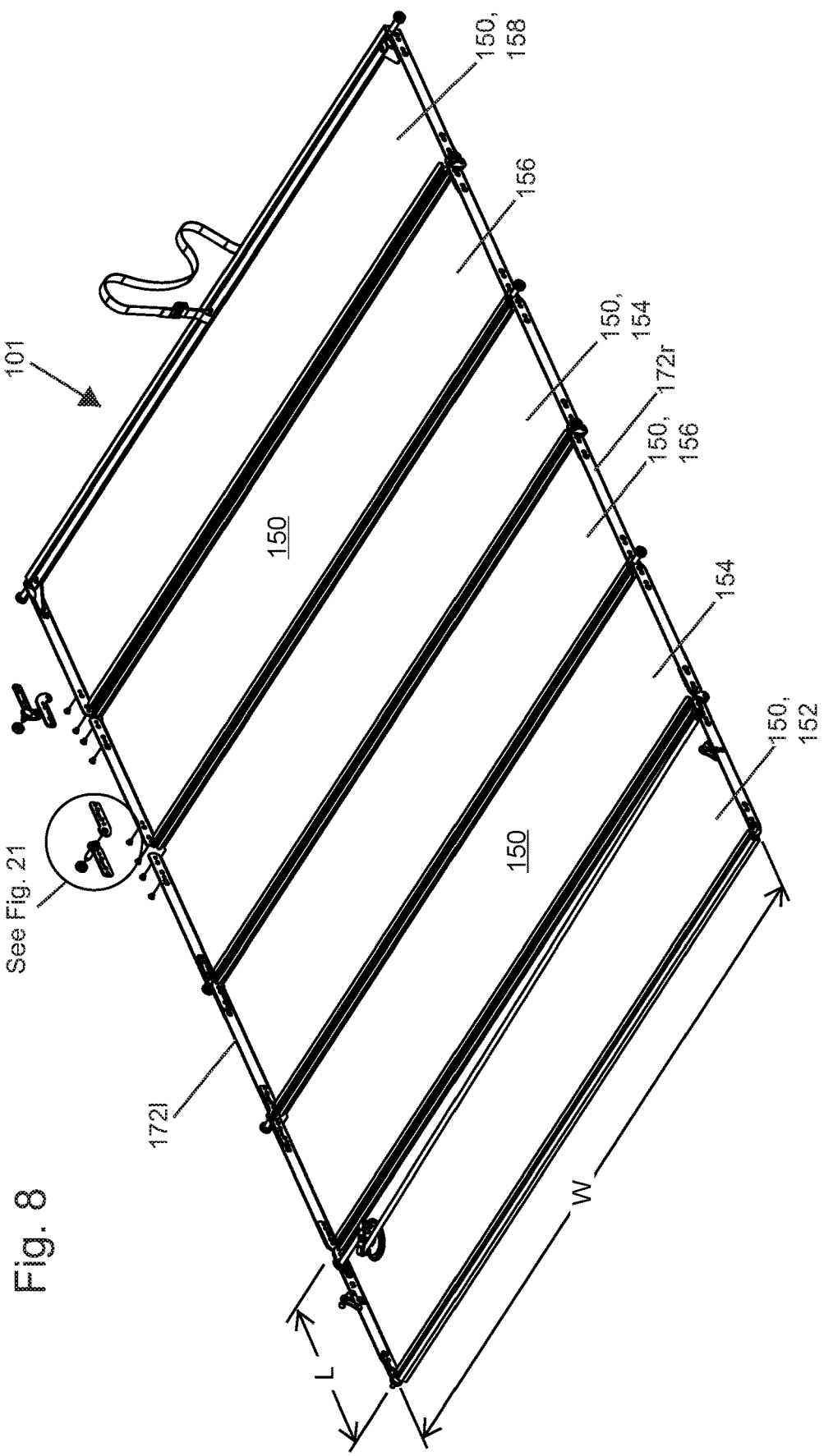
FIG. 8 is an exploded front-right perspective view of an underside of a panel assembly of the retractable cover system of FIG. 1 in the extended configuration.
Figure 9:
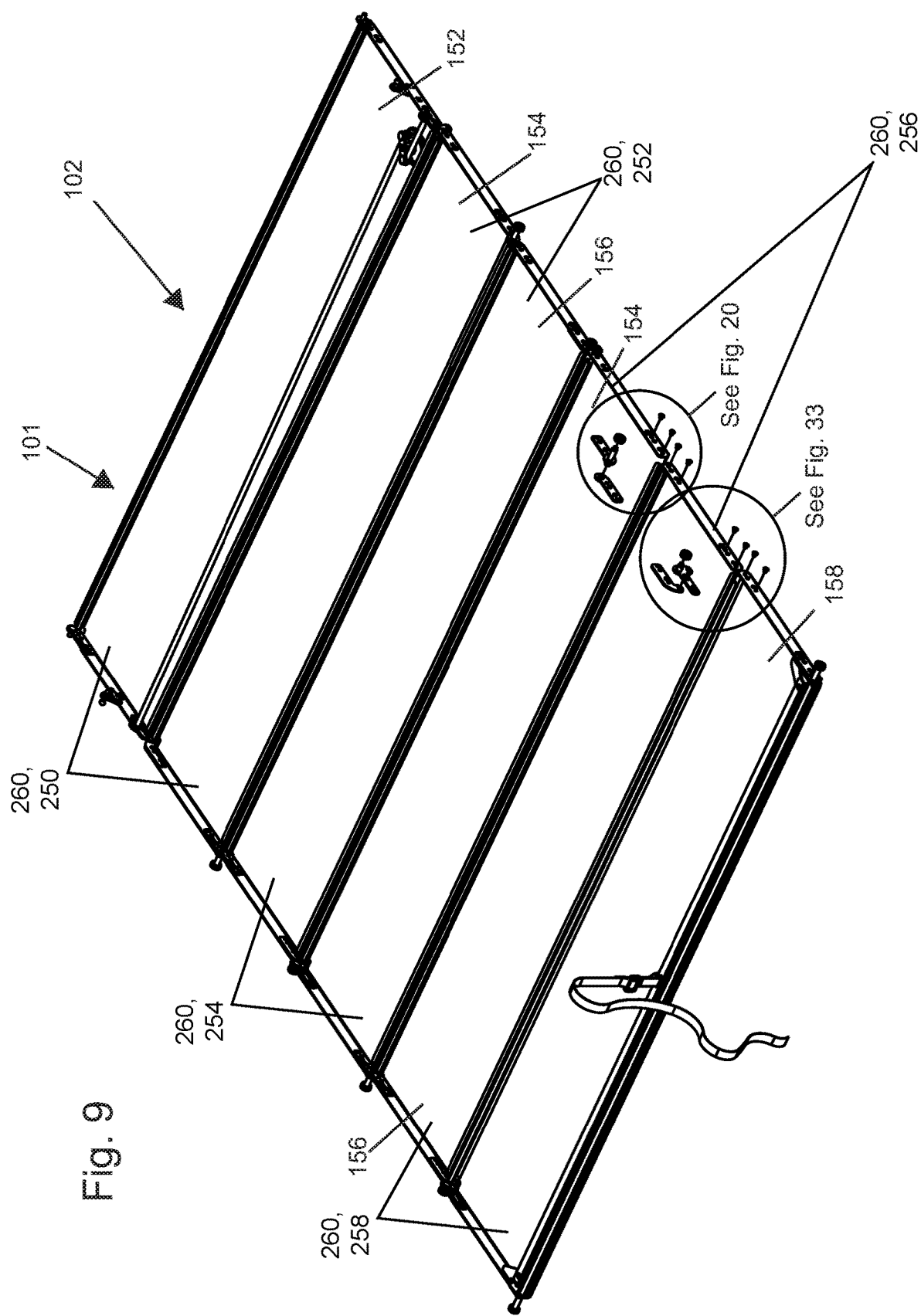
FIG. 9 is an exploded left-rear perspective view of the panel assembly of FIG. 8 in the extended configuration.
Figure 22:
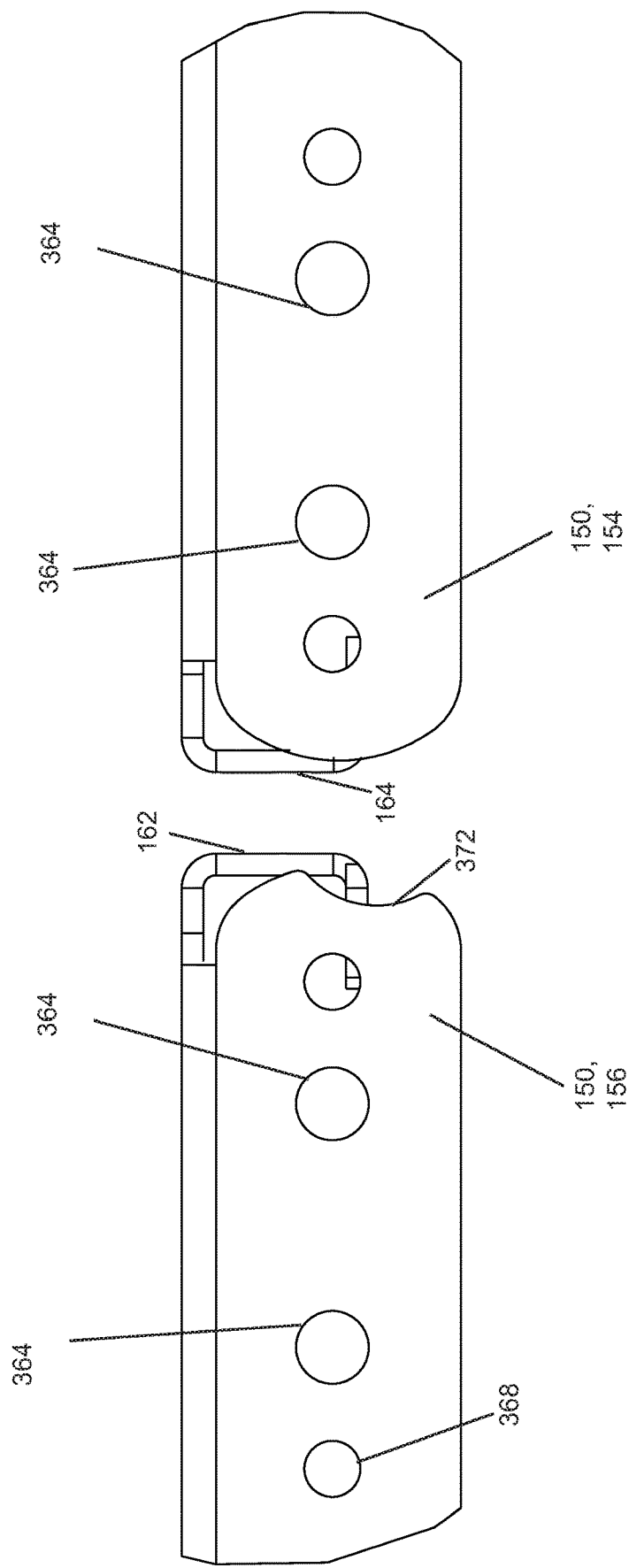
FIG. 22 is a partial side elevation view of a first panel and a second panel of the panels of FIG. 12 before they are connected by the first joint type of FIG. 18.
Figure 27:
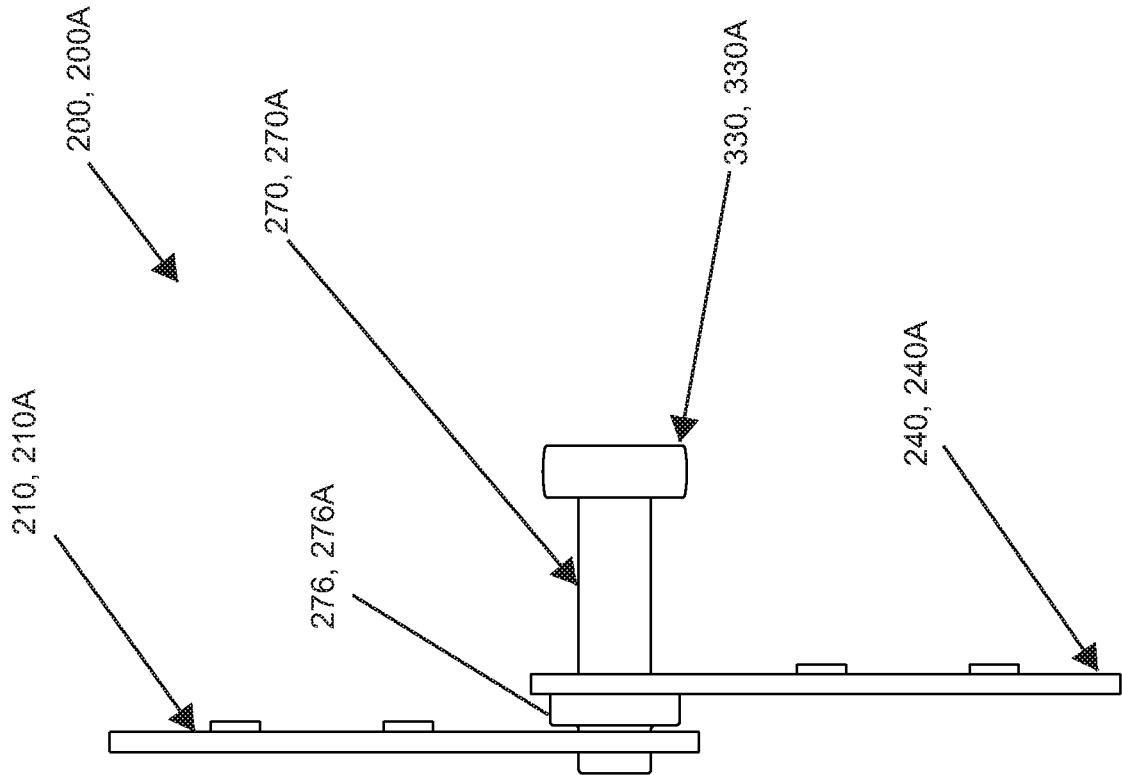
FIG. 27 is a plan view of the first joint type of FIG. 18.

As illustrated at FIGS. 8 and 22, the panel 150 extends a length L from a first end 162 (i.e., a front end) to a second end 164 (i.e., a rear end). In certain embodiments, the length L may range from about 6.985 inches to about 12.872 inches. In preferred embodiments, the lengths L of the panel assembly 101 are substantially the same across all of the panels 150 of the given panel assembly 101.

Figure 15:
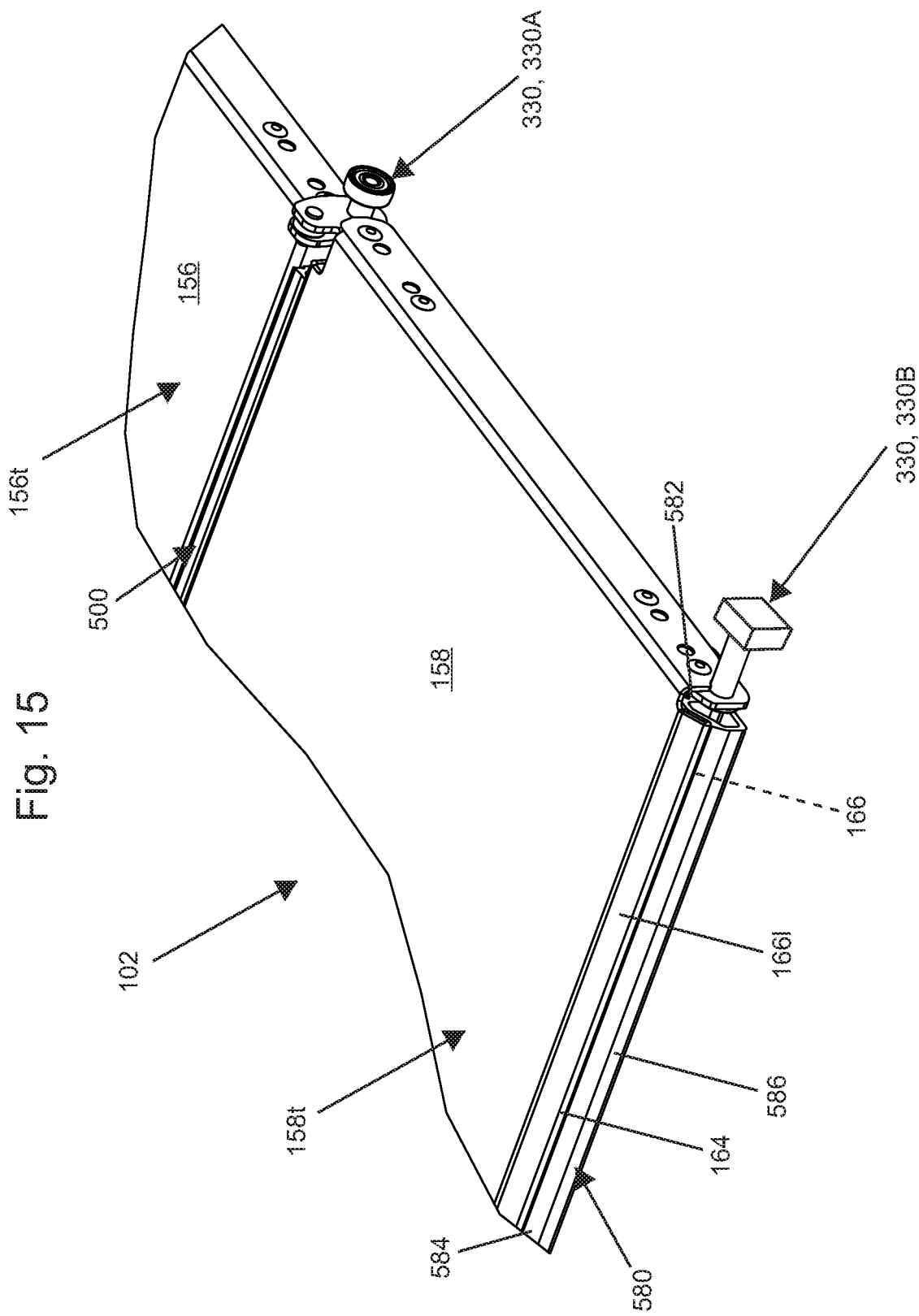
FIG. 15 is a partial right-rear perspective view of the panel assembly of FIG. 8 illustrating various guide elements.

As illustrated at FIGS. 57, 89, 99, 108, and 119, the ends 162, 164 may include a C-channel feature 166 that opens inwardly on the panel 150. The C-channel feature may extend a distance Lv from a top leg 166t to a bottom leg 166b along and connected by a vertical leg 166v (see FIG. 99). In certain embodiments, the length Lv may range from about 0.6875 inch to about 1 inch. In certain embodiments, the length Lv may range from about 0.6875 inch to about 1.112 inch. In certain embodiments, the length Lv is a length Lv1 of about 0.6875 inch for the panels 152, 154, and 156 (see FIG. 108). In certain embodiments, the length Lv is a length Lv2 of about 1 inch for the panel 158 (see FIG. 108). In certain embodiments, the length Lv2 is about 1 inch for a forward end of the panel 158, and the length Lv2 is about 1.112 inch for a rearward end of the panel 158. In preferred embodiments, the lengths Lv1 of the panel assembly 101 are substantially the same across all of the panels 152, 154, and 156 of the given panel assembly 101. In preferred embodiments, the lengths Lv2 of the panel assembly 101 are substantially the same at the front and the rear of the panel 158 of the given panel assembly 101. The C-channel feature 166 may substantially stiffen and strengthen the panel 150. The C-channel feature 166 may provide a mounting surface 168 for a seal 500 (see FIG. 55). The C-channel feature 166 may provide a sealing surface 170 for the seal 500 (see FIGS. 55 and 57). The C-channel feature 166 may include one or more bend radius R. As illustrated at FIG. 15, the second end 164 of the panel 158 may further include a protective lip structure 166l in addition to the C-channel feature 166. In other embodiments, other suitable structures may be substituted for the C-channel feature 166.

As illustrated at FIG. 8, the panel 150 extends a width W from a right side 172r (i.e., a first side) to a left side 172l (i.e., a second side). In certain embodiments, the width W may range from about 41.445 inches to about 58.263 inches. In certain embodiments, a width of the panel assembly 101 is substantially defined by the width W of the outside panels 150o, and the width W of the inside panels 150i is narrower than the width W of the outside panels 150o (see FIG. 3).

As illustrated at FIG. 31, the sides 172r, 172l may include an L-feature 174 with a leg 176 that extends downwardly on the panel 150. The L-feature 174 may substantially stiffen and strengthen the panel 150. In other embodiments, other suitable structures may be substituted for the L-feature 174. The flange 712, 714 may be included on the L-feature 174, and the L-feature 174 may thereby provide a mounting surface 178 for the first member 210 on the inside panels 150i and for the second member 240 on the outside panels 150o (see FIG. 18). The L-feature 174 may include one or more of the bend radius R (see FIG. 19).

Figure 14:
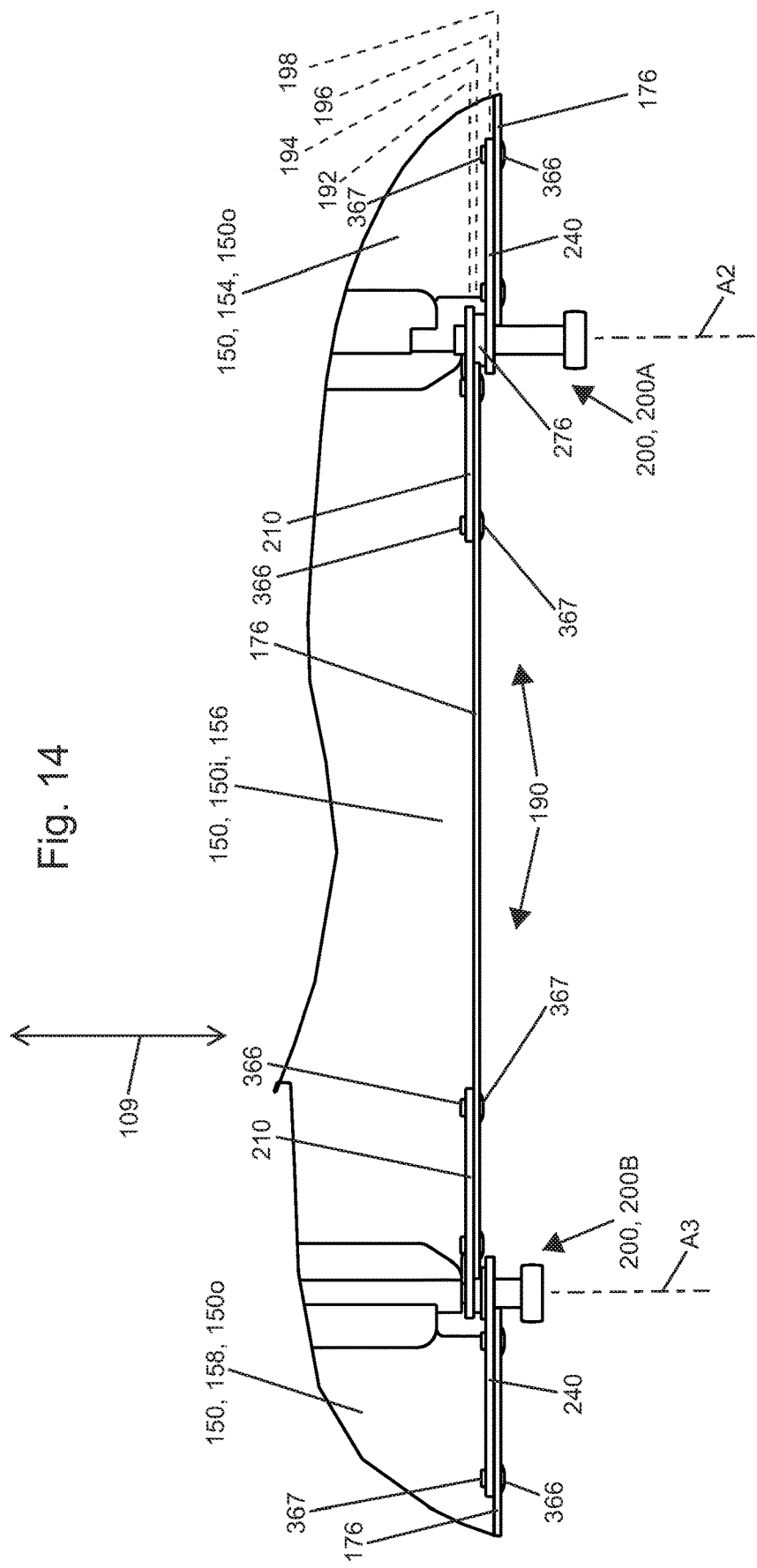
FIG. 14 is an enlarged portion of FIG. 10.
Figure 57:
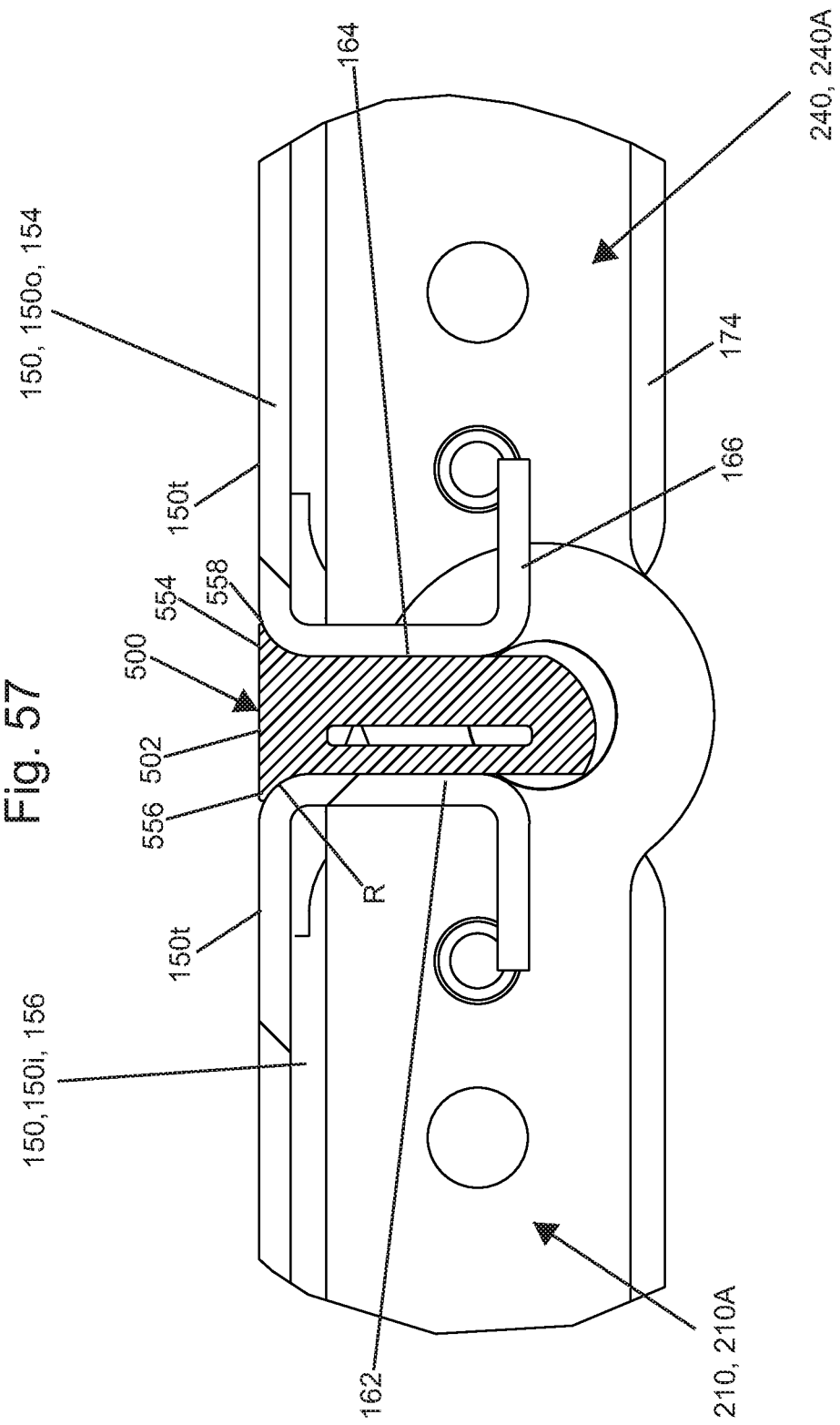
FIG. 57 is a partial cross-sectional side right elevation view illustrating the seal of FIG. 23 positioned between the first and the second panels of FIG. 22 with the panels in the extended configuration, the seal being compressed by the first and the second panels and the seal including a top surface that is substantially co-planar with the top surfaces of the first and the second panels.

As illustrated at FIG. 57, the L-feature 174 may extend downwardly farther than the C-channel feature 166 on the panel 150. As illustrated at FIGS. 14 and 31, the legs 176 of two adjacent panels 150 (i.e., an inside panel 150i and an outside panel 150o) overlap each other when the retractable cover system 100 is in the stowed configuration 104 thereby allowing the longer legs 176.

As illustrated at FIG. 20, the legs 176 are adapted to attach to the fastening arrangement 360. In particular, a pair of holes 364 is adapted to receive a pair of the protrusions 362 (e.g. upset protrusions) of the first member 210 or the second member 240. As depicted, the holes 364 are round holes and the protrusions 362 are round protrusions. In other embodiments, the holes 364 and the protrusions 362 may be non-round (e.g., slot shaped, obround, etc.) and/or may be a single hole, as illustrated by a protrusion 624 and a slot 634 at FIG. 59. A pair of holes 368 may be further included on the legs 176 that is adapted to receive a pair of fasteners 366. In the depicted embodiment, the pair of fasteners 366 is a pair of rivets. In other embodiments, other fasteners may be used and/or one or more of the fastener 366 may be used. As depicted, the fastening arrangement 360 includes the pair of the holes 364 engaging the pair of the protrusions 362, the pair of the holes 368 aligning with a pair of holes 370 on the first member 210 or the second member 240, and the pair of the fasteners 366 inserted through and fastening the pairs of the holes 368, 370. Any shear loads between the first member 210 or the second member 240 and the respective panel 150 are substantially carried by the pair of the protrusions 362 engaging the pair of the holes 364. The pair of the fasteners 366 compresses the first member 210 or the second member 240 and the respective panel 150 together and thereby keeps the pair of the protrusions 362 engaged with the pair of the holes 368.

As depicted, boundaries of the panel 150 are defined by the C-channel feature 166 at the ends 162, 164, by the legs 176 at the sides 172r, 172l, by the top surface 150t, and by bottoms of the legs 176 at a bottom of the panel 150. No tabs or other protruding features extend beyond these boundaries in the depicted embodiment. This provides advantages when shipping, storing, and handling the panel 150 as protruding tabs or other protruding features are vulnerable to damage and increase a size of volume that is stored, packaged, shipped, etc.

A layered arrangement of the pivoting joint 200 with respect to the transverse direction 109 will now be described in detail. As illustrated at FIG. 14, the pivoting joint 200 may be arranged in an ordered sequence 190. The first member 210 is located at a first position 192, the leg 176 of the first panel 150i is located at a second position 194, the second member 240 is located at a third position 196, and the leg 176 of the second panel 150o is located at a fourth position 198. The fourth position 198 is positioned outward on the retractable cover system 100 from the first position 192. The pivot surface 212 of the first member 210 is thereby positioned inward on the retractable cover system 100 from the spacer portion 276 of the shaft 270. As further illustrated at FIGS. 22, 25, and 26, the spacer portion 276 of the shaft 270 may be positioned partially within a relief portion 372 of the first panel 156, 150i. The spacer portion 276 spaces the second member 240 from the first panel 150i and thereby allows the first panel 150i and the second panel 150o to pivot about the axis A2, A3 of the shaft 270 without the first member 210 and/or the first panel 150i contacting the second member 240 and/or the second panel 150o. In the depicted embodiment, a fastener flange 367 of the fastener 366 is arranged in the ordered sequence 190 between the second position 194 and the third position 196. The spacer portion 276 spaces the second member 240 from the first panel 150i and thereby allows the first panel 150i and the second panel 150o to pivot about the axis A2, A3 of the shaft 270 without interference from the fastener flange 367. The fastener flange 367 may be included on the fastener 366 that joins the first member 210 to the first panel 150i. The fastener flange 367 may be included on the fastener 366 that joins the second member 240 to the second panel 150o. The first panel 150i may include the first notch 704 (see FIG. 53) to receive the first member 210 at the first position 192 and may further include the first leg 176 of the first panel 150i at the second position 194. The second panel 150o may include the second leg 176 at the fourth position 198 and may further include the second notch 702 (see FIG. 53) to receive the first member 210 at the first position 192, the spacer portion 276 of the shaft 270 at the second position 194, and the second member 240 at the third position 196. The second notch 702 may further receive a portion of the spacer portion 276 of the shaft 270 between the second position 194 and the third position 196. Rotating the sub-assembly 235 away from the second leg 176 of the second panel 150o may allow the protrusion 362 of the second member 240 to be inserted into the hole 364 of the second panel 150o. Rotating the sub-assembly 235 away from the second leg 176 of the second panel 150o may allow the pair of the protrusions 362 of the second member 240 to be inserted respectively into the pair of the holes 364 of the second panel 150o.

In certain embodiments, the pivoting joint 200 may not be disassembled after the connecting arrangements $360_1$ and $360_2$ have fastened the first member 210 and the second member 240 to the panels 150 without yielding at least one of the components (e.g., the panel 150, the first member 210, the second member 240, etc.). As mentioned above, the panels 150 are preferably made from aluminum and powder coated after forming. The remaining structural components (e.g., the first member 210, the second member 240, the rivets 366, etc.) are preferably made of steel with a corrosion resistant coating. The ordered sequence 190 structure of the pivoting joint 200 mirrored with an opposing ordered sequence 190 structure of the opposing pivoting joint 200 has been found to be robust and resistant to failure and unwanted disconnection.

Turning now to FIGS. 2, 15, 55-57, 61-63, and 70-80, a sealing system 490 for the retractable cover system 100 is illustrated according to the principles of the present disclosure. The sealing system 490 includes the seal 500 and at least one longitudinal seal 560. The seal 500 is adapted to seal the first panel 150i and the second panel 150o at the joints 200A, 200B, 200C and a joint between the panel 152 and the front cross-member 130 when the retractable cover system 100 is in the extended configuration 102. The first panel 150i, the second panel 150o, and the seal 500 substantially extend between the sides 86r and 86l of the pickup truck box 80. The seal 500 includes a top 502 (see FIGS. 56 and 57) that extends between the C-channel feature 166 of the first and the second panels 150i, 150o. The top 502 is substantially co-planar with the top surfaces 152t, 154t, 156t, 158t of the first and the second panels 150i, 150o when the retractable cover system 100 is in the extended configuration 102. The at least one longitudinal seal 560 extends along the fore-aft direction 108. The longitudinal seal 560 is in sealing contact with the top surfaces 152t, 154t, 156t, 158t of the panels 150 and the top 502 of the seal 500 when the retractable cover system 100 is in the extended configuration 102. The sealing system 490 may further include a seal 580 for sealing the retractable cover system 100 to the end gate 98 of the pickup truck box 80 (see FIGS. 2 and 15). The seal 580 substantially extends between the sides 86r and 86l of the pickup truck box 80. The seal 580 includes a first side 582 that is attached to the end panel 158 of the retractable cover system 100, a top side 584 that is adjacent the guard lip 166l of the end panel 158, and a second side 586 that is adapted for sealing contact with the end gate 98 when the retractable cover system 100 is in the extended configuration 102 and the end gate 98 is in the closed position.

As the sealing system 490 includes the longitudinal seal 560 being in sealing contact with the top 502 of the seal 500 when the retractable cover system 100 is in the extended configuration 102, the top 502 of the seal 500 should be sufficiently flat and co-planar with the top surfaces 152t, 154t, 156t, 158t of the first and the second panels 150i, 150o when the retractable cover system 100 is in the extended configuration 102. Therefore, the seal 500 is specially designed to achieve a sufficient degree of flatness and co-planarness, as will be described in detail below. To achieve the flatness of the top surfaces 152t, 154t, 156t, 158t of the panels 150 and the top 502 of the seal 500 when the retractable cover system 100 is in the extended configuration 102, the bend radius R of the C-channel feature 166 is preferably covered by a radius covering portion 554, 556 of the seal 500 (see FIG. 57). A certain deviation 558 from the flatness and the co-planarness may be accommodated by the longitudinal seal 560. The seal 500 may achieve the sufficient degree of the flatness and the co-planarness even though the panels 150 rotate with respect to each other about the axes A2, A3 which are close to the seal. In the depicted embodiment, the axis A2 is positioned within about 0.72 inch below the top 502 of the seal 500 and the top surfaces 150t of the panels 150 when the retractable cover system 100 is in the extended configuration 102. In the depicted embodiment, the axis A3 is positioned within about 0.094 inch above the top 502 of the seal 500 and the top surfaces 150t of the panels 150 when the retractable cover system 100 is in the extended configuration 102.

In other embodiments, the axis A2 may be positioned within about 1.25 inch below the top 502 of the seal 500 and the top surfaces 150t of the panels 150 when the retractable cover system 100 is in the extended configuration 102. In other embodiments, the axis A3 is positioned within about 0.2 inch above the top 502 of the seal 500 and the top surfaces 150*t* of the panels 150 when the retractable cover system 100 is in the extended configuration 102.

According to the principles of the present disclosure, the positions of the axes A2 and A3 may be standardized throughout the panel assembly 101. Thus, in preferred embodiments, all of the axes A2 are positioned below the top 502 of the seal 500 and/or the top surfaces 150*t* of the panels 150 by substantially a same distance when the retractable cover system 100 is in the extended configuration 102. Thus, in preferred embodiments, all of the axes A3 are positioned above the top 502 of the seal 500 and/or the top surfaces 150*t* of the panels 150 by substantially a same distance when the retractable cover system 100 is in the extended configuration 102. Thus, in preferred embodiments, all of the axes A2 are positioned at a same elevation when the retractable cover system 100 is in the extended configuration 102. Thus, in preferred embodiments, all of the axes A3 are positioned at a same elevation when the retractable cover system 100 is in the extended configuration 102.

As depicted, the seal 500 includes a first side 518 that is attached to the C-channel feature 166 of the first panel 150*i*, a second side 508 that is in sealing contact with the C-channel feature 166 of the second panel 150*o* when the retractable cover system 100 is in the extended configuration 102, and the top 502. The top 502 extends between the first side 518 and the second side 508 and is substantially co-planar with the top surfaces 150*t* of the first panel 150*i* and the second panel 150*o* when the retractable cover system 100 is in the extended configuration 102. The second side 508 pivots away from the second panel 150*o* about the pivot axis A2, A3 when the retractable cover system 100 is moved from the extended configuration 102 toward the stowed configuration 104. The second side 508 pivots toward the second panel 150*o* about the pivot axis A2, A3 when the retractable cover system 100 is moved from the stowed configuration 104 toward the extended configuration 102. As depicted, the seal 500 is a bulb seal and includes a hollow interior 524. As depicted, the seal 500 is a compression seal.

In certain embodiments, the top 502 of the seal 500 is co-planar with the top surfaces 150*t* of the first and the second panels 150*i*, 150*o* within 0.025 inch when the retractable cover system 100 is in the extended configuration 102. In other embodiments, the top 502 of the seal 500 is co-planar with the top surfaces 150*t* of the first and the second panels 150*i*, 150*o* within 0.04 inch when the retractable cover system 100 is in the extended configuration 102. In certain preferred embodiments, cross-sectional voids (e.g., the deviations 558) that may result from non-perfect co-planarness are within about 0.0008 square inch. In certain embodiments, cross-sectional voids that may result from non-perfect co-planarness are within about 0.0035 square inch.

Figure 56:
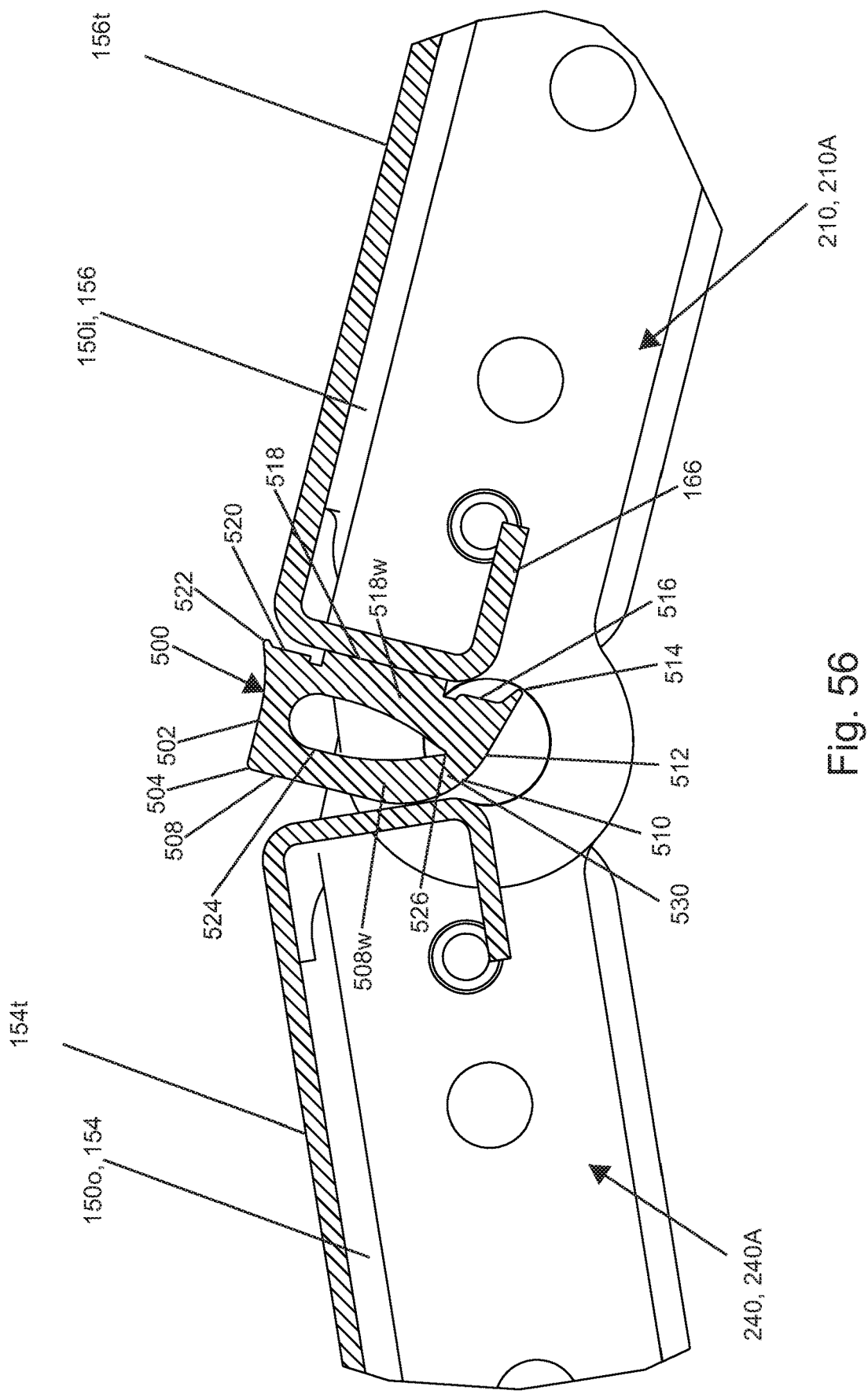
FIG. 56 is a partial cross-sectional left side elevation view illustrating the seal of FIG. 23 positioned between the first and the second panels of FIG. 22 with the first and the second panels joined by the first joint type of FIG. 18 thereby positioning a joint pivot axis below the top surfaces of the first and the second panels.

As illustrated at FIG. 56, the seal 500 includes a support structure 530 for supporting the second side 508 of the seal 500 when the second side 508 pivotally scrubs against the second panel 150*o*. The support structure 530 thereby holds the top 502 of the seal 500 substantially co-planar with the top surfaces 150*t* of the first and the second panels 150*i*, 150*o* when the retractable cover system 100 is in the extended configuration 102. The support structure 530 may include a thickening of a wall 518*w* of the first side 518 as the first side 518 extends toward a bottom 512 of the seal 500. The first side 518 and the second side 508 may be connected via the bottom 512. The support structure 530 may include a thickening of a wall 508*w* of the second side 508 as the second side 508 extends toward the bottom of the seal 500. The bottom 512 of the seal 500 may extend between the first side 518 and the second side 508. A curved portion 510 may transition the bottom 512 and the second side 508 of the seal 500.

The curved portion 510 may be adapted to interface with the second panel 150*o* when the second side 508 pivotally scrubs against the second panel 150*o* thereby positioning the top 502 of the seal 500 substantially co-planar with the top surfaces 150*t* of the first and the second panels 150*i*, 150*o* when the retractable cover system 100 is in the extended configuration 102.

Figure 70:
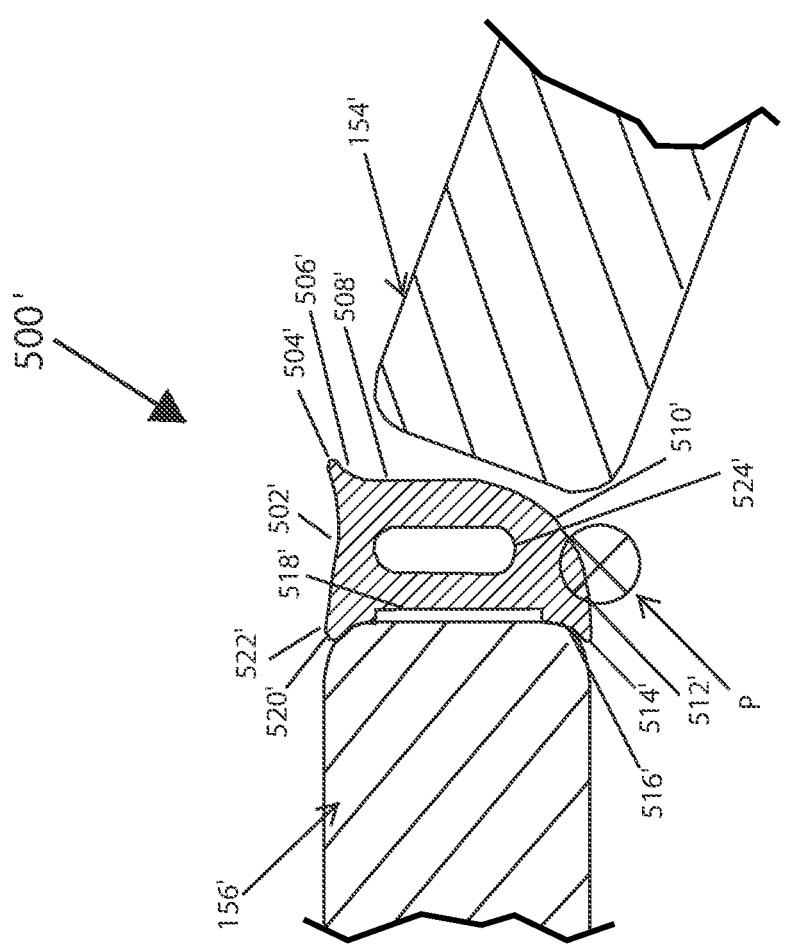
FIGS. 70-73 are a series of cross-sectional images of a seal deforming between two folding panels as the two folding panels fold into one another about a hinge-line positioned below top surfaces of the two folding panels, according to the principles of the present disclosure.
Figure 71:
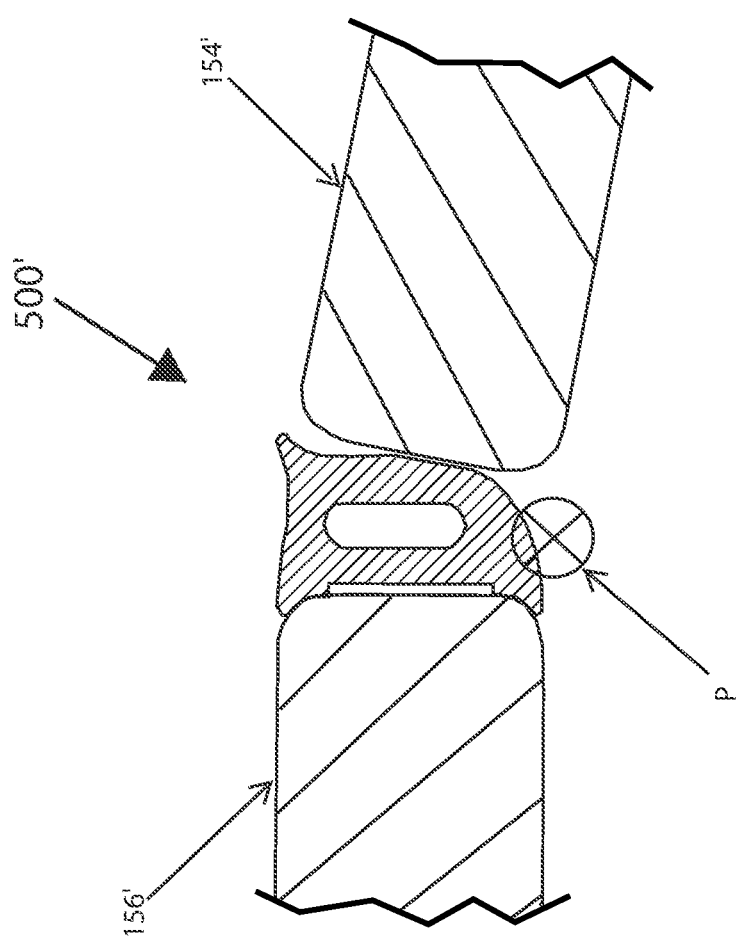
Figure 72:
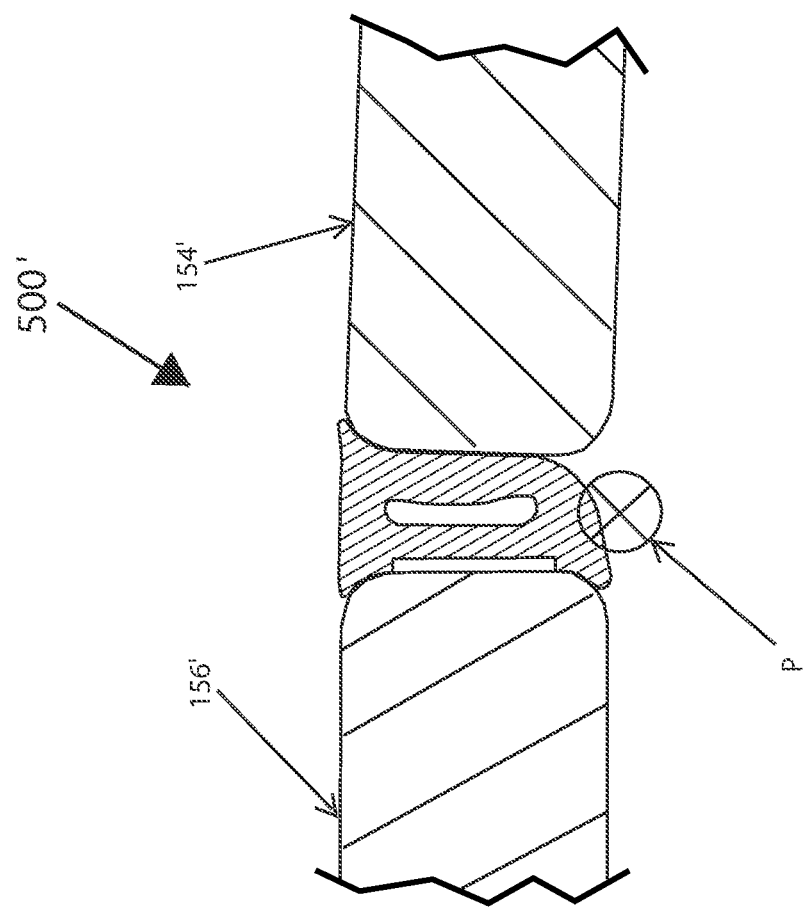
Figure 73:
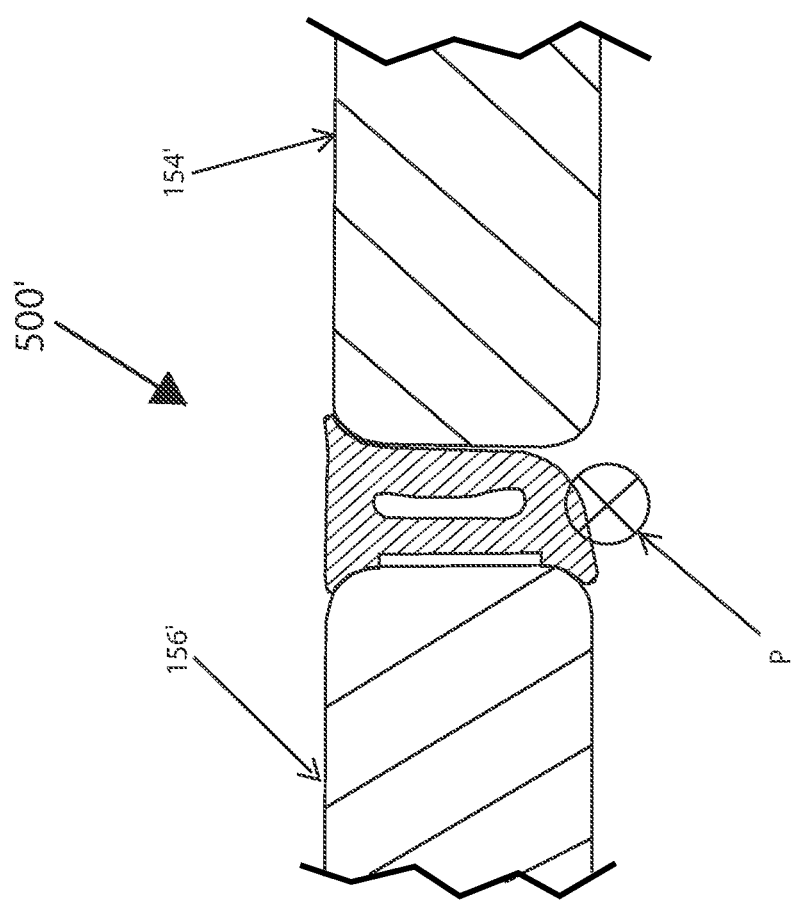
Figure 74:
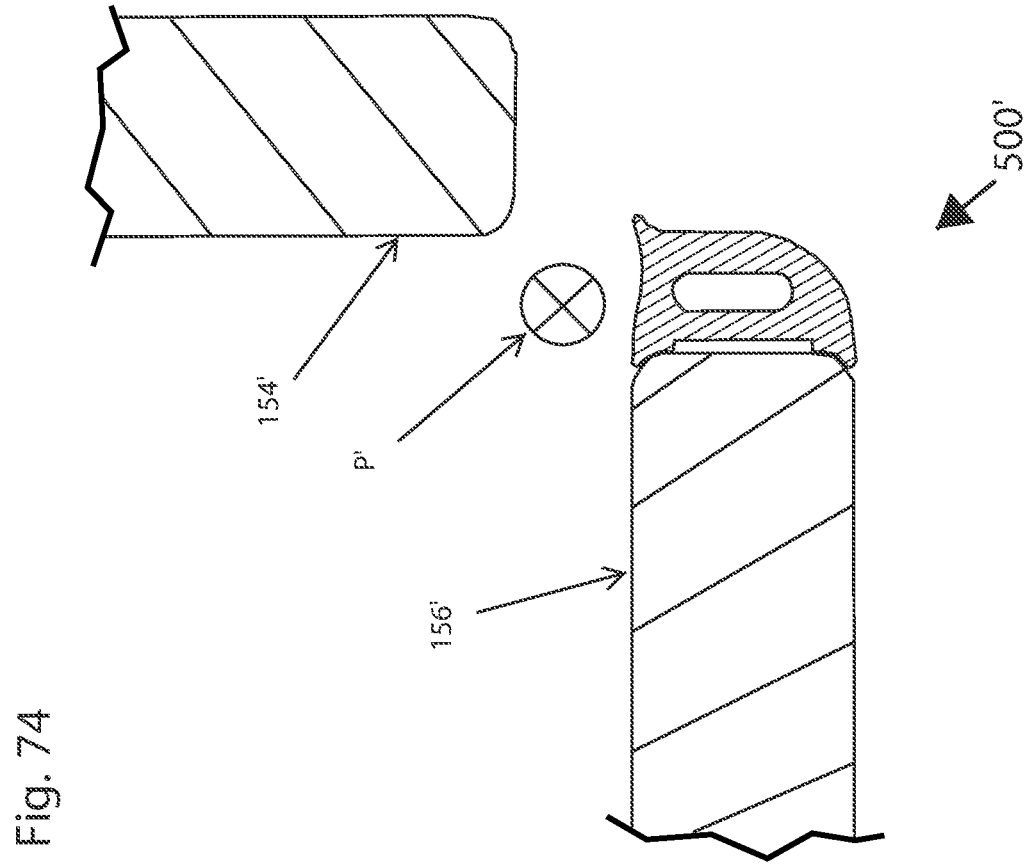
FIGS. 74-80 are a series of cross-sectional images of the seal of FIGS. 70-73 deforming between two folding panels as the two folding panels fold into one another about a hinge-line positioned above top surfaces of the two folding panels, according to the principles of the present disclosure.
Figure 75:
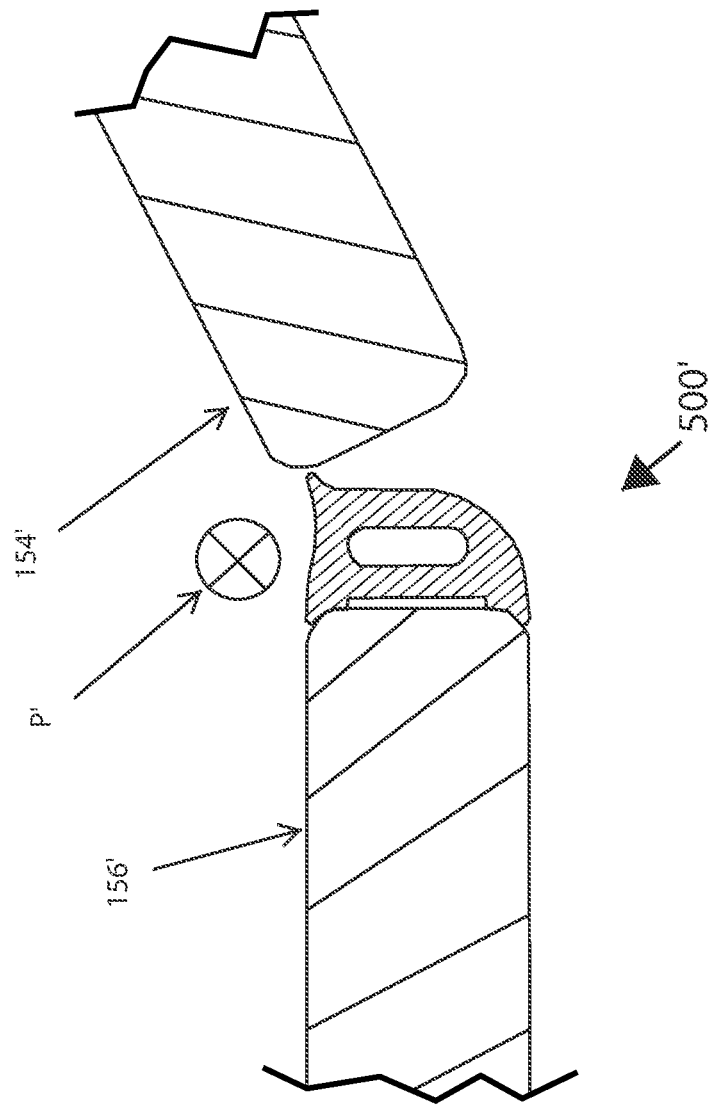
Figure 76:
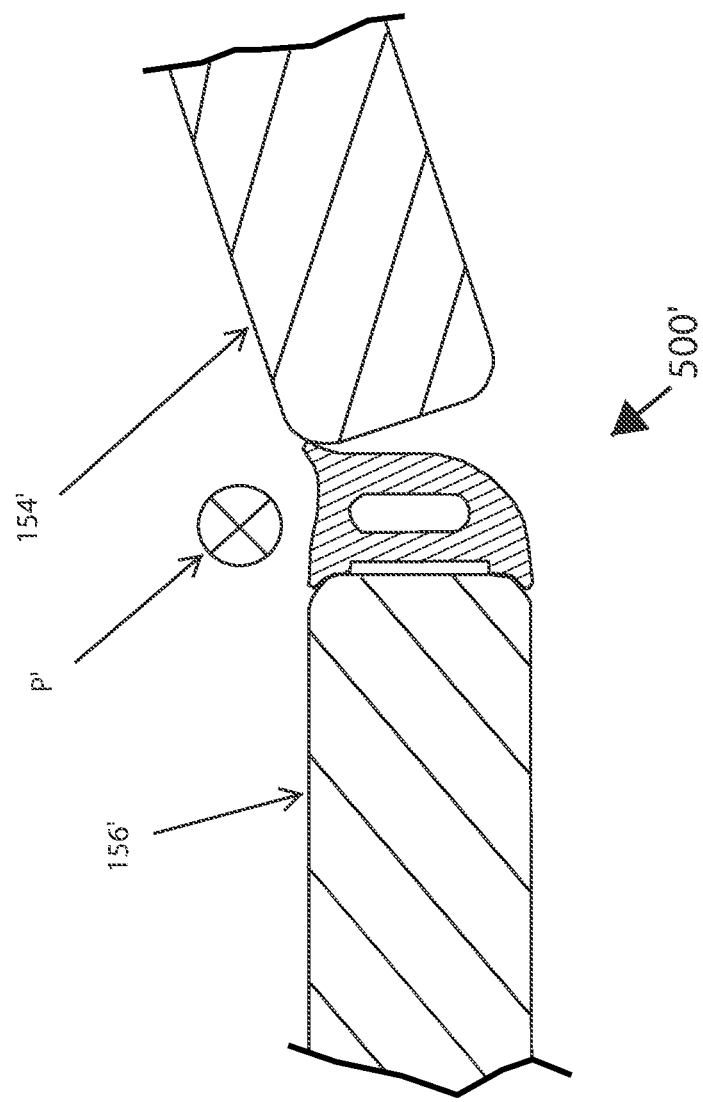
Figure 77:
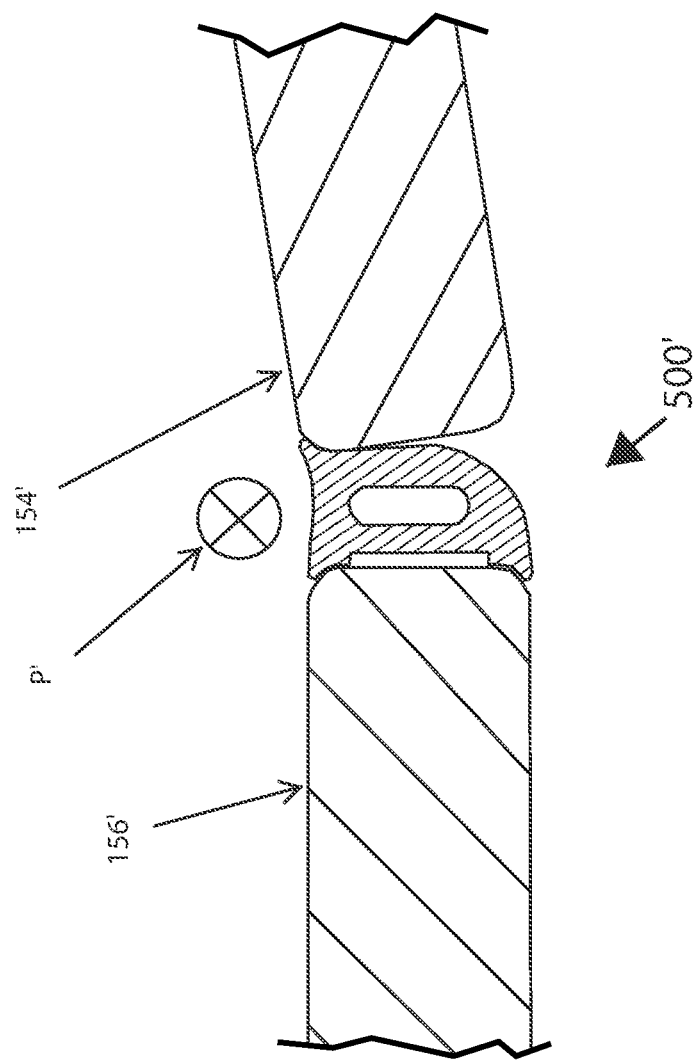
Figure 78:
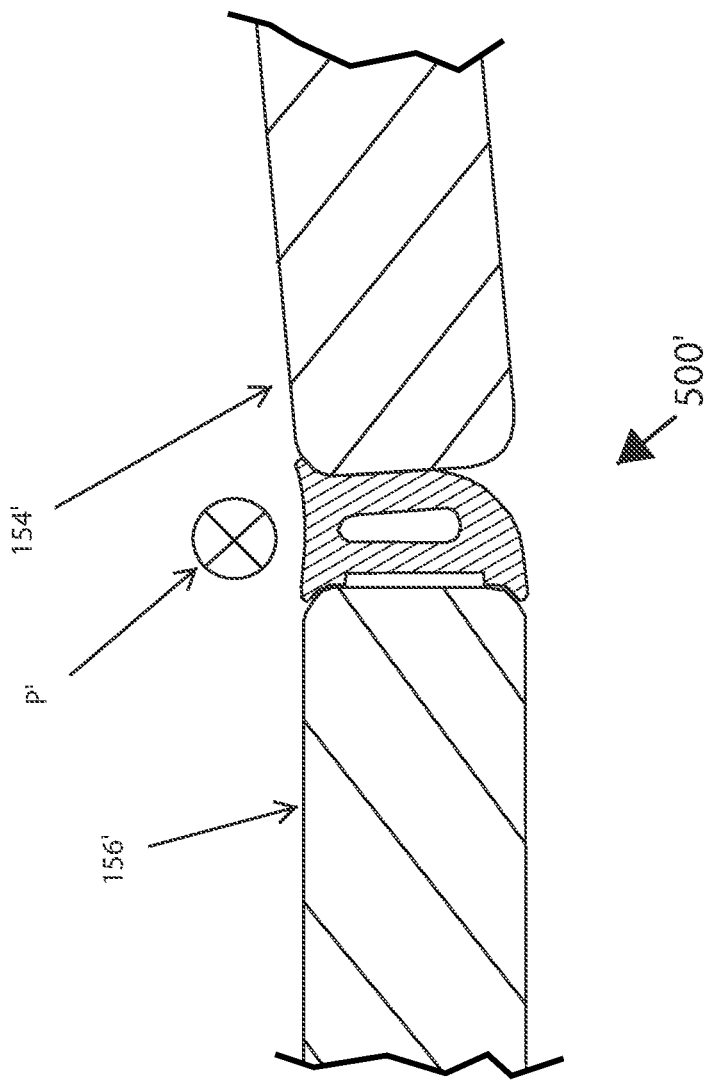
Figure 79:
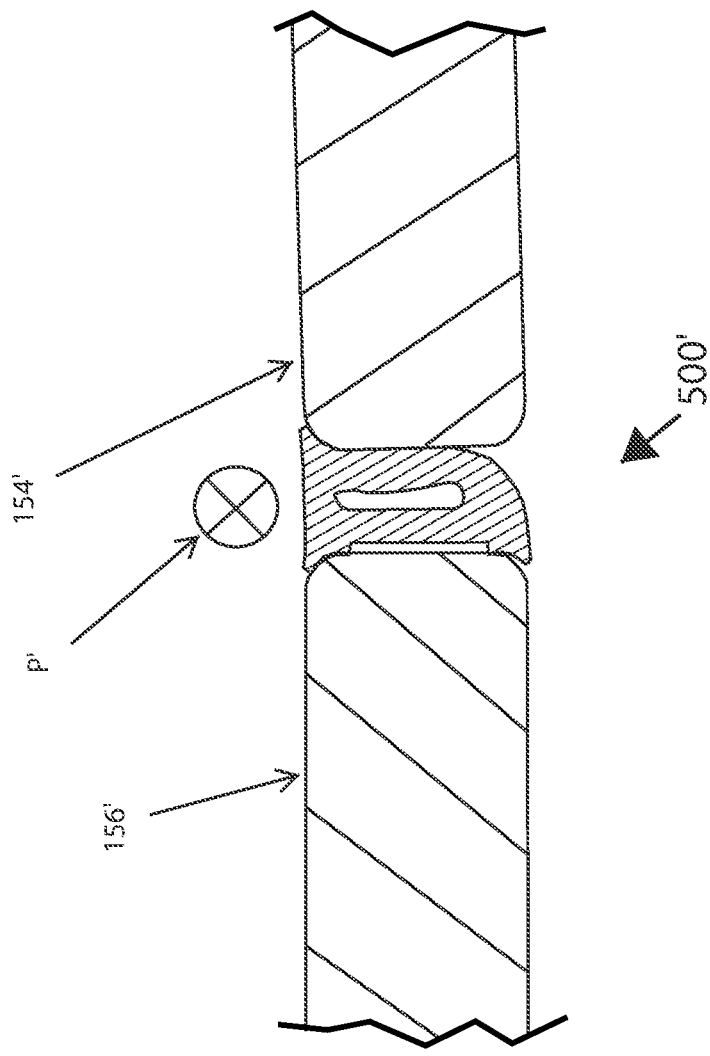
Figure 80:
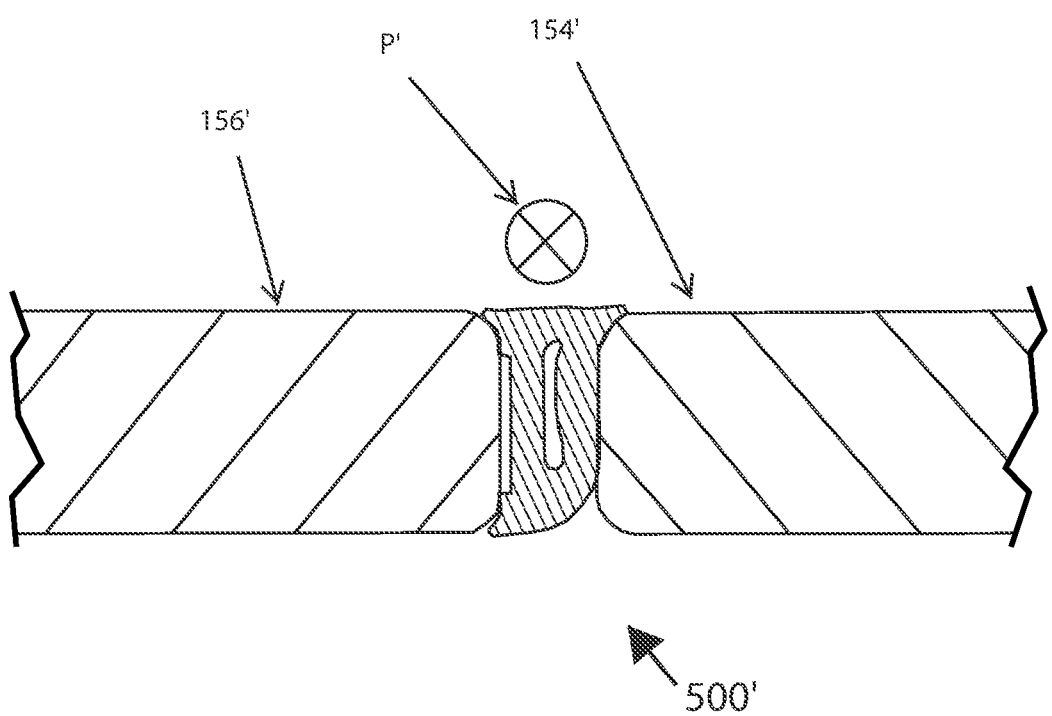
Figure 81:
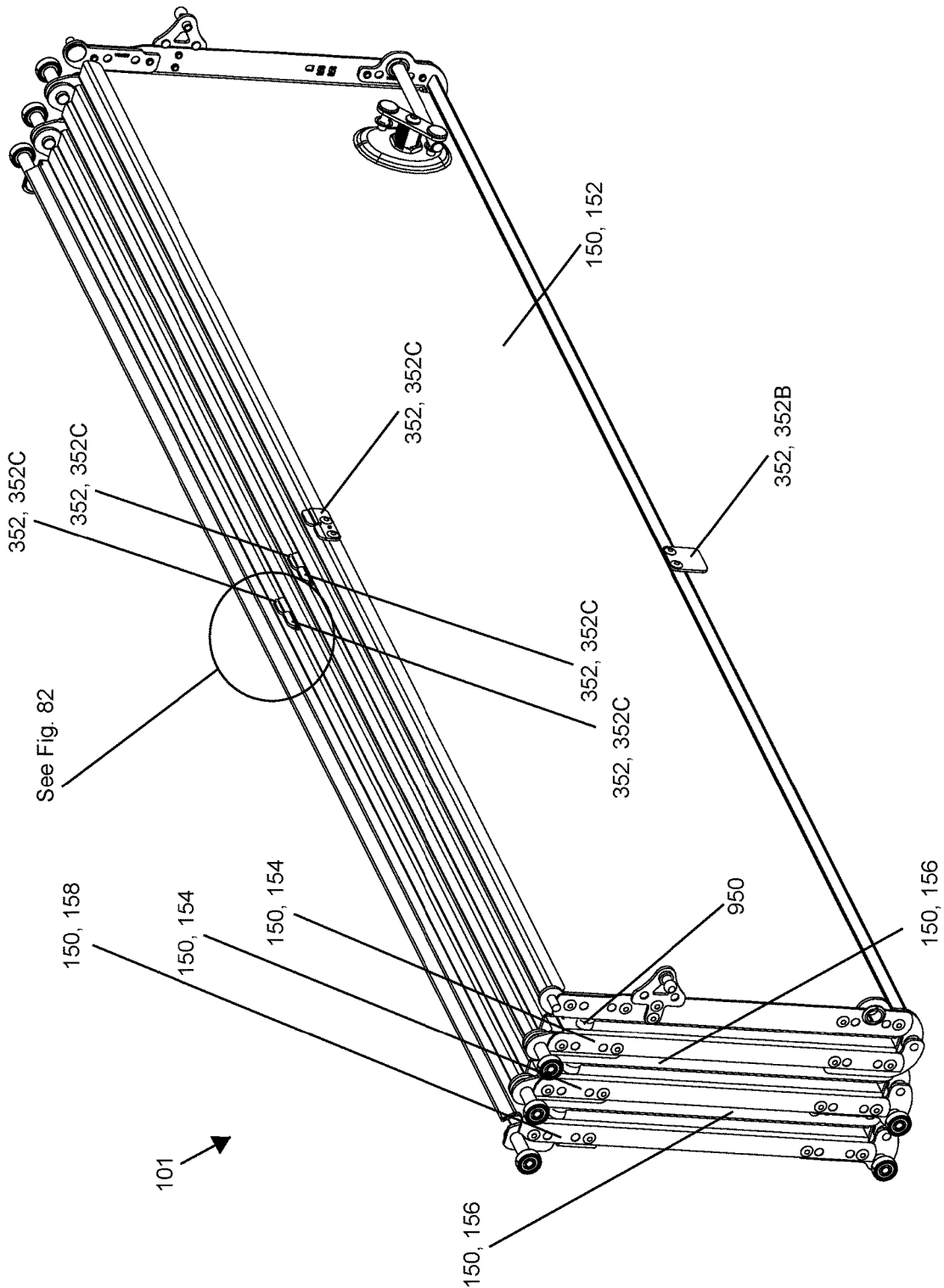
FIG. 81 is a perspective view of the panel assembly of FIG. 8 further illustrating interlocking structures for interlocking panel pairs of the panel assembly according to the principles of the present disclosure, the interlocking structures shown in a decoupled configuration.

As illustrated at FIG. 56, the seal 500 includes a variety of other features that will now be described. A corner 504 between the top 502 and the second side 508 is adapted to cover at least a portion of the bend radius R as it transforms to the radius covering portion 554, as illustrated at FIG. 57. A similar corner 504' is illustrated at FIG. 70 that includes a protrusion. The corner An undercut 506' (see FIG. 70) may be included adjacent the corner 504 on the second side 508 to adapt the corner 504 to cover the bend radius R. A corner 514 is included between the bottom 512 and the first side 518. The corner 514 may include a protrusion. An undercut 516 may be included adjacent the corner 514 on the first side 518. A corner 522 between the top 502 and the first side 518 is adapted to cover at least a portion of the bend radius R as it transforms to the radius covering portion 556, as illustrated at FIG. 57. As depicted, the corner 522 includes a protrusion. An undercut 520 may be included adjacent the corner 522 on the first side 518. As depicted, the hollow interior 524 may include a vertex 526 near the bottom 512. The vertex 526 may form a portion of the support structure 530. The top 502 may be initially curved (e.g. concave) and transform (e.g. deform) into a planar or near-planar surface as illustrated at FIG. 57.

Turning now to FIGS. 70-80, a seal 500', similar to the seal 500, is illustrated. The features of the seal 500 are generally similar to features of the seal 500' and are renumbered by adding a prime ('). FIGS. 70-80 are derived from a finite element analysis of the seal 500' as it is progressively compressed between a first panel 156' and a second panel 154' as the panels 154', 156' pivot toward each other about a pivot P, P'. In particular, FIGS. 70-73 illustrate the seal 500' with the pivot P below top surfaces of the panels 154', 156', and FIGS. 74-80 illustrate the seal 500' with the pivot P' above the top surfaces of the panels 154', 156'. As illustrated, the seal 500' deforms such that the top 502' becomes substantially flat and co-planar with the top surfaces of the panels 154', 156' when compressed (see FIGS. 73 and 80). Images of the seal 500' are included in an appendix that is hereby incorporated by reference in its entirety. The seal 500 is designed to form the flat top 502 when compressed under both configurations of the joint 200A, 200B-C. Likewise, the seal 500' is designed to form the flat top 502' when compressed under both configurations of the pivot P, P'.

Turning now to FIGS. 58 and 59, the quick-attach system 600 will be described in detail. As mentioned above, the panel 152 is pivotally attached to the interface system 105 at the quick-attach system 600. The quick-attach system 600 defines the axis A0 about which the panel 152 is pivotally attached to the interface system 105. The panel assembly 101 is also thereby attached to the interface system 105 at the quick-attach system 600. By releasing the panel assembly 101 from the quick-attach system 600, the panel assembly 101 can be removed from the pickup truck box 80 and thereby free up space in the pickup truck box 80 occupied by the panel assembly 101. As depicted, the panel assembly 101 is preferably moved to the stowed configuration 104 before removing the panel assembly 101 by releasing the quick-attach system 600. Likewise, the panel assembly 101 is preferably in the stowed configuration 104 before reattaching or initially attaching it to the quick-attach system 600.

Figure 65:
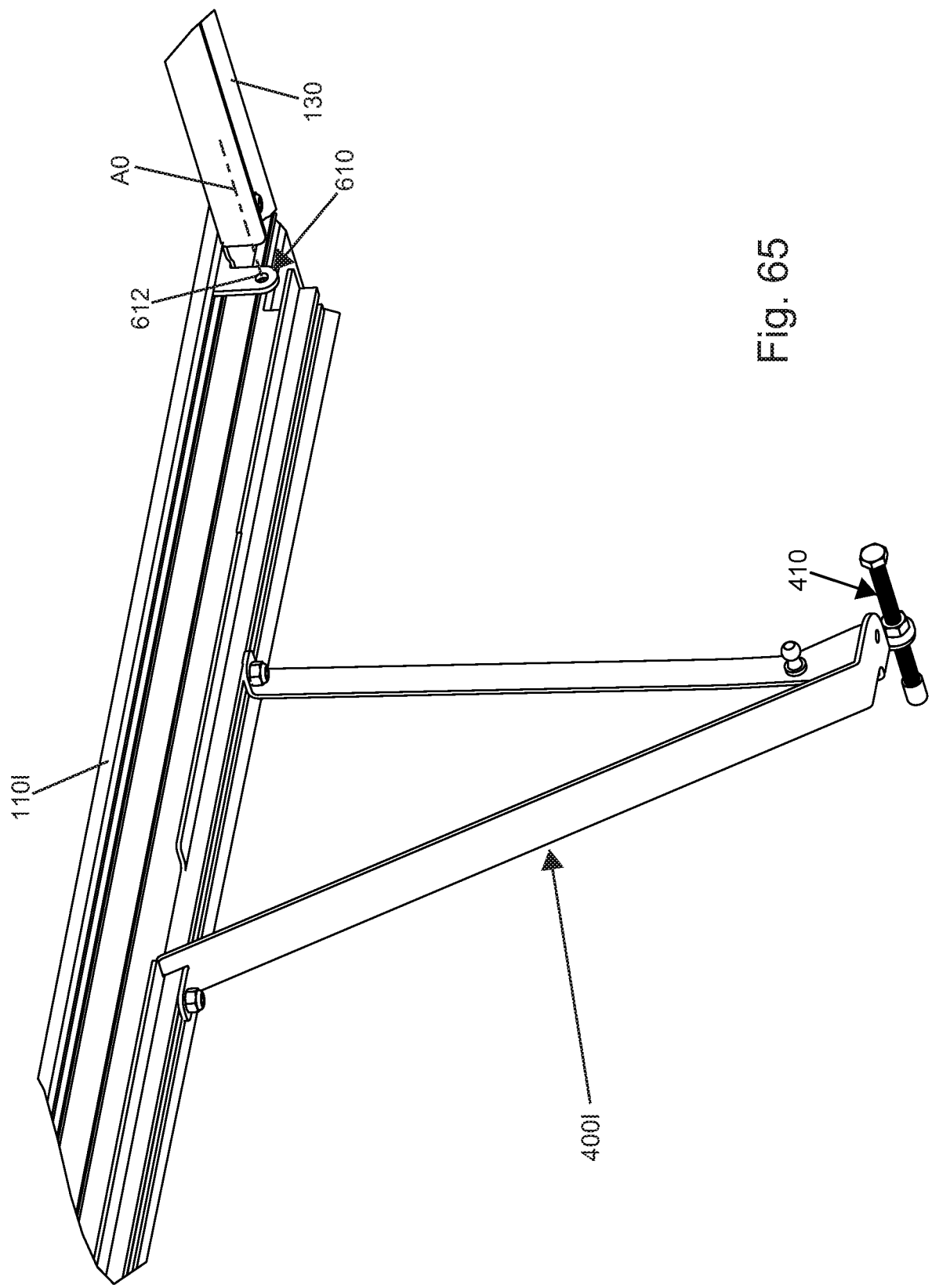
FIG. 65 is an enlarged portion of FIG. 64.
Figure 66:
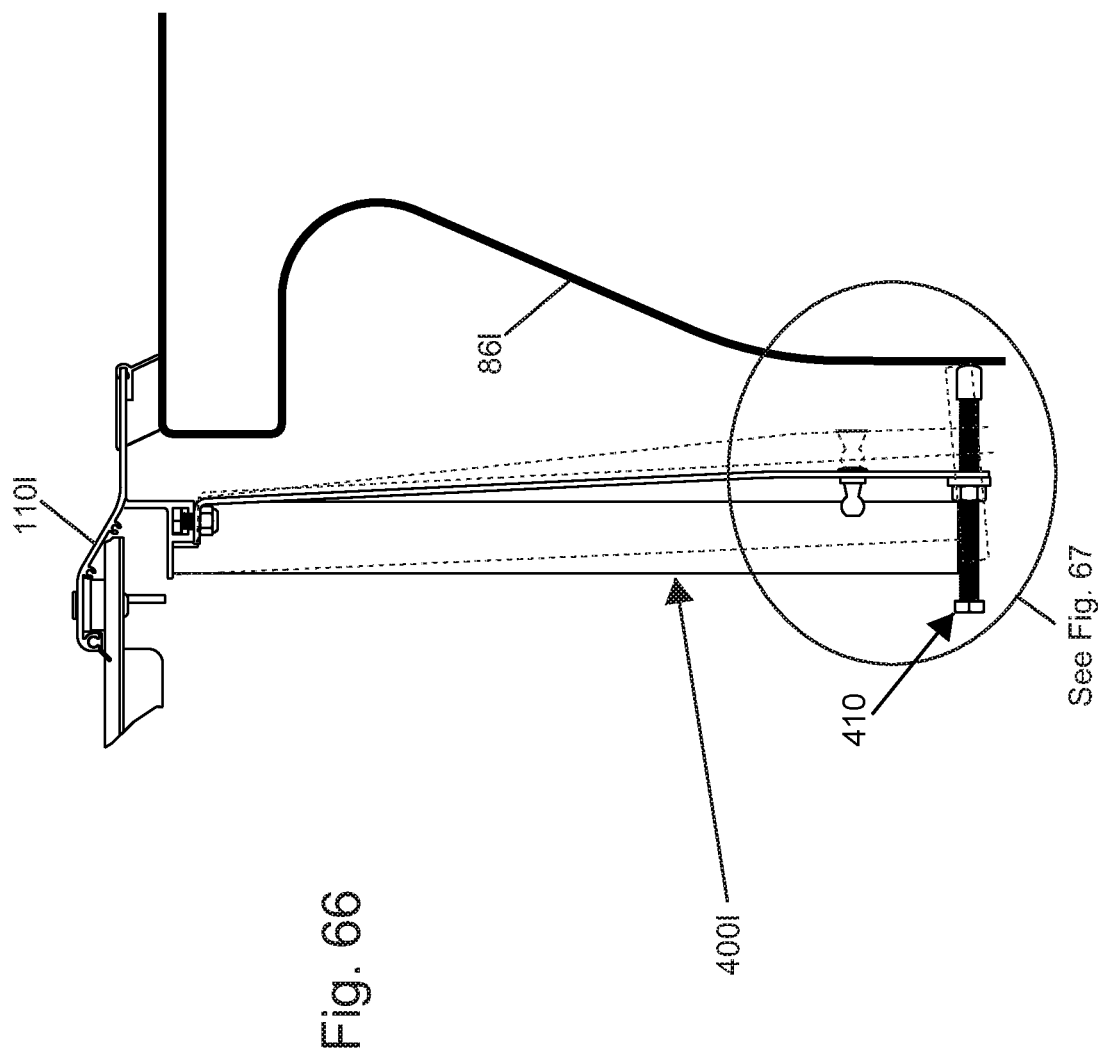
FIG. 66 is a front elevation view of the ramp assembly of FIG. 64 in an adjusted position.
Figure 67:
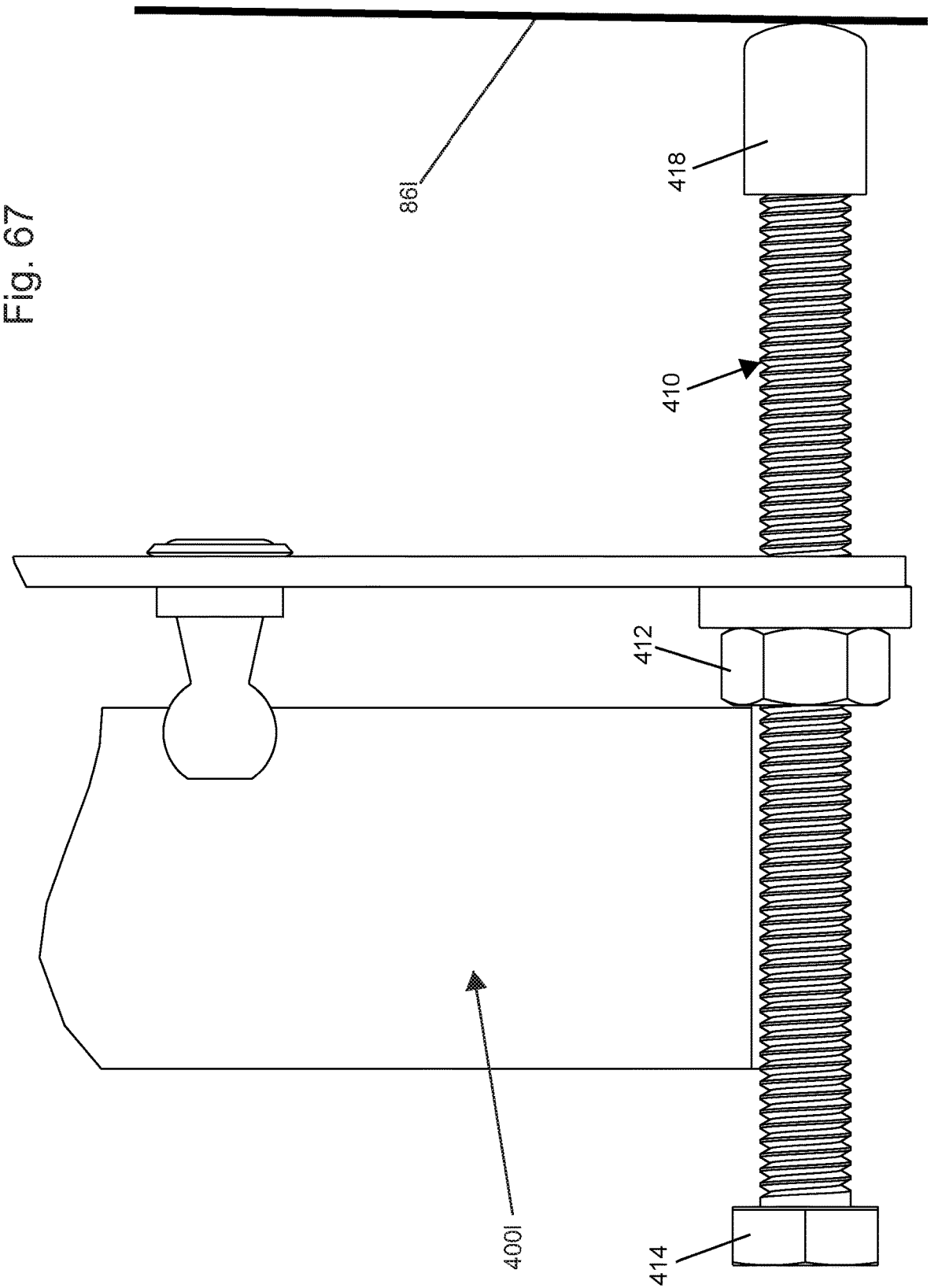
FIG. 67 is an enlarged portion of FIG. 66.

The quick-attach system 600 includes a mounting bracket 610 with a pivot hole 612 (see FIGS. 16 and 65), a mounting bracket 620 with a pivot slot 622 (see FIG. 58), and a release member 630 with a pivot slot 632 (see FIG. 59). The mounting brackets 610, 620 are attached to and part of the interface system 105. The mounting bracket 620 further includes the protrusion 624 and a fastener hole 626. In the depicted embodiment, the protrusion 624 is an obround protrusion and is a single protrusion. In other embodiments, a circular protrusion and/or multiple protrusions may be used. In the depicted embodiment, the release member 630 includes the slot 634 adapted to fit on the protrusion 624 and a fastener hole 636 adapted to be fastened to the fastener hole 626 by a fastener 650. In the depicted embodiment, a single fastener 650 is used. In other embodiments, multiple fasteners 650 may be used. In the depicted embodiment, the fastener 650 is a rivet. The protrusion 624 may be an upset protrusion. The obround protrusion 624, engaged with the slot 634, may transmit shear forces and moments between the mounting bracket 620 and the release member 630.

The release member 630 is preferably made of a spring material and thereby is flexible and can be moved to a release position without yielding the spring material. Upon releasing the release member 630 from the release position, the release member 630 automatically returns to a holding position. A tab 638 may be provided for manually moving the release member 630 to the release position. The tab 638 may further provide a ramp surface 640 for automatically latching the quick-attach system 600 with a shaft 270C of the panel assembly 101 when installing the panel assembly 101 in the pickup truck box 80. When the release member 630 is flexed between the release position and the holding position, the release member 630 may be peeled away from the mounting bracket 620 and the protrusion 624 may slide within the slot 634. The joint between the protrusion 624 and the slot 634, including the rivet 650, thereby provides a compact latch and release mechanism.

To install the panel assembly 101 in the pickup truck box 80 with the quick-attach system 600, a first one of two of the shafts 270C of the panel 152 is inserted into the pivot hole 612 of the mounting bracket 610 at a first side (e.g., a left side) of the panel assembly 101. The first side of the panel assembly 101 is thereby supported by the mounting bracket 610 and is thereby supported by the interface system 105. A second one of the two of the shafts 270C of the panel 152 is then engaged with the ramp surface 640 and thereby moves the release member 630 to the release position. The pivot slot 622 includes lead-in features that facilitate aligning the second one of the two of the shafts 270C into the pivot slot 622 at a second side (e.g., a right side) of the panel assembly 101. The pivot slot 622 may further taper and become tighter as the shaft 270C reaches a bottom of the pivot slot 622. Upon reaching or shortly before reaching the bottom of the pivot slot 622, the pivot slot 632 becomes positioned over the shaft 270C and thereby allows the release member 630 to spring back to the holding position.

The pivot slot 632 is obround and thereby may slide on and off the shaft 270C as it flexes. The pivot slot 622 is open at one end and thereby allows the shaft 270C to enter the pivot slot 622. The pivot slot 632 fits snuggly on the shaft 270C in the fore-aft direction 108, and the pivot slot 622 fits snuggly on the shaft 270C in a vertical direction. By holding the shaft 270C snuggly in the fore-aft direction 108 and in the vertical direction, the quick-attach system 600 aligns an axis A5 of the panel assembly 101 with the axis A0 of the interface system 105 with a desired precision.

To release the panel assembly 101 from the interface system 105, the tab 638 (i.e., a release tab) may be manually moved to the release position and thereby moves the pivot slot off of the shaft 270C. The shaft 270C can thereafter be removed from the pivot slot 622. After the second one of the two of the shafts 270C is freed from the mounting bracket 620, the first one of the two of the shafts 270C may be pulled from the pivot hole 612 of the mounting bracket 610. The panel assembly 101 is thereby free from the interface system 105.

Figure 60:
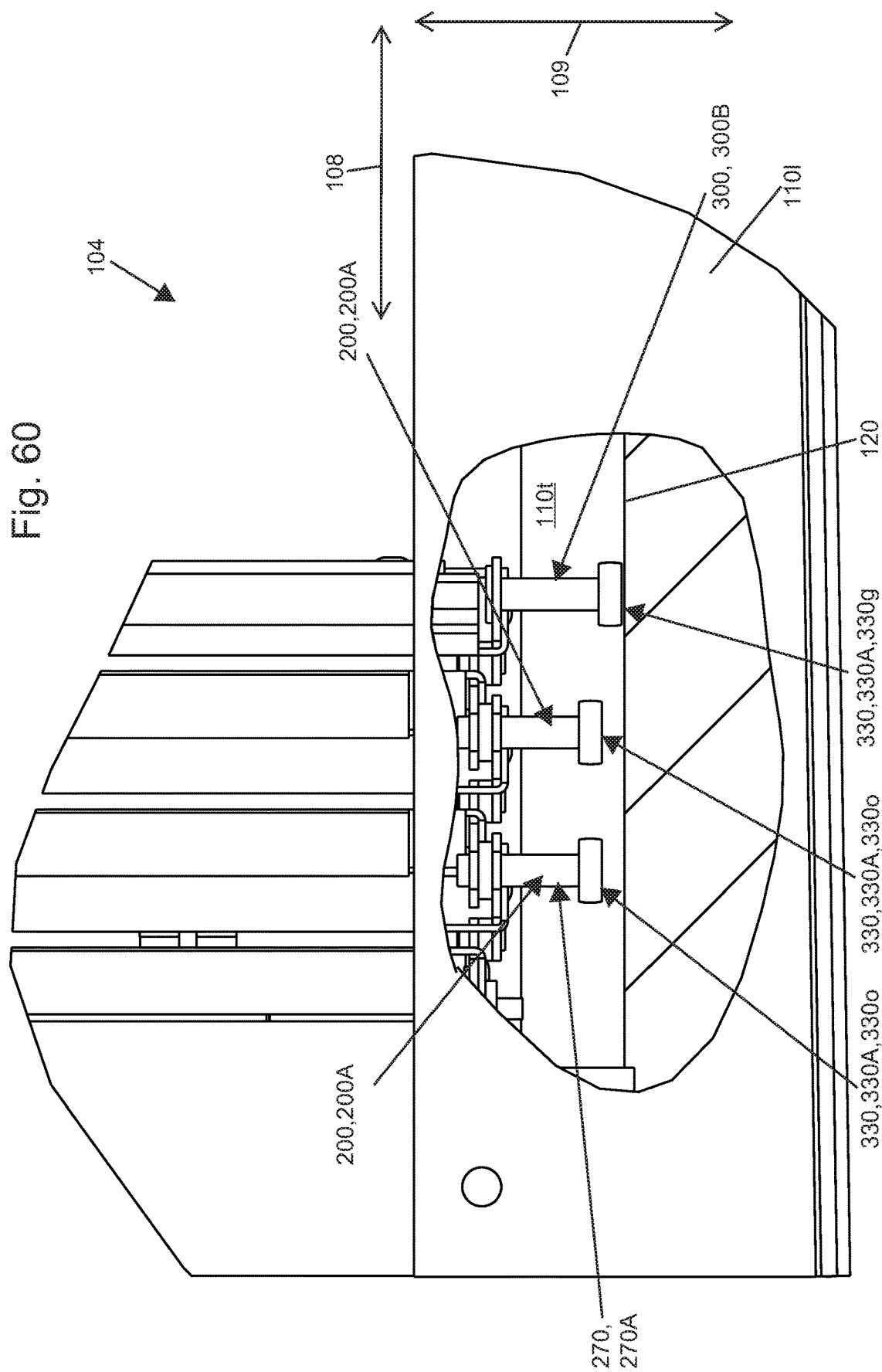
FIG. 60 is an enlarged portion of FIG. 7 illustrating a lateral guide system for the retractable cover system of FIG. 1.
Figure 61:
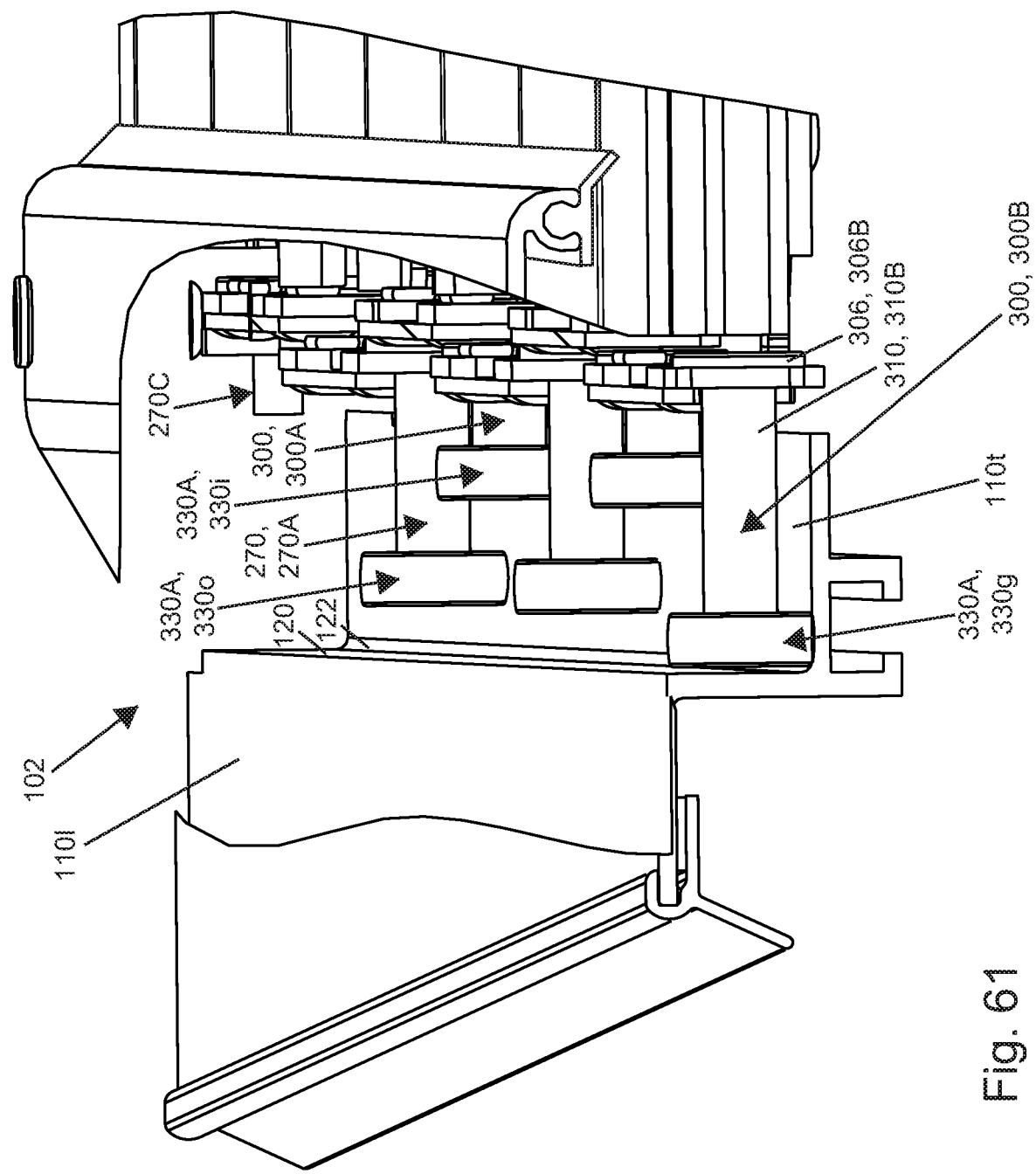
FIG. 61 is an enlarged portion of FIG. 4 further illustrating the lateral guide system of FIG. 60.

Turning now to FIGS. 60-63, a later guide arrangement according to the principles of the present disclosure will be described in detail. As illustrated at FIGS. 60 and 61, the guide elements 330 ride along the track 110t as the panel assembly 101 is moved between the deployed configuration 102 and the stowed configuration 104 in generally the fore-aft direction 108. Clearance may be provided between the guide elements 330 and a wall 120 of the rails 110r, 110l adjacent to the track 110t. A corner 122 may be positioned between the wall 120 and the track 110t. The corner 122 may take a form of a radius. The clearance may accommodate manufacturing tolerances of the panel assembly 101.

The clearance, if present at all of the guide elements 330 would leave the guide elements 330 unsupported against force loads with a component in the transverse direction 109. In addition, force loads with a component in the fore-aft direction 108 (e.g., opening and closing loads) that are off-set from a center of the panel assembly 101 may result in a moment load in a horizontal plane being applied to the panel assembly 101 that is reacted by the axis A0. Such force and moment loads may result in binding in the panel assembly 101. Such binding may result in the panel assembly 101 being difficult to open and close (i.e., being moved between the deployed configuration 102 and the stowed configuration 104). As illustrated at FIGS. 60 and 61, one of the guide elements 330, 330g is placed in lateral contact with the wall 120, the corner 122, or both. This may be done on the right rail 110r, the left rail 110l, or both rails 110r, 110l. The guide element 330g thereby receives lateral support from the wall 120, the corner 122, or both. This lateral support may also react moment loads that would otherwise be reacted at the axis A0. Thus, the guide element 330g, together with the corner 122 and/or the wall 120 acts as a lateral guide that is positioned on at least one of the first and the second rails 110r, 110l. The guide element 330g also serves as a vertical guide along the track 110t.

As the moment loads in the horizontal plane may be reacted by a force couple at the axis A0 and the guide element 330g, the guide element 330g is preferably a rear-most guide element 330 and thereby has a long moment arm to the axis A0.

In preferred embodiments, a pair of the guide elements 330g is positioned opposite each other along the opposite rails 110r, 110l. As the lateral support is received as a compressive contact load between the guide element 330g and the wall 120 or the corner 122, positioning the pair of the guide elements 330g accommodates loads along the transverse direction 109 in either direction. In other embodiments, a single guide element may accommodate loads along the transverse direction 109 in either direction (e.g. a V-groove wheel). In embodiments with the single guide element that accommodates such bi-directional loads, the single guide element may be used for lateral support by the panel assembly 101.

In the depicted embodiment, the pair of the guide elements 330A, 330g is mounted to the rear-most panel 158 adjacent the rear end 164 of the panel 158 on a pair of shafts 300B. The shaft 300B is similar to, but longer than, the shaft 300A. The shaft 300B is held by a bracket 340 and may be sub-assembled to the bracket 340, as illustrated at FIGS. 50-52. The bracket 340 may exist as a right-hand or a left-hand bracket. The joining of the shaft 300B to the bracket 340 may include a weld portion 312B on the shaft 300B being welded to a weld portion of the bracket 340. The weld portion 312, 312B may be included on a flange 306, 306B of the shaft 300, 300B. The joining of the shaft 300B to the bracket 340 may include a piloting portion of the bracket 340 receiving a pilot 310B of the shaft 300B. As the rear end 164 of the rear-most panel 158 does not pivotally connect to another of the panels 150, no pivot joint 200 is defined. Instead, a right hand and a left hand pair of the brackets 340 are attached to the panel 158 by the fastening arrangement 360 at the right hand and the left hand legs 176 of the panel 158, respectively. The bracket 340 further connects to the C-channel feature 166 at the rear end 164 of the panel 158. The rear end 164 of the panel 158 is thereby reinforced. The guide element 330A may be assembled before or after the bracket 340 is mounted to the panel 158. The guide element 330A may be disassembled and reassembled (e.g., for servicing and/or replacing the guide element 330A) without additional disassembly of the bracket 340 and the panel 158.

Figure 62:
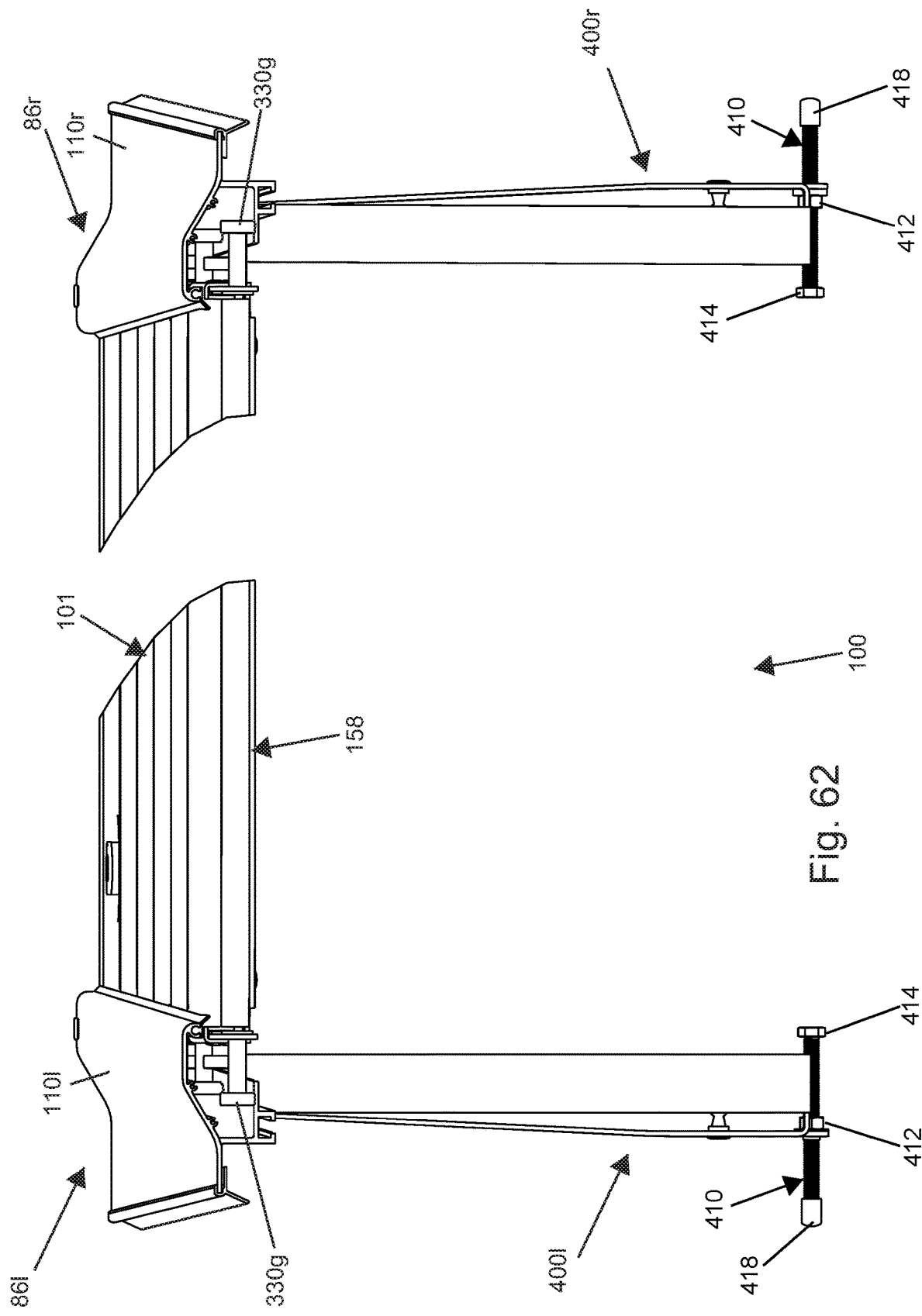
FIG. 62 is a broken rear perspective view of the retractable cover system of FIG. 1 illustrating an initial installation of rails of the retractable cover system before a final adjustment.

FIGS. 62 and 63 illustrate a method for adjusting the rails 110r and 110l according to the principles of the present disclosure. As depicted, the rails 110r and 110l are a pair of opposing rails 110r, 110l. The method includes: 1) installing the pair of the opposing rails 110r, 110l; 2) assembling the folding panel assembly 101 to the pair of the opposing rails 110r, 110l; and 3) moving each of the opposing rails 110r, 110l inwardly. The pair of the opposing rails 110r, 110l is installed over a pair of the opposing side walls 86r, 86l of the pickup truck box 80. In particular, the right rail 110r is installed over the right side 86r, and the left rail 110l is installed over the left side 86l. This installation may be part of the installation of the interface system 105. The folding panel assembly 101 is assembled to the pair of the opposing rails 110r, 110l by respectively engaging a pair of opposing sets of the guide elements 330 with a pair of the tracks 110t of the opposing rails 110r, 110l. Each of the opposing sets of the guide elements 330 includes one of the lateral guide elements 330g that extends outwardly beyond the other guide elements 330. As illustrated at FIG. 63, each of the opposing rails 110r, 110l is moved inwardly until the wall 120, the corner 122, or both contacts the respective extended guide element 330g. As depicted, the extended guide element 330g is a rearmost guide element 330g.

As depicted, the rail 110l may pivot about an axis A6l, and the rail 110r may pivot about an axis A6r. The moving of the rails 110l, 110r inwardly may be accomplished by rotationally moving the rails 110l, 110r inwardly about the axes A6l, A6r, respectively. The axes A6l, A6r are located on a forward end of the rails 110l, 110r. The front cross-member 130 may accurately establish positions of the axes A6l, A6r. The rails 110l, 110r are thereby rotatable about the front cross-member 130 of the retractable cover system 100. The front cross-member 130 may be attached to the pickup truck box 80. The extended guide element 330g and the front cross-member 130 may thereby function together as a jig to locate the rails 110r, 110l on the pickup truck box 80.

FIGS. 63-67 illustrate the ramps 400r, 400l as adjustable ramps 400r, 400l according to the principles of the present disclosure. Upon adjusting the rails 110r, 110l, as described above, the ramps 400r, 400l are preferably adjusted to align with the inner guide elements 330i. The ramps 400r, 400l are mounted to a respective one of the rails 110r, 110l such that an inner portion of the tracks 110t aligns with a corresponding one of the tracks 400t of the ramps 400r, 400l (see FIGS. 6, 16, and 17).

Alignment at an adjacent upper portion 402 of the ramps 400r, 400l adjacent the tracks 110t may occur by virtue of the fastening arrangement. However, lower portions 404 of the ramps 400r, 400l may need adjustment to align with the inner guide elements 330i along the path 106B. Jacking screws 410 may be provided for the purpose of adjusting the ramps 400r, 400l. The jacking screws 410 may also provide support for the ramps 400r, 400l. The ramps 400r, 400l may be adjusted by bending the ramps 400r, 400l with the jacking screws 410. The ramps 400r, 400l may be initially positioned (e.g., biased) outwardly and out of alignment with the guide elements 330i. The jacking screws 410 may jack against the sides 86r, 86l of the pickup truck box 80 and thereby bend the ramps 400r, 400l inwardly until they are aligned with the inner guide elements 330i. The ramps 400r, 400l may be formed with an outward bias. The ramps 400r, 400l may be formed of one piece of sheet metal. The jacking screws 410 may threadingly engage the ramps 400r, 400l. A locknut 412 may be provided to secure the threaded connection between the ramps 400r, 400l and the jacking screws 410. A head 414 (i.e., a hex head) may be provided on the jacking screw 410 to adapt the jacking screw 410 to be turned by a wrench and/or a socket. A foot 418 (e.g., a rubber cap) may be placed on the jacking screw 410 to protect the sides 86r, 86l of the pickup truck box 80 from scratches, etc.

No cross-member is needed to directly link the lower portion 404 of the ramp 400r with the lower portion 404 of the ramp 400l. The retractable cover system 100 does not need structure between the lower portion 404 of the ramp 400r and the lower portion 404 of the ramp 400l.

FIGS. 10, 43, 44, 46, and 47 illustrate the locking system 900 for the retractable cover system 100. The locking system 900 includes a locked configuration that locks the retractable cover system 100 in the extended configuration 102 and an unlocked configuration that allows the retractable cover system to be moved between the extended configuration 102 and the stowed configuration 104.

The locking system includes a lock mount 902, a rotatable portion 904, a right guide 906, a left guide 908, the right lock rod 920r, and the left lock rod 920l (see FIG. 10). The lock mount 902 is positioned on the panel 152. The rotatable portion 904 is rotatably mounted to the lock mount 902 about an axis. The rotatable portion 904 includes an arm 922 with a first connection 932 and a second connection 934. The rotatable portion 904 is moveable between a locked position and an unlocked position. The right guide 906 is positioned on a right side of the panel 152. The right guide 906 may include a bushing 940 mounted in the opening 930 of the first member 210C of the joint 200C. The left guide 908 is positioned on a left side of the panel 152. The left guide 908 may include another bushing 940 mounted in the opening 930 of the first member 210C of the joint 200C. The right lock rod 920r is pivotally connected to the first connection 932 and is slidingly connected to the right guide 906. The left lock rod 920l is pivotally connected to the second connection 934 and slidingly connected to the left guide 908. When the rotatable portion 904 is moved to the locked position from the unlocked position, the arm 922 urges a right end of the right lock rod 920r to extend beyond the right guide 906 and enter the right rail 110r. When the rotatable portion 904 is moved to the locked position from the unlocked position, the arm 922 urges a left end of the left lock rod 920*l* to extend beyond the left guide 908 and enter the left rail 110*l*.

When the rotatable portion 904 is moved to the unlocked position from the locked position the arm 922 urges the right end of the right lock rod 920*r* to retract from the right rail 110*r* and urges the left end of the left lock rod 920*l* to retract from the left rail 110*l*. When the right end enters the right rail 110*r* the right end is positioned over the right track 110*t* and when the left end enters the left rail 110*l* the left end is positioned over the left track 110*t*.

Figure 68:
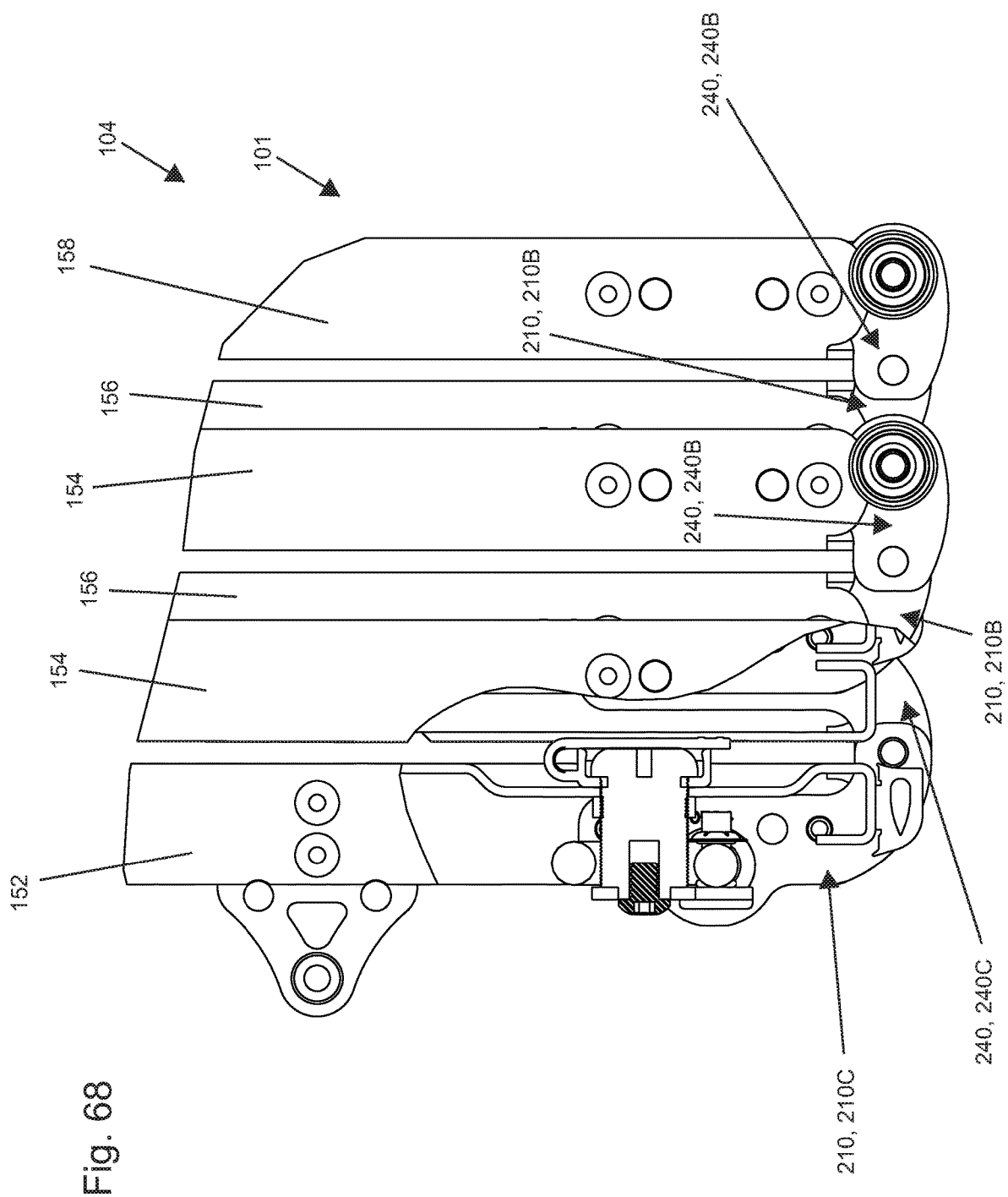
FIG. 68 is an enlarged portion of FIG. 6 illustrating a lock assembly positioned partially into a recess of a panel and further illustrating the panel assembly of FIG. 8 compactly arranged in the stowed configuration of FIG. 5.
Figure 69:
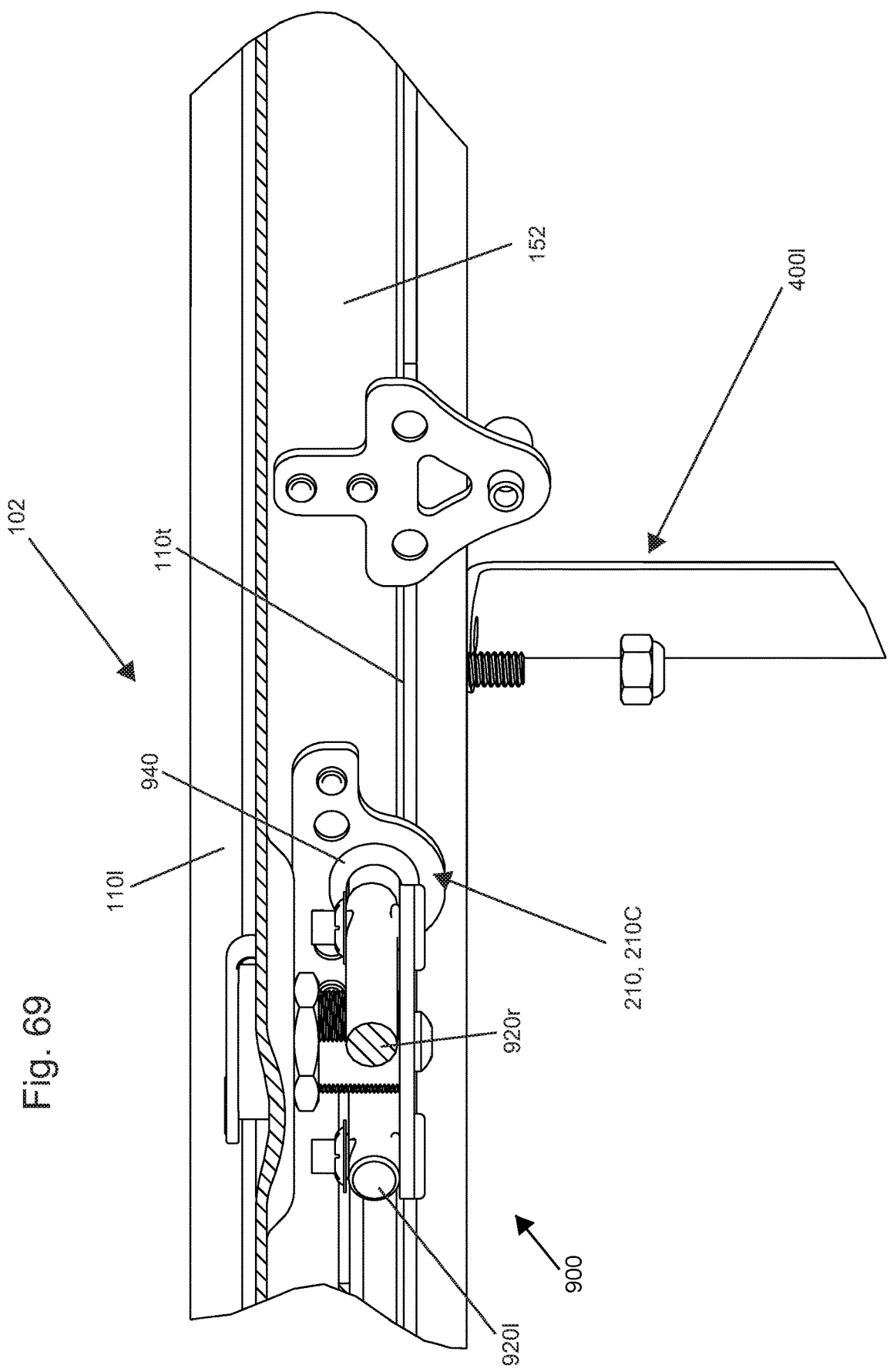
FIG. 69 is a partial cross-sectional perspective view illustrating lock rods of the lock assembly of FIG. 68 and their position with respect to the rails of FIG. 62.

The lock mount 902 may be positioned within a recess 938 of the panel 152, and the rotatable portion 904 may be at least partially positioned with the recess 938 of the panel 152. The right and the left lock rods 920*r*, 920*l* are substantially contained within a side panel profile of the panel 152 (see FIG. 68).

Figure 112:
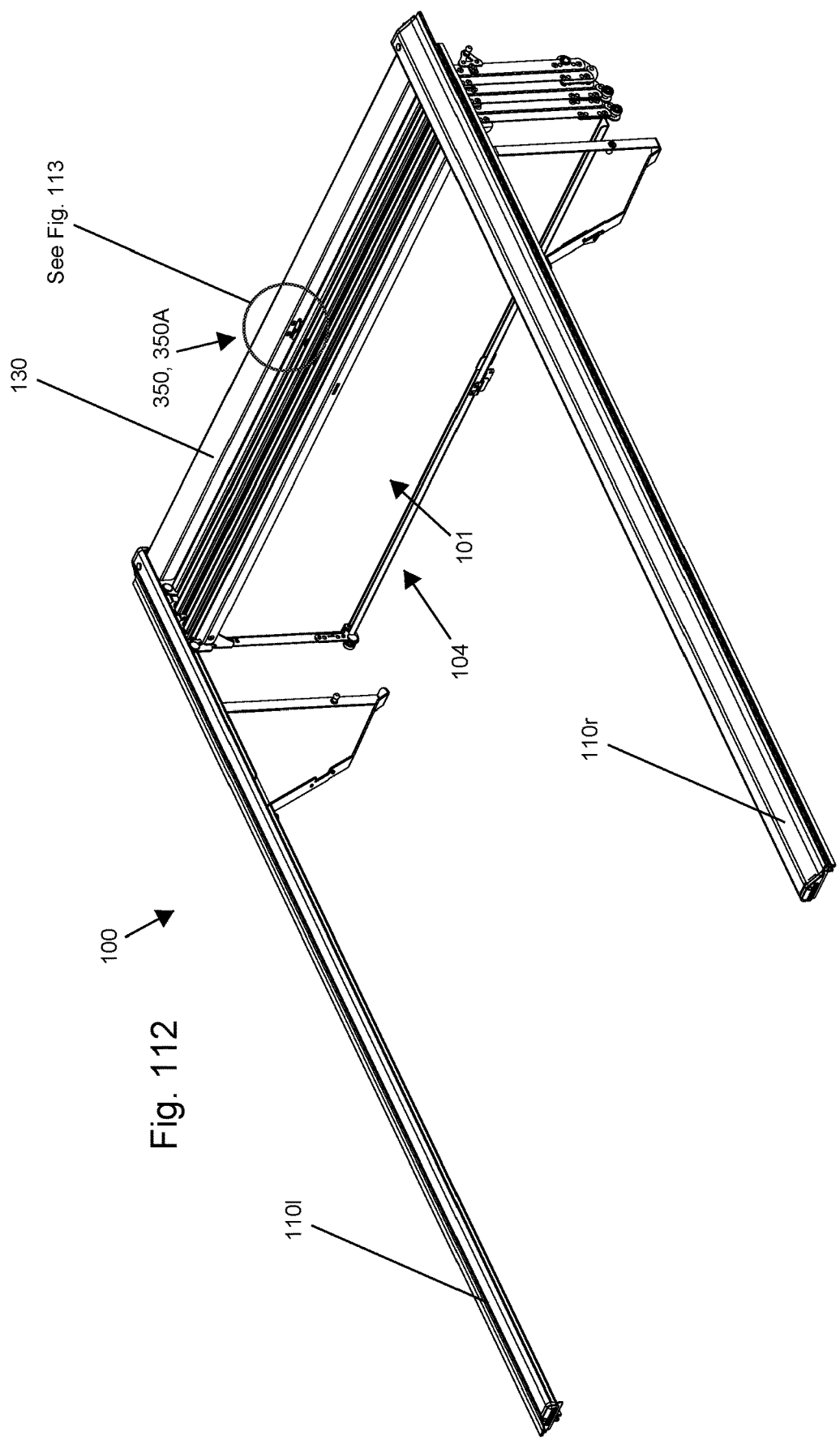
FIG. 112 is a perspective view of the retractable cover system of FIG. 1 further illustrating yet other interlocking structures for interlocking a panel of the panel assembly of FIG. 8 to a front cross-member of the retractable cover system according to the principles of the present disclosure, the interlocking structures shown in a decoupled configuration.
Figure 113:
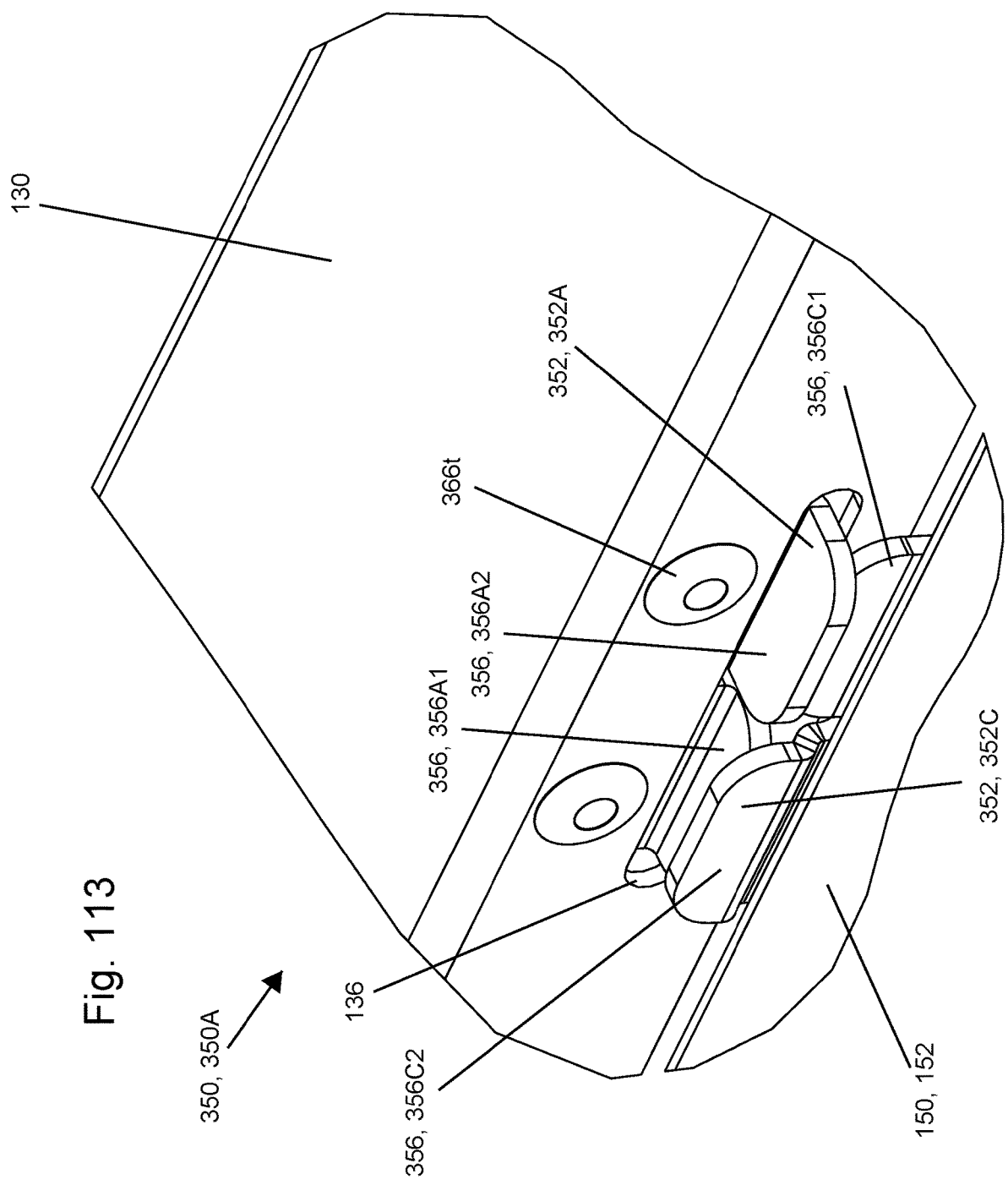
FIG. 113 is a partial perspective view of the interlocking structures of FIG. 112 shown in the decoupled configuration.
Figure 114:
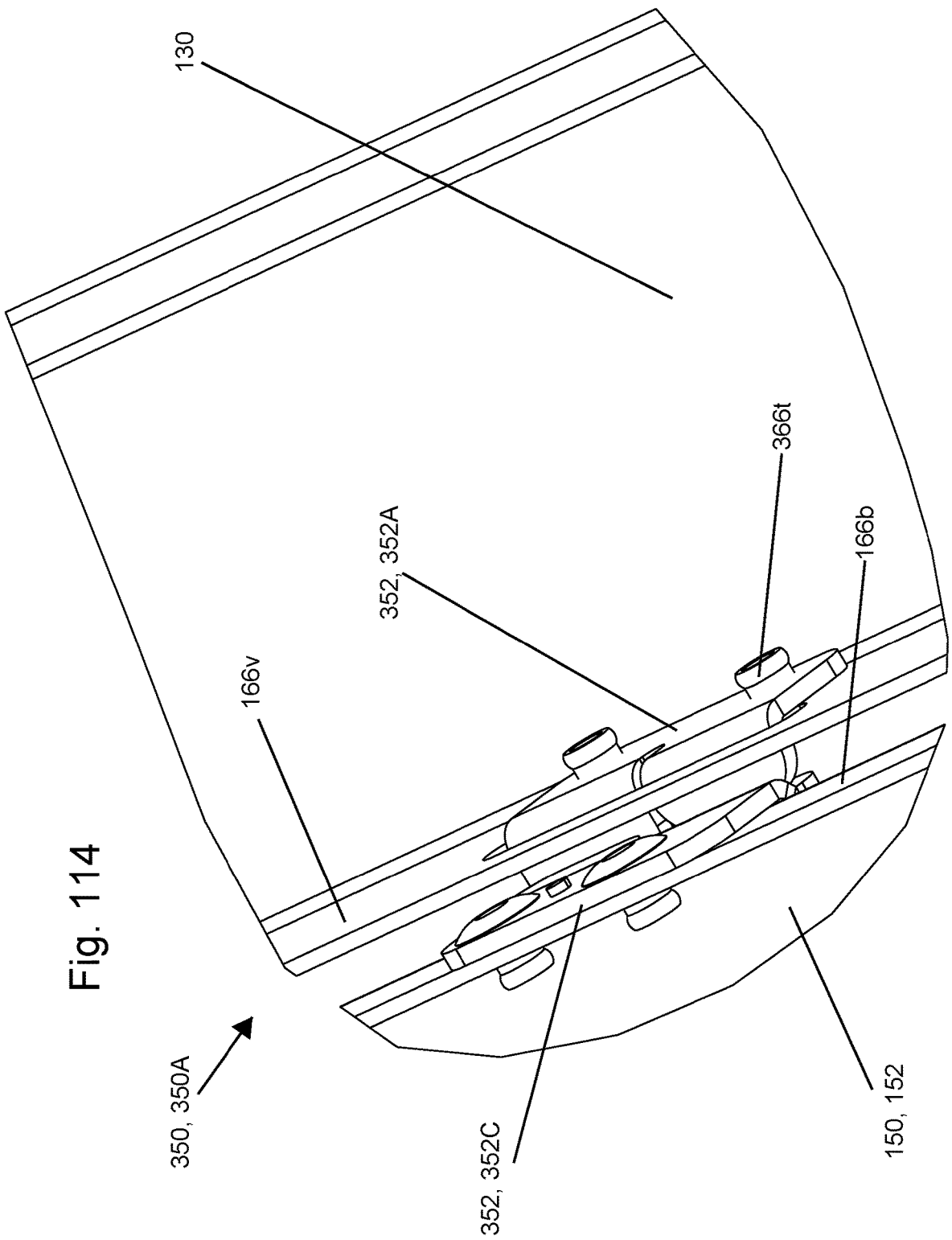
FIG. 114 is another partial perspective view of the interlocking structures of FIG. 112 shown in the decoupled configuration.

Turning now to FIGS. 81-120, connecting structures 350 for the retractable cover system 100 are illustrated according to the principles of the present disclosure. In particular, a connecting structure 350A of the connecting structures 350 is illustrated at FIGS. 112-120. As illustrated at FIGS. 112 and 113, the connecting structure 350A interconnects the panel 152 to the front cross-member 130. FIGS. 93-101 illustrate a connecting structure 350B of the connecting structures 350. As illustrated at FIG. 96, the connecting structure 350B interconnects a panel pair 250 that includes the panel 152 and the panel 154. The connecting structure 350B also interconnects a panel pair 254 that includes the panel 156 and the panel 154. The connecting structure 350B may be used between the panel pair 250 and the panel pair 254 in substantially the same way. FIGS. 82-91 illustrate a connecting structure 350C of the connecting structures 350. As illustrated at FIG. 85, the connecting structure 350C interconnects a panel pair 252 including the panel 154 and the panel 156. The connecting structure 350C also interconnects a panel pair 256 including the panel 154 and the panel 156. The connecting structure 350C may be used between the panel pair 252 and the panel pair 256 in substantially the same way. FIGS. 104-111 illustrate a connecting structure 350D of the connecting structures 350. As illustrated at FIG. 106, the connecting structure 350D interconnects a panel pair 258 including the panel 156 and the panel 158. The panel pairs 250, 252, 254, 256, and 258 are each generically a panel pair 260.

Thus, the connecting structures 350 are arranged from a front to a rear of the panel assembly 101 as follows: the connecting structure 350A interconnects a first joint between the panel assembly 152 and the front cross-member 130; a second joint between the panels 152 and 154 is interconnected by a first of the connecting structure 350B; a third joint between the panels 154 and 156 is interconnected by a first of the connecting structure 350C; a fourth joint between the panels 156 and 154 is interconnected by a second of the connecting structure 350B; a fifth joint between the panels 154 and 156 is interconnected by a second of the connecting structure 350C; and a sixth joint between the panels 156 and 158 is interconnected by the connecting structure 350D. In the depicted embodiments, the panel assembly 101 includes six of the panels (1) 152, (2) 154, (2) 156, (1) 158. In other embodiments, the panel assembly 101 may include eight of the panels (1) 152, (3) 154, (3) 156, (1) 158, similarly connected in this sequence—152, 154, 156, 154, 156, 154, 156, and 158. In embodiments with eight of the panels 150, an additional copy of the pair 254 of the panels 156, 154 may thus be added along with one of the connecting structures 350B and one of the connecting structures 350C.

In certain embodiments, all of the joints of the preceding paragraph include connecting structures 350. In other embodiments, one or more of the joints may include the connecting structures 350 while other of the joints may not include the connecting structures 350. As depicted, a single one of the connecting structures 350 is positioned substantially centered along the width W of each of the panels 150 (see FIG. 8). In other embodiments, a plurality of the connecting structures may be used between each of the pairs 260 of the panels 150. In other embodiments, the single one of the connecting structures 350 is not necessarily positioned substantially centered along the width W of each of the panels 150.

As depicted, the connecting structures 350 each include a first bearing surface 354 and a second bearing surface 354 that work together to structurally connect the panels 150 of the panel pairs 260. The first bearing surface 354 is kinematically part of a first panel of one of the adjacent pairs 260 of panels 150. The second bearing surface 354 is kinematically part of a second panel of the adjacent pairs 260. Likewise, the connecting structure 350A includes a first bearing surface 354 that is kinematically part of the front cross-member 130 and a second bearing surface 354 that is kinematically part of the panel 152. The first and the second bearing surfaces 354 bear against each other and thereby structurally connect the corresponding panels 150 of the panel pairs 260 when the retractable cover system 100 is in the deployed configuration. When the retractable cover system 100 is moved toward the retracted configuration 104, the first and the second bearing surfaces 354 disengage from each other and thereby disconnect the connecting structure 350 from the corresponding adjacent pair 260.

As depicted, when in a connected configuration, one of the first and the second bearing surfaces 354 is an up-facing bearing surface 354*u*, and another is a down-facing bearing surface 354*d*. The up-facing bearing surface 354*u* and the down-facing bearing surface 354*d* bear against each other when in the connected configuration. When the up-facing surface 354*u* and the down-facing surface 354*d* engage each other, the panel 150 including the down-facing surface 354*d* cannot move downward with respect to the opposite panel 150 including the up-facing surface 354*u*. Likewise, the panel 150 including the up-facing surface 354*u* cannot move upward with respect to the opposite panel 150 including the down-facing surface 354*d*. As depicted, the up-facing bearing surfaces 354*u* are substantially parallel to a top surface 150*t* of the corresponding panel 150 on which it is mounted. Likewise, the down-facing bearing surfaces 354*d* are substantially opposite of parallel to the top surface 150*t* of the corresponding panel 150 on which it is mounted or a part of.

However, a single pair of the bearing surfaces 354*u* and 354*d* do not prevent the panel 150 including the down-facing surface 354*d* from moving upward with respect to the opposite panel 150 including the up-facing surface 354*u*. Likewise, the panel 150 including the up-facing surface 354*u* can move downward with respect to the opposite panel 150 including the down-facing surface 354*d*. Therefore, to provide both an upward and downward structural connection between the adjacent pairs 260 of the panels 150 a third bearing surface 354 and a fourth bearing surface 354 are provided. The third bearing surface 354 is kinematically part of the first panel 150, and the fourth bearing surface 354 is kinematically part of the second panel 150. As with the first and the second bearing surfaces 354 that are paired and mated, the third and the fourth bearing surfaces 354 engage each other when the retractable cover system 100 is in the deployed configuration and disengage from each other when the retractable cover system 100 is in the retracted configuration 104. The third and the fourth bearing surfaces 354 are arranged oppositely from the first and the second bearing surfaces 354. As will be further described below, the bearing surfaces 354, 354u, 354d may be provided on connecting pieces 352 (e.g., on a tab 356). As will be further described below, the bearing surfaces 354, 354d may be provided on the connecting pieces 352 (e.g., on the tab 356) and/or on portions of the bottom leg 166b of the C-channel feature 166.

Together, the first and the second bearing surfaces 354 and the third and the fourth bearing surfaces 354 restrain all vertical movement between the adjacent pairs 260 of the panels 150. This structural connection allows the panels 150 to reinforce each other when the retractable cover system 100 is in the deployed configuration. For example, when a vertical load is applied to the panel 154 and no load is applied to the adjacent panel 156, the panel 156 may help the panel 154 carry the load. In addition to directly carrying and sharing loads, the connecting structure 350 may increase the overall stiffness of the retractable cover system 100. The connecting structure 350 may further reduce aerodynamic flutter and other vibrations and noise of the retractable cover system 100 when deployed.

Figure 115:
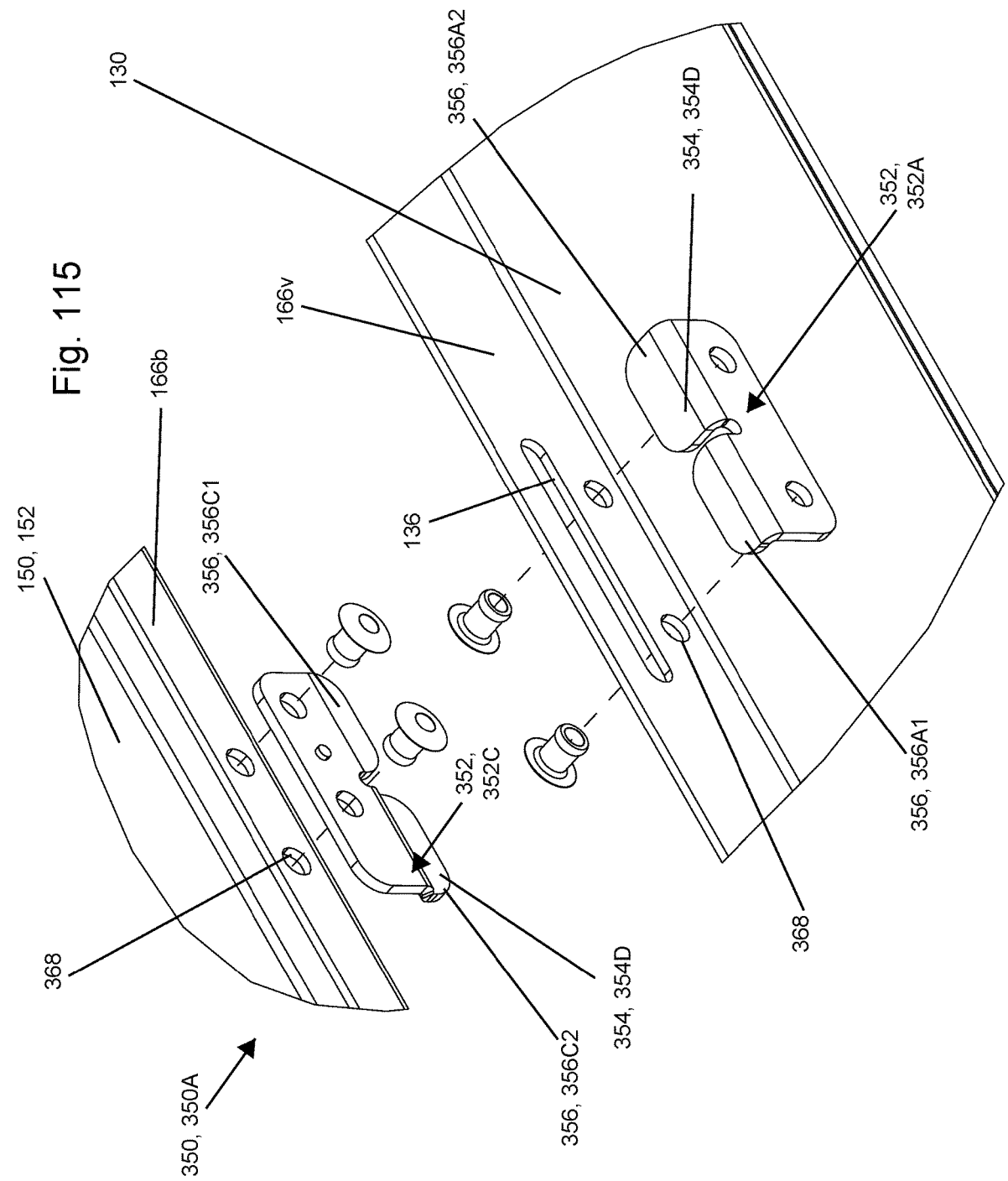
FIG. 115 is a partial exploded perspective view of the interlocking structures of FIG. 112 shown in the decoupled configuration.
Figure 116:
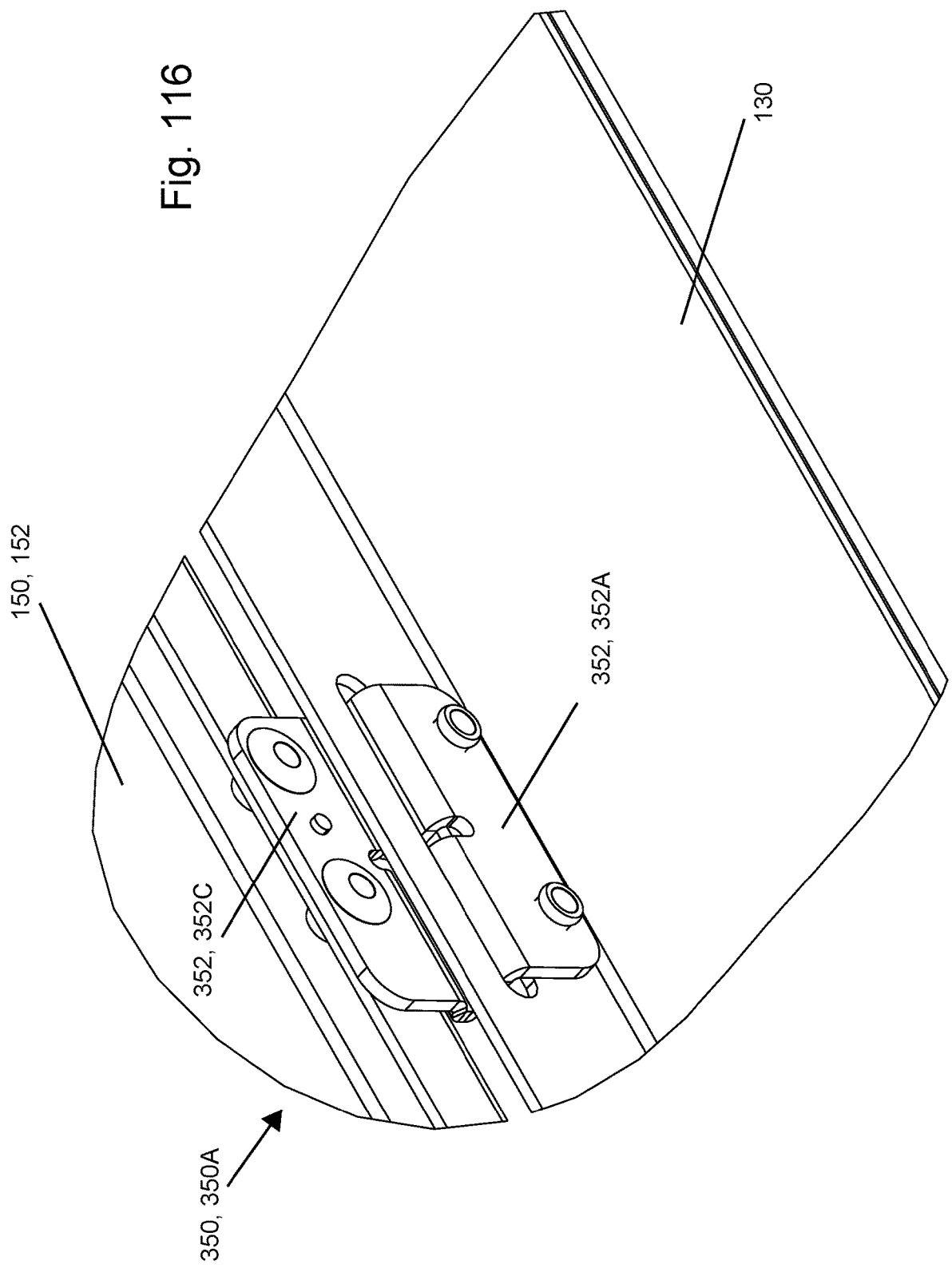
FIG. 116 is still another partial perspective view of the interlocking structures of FIG. 112 shown in the decoupled configuration.

Turning now to FIGS. 112-120, the connecting structure 350A will be described in detail. The connecting structure 350A includes a connecting piece 352A of the connecting pieces 352 and a connecting piece 352C of the connecting pieces 352. The connecting piece 352A is mounted to the front cross-member 130. In particular, the connecting piece 352A is fastened to the front cross-member 130 with a pair of fasteners 366t (e.g., rivets) through fastening holes 368. The connecting piece 352A includes a first tab 356A1 and a second tab 356A2, as illustrated at FIGS. 113 and 115. The tabs 356A1 and 356A2 extend through a slot 136 of the front cross-member 130. The front cross-member 130 further includes a pair of the fastening holes 368 for the pair of the fasteners 366t. The connecting piece 352C is mounted to the bottom leg 166b of the C-channel feature 166 of the panel 152. In particular, the connecting piece 352C is fastened to the bottom leg 166b with a pair of fasteners 366t (e.g., rivets) through fastening holes 368. The connecting piece 352C includes a first tab 356C1 and a second tab 356C2, as illustrated at FIGS. 113 and 115. The tabs 356C1 and 356C2 extend beyond a forward side of the panel 152.

Figure 117:
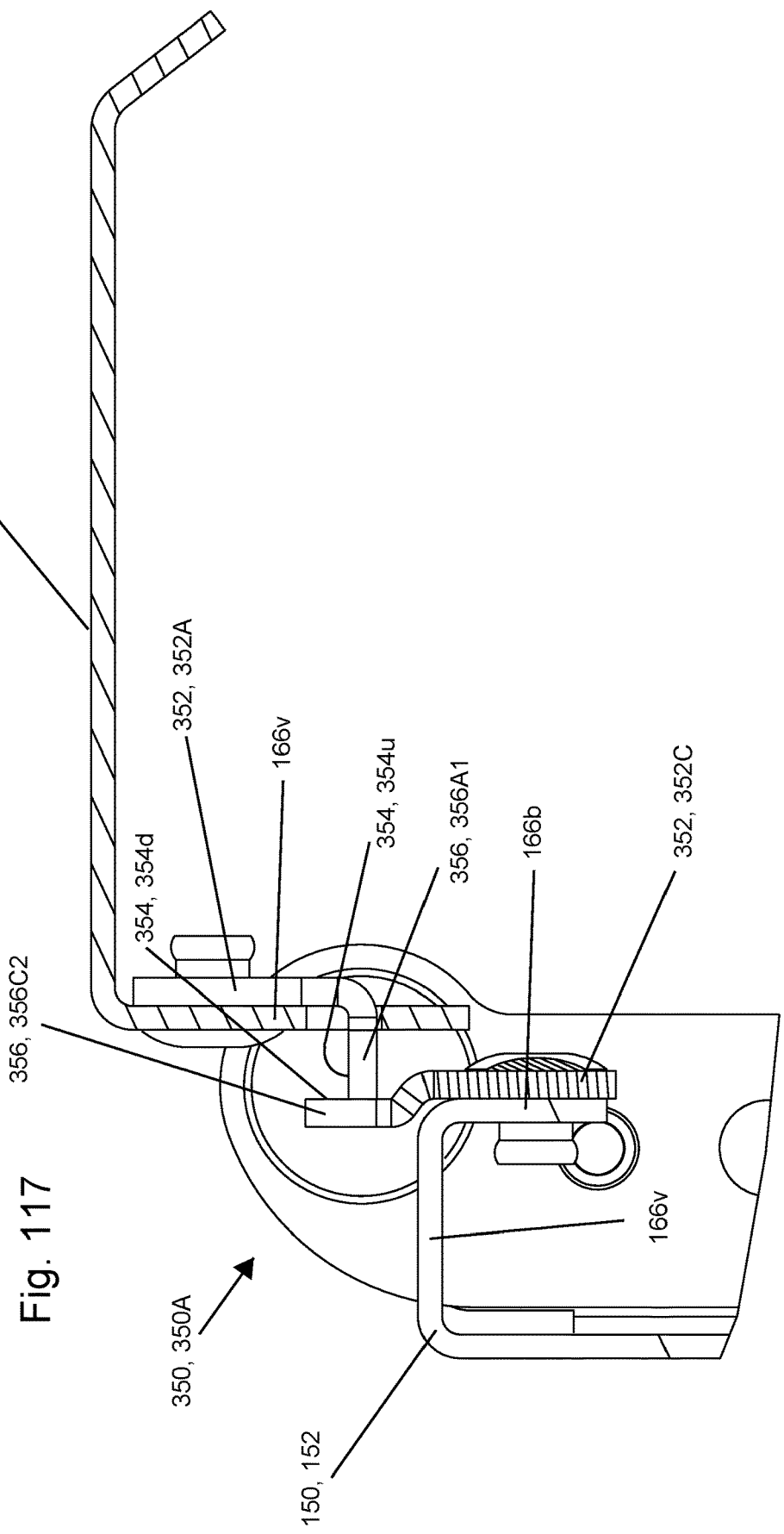
FIG. 117 is a cross-sectional side view of the interlocking structures of FIG. 112 shown in the decoupled configuration.
Figure 118:
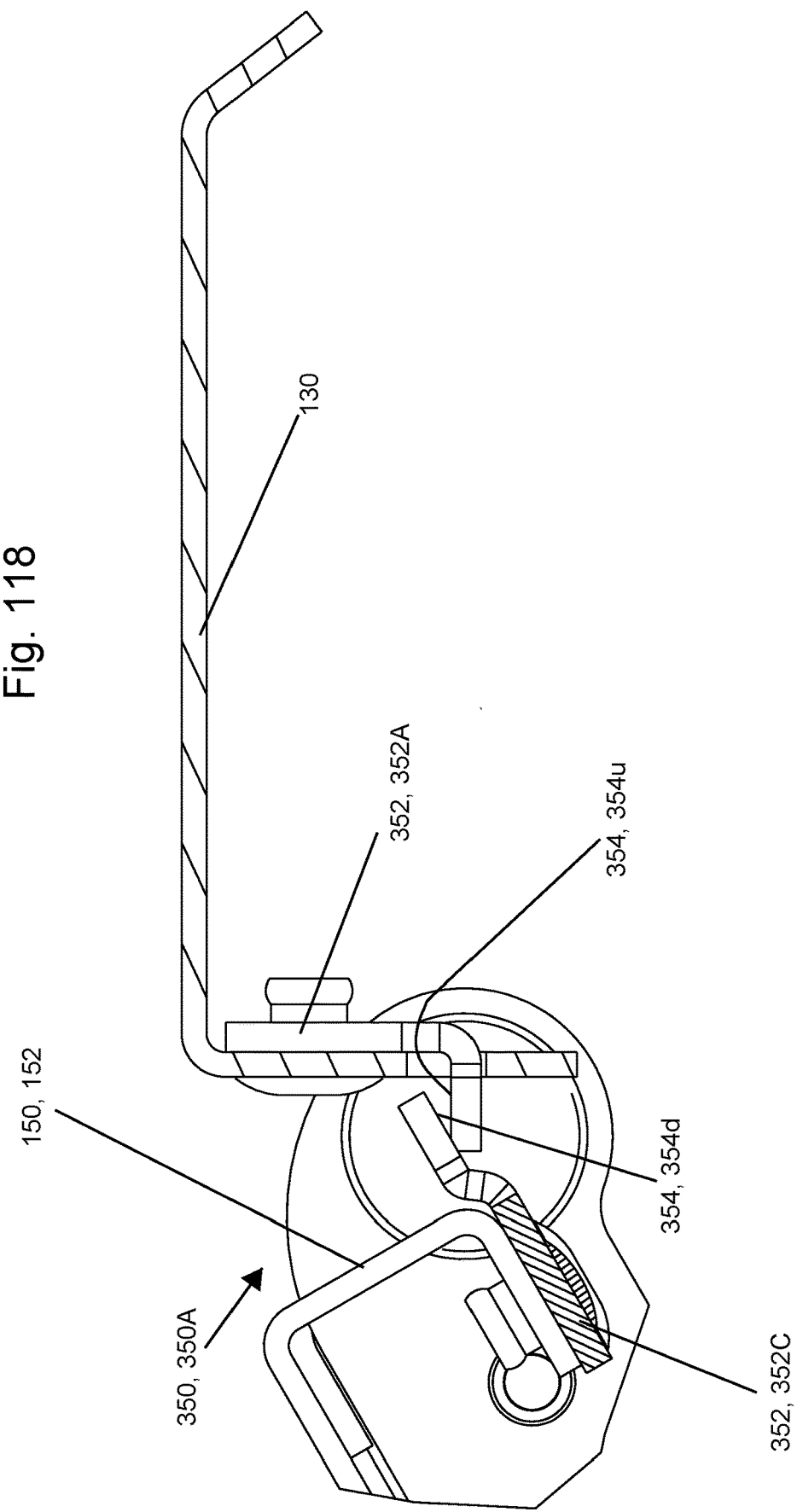
FIG. 118 is a cross-sectional side view of the interlocking structures of FIG. 112 shown in a transitioning configuration.
Figure 119:
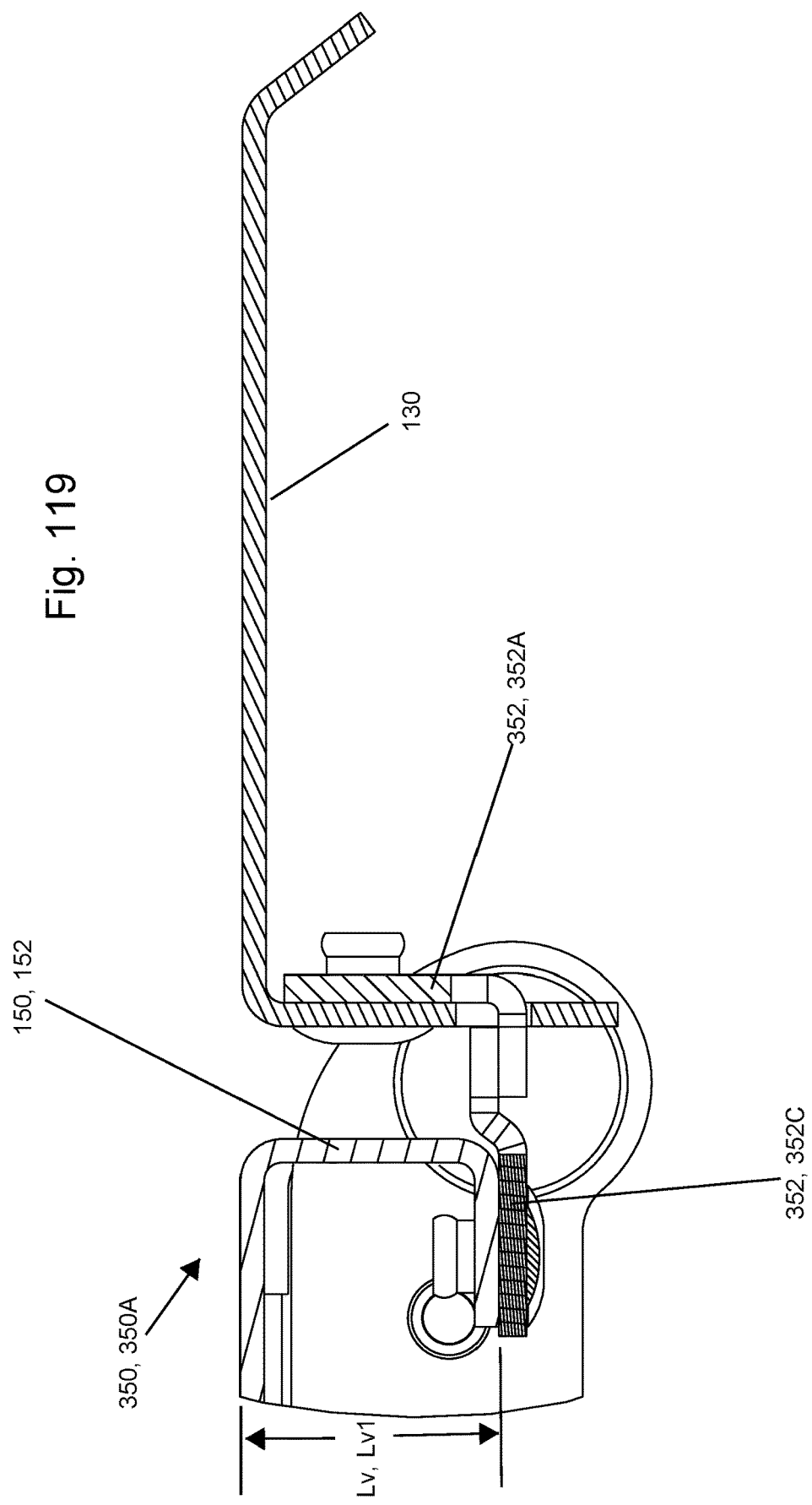
FIG. 119 is a cross-sectional side view of the interlocking structures of FIG. 112 shown in an engaged configuration.
Figure 120:
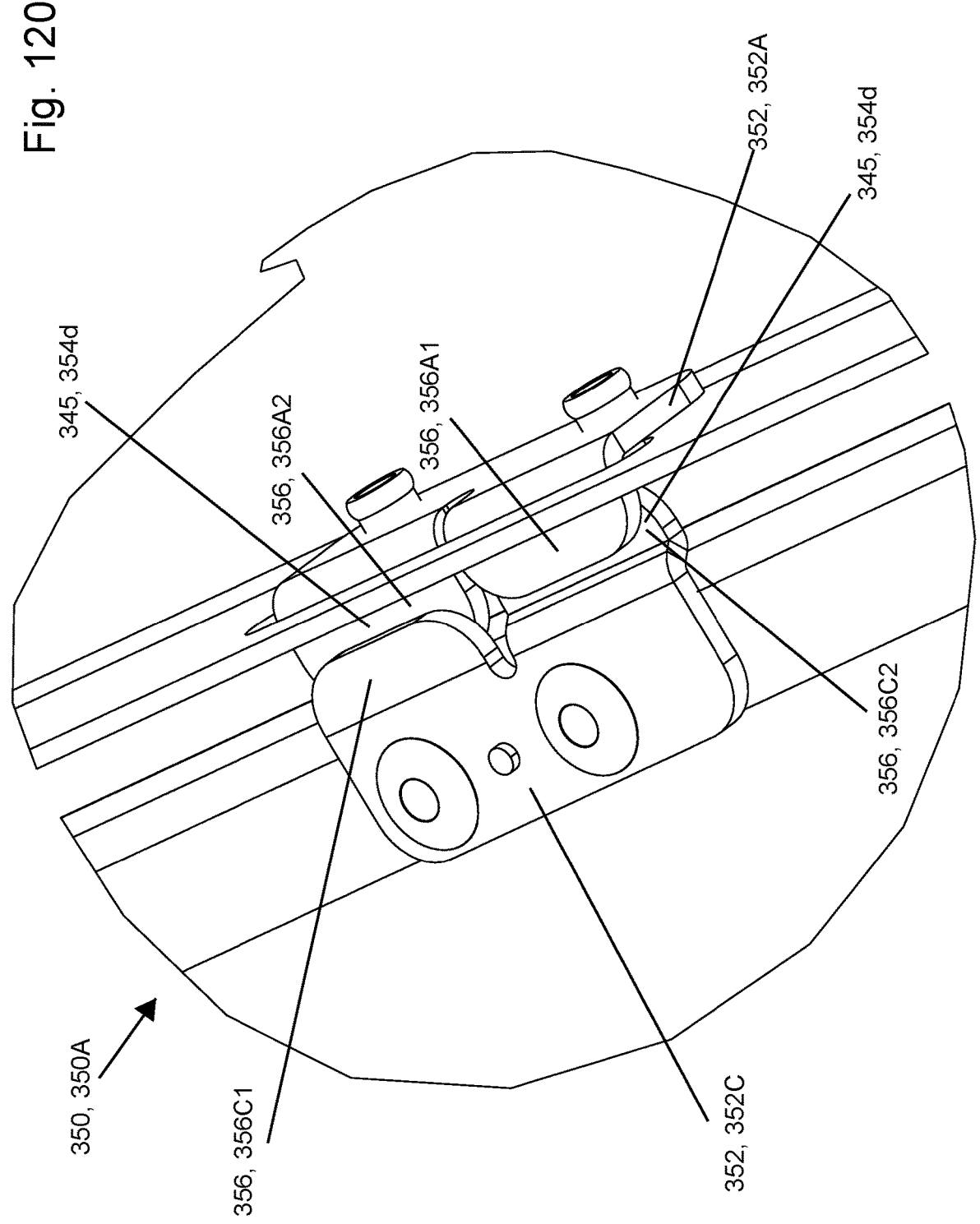
FIG. 120 is a partial perspective view of the interlocking structures of FIG. 112 shown in the engaged configuration.

Turning now to FIGS. 117-119, an engagement/disengagement sequence of the connecting structure 350A is illustrated. FIG. 117 illustrates the panel 152 in the retracted configuration 104. In the retracted configuration 104, the up-facing bearing surface 354u of the tab 356A1 faces upwardly, and the down-facing bearing surface 354d of the tab 356C2 of the connecting piece 352C faces forward. FIG. 118 illustrates the panel 152 transitioning between the retracted configuration 104 and the deployed configuration. The up-facing surface 354u continues to face in the upward direction while the down-facing surface 354d rotates and increasingly faces in a downward direction as the panel 152 moves toward the extended configuration 102. At FIG. 119, the panel 152 is in the deployed (i.e., extended) configuration and the up-facing surface 354u is in contact with the down-facing surface 354d. A similar but opposite action occurs between the tab 356A2 and the tab 356C1.

Thus, when the panel 152 is in the extended configuration 102, the connecting structure 350A prevents upward and downward relative movement between the front cross-member 130 and the panel 152. It is noted that the joint hingedly connecting the front cross-member 130 with the panel 152 is similar to the joint 200A in that a pivot axis of the joint, defined by the mounting brackets 610 and 620, is below the top surfaces 150t of the panels 150, when deployed.

Figure 93:
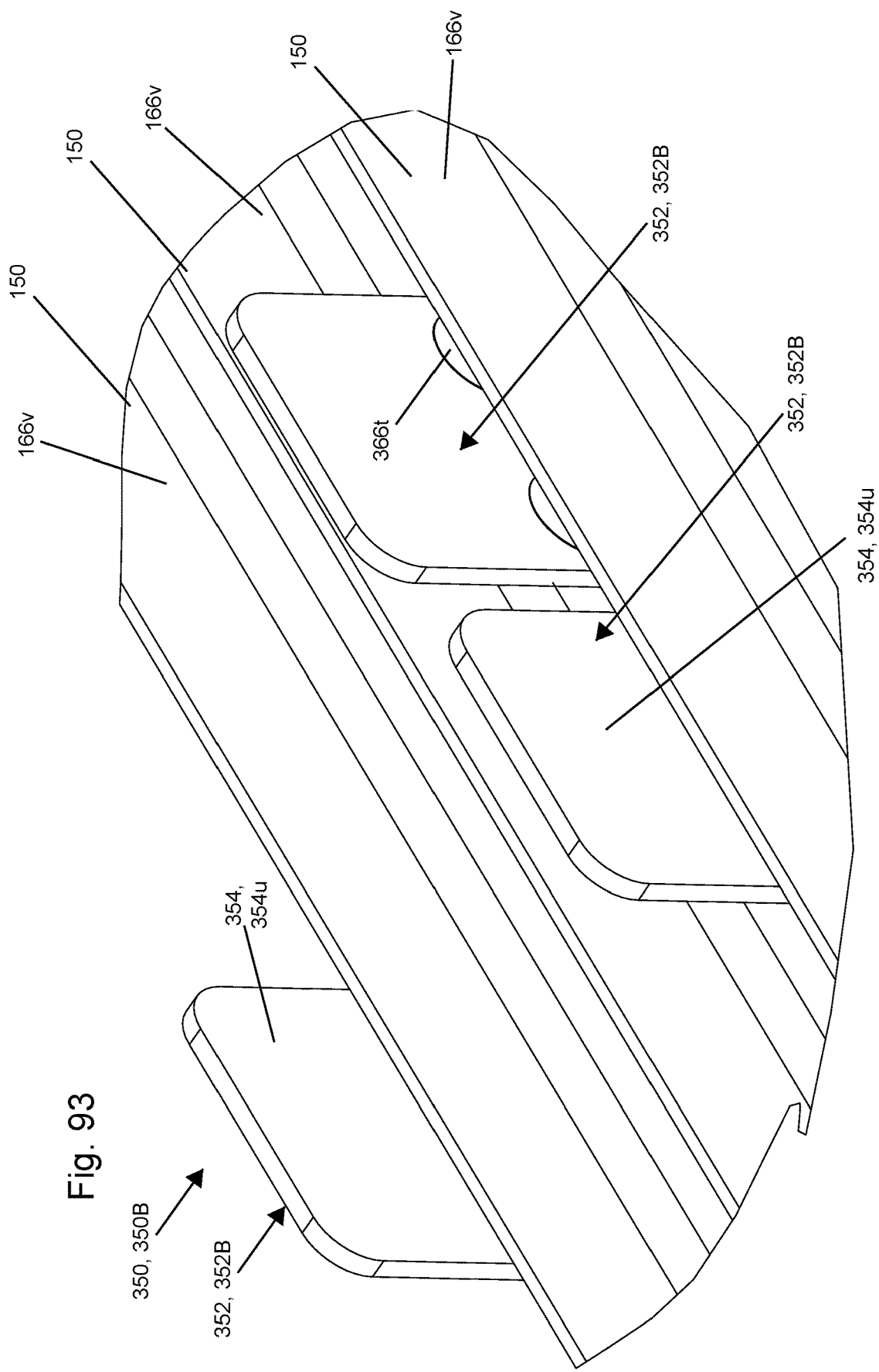
FIG. 93 is a partial perspective view of the interlocking structures of FIG. 92 shown in the decoupled configuration.
Figure 94:
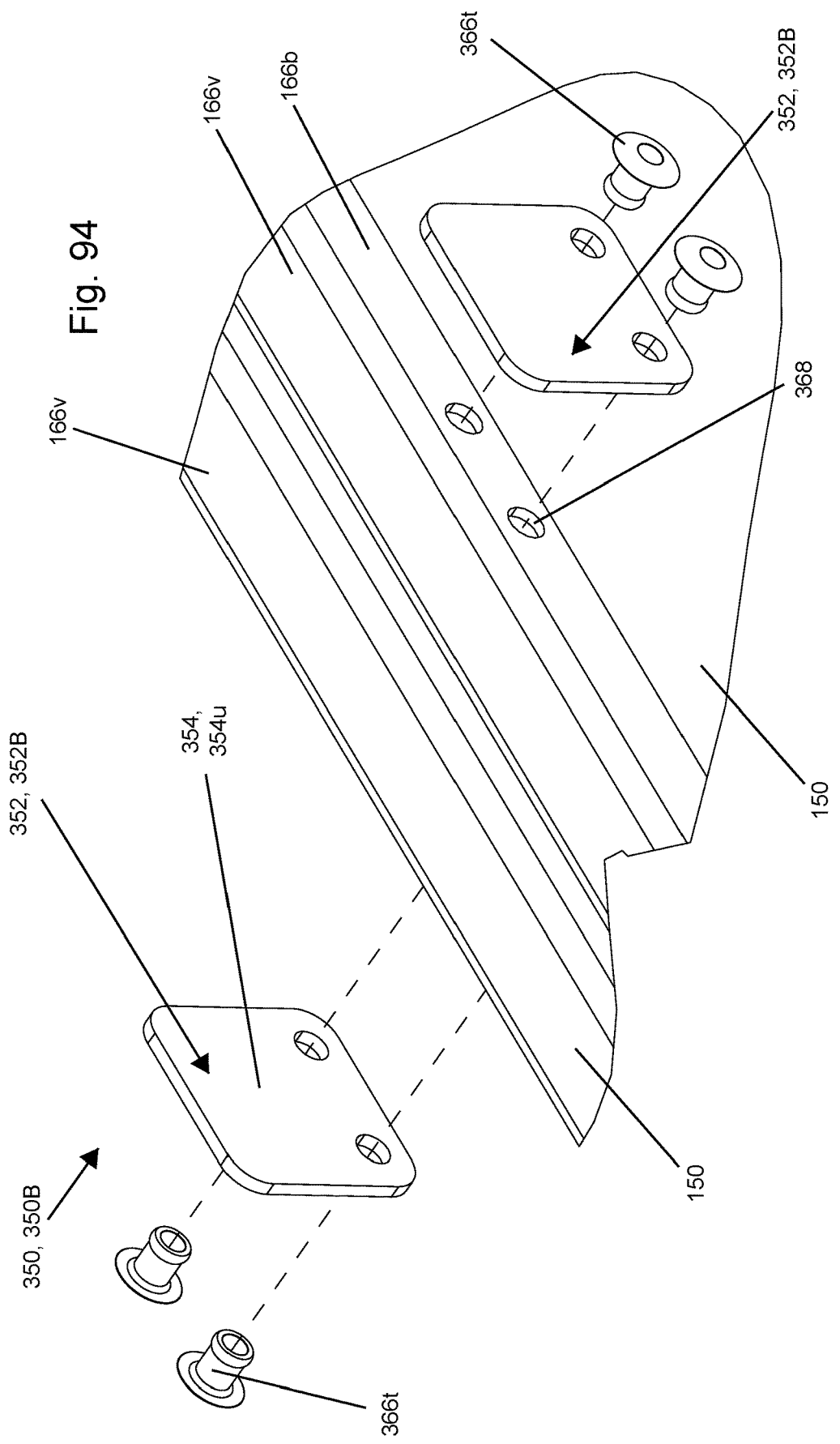
FIG. 94 is a partial exploded perspective view of the interlocking structures of FIG. 92 shown in the decoupled configuration.
Figure 95:
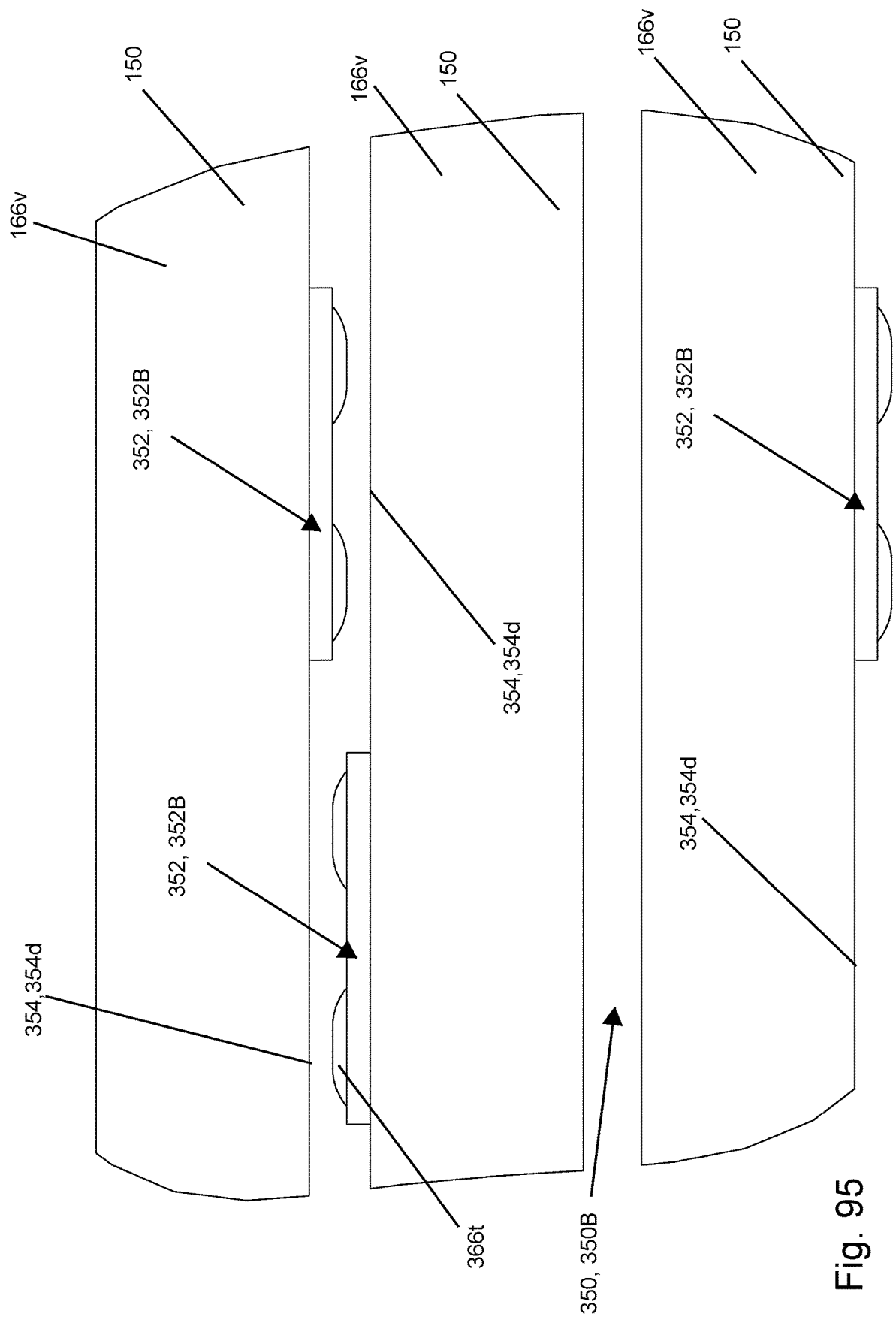
FIG. 95 is a plan view of the interlocking structures of FIG. 92 shown in the decoupled configuration.
Figure 96:
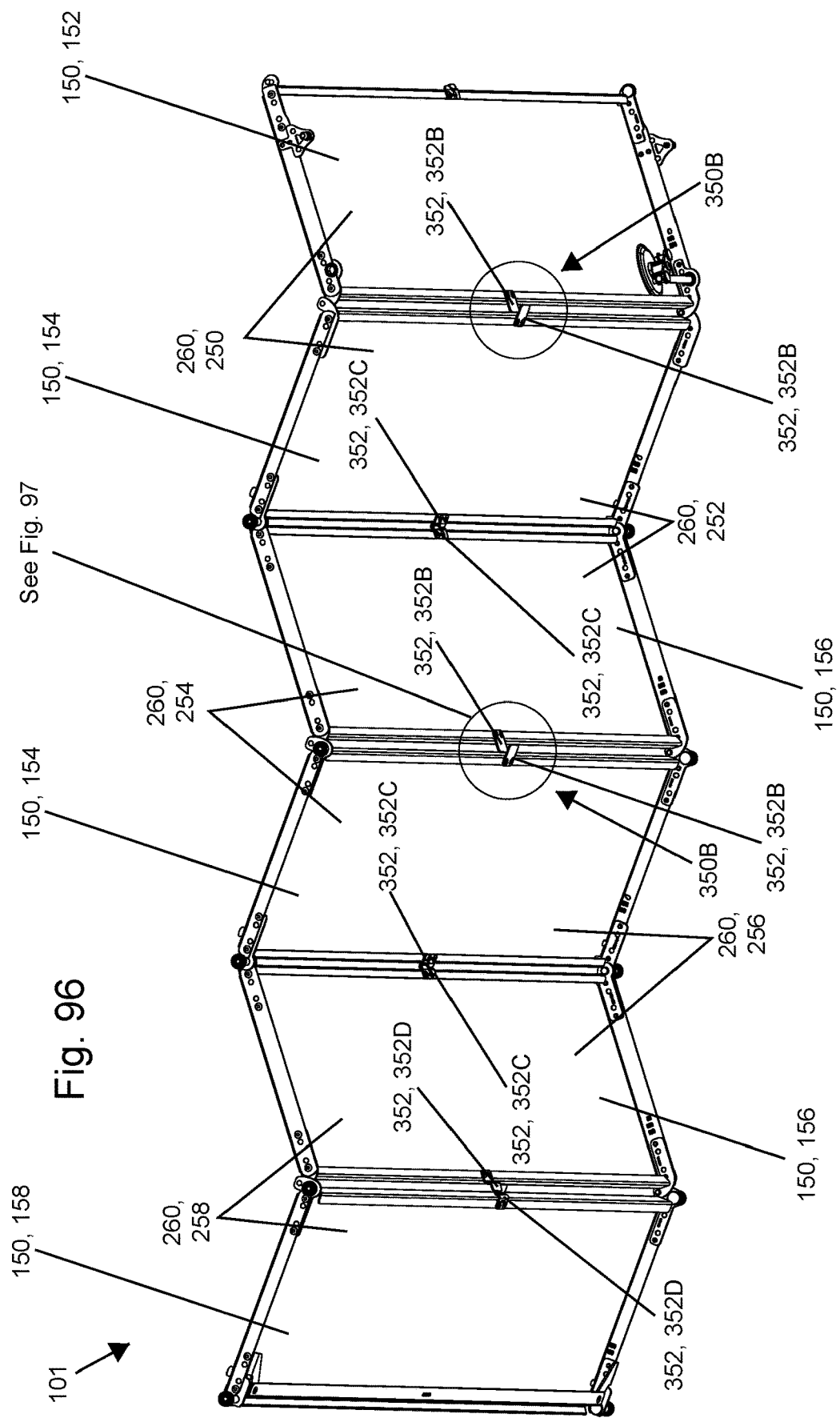
FIG. 96 is a perspective view of the panel assembly of FIG. 8 further illustrating the interlocking structures of FIG. 92.
Figure 97:
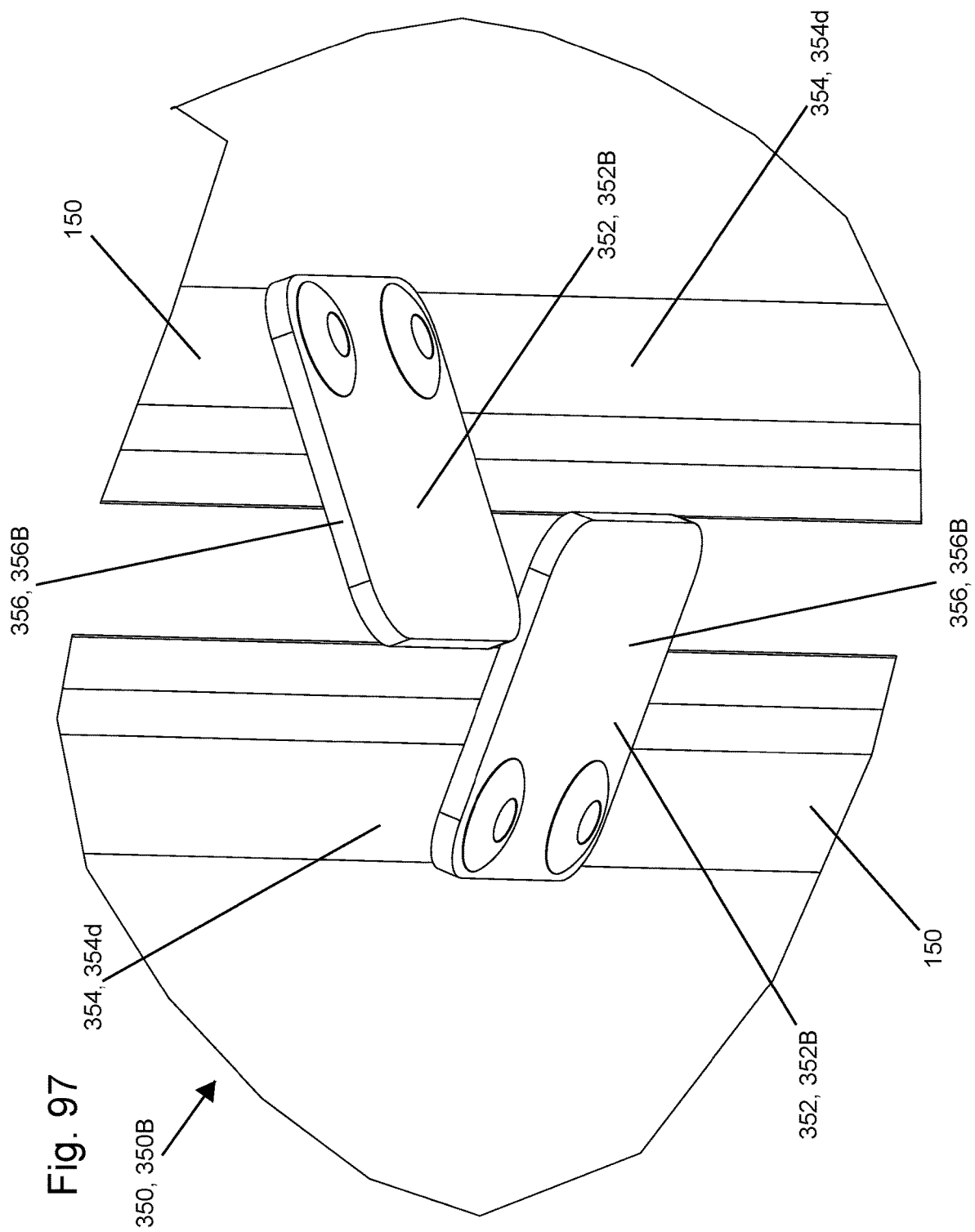
FIG. 97 is a partial perspective view of the interlocking structures of FIG. 92 shown in a transitioning configuration.
Figure 98:
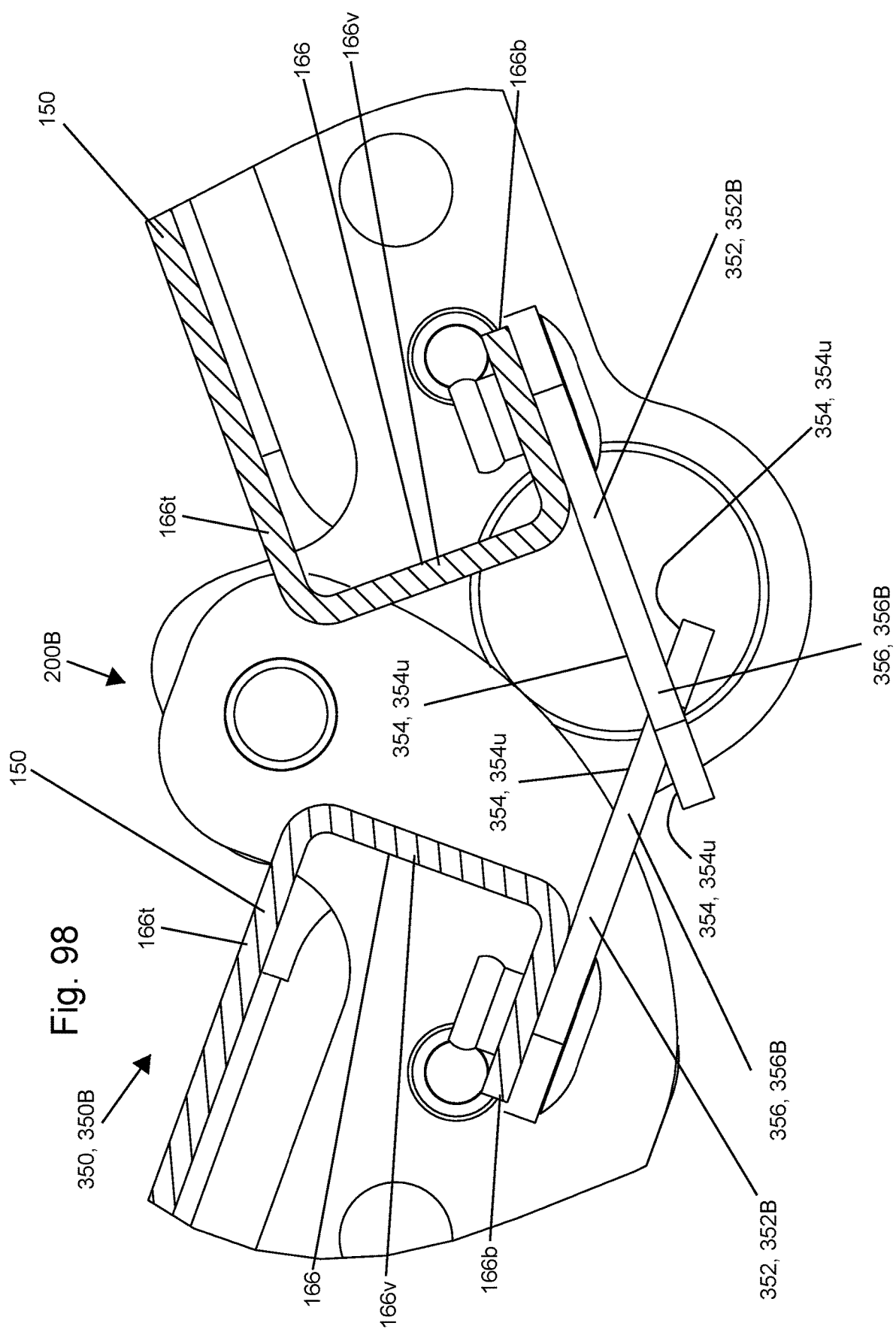
FIG. 98 is a cross-sectional side view of the interlocking structures of FIG. 92 shown in a transitioning configuration.

Turning now to FIGS. 93-101, the connecting structure 350B will be described in detail. The connecting structure 350B includes a pair of connecting pieces 352B of the connecting pieces 352 and portions of the bottom leg 166b of the C-channel feature 166 of the adjoining panels 150. As illustrated at FIG. 94, the connecting pieces 352B are fastened to the bottom leg 166b of the C-channel feature 166. As depicted, the connecting pieces 352B are connected with a pair of the fasteners 366t through a pair of holes 368. As illustrated at FIG. 95, the connecting pieces 352B, and therefore the fasteners 366t, are staggered. By including a staggered pattern, the connecting structure 350B can be made more compact. By staggering the connecting pieces 352B, the connecting pieces 352B avoid interfering with each other. In addition, the fasteners 366t and the heads of the fasteners 366t also avoid interfering with the fasteners 366t of the opposite connecting piece 352B. As illustrated at FIG. 97, the down-facing bearing surfaces 354d are included on a portion of the bottom leg 166b of the C-channel feature 166. As illustrated at FIG. 98, the up-facing bearing surfaces 354u are included on a tab 356B of the connecting piece 352B. A first of the connecting pieces 352B is on a first panel of an adjacent pair 260 of the panels 150, and a second of the connecting pieces 352B is connected to the opposite panel 150. As depicted, the connecting pieces 352B can be identical parts.

Figure 99:
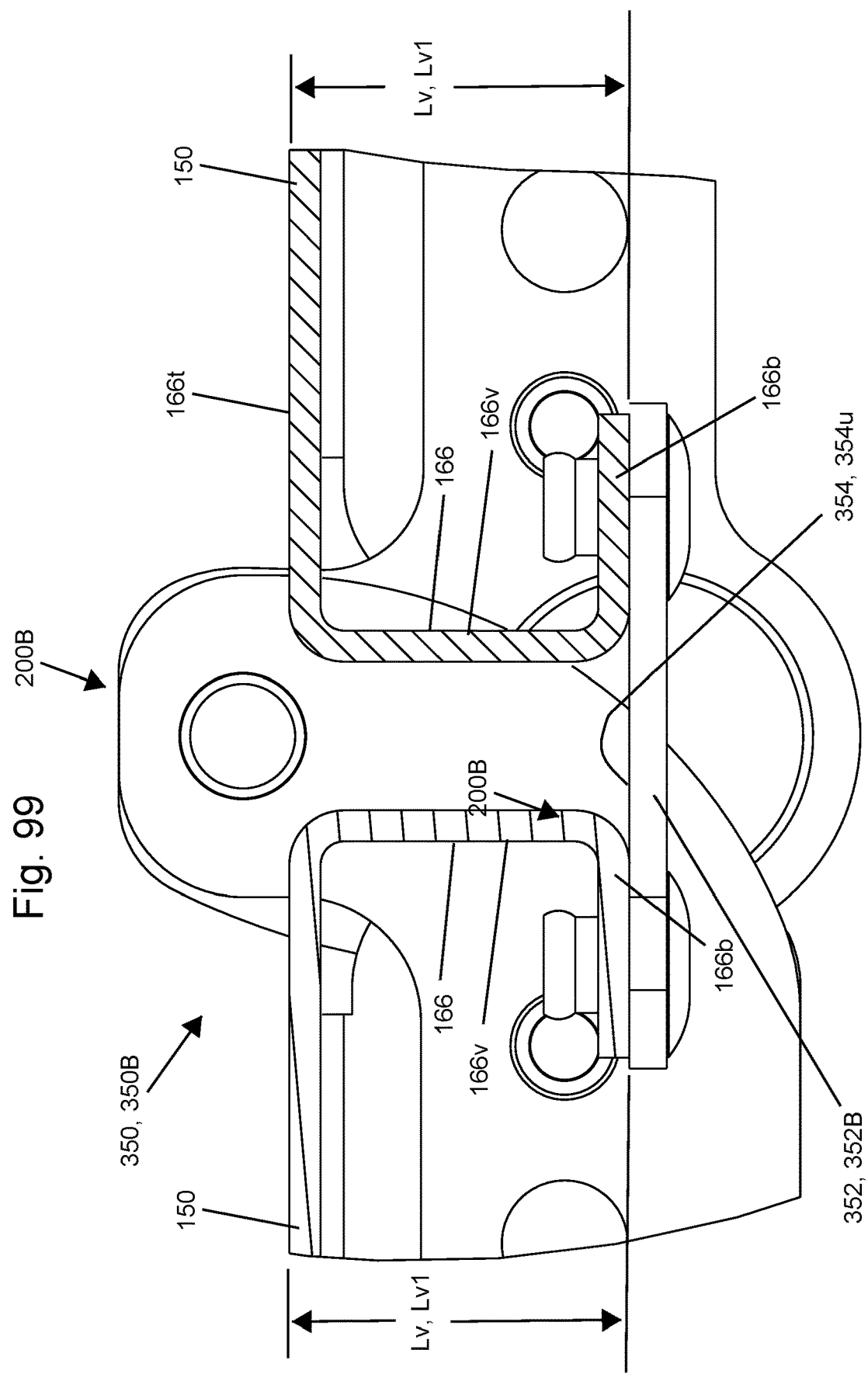
FIG. 99 is a cross-sectional side view of the interlocking structures of FIG. 92 shown in an engaged configuration.
Figure 100:
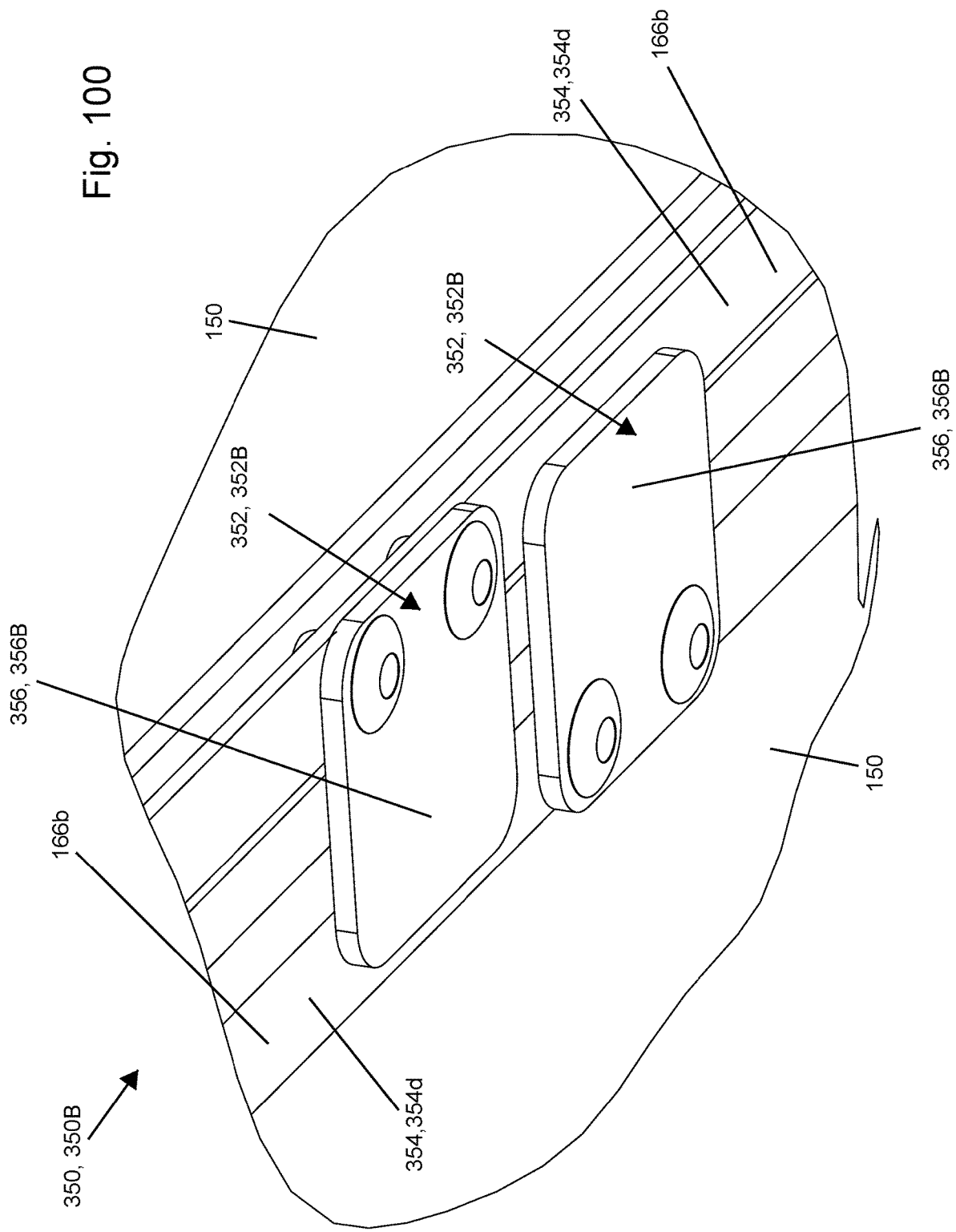
FIG. 100 is a partial perspective view of the interlocking structures of FIG. 92 shown in the engaged configuration.
Figure 101:
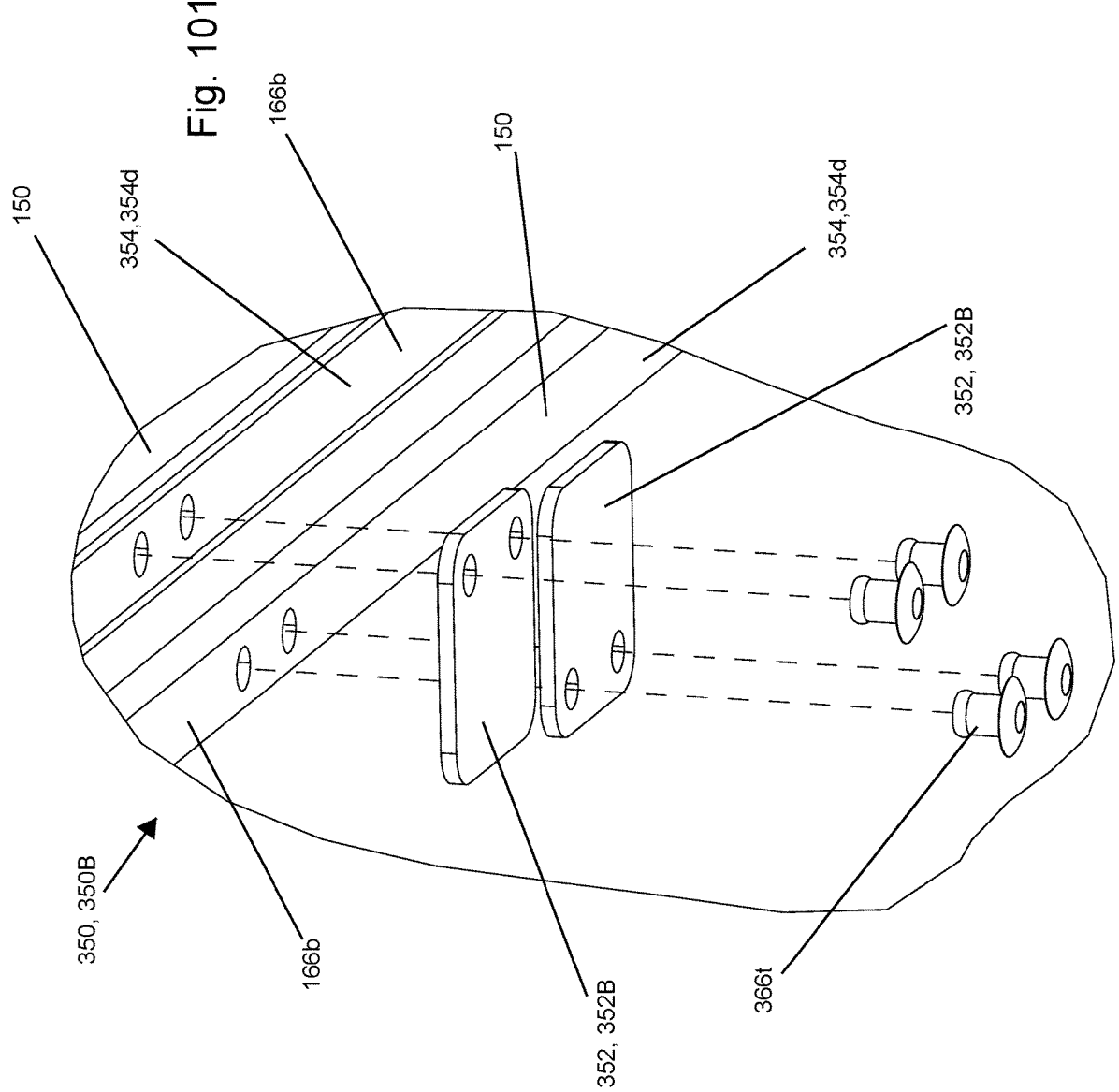
FIG. 101 is a partial exploded perspective view of the interlocking structures of FIG. 92 shown in the engaged configuration.
Figure 102:
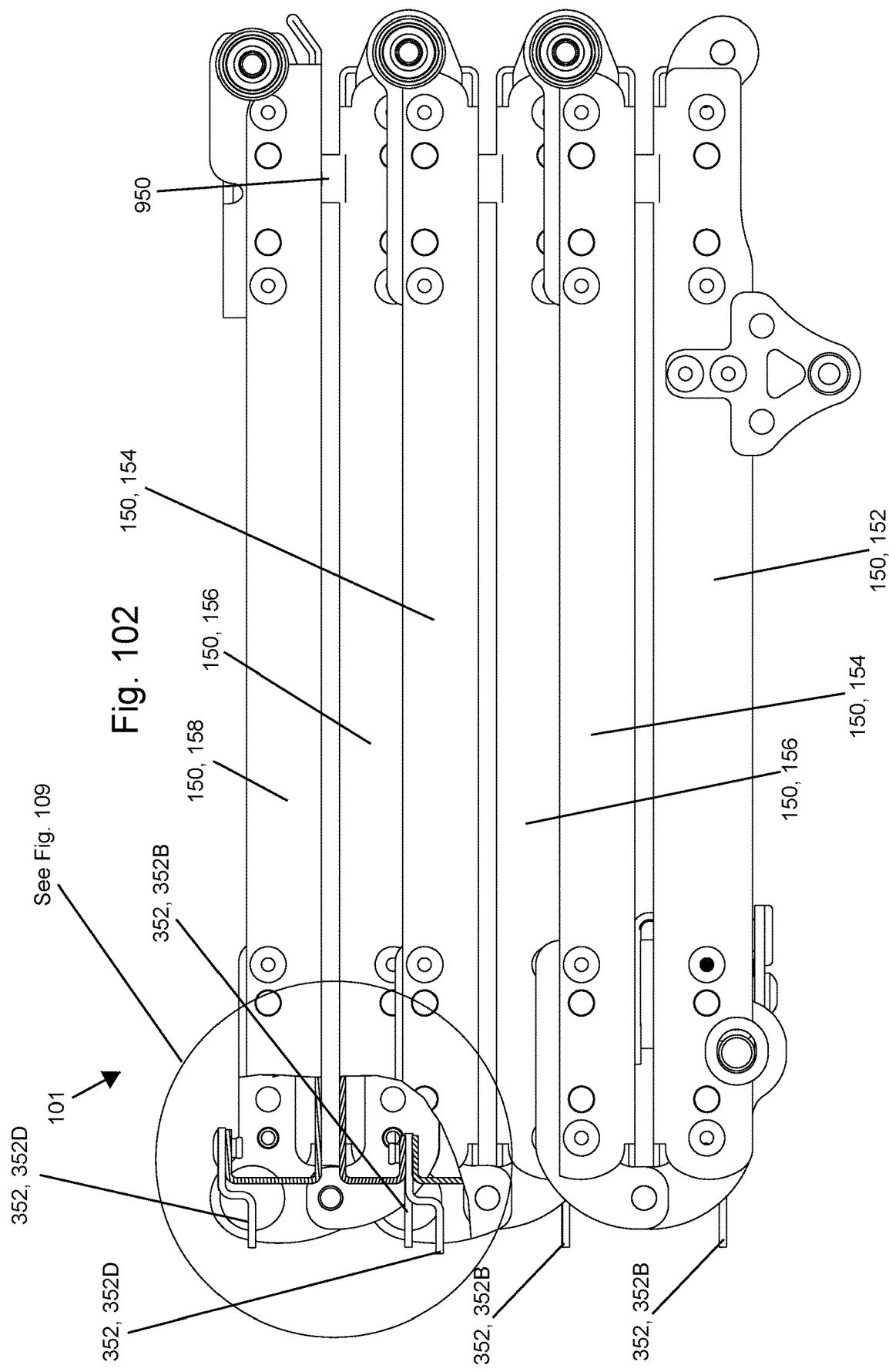
FIG. 102 is a cross-sectional side view of the panel assembly of FIG. 8 further illustrating still other interlocking structures for interlocking a panel pair of the panel assembly according to the principles of the present disclosure, the interlocking structures shown in a decoupled configuration.

Turning now to FIGS. 93, 98, and 99, an engagement/disengagement sequence of the connecting structure 350B is illustrated. FIG. 93 illustrates the connecting structure 350B when the retractable cover system 100 is in the fully retracted configuration 104. In this configuration, the up-facing surfaces 354u and the down-facing surfaces 354d face in a forward/rearward direction that is generally horizontal. FIG. 98 illustrates the adjacent pair 260 of panels 150 between the extended 102 and the retracted configurations 104. As illustrated at FIG. 98, as the retractable cover system 100 moves toward the extended (i.e., deployed) configuration, the up-facing surfaces 354u increasingly face in an upward direction and the down-facing surfaces 354d increasingly face in a downward direction. FIG. 99 illustrates the connecting structure 350B in an engaged configuration with the retractable cover system 100 fully deployed. In the fully deployed configuration, the up-facing surfaces 354u engage the down-facing surface 354d of the opposite panel. Likewise, the up-facing surface 354u of the opposite tab 356B engages the down-facing surface 354d of the opposite panel 150.

Therefore, as illustrated at FIG. 99, the pair of the tabs 356B of the connecting pieces 352B engage with opposite portions of the bottom leg 166b of the C-channel features 166 and thereby prevent upward and downward movement across the adjacent pairs 260 of the panels 150. FIGS. 98 and 99 generally illustrate the joint 200B as the axis of the joint 200B is above the top surfaces 150t of the panels 150 when the retractable cover system 100 is in the deployed configuration.

Figure 82:
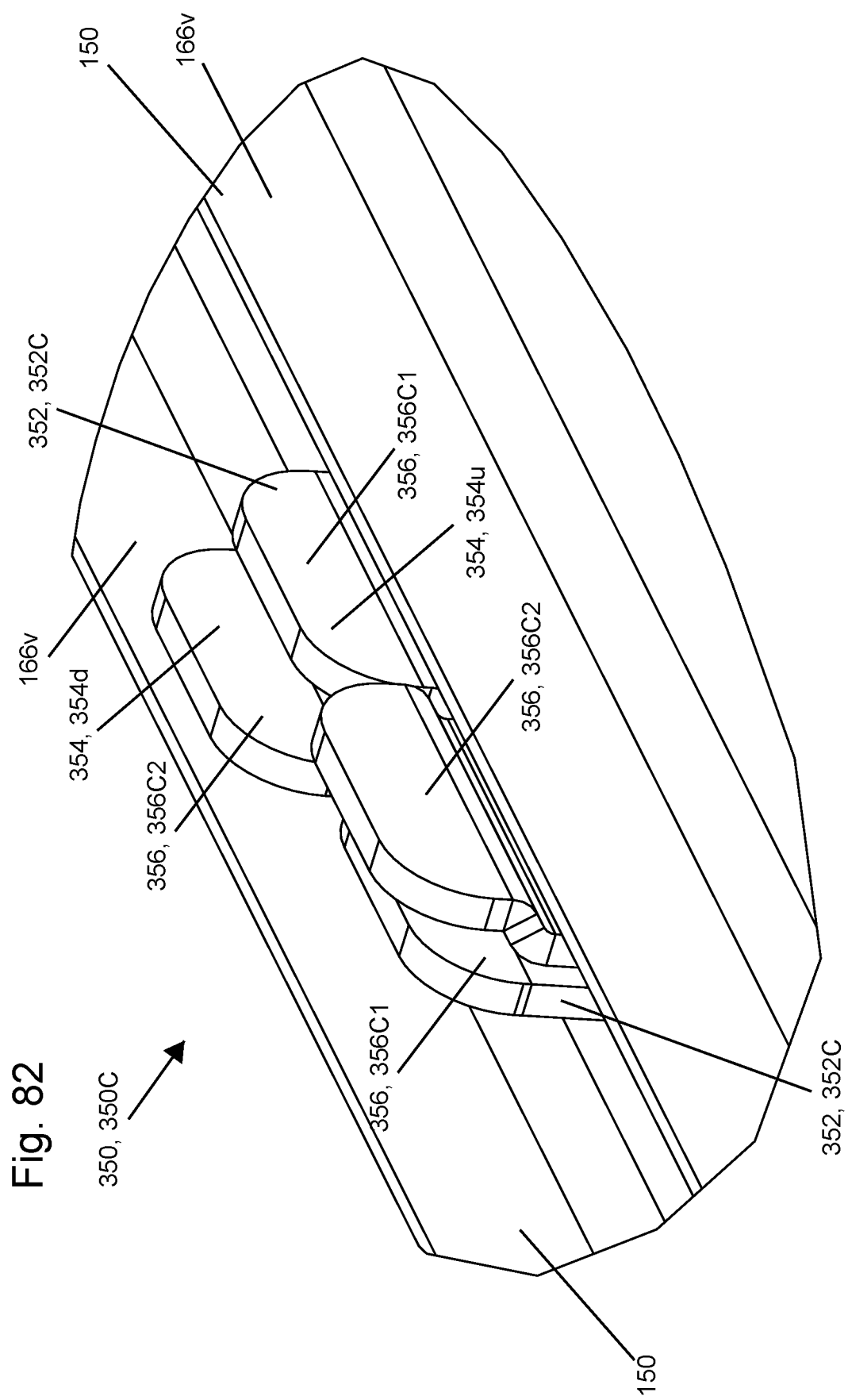
FIG. 82 is an enlarged portion of FIG. 81.
Figure 83:
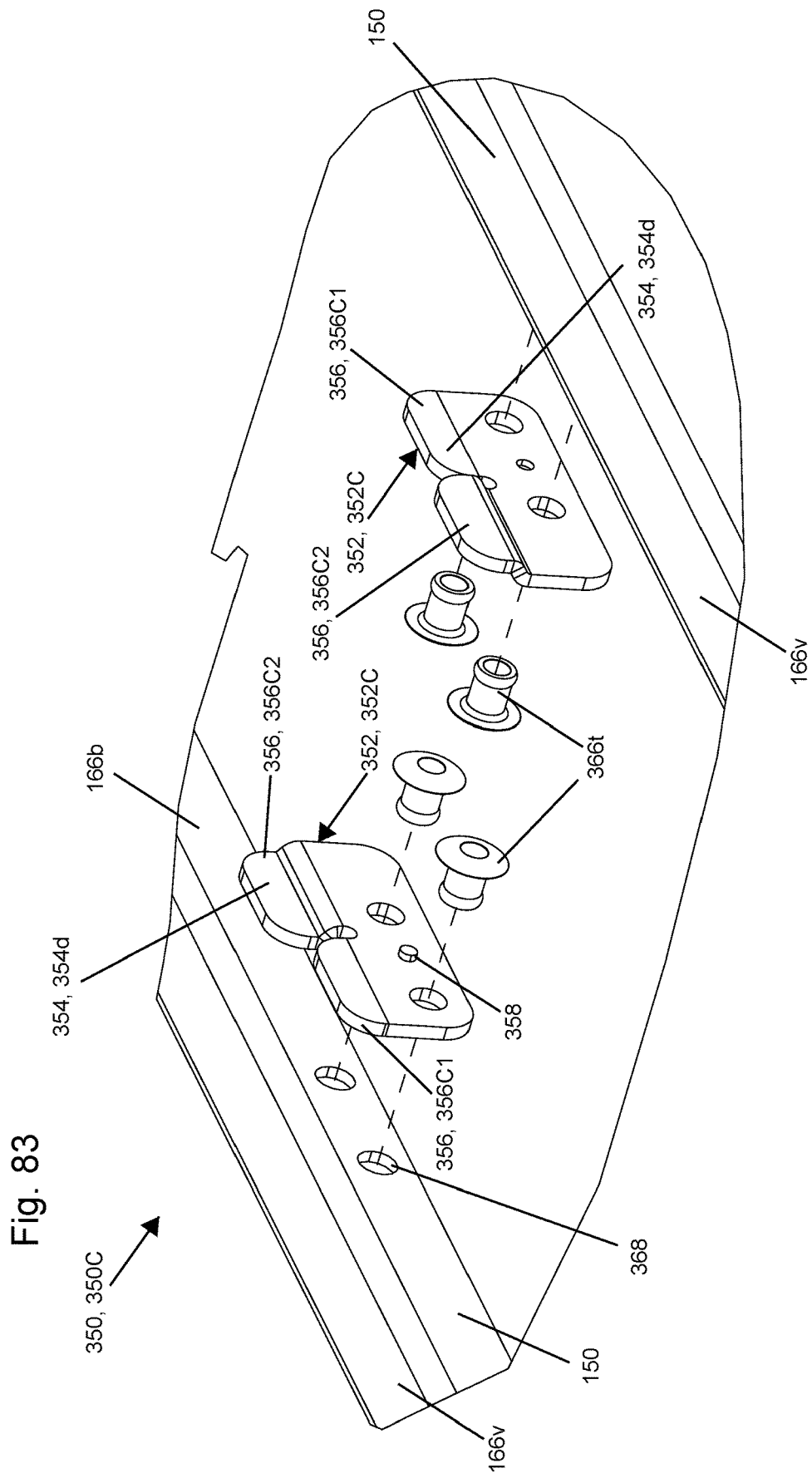
FIG. 83 is an exploded portion of FIG. 82.
Figure 84:
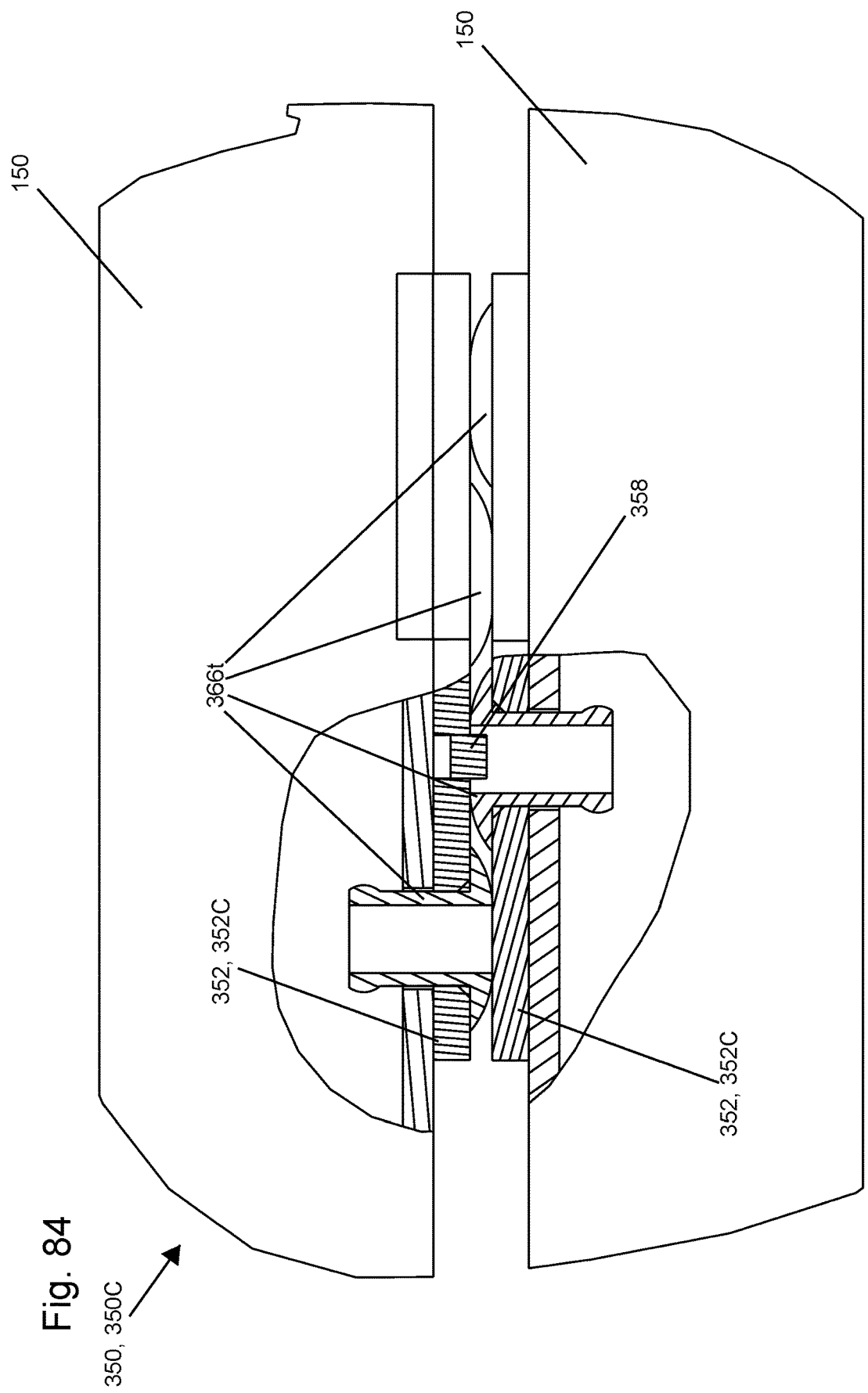
FIG. 84 is a partial top plan partial cross-sectional view of the interlocking structures of FIG. 81 shown in the decoupled configuration.
Figure 85:
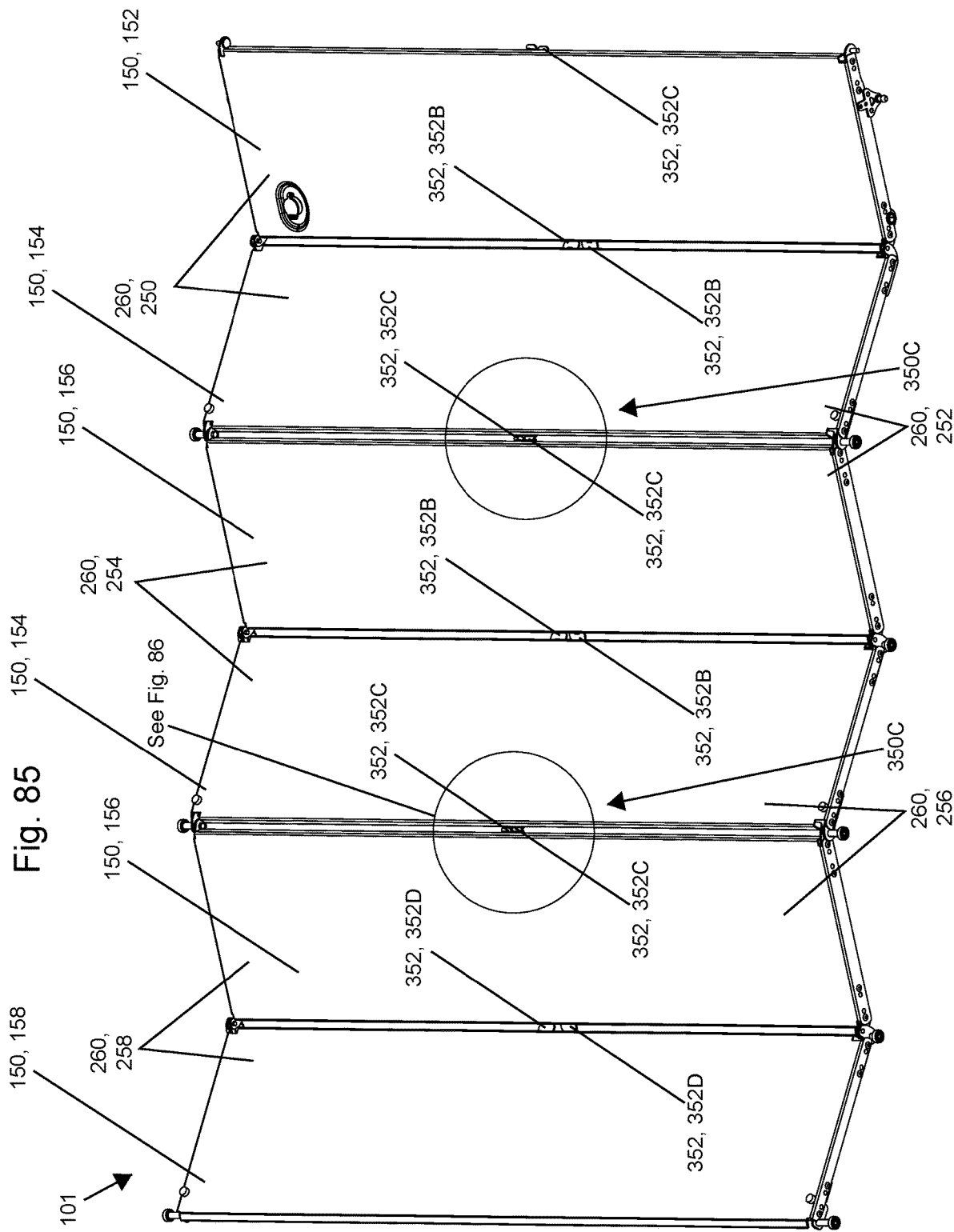
FIG. 85 is a perspective view of the panel assembly of FIG. 8 further illustrating the interlocking structures of FIG. 81.

Turning now to FIGS. 82-91, the connecting structure 350C will be described in detail. The connecting structure 350C includes a pair of connecting pieces 352C of the connecting pieces 352. As illustrated at FIG. 83, the connecting pieces 352C are fastened to the bottom leg 166b of the C-channel feature 166. As depicted, the connecting pieces 352C are connected with a pair of the fasteners 366t through a pair of holes 368. As illustrated at FIG. 84, the fasteners 366t of the connecting pieces 352C are staggered. By including a staggered pattern, the connecting structure 350C can be made more compact. By staggering the fasteners 366t of the connecting pieces 352C, the fasteners 366t avoid interfering with each other. In particular, the heads of the fasteners 366t avoid interfering with the heads of the fasteners 366t of the opposite connecting piece 352C.

Figure 86:
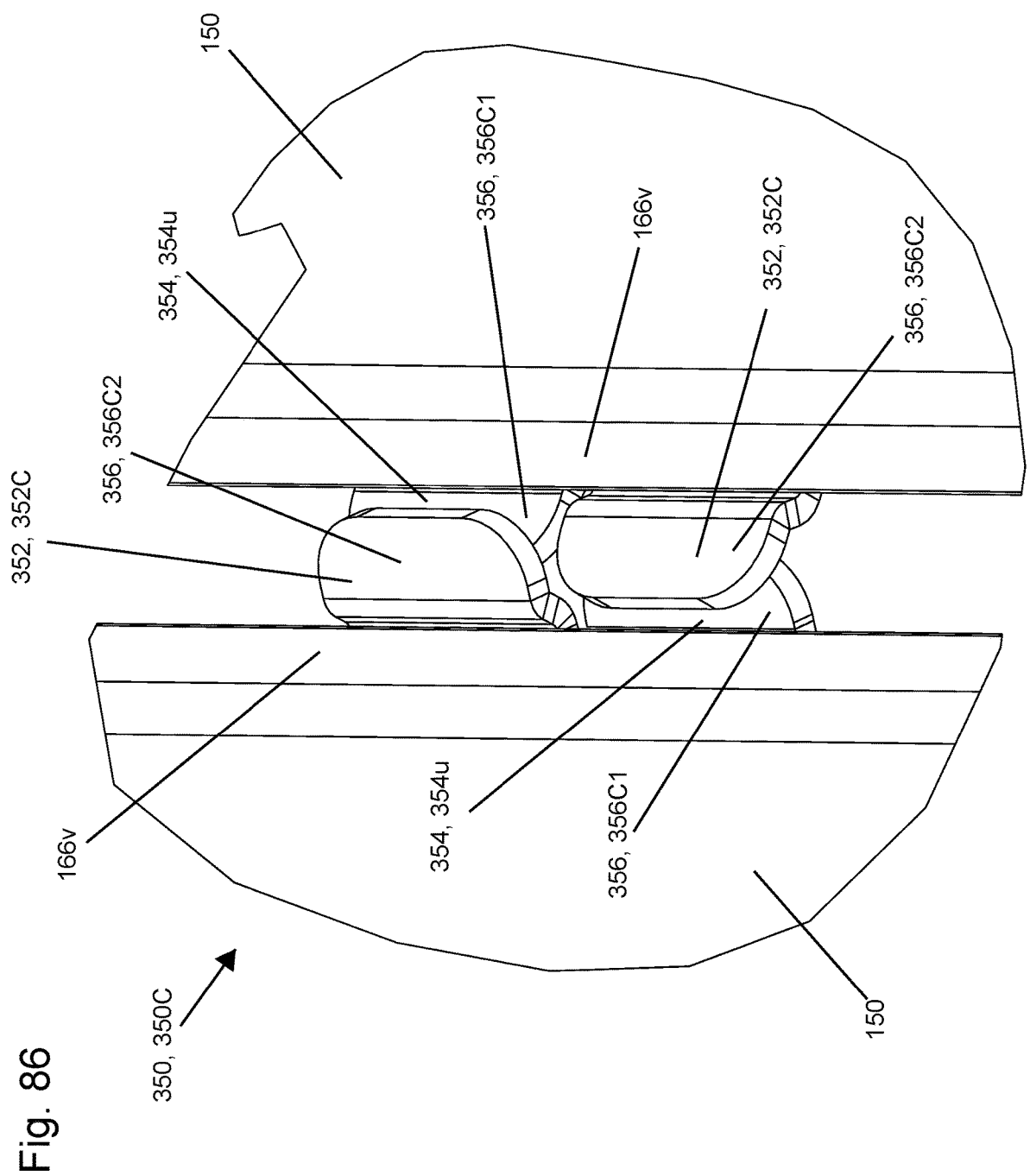
FIG. 86 is an enlarged portion of FIG. 85 illustrating the interlocking structures of FIG. 81 shown in a transitioning configuration.
Figure 87:
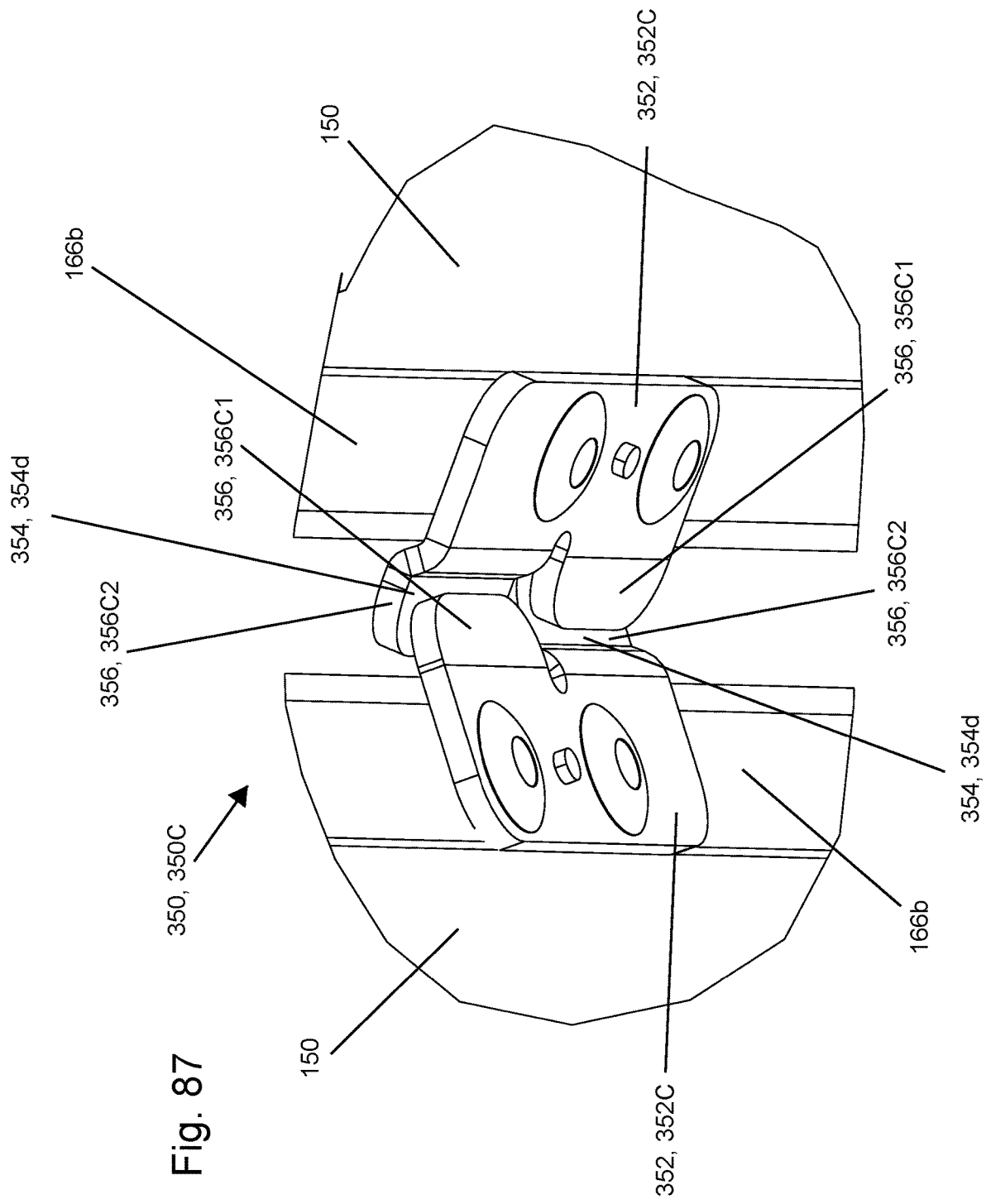
FIG. 87 is a partial perspective view of the interlocking structures of FIG. 81 shown in a transitioning configuration.

As illustrated at FIG. 87, the down-facing bearing surfaces 354d are included on a tab 356C2 of the connecting piece 352C. As illustrated at FIG. 86, the up-facing bearing surfaces 354u are included on a tab 356C1 of the connecting piece 352C. The first and the second tabs 356C1, 356C2 may be included on the same connecting piece 352C (e.g., in a split-finger arrangement). A first of the connecting pieces 352C is on a first panel of an adjacent pair 260 of the panels 150, and a second of the connecting pieces 352C is connected to the opposite panel 150. As depicted, the connecting pieces 352C of the connecting structure 350C can be identical parts and also be identical to the connecting piece 352C of the connecting structure 350A. As illustrated at FIGS. 86 and 87, the connecting pieces 352C of the connecting structure 350C may be identical as they are oriented relative to each other about a vertical axis and rotationally spaced away from each other by 180 degrees. As illustrated, the first tab 356C1 is a straight tab and substantially extends parallel to the bottom leg 166b. In contrast, the second tab 356C2 is an offset tab that jogs upwardly when the panel assembly 101 is in the extended configuration 102. The connecting piece 352C may include an orientation feature 358 to prevent incorrect assembly of the connecting pieces 352C to their respective panel 150. As illustrated at FIG. 84, the orientation feature 358 may fit within a hollow portion of the fastener 366t when the retractable cover system 100 is in the retracted configuration 104 and thereby not occupy space that would increase a size of the panel assembly 101 when in the retracted configuration 104.

Figure 88:
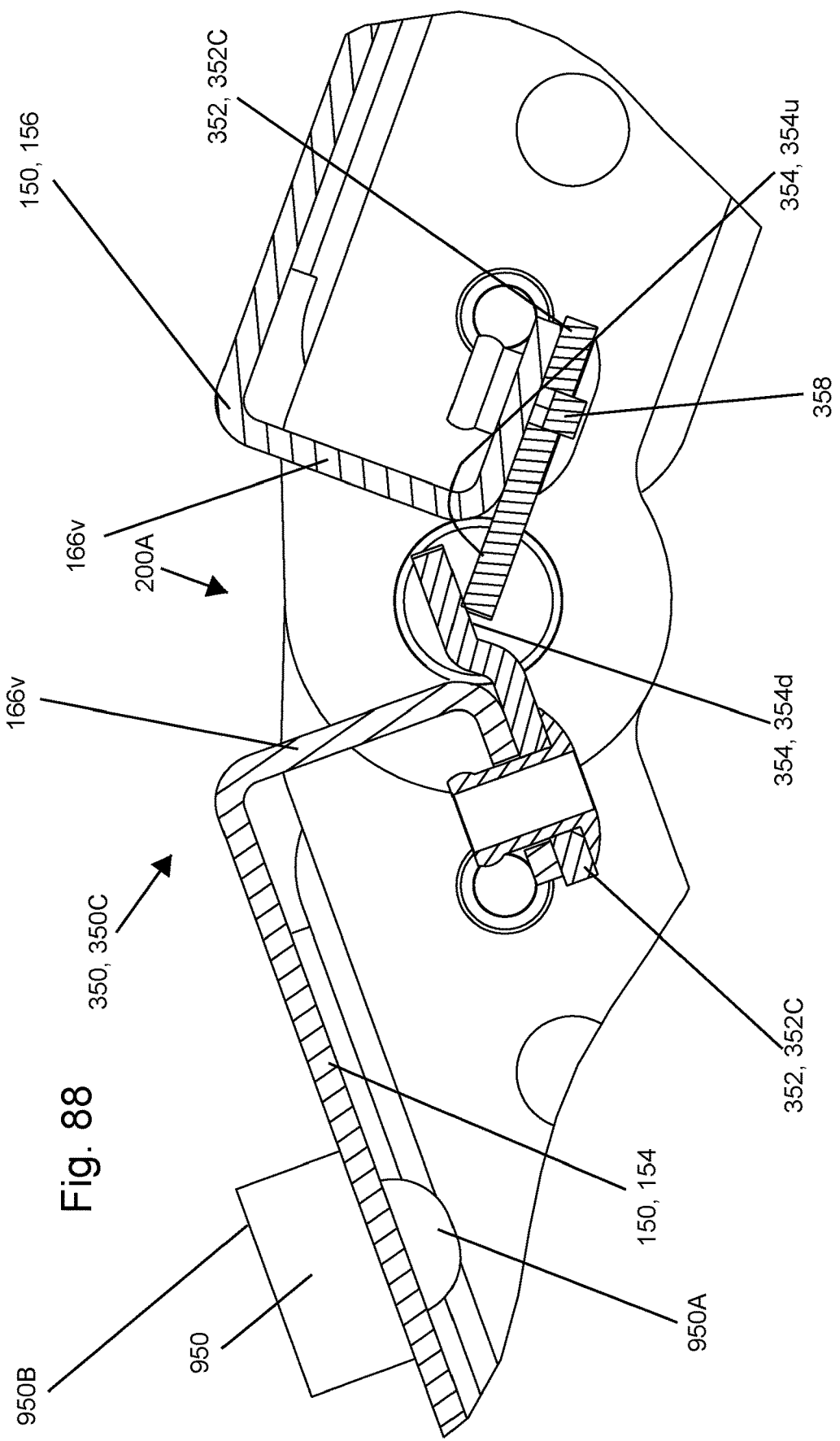
FIG. 88 is a cross-sectional side view of the interlocking structures of FIG. 81 shown in a transitioning configuration.
Figure 89:
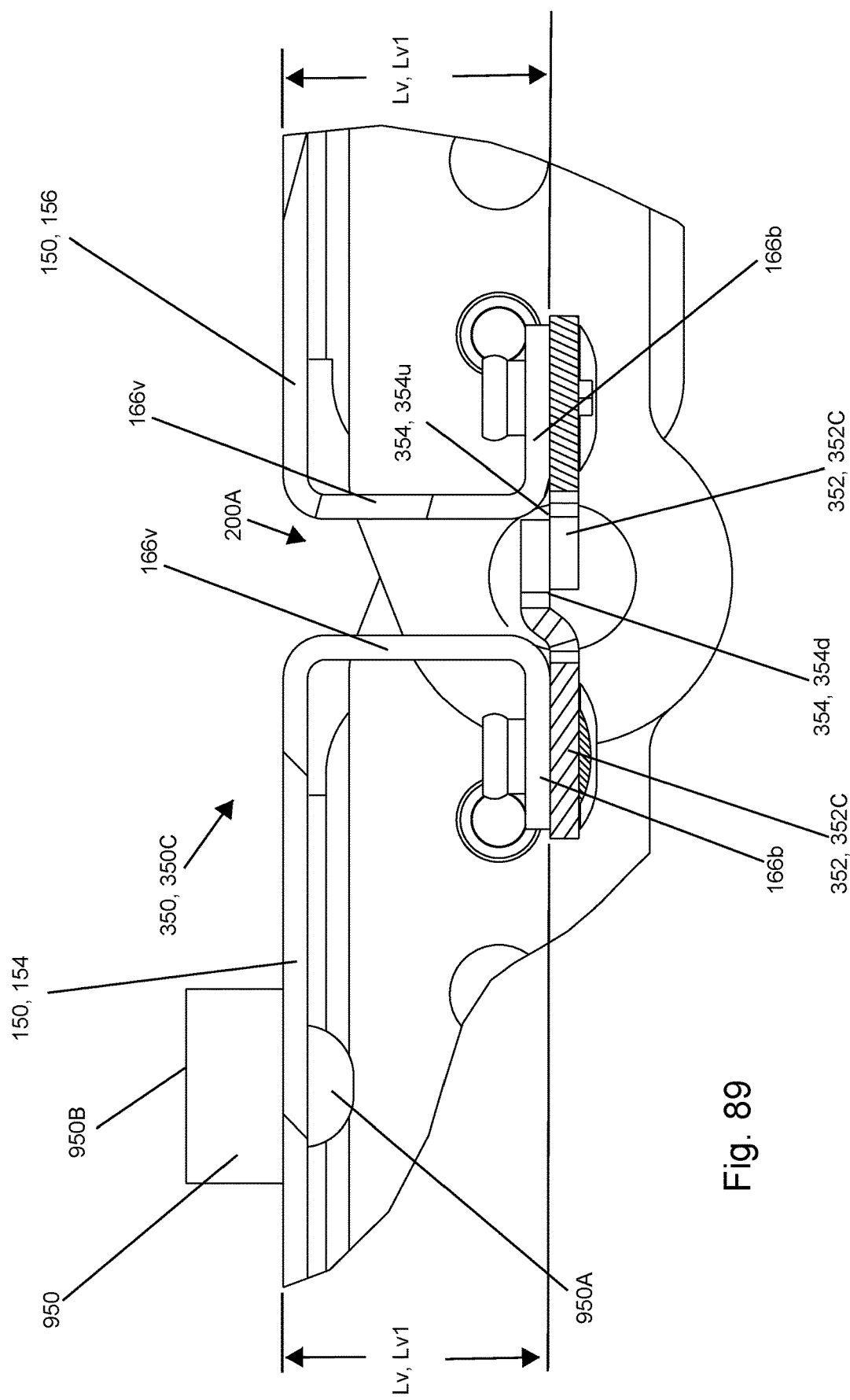
FIG. 89 is a cross-sectional side view of the interlocking structures of FIG. 81 shown in an engaged configuration.
Figure 90:
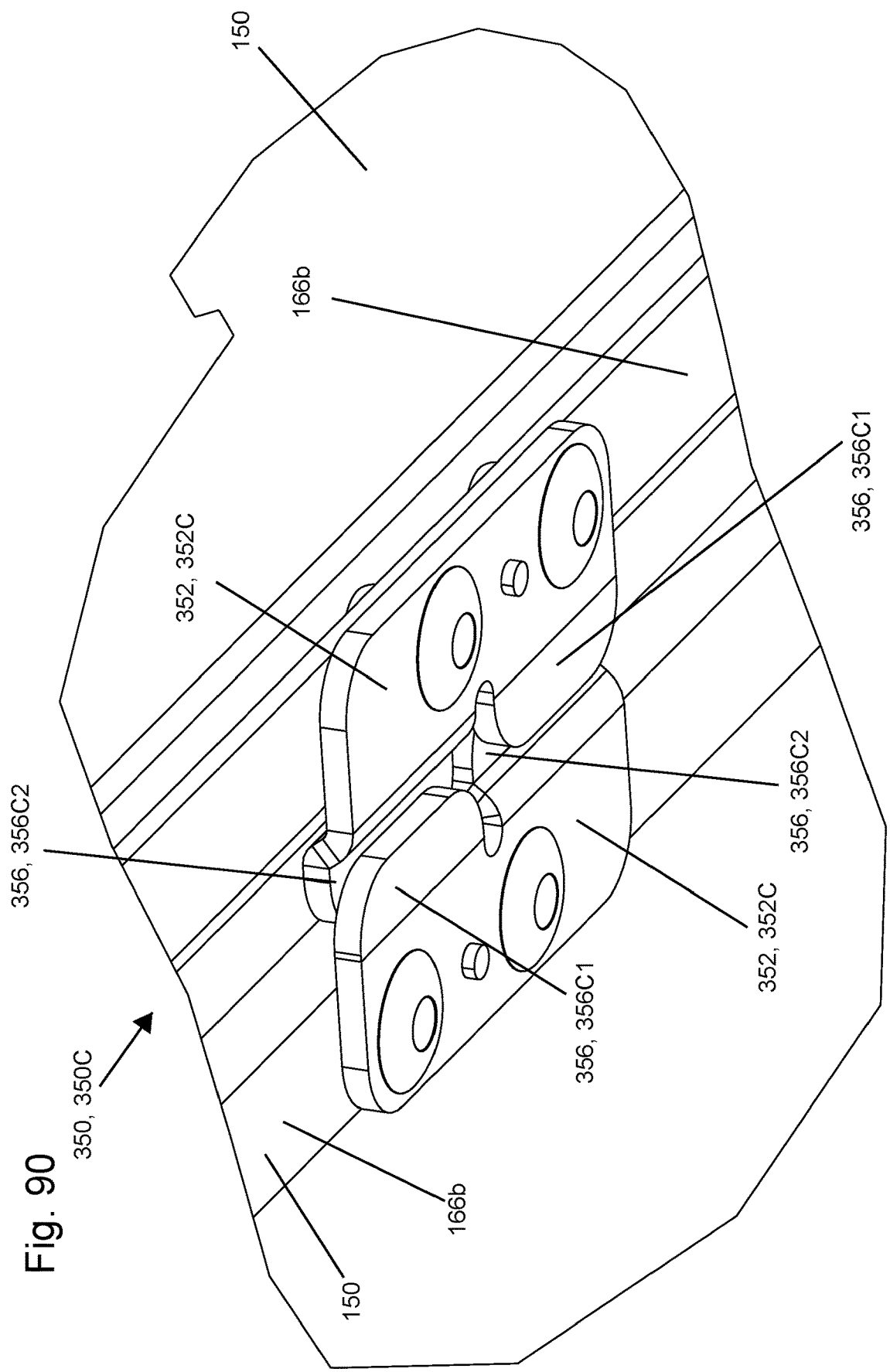
FIG. 90 is a partial perspective view of the interlocking structures of FIG. 81 shown in the engaged configuration.
Figure 91:
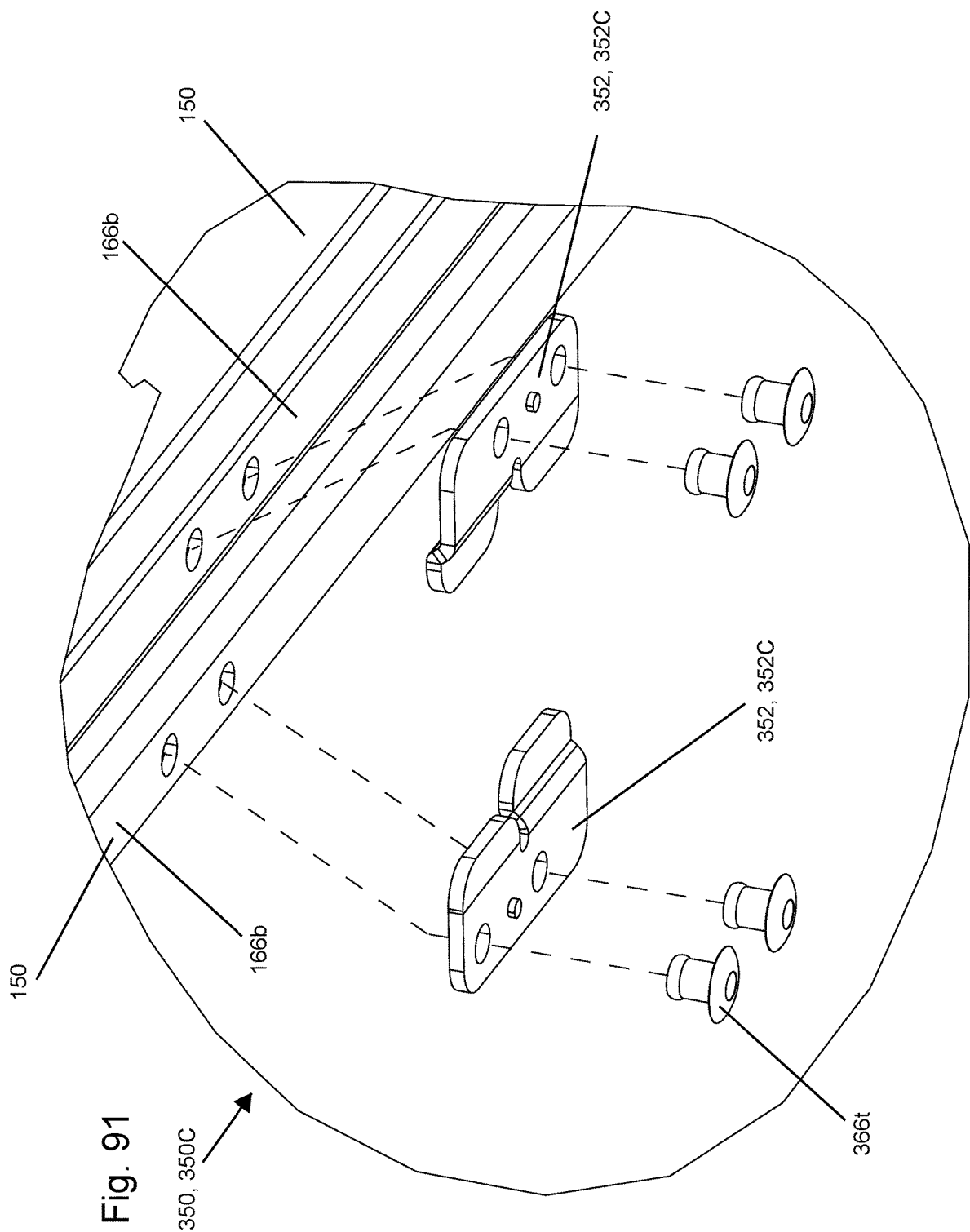
FIG. 91 is a partial exploded perspective view of the interlocking structures of FIG. 81 shown in the engaged configuration.
Figure 92:
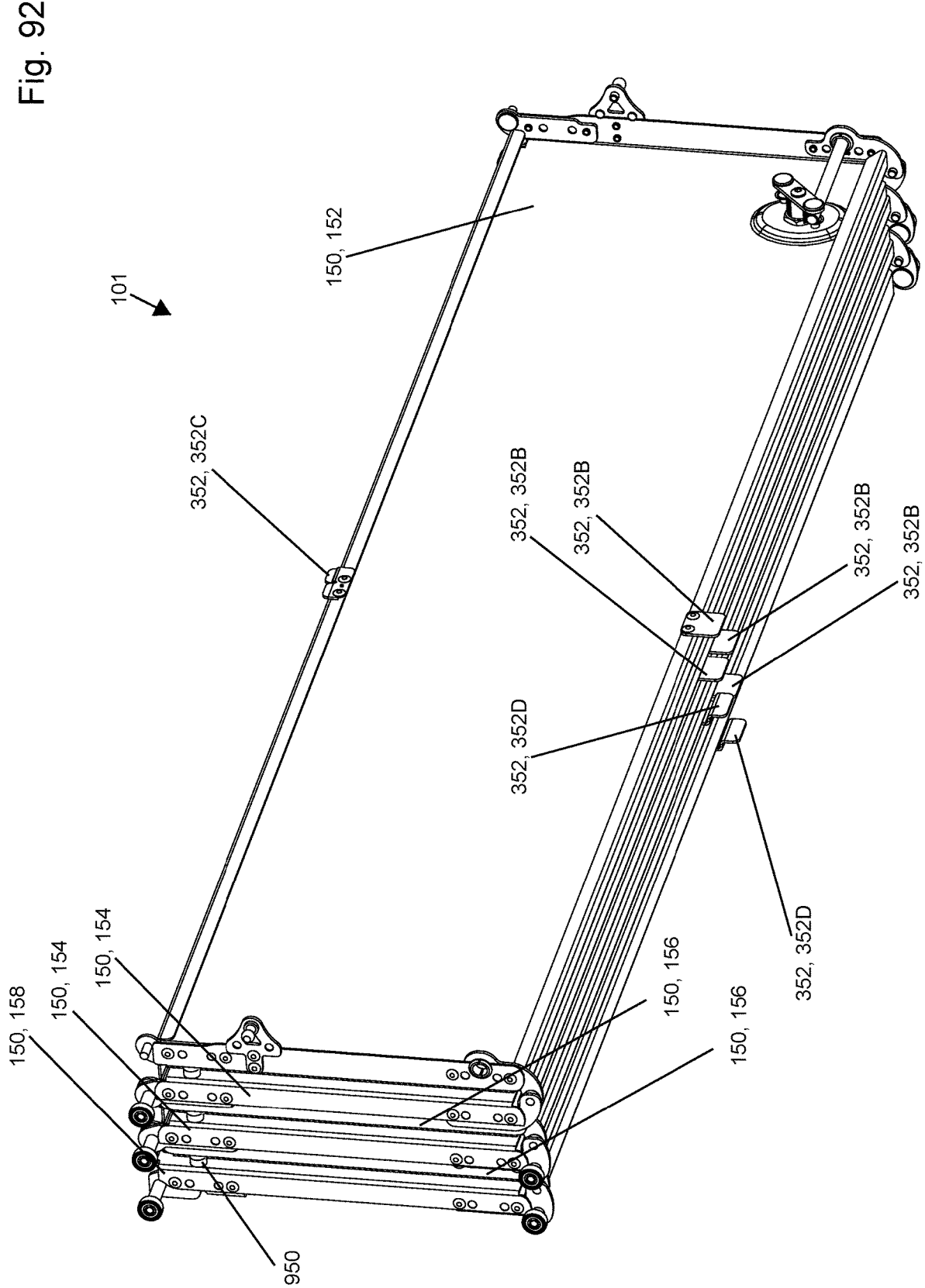
FIG. 92 is a perspective view of the panel assembly of FIG. 8 further illustrating other interlocking structures for interlocking panel pairs of the panel assembly according to the principles of the present disclosure, the interlocking structures shown in a decoupled configuration.

Turning now to FIGS. 82, 88, and 89, an engagement/disengagement sequence of the connecting structure 350C is illustrated. FIG. 82 illustrates the connecting structure 350C when the retractable cover system 100 is in the fully retracted configuration 104. In this configuration, the up-facing surfaces 354u and the down-facing surfaces 354d face in the forward/rearward direction that is generally horizontal. FIG. 88 illustrates the adjacent pair 260 of panels 150 between the extended 102 and the retracted configurations 104. As illustrated at FIG. 88, as the retractable cover system 100 moves toward the extended (i.e., deployed) configuration, the up-facing surfaces 354u increasingly face in an upward direction and the down-facing surfaces 354d increasingly face in a downward direction. FIG. 89 illustrates the connecting structure 350C in an engaged configuration with the retractable cover system 100 fully deployed. In the fully deployed configuration, the up-facing surfaces 354u of the tab 356C1 of the connecting piece 352C engages the down-facing surface 354d of the tab 356C2 of the opposite connecting piece 352C. Likewise, the up-facing surface 354u of the opposite tab 356C1 engages the down-facing surface 354d of the opposite tab 356C2.

Therefore, as illustrated at FIG. 89, the pair of the tabs 356C1, 356C2 of the connecting piece 352C engages with the opposite pair of the tabs 356C1, 356C2 of the opposite connecting piece 352C and thereby prevents upward and downward movement across the adjacent pairs 260 of the panels 150. As there are one upward 354u and one downward 354d facing bearing surface on the first connecting piece 352C and also one up-facing bearing surface 354u and one down-facing bearing surface 354d on the second connecting piece 352C, both upward and downward relative movement between the adjacent pairs 260 of the adjacent panels 150 is prevented. As illustrated at FIGS. 88 and 89, the connecting structure 350C may be used between adjacent pairs 260 of panels 150 connected by the joint 200A. The joint 200A includes an axis of rotation that is below the top surfaces 150t of the panels 150 when the retractable cover system 100 is in the extended configuration 102.

Figure 103:
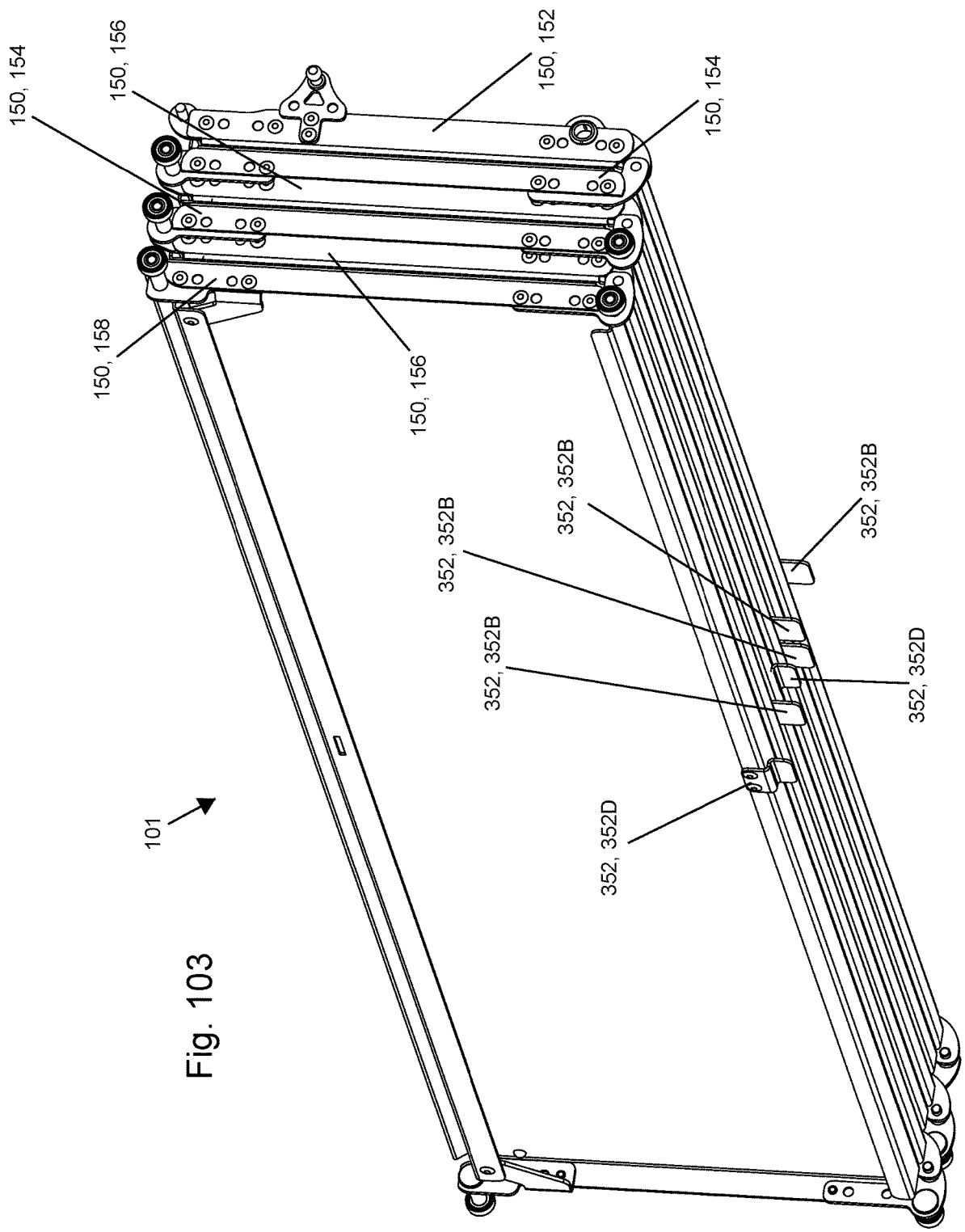
FIG. 103 is a perspective view of the panel assembly of FIG. 8 further illustrating the interlocking structures of FIG. 102 shown in the decoupled configuration.
Figure 104:
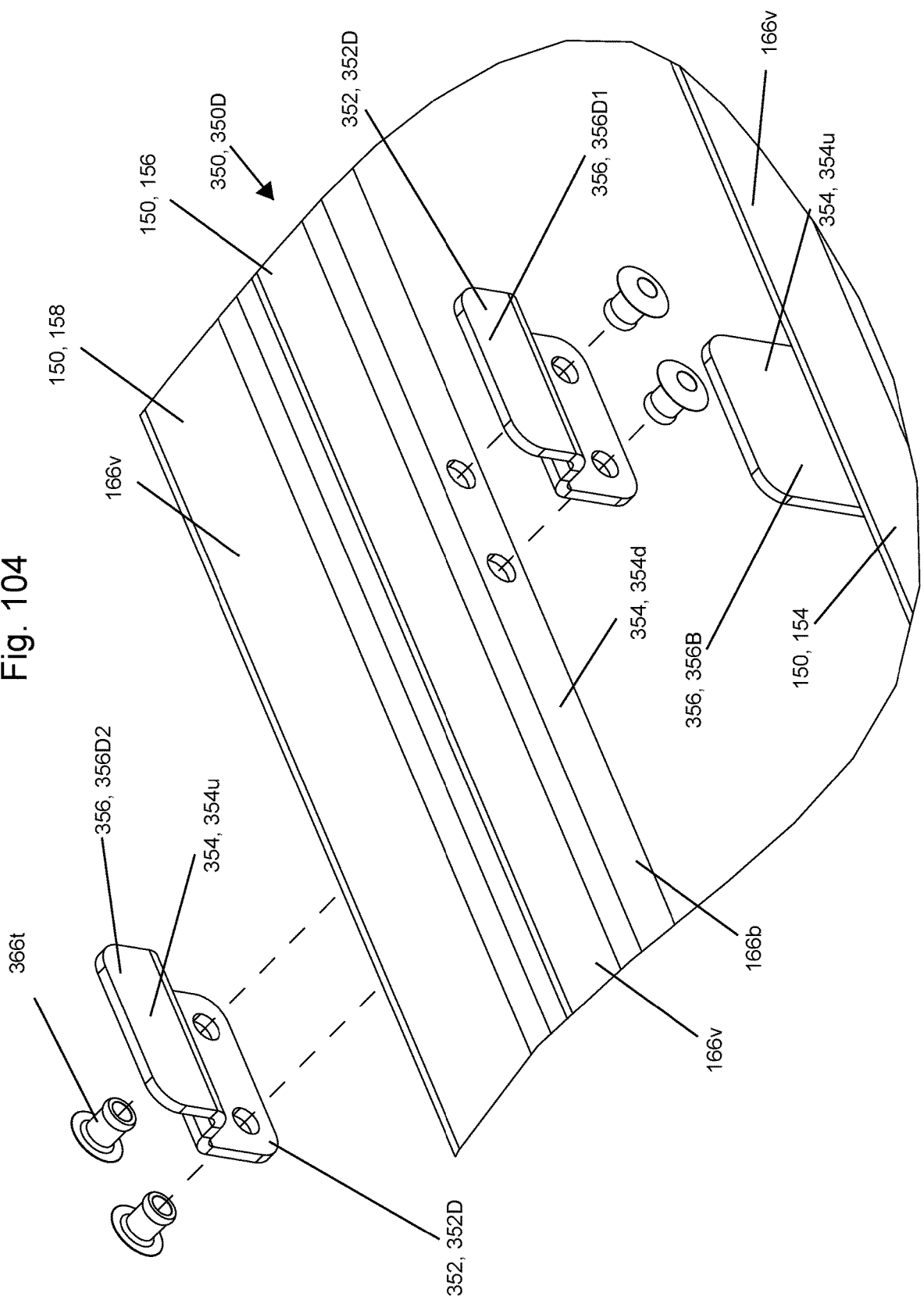
FIG. 104 is a partial exploded perspective view of the interlocking structures of FIG. 102 shown in the decoupled configuration.
Figure 105:
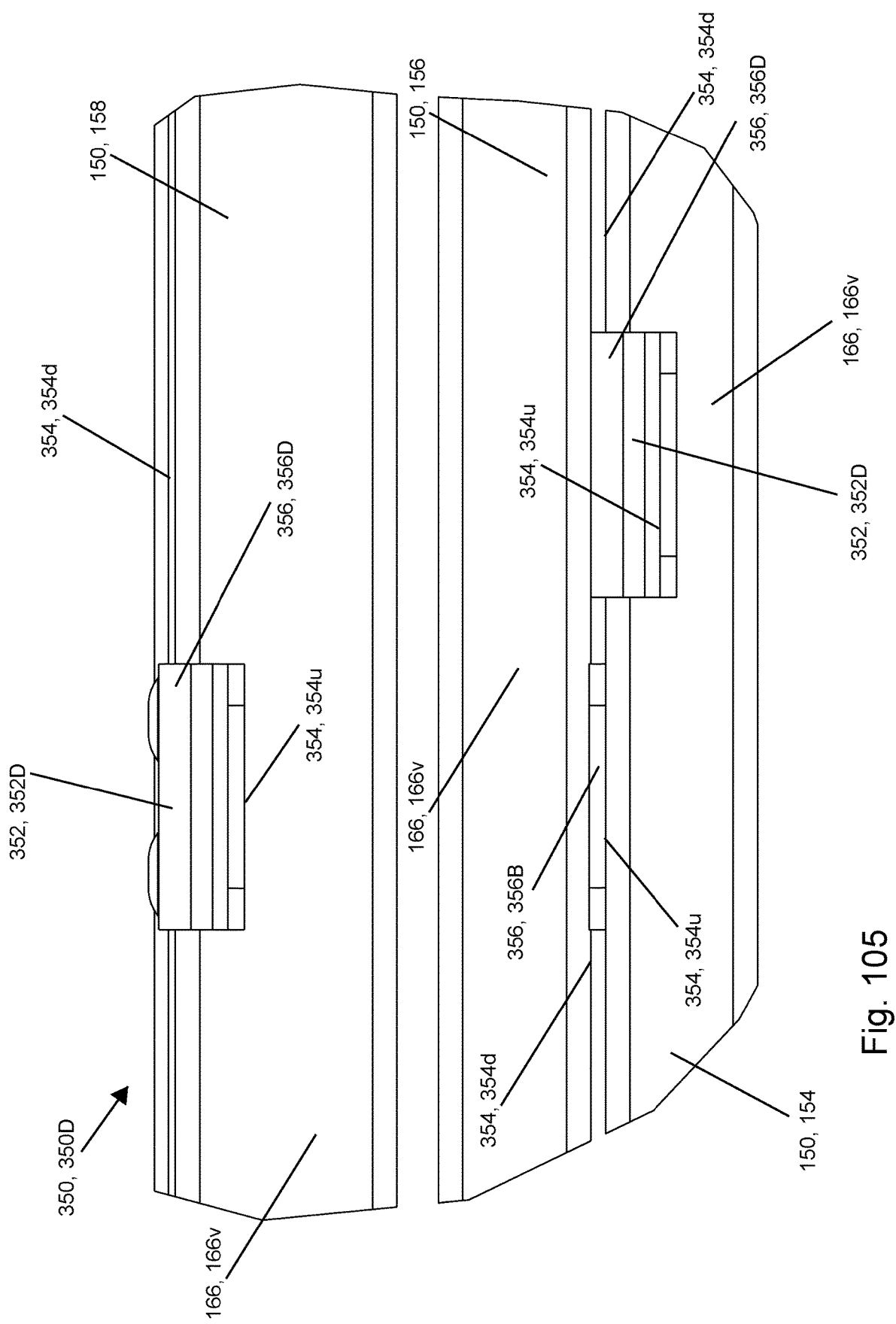
FIG. 105 is a plan view of the interlocking structures of FIG. 102 shown in the decoupled configuration.
Figure 106:
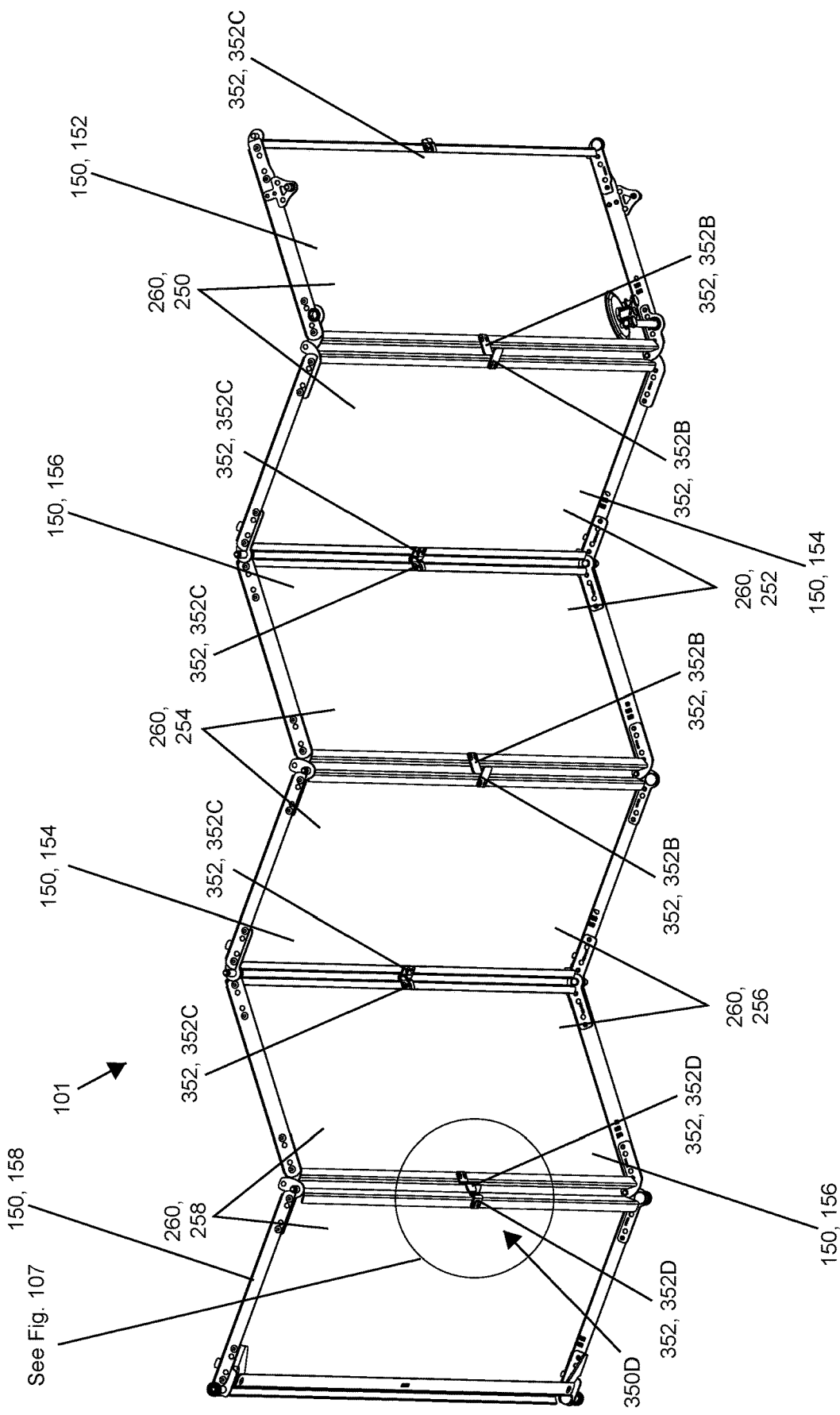
FIG. 106 is a perspective view of the panel assembly of FIG. 8 further illustrating the interlocking structures of FIG. 102.
Figure 107:
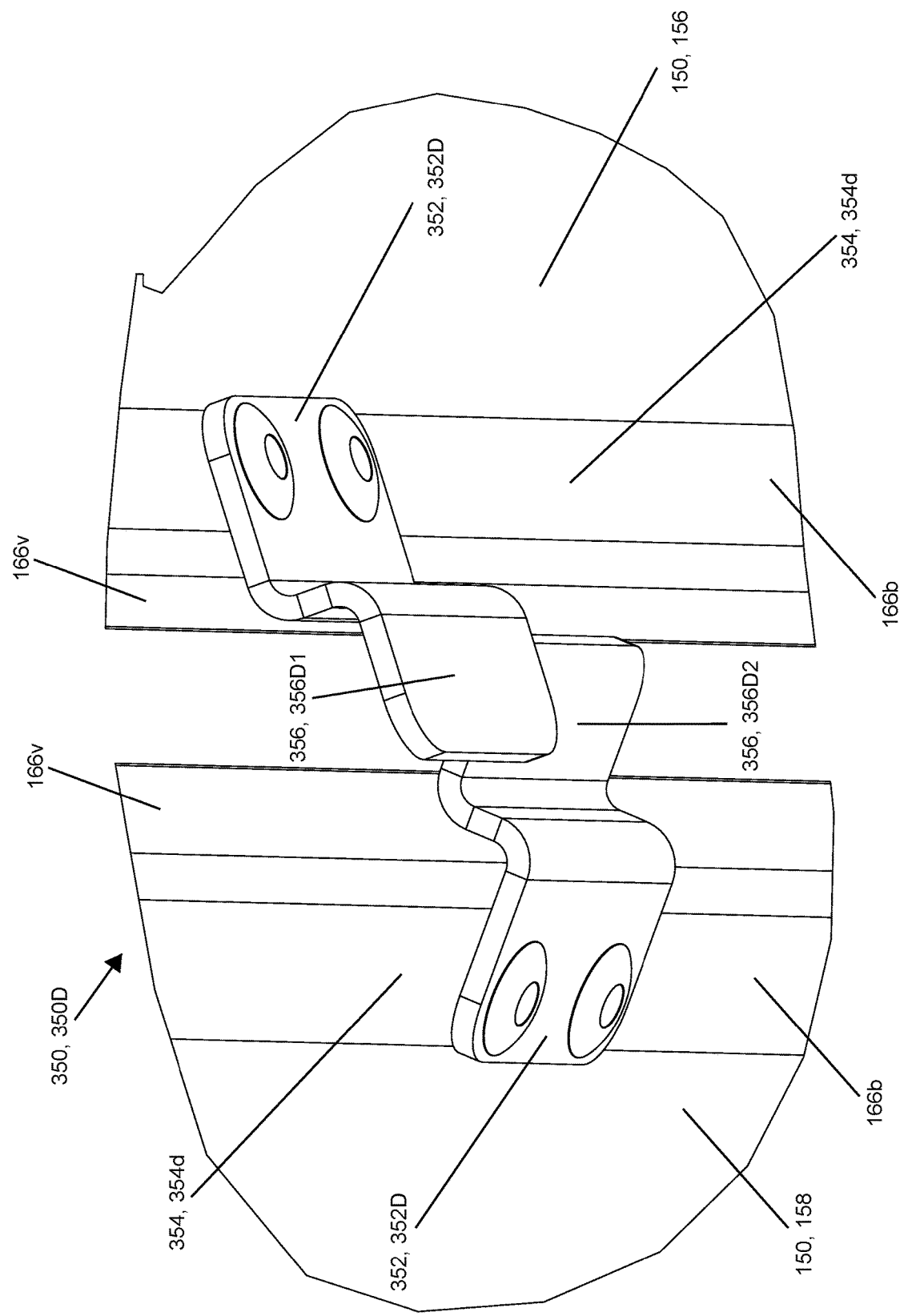
FIG. 107 is a partial perspective view of the interlocking structures of FIG. 102 shown in a transitioning configuration.
Figure 108:
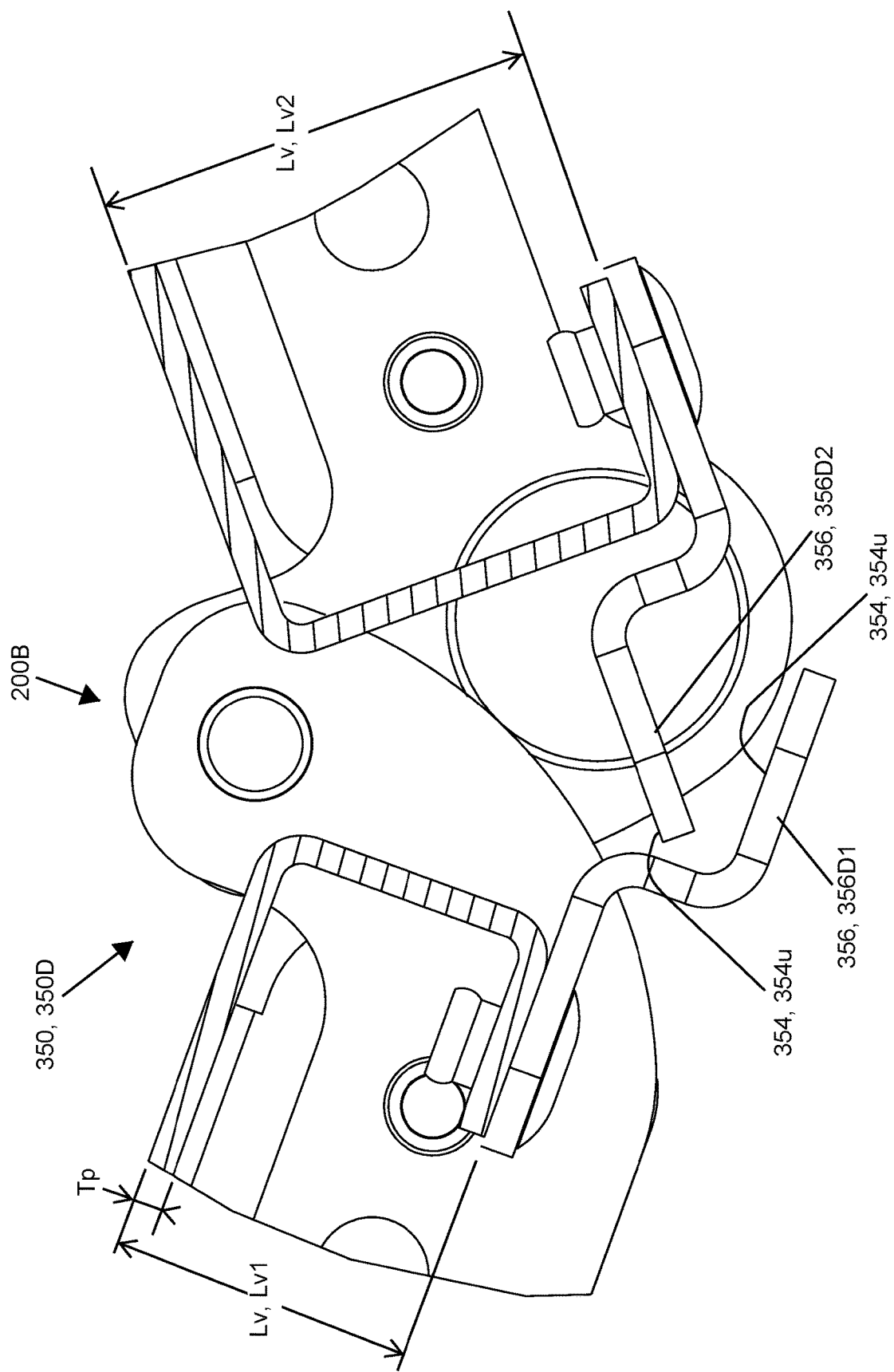
FIG. 108 is a cross-sectional side view of the interlocking structures of FIG. 102 shown in a transitioning configuration.

Turning now to FIGS. 102-111, the connecting structure 350D will be described in detail. The connecting structure 350D includes a pair of connecting pieces 352D of the connecting pieces 352 and portions of the bottom leg 166b of the C-channel feature 166 of the adjoining panels 156, 158. As illustrated at FIG. 104, the connecting pieces 352D are fastened to the bottom leg 166b of the C-channel feature 166. As depicted, the connecting pieces 352D are connected with a pair of the fasteners 366t through a pair of holes 368. As illustrated at FIG. 105, the connecting pieces 352D, and therefore the fasteners 366t, are staggered. By including a staggered pattern, the connecting structure 350D can be made more compact. By staggering the connecting pieces 352D, the connecting pieces 352D avoid interfering with each other. In addition, the fasteners 366t and the heads of the fasteners 366t also avoid interfering with the fasteners 366t of the opposite connecting piece 352D. As illustrated at FIG. 107, the down-facing bearing surfaces 354d are included on a portion of the bottom leg 166b of the C-channel feature 166. As illustrated at FIG. 108, the up-facing bearing surfaces 354u are included on tabs 356D1, 356D2 of the connecting piece 352D. A first of the connecting pieces 352D is on a first panel 156 of an adjacent pair 260 of the panels 156, 158, and a second of the connecting pieces 352D is connected to the opposite panel 158. As depicted, the connecting pieces 352D can be identical parts used flipped over from each other.

Figure 109:
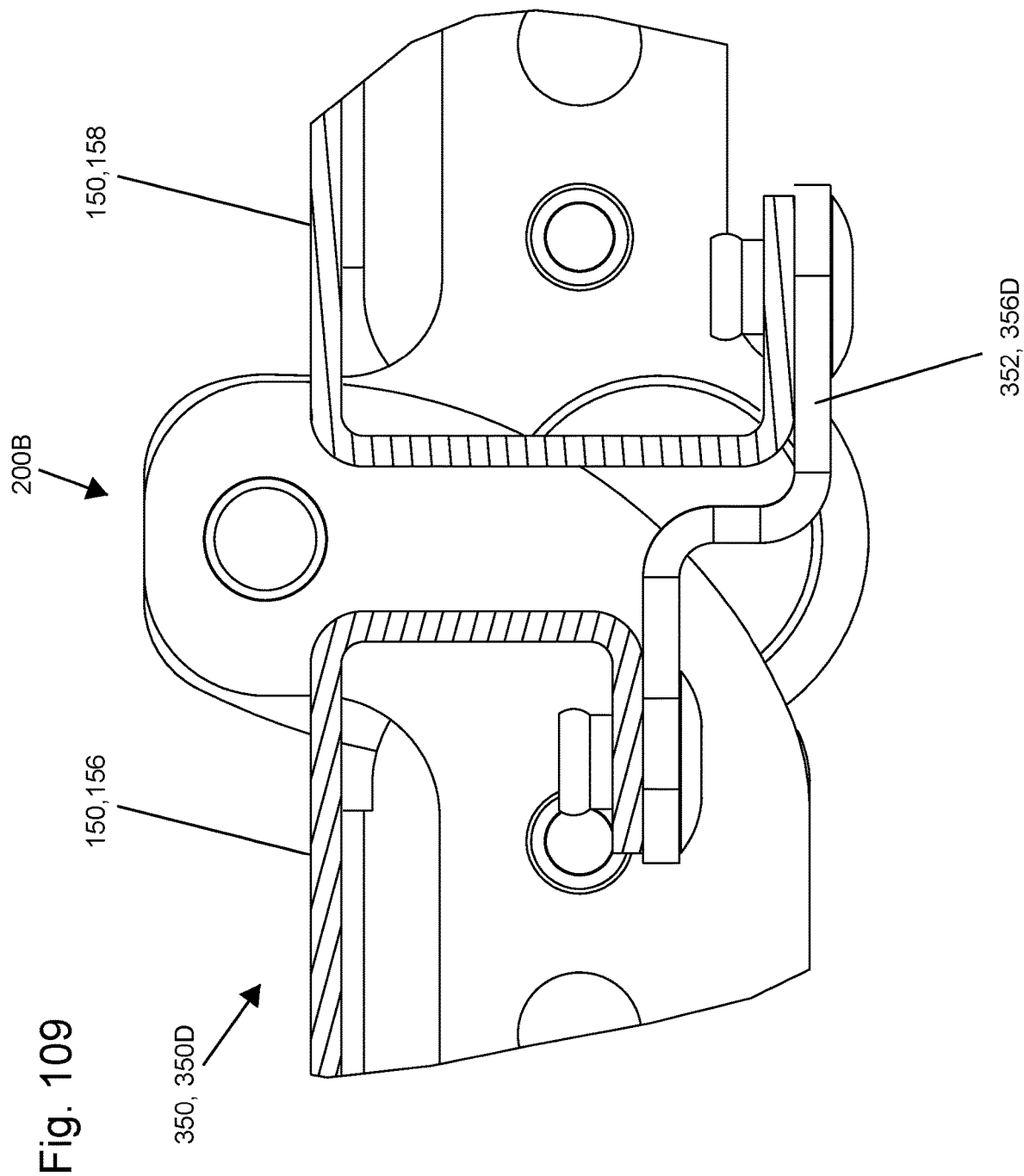
FIG. 109 is a cross-sectional side view of the interlocking structures of FIG. 102 shown in an engaged configuration.
Figure 110:
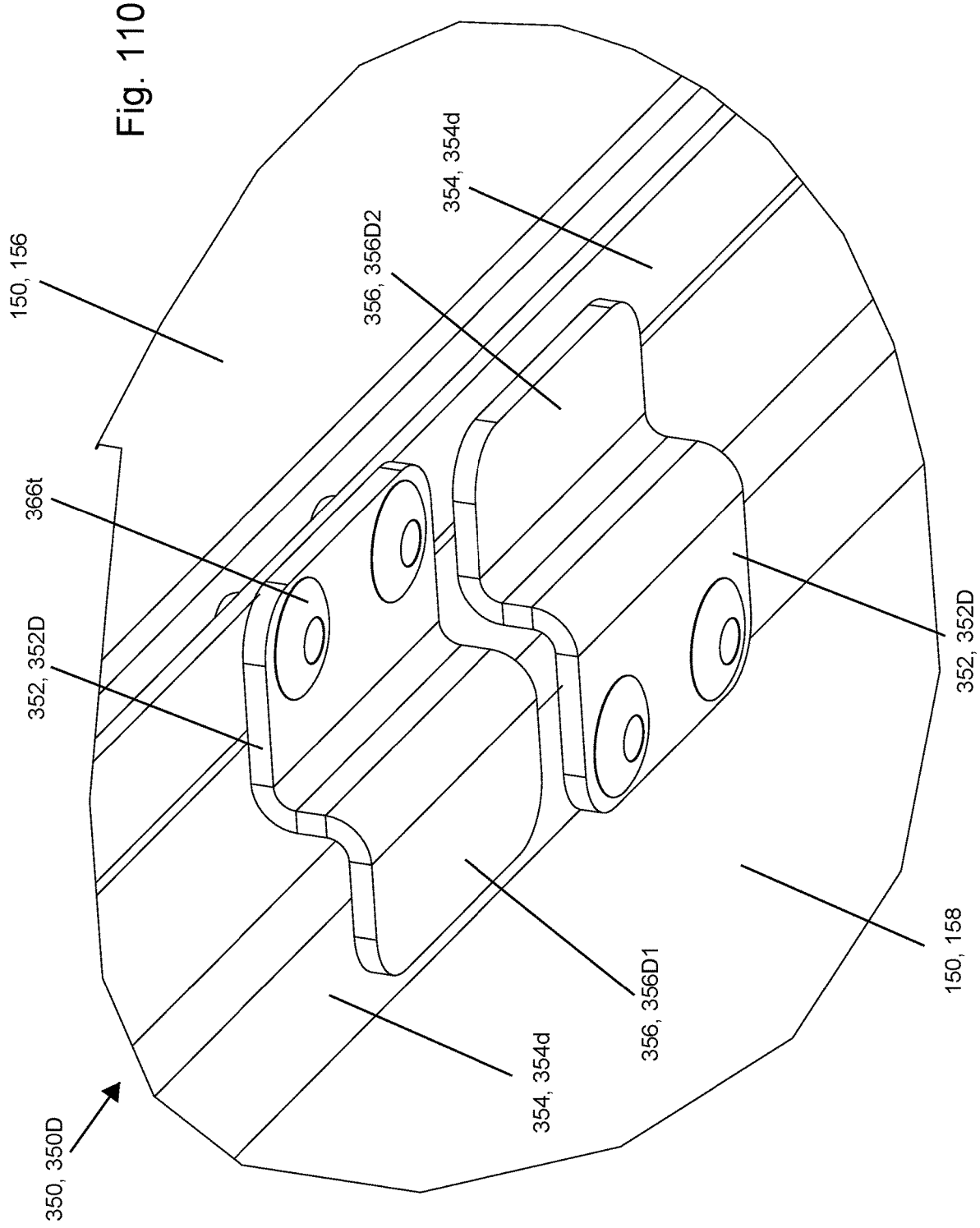
FIG. 110 is a partial perspective view of the interlocking structures of FIG. 102 shown in the engaged configuration.
Figure 111:
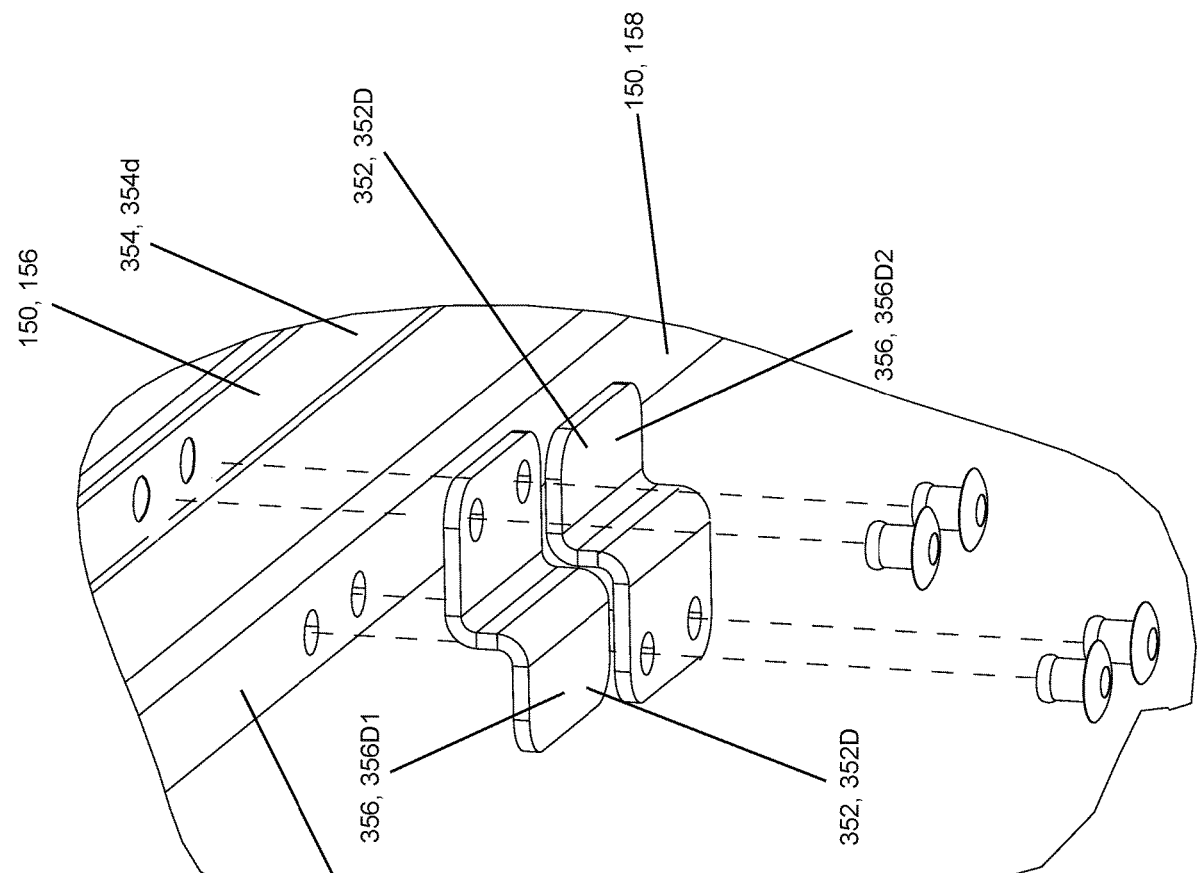
FIG. 111 is a partial exploded perspective view of the interlocking structures of FIG. 102 shown in the engaged configuration.

Turning now to FIGS. 103, 108, and 109, an engagement/disengagement sequence of the connecting structure 350D is illustrated. FIG. 103 illustrates the connecting structure 350D when the retractable cover system 100 is in the fully retracted configuration 104. In this configuration, the up-facing surfaces 354u and the down-facing surfaces 354d face in a forward/rearward direction that is generally horizontal. FIG. 108 illustrates the adjacent pair 258 of panels 150 between the extended 102 and the retracted configurations 104. As illustrated at FIG. 108, as the retractable cover system 100 moves toward the extended (i.e., deployed) configuration, the up-facing surfaces 354u increasingly face in an upward direction and the down-facing surfaces 354d increasingly face in a downward direction. FIG. 109 illustrates the connecting structure 350D in an engaged configuration with the retractable cover system 100 fully deployed. In the fully deployed configuration, the up-facing surfaces 354u engage the down-facing surface 354d of the opposite panel. Likewise, the up-facing surface 354u of the opposite tab 356D1, 356D2 engages the down-facing surface 354d of the opposite panel 150.

Therefore, as illustrated at FIG. 109, the pair of the tabs 356D1, 356D2 of the connecting pieces 352D engage with opposite portions of the bottom leg 166b of the C-channel features 166 and thereby prevent upward and downward movement across the adjacent pair 258 of the panels 150. FIGS. 108 and 109 generally illustrate the joint 200B as the axis of the joint 200B is above the top surfaces 150t of the panels 156, 158 when the retractable cover system 100 is in the deployed configuration.

The connecting structure 350D is similar to the connecting structure 350B except that the panel 158 includes a thickness Lv2 that is substantially greater than a thickness Lv1 of the adjacent panel 156. For this reason, the connecting pieces 352D include a jog that matches a difference between the thickness Lv1 and the thickness Lv2. As with the connecting structure 350B, the connecting pieces 352D are staggered with respect to each other and thereby avoid interfering with each other along the width W of the panels 150 (see FIG. 8). As with the connecting structure 350B, the connecting structure 350D includes the upward facing bearing surfaces 354u on the connecting piece 352B. As illustrated at FIG. 97, the downward facing bearing surfaces 354d are included on a portion of the bottom leg 166b of the corresponding panel 150.

The connecting structures 350B are used to act as a reinforcing structure at or near the center of the panels 150 of the same thickness across the joints 200B where the pivot axis is above the top 150t of the panels 150, when extended, thereby joining the panels 150 to one another. When the cover 100 is open, the brackets 352B hang below the cover 100. As the cover 100 is closed, the brackets 352B rotate up and mate with a portion of the underside long leg 166b of the panel 150 opposite the joint. Each mating pair of the brackets 352B is offset from the center of the panels 150 in opposite directions slightly for clearance as they swing up into place. This forms a joint because neither of the panels 150 is able to translate up or down in the center once the cover 100 is closed.

The connecting structures 350C are used to act as a reinforcing structure and mesh together and join where the pivot axis is below the top 150t of the panels 150, when extended (i.e., at the joints 200A). The connecting structure 350A is similar but is between the first panel 152 and the cross-member 130. When the cover 100 is open, the brackets 352C are opposite each other at or near the center of the panels 150. When the cover 100 is open, the brackets 352C extend above the cover 100. As the cover 100 is closed, the brackets 352C rotate and mesh together. In the closed position of the cover 100, the tab 356C2 of each bracket 352C is offset upward above the opposing flat tab 356C1 of the mating bracket 352C. This forms a joint when these offset tabs 356C1 and 356C2 (i.e., sections) slide over the mating tab 356C1 and 356C2 on the opposite bracket 352C. In certain embodiments, both brackets 352C are equal and opposite and both have an offset 356C2 and a flat tab 356C1 and thus do not allow either adjacent panel 150 to translate up or down at the location of the connecting structures 350C (e.g., in the center of the panel 150) once the connecting structure 350C (i.e., joint) is locked. The rivets 366t of the connecting structures 350C are offset from each other when the cover 100 is folded open. This allows the panel assembly 101 to take up minimum space and not have excessive bow when the joint is collapsed. For the connecting structure 350A between the first panel 152 and the rail crosspiece 130, the rail crosspiece bracket 352A is stationary in a horizontal position and the mating bracket 352C rotates up and into mesh, similar to the connecting structures 350C.

The connecting structure 350D is used at the final two panels 156, 158 on the underside of the long legs 166b in generally the same manner as the other center supports 350B on upper pivot joints 200B. The brackets 352D are used to act as a reinforcing structure at or near the center of the panels 156, 158 of different thickness at the joints 200B where the pivot axis is above the panels 150 thereby joining the panels 156, 158 to one another in the middle. When the cover 100 is open, the brackets 352D hang below the cover 100. As the cover 100 is closed, the brackets 352D rotate up and mate with the underside long leg 166b of the panel 150 opposite the joint. The mating pair is offset from the center of the panels 150 in opposite directions slightly for clearance as they swing up into place. The difference between this pair of brackets 352D and the pairs of brackets 352B that support the other upper pivot joints 200B is an offset jog in the brackets 352D. The long leg on the last panel 158 is taller than that of the mating panel 156 and so requires that the tabs 356D1, 356D2 be offset to complete the joint. As with the connecting structure 350B, the connecting structure 350D forms a joint because neither panel 156, 158 is able to translate up or down in the center once the cover 100 is closed.

As illustrated at FIGS. 81, 88, 89, 92, and 102, a bumper 950 may be mounted on the panels 150 for use in the stowed configuration 104. In particular, the bumper 950 includes an attachment portion 950A adapted to attach to the panel permanently or semi-permanently. The bumper 950 also includes a bumper portion 950B adapted to contact an opposite panel 150 when the retractable cover system 100 is in the stowed configuration 104. As illustrated, the attachment portion 950A includes a projection adapted to insert through a mounting hole of the panel 150. The projection may include a latching feature to retain the attachment portion 950A within the hole. The bumpers 950 may compress when the retractable cover system 100 is in the stowed configuration 104 and thereby reduce or prevent rattling of the retractable cover system 100 when in the stowed configuration 104. The bumpers 950 may prevent the panels 950 from directly contacting each other and thereby prevent the panels 950 from scratching, scrapping, and/or marring each other.

As illustrated at FIGS. 2 and 3, the bumpers 950 may be hidden under the rails 110l, 110r when the retractable cover system 100 is in the extended configuration 102 and thereby be protected from external objects and/or avoid detracting from the otherwise smooth appearance of the retractable cover system 100, when in the extended configuration 102.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A retractable cover system for covering a pickup truck box, the retractable cover system comprising:
    a first rail including a first track portion with a first cutout;
    a second rail including a second track portion with a second cutout;
    a first lateral guide surface positioned on the first rail;
    a second lateral guide surface positioned on the second rail;
    a plurality of panels extending between a first side and a second side and pivotally attached to one another at a plurality of pivots;
    at least one first roller attached to the first side of the plurality of panels, the at least one first roller laterally positioned to ride along the first track portion and pass through the first cutout;
    at least one second roller attached to the second side of the plurality of panels, the at least one second roller laterally positioned to ride along the second track portion and pass through the second cutout;
    a plurality of third rollers attached to the first side of the plurality of panels, the plurality of third rollers laterally positioned to ride along the first track portion but not pass through the first cutout, wherein one of the third rollers extends outwards from the first side of the plurality of panels further than the remaining third rollers and laterally engages the first lateral guide surface to laterally guide the plurality of panels;
a plurality of fourth rollers attached to the second side of the plurality of panels, the plurality of fourth rollers laterally positioned to ride along the second track portion but not pass through the second cutout, wherein one of the fourth rollers extends outwards from the second side of the plurality of panels further than the remaining fourth rollers and laterally engages the second lateral guide surface to laterally guide the plurality of panels;
a first ramp continuing from the cutout in the first rail;
a second ramp continuing from the cutout in the second rail;
a first jacking screw threadingly engaged with the first ramp and adapted for engagement with a first side wall of the pickup truck box; and
a second jacking screw threadingly engaged with the second ramp and adapted for engagement with a second side wall of the pickup truck box;
wherein the ramps are initially positioned outwardly out of alignment with the rollers and are adjustable for aligning the ramps with the plurality of third and fourth rollers; and
wherein the first jacking screw bends the first ramp inwardly to align with first corresponding rollers of the plurality of third rollers when turned, and wherein the second jacking screw bends the second ramp inwardly to align with second corresponding rollers of the plurality of fourth rollers when turned.

2. The retractable cover system of claim 1, wherein the first lateral guide surface is included at a first corner between a first wall and the first track portion of the first rail, and wherein the second lateral guide surface is included at a second corner between a second wall and the second track portion of the second rail.

3. The retractable cover system of claim 1, wherein the first lateral guide surface is included at a first wall of the first rail, and wherein the second lateral guide surface is included at a second wall of the second rail.

4. The retractable cover system of claim 1, wherein the one of the third rollers that is guided by the first lateral guide surface is a rearmost roller of the third rollers and wherein the one of the fourth rollers that is guided by the second lateral guide surface is a rearmost roller of the fourth rollers.

5. The retractable cover system of claim 1, wherein the retractable cover system includes no structure between a lower portion of the first ramp and a lower portion of the second ramp.

6. A retractable cover system for covering a pickup truck box, the retractable cover system comprising:
a first rail including a first track portion with a first cutout;
a first ramp continuing from the first cutout of the first rail;
a second rail including a second track portion with a second cutout;
a second ramp continuing from the second cutout of the second rail;
a plurality of panels extending between a first side and a second side, the plurality of panels movable between a deployed configuration and a stowed configuration, the plurality of panels substantially covering the pickup truck box when in the deployed configuration; and
a plurality of guide elements that guides and supports the plurality of panels and rides on the track portions, the plurality of guide elements including a first set of guide elements that remain on the track portions but provide substantially no lateral support, a second set of guide elements that remain on the track portions and provide lateral support, and a third set of guide elements that leave the track portions at the cutouts and ride on the ramps;
a first jacking screw threadingly engaged with the first ramp and adapted for engagement with a first side wall of the pickup truck box;
a second jacking screw threadingly engaged with the second ramp and adapted for engagement with a second side wall of the pickup truck box;
wherein the ramps are initially positioned outwardly out of alignment with the guide elements and
are adjustable for aligning the ramps with the second set of guide elements; and
wherein the first jacking screw bends the first ramp inwardly to align with first corresponding guide elements of the second set of guide elements when turned, and wherein the second jacking screw bends the second ramp inwardly to align with second corresponding guide elements of the second set of guide elements when turned.

7. The retractable cover system of claim 6, wherein no cross-member directly links a lower portion of the first ramp with a lower portion of the second ramp.

8. The retractable cover system of claim 6, wherein the retractable cover system includes no structure between a lower portion of the first ramp and a lower portion of the second ramp.

9. The retractable cover system of claim 6, wherein the second set of guide elements comprise a pair of opposing extended guide elements that extend beyond the other guide elements to engage a pair of lateral guide surfaces adjacent the rails and the other guide elements are spaced apart from the lateral guide surfaces.

* * * * *